US012458705B2

(12) United States Patent
Jaminet et al.

(10) Patent No.: US 12,458,705 B2
(45) Date of Patent: *Nov. 4, 2025

(54) ANTIBODY-OLIGONUCLEOTIDE CONJUGATES

(71) Applicant: ANGIEX, INC., Cambridge, MA (US)

(72) Inventors: Paul A. Jaminet, Cambridge, MA (US); Shou-Ching S. Jaminet, Cambridge, MA (US); Edward Ha, Cambridge, MA (US)

(73) Assignee: ANGIEX, INC., Cambridge, MA (US)

( * ) Notice: Subject to any disclaimer, the term of this patent is extended or adjusted under 35 U.S.C. 154(b) by 1132 days.

This patent is subject to a terminal disclaimer.

(21) Appl. No.: 17/251,316

(22) PCT Filed: Jun. 12, 2019

(86) PCT No.: PCT/US2019/036836
§ 371 (c)(1),
(2) Date: Dec. 11, 2020

(87) PCT Pub. No.: WO2019/241430
PCT Pub. Date: Dec. 19, 2019

(65) Prior Publication Data
US 2021/0260209 A1   Aug. 26, 2021

Related U.S. Application Data

(60) Provisional application No. 62/684,131, filed on Jun. 12, 2018.

(51) Int. Cl.
C07K 16/00 (2006.01)
A61K 45/06 (2006.01)
A61K 47/68 (2017.01)
A61P 35/00 (2006.01)
C07K 16/28 (2006.01)
C07K 19/00 (2006.01)
C12N 15/113 (2010.01)

(52) U.S. Cl.
CPC .......... *A61K 47/6807* (2017.08); *A61K 45/06* (2013.01); *A61K 47/6849* (2017.08); *A61K 47/6855* (2017.08); *A61P 35/00* (2018.01); *C07K 16/28* (2013.01); *C07K 19/00* (2013.01); *C12N 15/113* (2013.01); *C12N 15/1135* (2013.01); *C12N 15/1137* (2013.01); *C12N 15/1138* (2013.01); *C07K 2317/55* (2013.01); *C12N 2310/11* (2013.01); *C12N 2310/14* (2013.01); *C12N 2310/141* (2013.01); *C12N 2310/3513* (2013.01); *C12N 2320/32* (2013.01)

(58) Field of Classification Search
None
See application file for complete search history.

(56) References Cited

U.S. PATENT DOCUMENTS

| | | |
|---|---|---|
| 3,773,919 A | 11/1973 | Boswell et al. |
| 3,854,480 A | 12/1974 | Zaffaroni |
| 3,887,699 A | 6/1975 | Yolles |
| 4,452,775 A | 6/1984 | Kent |
| 4,485,045 A | 11/1984 | Regen |
| 4,544,545 A | 10/1985 | Ryan et al. |
| 4,675,189 A | 6/1987 | Kent et al. |
| 4,816,567 A | 3/1989 | Cabilly et al. |
| 5,133,974 A | 7/1992 | Paradissis et al. |
| 5,225,539 A | 7/1993 | Winter |
| 5,407,686 A | 4/1995 | Patel et al. |
| 5,500,362 A | 3/1996 | Robinson et al. |
| 5,530,101 A | 6/1996 | Queen et al. |
| 5,565,332 A | 10/1996 | Hoogenboom et al. |
| 5,585,089 A | 12/1996 | Queen et al. |
| 5,654,010 A | 8/1997 | Johnson et al. |
| 5,693,761 A | 12/1997 | Queen et al. |
| 5,693,762 A | 12/1997 | Queen et al. |
| 5,736,152 A | 4/1998 | Dunn |
| 5,821,337 A | 10/1998 | Carter et al. |
| 6,180,370 B1 | 1/2001 | Queen et al. |
| 6,194,551 B1 | 2/2001 | Idusogie et al. |
| 6,372,716 B1 | 4/2002 | Bush et al. |
| 6,566,329 B1 | 5/2003 | Meyn et al. |
| 6,685,940 B2 | 2/2004 | Andya et al. |
| 6,982,321 B2 | 1/2006 | Winter |
| 7,087,409 B2 | 8/2006 | Barbas, III et al. |
| 7,527,791 B2 | 5/2009 | Adams et al. |
| 10,155,812 B2 | 12/2018 | Jaminet et al. |
| 11,208,495 B2 * | 12/2021 | Jaminet ................. A61P 35/04 |
| 2003/0235584 A1 | 12/2003 | Kloetzer et al. |

(Continued)

FOREIGN PATENT DOCUMENTS

| | | |
|---|---|---|
| CA | 1176565 A | 10/1984 |
| CN | 105934252 A | 9/2016 |

(Continued)

OTHER PUBLICATIONS

Gong et al. Bioconjugate Chemistry 2016, 27:217-235. (Year: 2016).*
Janeway Jr et al., Immunology, 3rd Edition, 1997 Garland Publishing Inc., pp. 3:1-3:11. (Year: 1997).*
Edwards et al. J. Mol. Biol., 2003, 334:103-118. (Year: 2003).*
Lloyd et al. Protein Engineering Design & Selection 2009, 22;3:159-168. (Year: 2009).*
Goel et al. The Journal of Immunology, 2004, 173:7358-7367. (Year: 2004).*
Kanyavuz et al. Nature Review Immunology, 2019, 19: 355-368. (Year: 2019).*
International Search Report and Written Opinion dated Dec. 2, 2019 for PCT/US2019/036836.

(Continued)

Primary Examiner — Chun W Dahle
(74) Attorney, Agent, or Firm — Wilson Sonsini Goodrich & Rosati

(57) ABSTRACT

Conjugates are provided, comprising a targeting protein, e.g., an anti-TM4SF1 antibody or antigen or binding fragments thereof. Methods of manufacture and use of said conjugates are also described.

12 Claims, 44 Drawing Sheets

Specification includes a Sequence Listing.

(56) References Cited

U.S. PATENT DOCUMENTS

| | | | |
|---|---|---|---|
| 2006/0030003 A1* | 2/2006 | Simon | A61K 47/6867 530/391.1 |
| 2006/0030015 A1 | 2/2006 | Uda et al. | |
| 2012/0004117 A1 | 1/2012 | Aburatani et al. | |
| 2016/0194402 A1 | 7/2016 | Van Eenennaam et al. | |

FOREIGN PATENT DOCUMENTS

| | | | |
|---|---|---|---|
| DE | 3218121 A1 | 11/1983 | |
| EP | 0036676 A1 | 9/1981 | |
| EP | 0052322 A2 | 5/1982 | |
| EP | 0058481 A1 | 8/1982 | |
| EP | 0088046 A2 | 9/1983 | |
| EP | 0102324 A2 | 3/1984 | |
| EP | 0142641 A2 | 5/1985 | |
| EP | 0143949 A1 | 6/1985 | |
| EP | 0158277 A2 | 10/1985 | |
| EP | 0239400 A2 | 9/1987 | |
| EP | 0517565 A2 | 12/1992 | |
| EP | 0519596 A1 | 12/1992 | |
| EP | 0592106 A1 | 4/1994 | |
| EP | 1951890 A4 | 6/2009 | |
| EP | 3315139 A1 * | 5/2018 | A61K 47/555 |
| WO | WO-9109967 A1 | 7/1991 | |
| WO | WO-9209690 A2 | 6/1992 | |
| WO | WO-9315722 A1 | 8/1993 | |
| WO | WO-9607399 A1 | 3/1996 | |
| WO | WO-9629998 A1 | 10/1996 | |
| WO | WO-9640072 A2 | 12/1996 | |
| WO | WO-9703692 A1 | 2/1997 | |
| WO | WO-9951642 A1 | 10/1999 | |
| WO | WO-2004009664 A2 | 1/2004 | |
| WO | WO-2005087201 A1 | 9/2005 | |
| WO | WO-2005100402 A1 | 10/2005 | |
| WO | WO-2006029879 A2 | 3/2006 | |
| WO | WO-2007070659 A2 | 6/2007 | |
| WO | WO-2007079130 A2 | 7/2007 | |
| WO | WO-2007094916 A2 | 8/2007 | |
| WO | WO-2008077079 A1 | 6/2008 | |
| WO | WO-2008083346 A1 | 7/2008 | |
| WO | WO-2009045536 A2 | 4/2009 | |
| WO | WO-2010037062 A1 | 4/2010 | |
| WO | WO-2011028195 A2 | 3/2011 | |
| WO | WO-2012166559 A1 | 12/2012 | |
| WO | WO-2012166560 A1 | 12/2012 | |
| WO | WO-2015054427 A1 | 4/2015 | |
| WO | WO-2019046338 A1 * | 3/2019 | A61P 35/04 |
| WO | WO-2019241430 A2 | 12/2019 | |

OTHER PUBLICATIONS

Karaki et al., Lipid-oligonucleotide conjugates improve cellular update and efficiency of TCTP-antisense in castration-resistant prostrate cancer, J Control Release, Jul. 2017, 258:1-9.

Lin, Chi-Lou et al., TM4SF!: A new vascular therapeutic target in cancer, Angiogenesis, Oct. 2014; 17(4):897-907.

Murmann, et al., Small interfering RNAs based on huntington trinucleotide repeats are highly toxic to cancer cells, EMBO Rep. Mar. 2018, 19(3).

Sciuto et al., Intracellular distribution of TM4SF1 and internalization of TM4SF1-antibody complex in vascular endothelial cells, Biochem Biophys Res Commun, Aug. 1, 2015, vol. 45, pp. 338-343.

Visintin, et al., Novel Anti-TM4SF1 Antibody-Drug Conjugates with Activity against Tumor Cells and Tumor Vasculature, Mmol Cancer Ther, Jun. 18, 2015, vol. 14, pp. 1868-1876.

Zhu, Haibin et al., RNA interference targeting mutant p53 inhibits growth and induces apoptosis in DU145 human prostate cancer cells, Medical Oncology vol. 28, pp. 381-387 (2011).

Almagro et al.: Humanization of Antibodies. Frontiers in Bioscience 13:1619-1633 (2008).

Altschul et al., Gapped BLAST and PSI-Blast: A New Generation Of Protein Database Search Programs. Nucleic Acids Research 25(17):3389-3402 (1997).

An Z et al.: IgG2m4, an engineered antibody isotype with reduced Fc function. MAbs. 1(6):572-9 (2009).

Angal et al.: A single amino acid substitution abolishes the heterogeneity of chimeric mouse/human (IgG4) antibody.Mol Immunol. 30(1):105-108 (1993).

Baca et al.: Antibody humanization using monovalent phage display. J Biol Chem 272(16):10678-10684 (1997).

Bass et al.: Hormone phage: an enrichment method for variant proteins with altered binding properties. Proteins. 8(4):309-314 (1990).

Brennan et al.: Preparation of bispecific antibodies by chemical recombination of monoclonal immunoglobulin fragments. Science 229:81-83 (1985).

Brodeur et al.: In: Monoclonal Antibody Production Techniques and Applications. New York: Marcel Dekker:51-63 (1987).

Bruggemann et al.: Comparison of the Effector Functions of Human Immunoglobulins Using a Matched Set of Chimeric Antibodies. J. Exp. Med. 166:1351-1361 (1987).

Carter et al.: Humanization of an anti-p185HER2 antibody for human cancer therapy. PNAS USA 89(10):4285-4289 (1992).

Chang et al.: CD13 (Aminopeptidase N) Can Associate With Tumor-Associated Antigen L6 and Enhance the Motility of Human Lung Cancer Cells, IntJ Cancer. 1(16): 243-252 (2005).

Chaudhary et al.: A rapid method of cloning functional variable-region antibody genes in *Escherichia coli* as single-chain immunotoxins. Proc. Natl. Acad. Sci USA 87:1066-1070 (Feb. 1990).

Chen et al.: Selection And Analysis Of An Optimized Anti-VEGF Antibody: Crystal Structure Of An Affinity-matured Fab In Complex With Antigen. Journal of Molecular Biology 293(4):865-881 (1999).

Chinese Patent Application No. 201980054038.8 Office Action dated Aug. 26, 2023.

Chothia et al.: Canonical structures for the hypervariable regions of immunoglobulins. J Mol Biol 196:901-917 (1987).

Chothia et al., Conformations Of Immunoglobulin Hypervariable Regions. Nature 342(6252):877-883 (1989).

Clynes et al.: Fc receptors are required in passive and active immunity to melanoma. Proc Natl Acad Sci U S A. 95(2):652-6 (1998).

Cragg et al.: Antibody specificity controls in vivo effector mechanisms of aniti-CD20 reagents, Blood 103:2738-2743 (2004).

Cragg et al.: Complement-mediated lysis by anti-CD20 mAb correlates with segregation into lipid rafts. Blood 101(3):1045-1052 (2003).

Cuellar et al. Systematic evaluation of antibody-mediated siRNA delivery using an industrial platform of THIOMAB-siRNA conjugates. Nucleic Acids Res 43(2):1189-1203 (2015).

Dall'Acqua, et al.: Antibody humanization by framework shuffling. Methods. 36(1):43-60 (2005).

Gazzano-Santoro et al.: A non-radioactive complement-dependent cytotoxicity assay for anti-CD20 monoclonal antibody. J Immunol Methods 202(2):163-171 (1997).

Griffiths et al.: Human anti-self antibodies with high specificity from phage display libraries. Embo J. 12(2):725-734 (1993).

Hellstrom et al.: Antitumor Effects of L6, and IgG2a Antibody that Reacts with Most Human Carcinomas. Proceedings of the National Academy of Sciences. National Academy of Sciences. US 83(18):7059-7063 (1986).

Hellstrom et al.: Monoclonal Mouse Antibodies Raised Against Human Lung Carcinoma Cancer Research, 46(8):3917-3923 (1986).

Hezareh et al. Effector Function Activities of a Panel of Mutants of a Broadly Neutralizing Antibody Against Human Immunodeficiency Virus Type 1. Journal of Virology 75(24):12161-12168 (2001).

Honegger, A et al., Yet Another Numbering Scheme For Immunoglobulin Variable Domains: An Automatic Modeling And Analysis Tool. Journal of Molecular Biology 309(3):657-670 (2001).

Hudes et al.: Temsirolimus, Interferon Alfa, or Both for Advanced Renal-cell Carcinoma. The New England Journal of Medicine 356(22):2271-2281 (2007).

Hudson et al.: Engineered Antibodies. Nature Medicine 9(1):129-134 (2003).

(56) References Cited

OTHER PUBLICATIONS

Idusogie et al.: Mapping of the C1q binding site on rituxan, a chimeric antibody with a human IgG1 Fc. J Immunol. 164(8):4178-84 (2000).
Japanese Patent Application No. 2020-569176 Office Action dated Oct. 10, 2023.
Jones et al., Replacing The Complementarity-determining Regions In A Human Antibody With Those From A Mouse. Nature 321(6069):522-525 (1986).
Karlin, S, et al., Applications And Statistics For Multiple High-scoring Segments In Molecular Sequences. Proceedings of the National Academy of Sciences of the United States of America 90(12):5873-5877 (1993).
Kashmiri et al.: SDR grafting—a new approach to antibody humanization, Methods vol. 36, No. 1, pp. 25-34 (2005).
Khidekel et al.: A Chemoenzymatic Approach Toward the Rapid and Sensitive Detection of O-GlcNAc Posttranslational Modifications. Journal of the American Chemical Society 125(52):16162-16163 (2003).
Klimka et al.: Human anti-CD30 recombinant antibodies by guided phage antibody selection using cell panning. British Journal of Cancer. 83(2):252-260 (2000).
Kohler et al.: Continuous Cultures of Fused Cells Secreting Antibody of Predefined Specificity. Nature 256(5517):495-497 (1975).
Kozbor.: A human hybrid myeloma for production of human monoclonal antibodies. Immunol. 133:3001-05 (1984).
Levengood et al.: Orthogonal Cysteine Protection Enables Homogeneous Multi-Drug Antibody-Drug Conjugates. Angew Chem Int Ed England 56(3):733-737 (2017).
Liu et al.: Synthesis of 2'-paclitaxel Methyl 2-glucopyranosyl succinate for Specific Targeted Delivery to Cancer Cells. Bioorganic & medicinal chemistry letters 17(3):617-620 (2007).
Maccallum, R M, et al., Antibody-Antigen Interactions: Contact Analysis And Binding Site Topography. Journal of Molecular Biology 262(5):732-745 (1996).
Morimoto et al.: Single-step purification of F(ab')2 Fragments of Mouse Monoclonal Antibodies (Immunoglobulins G1) by Hydrophobic Interaction High Performance Liquid Chromatography using TSKgel Phenyl-5PW. J Biochem Biophys Methods 24(1-2):107-117 (1992).
Morris: Epitope Mapping Protocols. Methods in Molecular Biology. 66:1-9 (1996).
Morrison et al. Chimeric human antibody molecules: mouse antigen-binding domains with human constant region domains. PNAS USA 81(21):6851-6855 (1984).
Munson et al.: Ligand a versatile computerized approach for characterization of ligand-binding systems. Anal Biochem 107(1):220-239 (1980).
Osbourn et al.: From rodent reagents to human therapeutics using antibody guided selection. Methods 36(1):61-68 (2005).
Padlan, et al.: A possible procedure for reducing the immunogenicity of antibody variable domains while preserving their ligand-binding properties. Mol Immunol 28(4-5):489-498 (1991).
Padlan et al.: Identification of specificity-determining residues in antibodies. Faseb J 9(1):133-9 (1995).
Pearson W.R.: Using the FASTA Program to Search Protein and DNA Sequence Databases. Meth. Mol. Biol 24:307-331 (1994).
Petkova et al.: Enhanced half-life of genetically engineered human IgG1 antibodies in a humanized FcRn mouse model: potential application in humorally mediated autoimmune disease. Int Immunol 18(12):1759-1769 (2006).
Pluckthun A.: Mono-and bivalent antibody fragments produced in Escherichia coli: engineering, folding and antigen binding. Immunol Rev 130:151-188 (1992).

Presta et al.: Humanization of an antibody directed against IgE. J Immunol 151:2623-2632 (1993).
Queen et al., A humanized antibody that binds to the interleukin 2 receptor. PNAS USA 86:10029-10033 (1989).
Rabuka David et al.: Site-Specific chemical protein conjugation using genetically encoded aldehyde tags. Nat. Protoc 7(6):1052-1067 (2012).
Richman et al.: Radioimmunotherapy for breast cancer using escalating fractionated doses of 131I-labeled chimeric L6 antibody with peripheral blood progenitor cell transfusions. Cancer Res 55(23 Suppl):5916s-5920s (Dec. 1, 1995).
Riechmann et al., Reshaping human antibodies for therapy. Nature 332(6162):323-327 (1988).
Roberts et al.: Chemistry for peptide and protein PEGylation. Adv Drug Deliv Rev 54: 459-476 (2002).
Roguska et al.: Humanization of murine monoclonal antibodies through variable domain resurfacing. PNAS USA 91:969-973 (1994).
Rosok et al.: A Combinatorial Library Strategy for the Rapid Humanization of Anticarcinoma BR96 Fab. J Biol Chem 271:22611-22618 (1996).
Rychly, et al., Therapeutic Strategies in Autoimmune Diseases by Interfering With Leukocyte Endothelium Interaction Curr Pharm Des. 12(29):3799-806 (2006).
Saxena and Christofori, Rebuilding cancer metastasis in the mouse, Mol Oncol 7(2):283-96 (2013).
Shih et al.: The L6 Protein TM4SF1 is Critical for Endothelial Cell Function and Tumor Angiogenesis, Available in PMC Apr. 15, 2010, published in final edited form as: Cancer Res. 69(8):3272-3277 (2009).
Silva et al.: The S228P Mutation Prevents in Vivo and in Vitro IgG4 Fab-arm Exchange as Demonstrated using a Combination of Novel Quantitative Immunoassays and Physiological Matrix Preparation. JBiol Chem. 290(9):5462-9 (2015).
Sims et al.: A humanized CD18 antibody can block function without cell destruction., J. Immunol. 151:2296-308 (1993).
Skerra A.: Bacterial expression of immunoglobulin fragments. Curr Opin Immunol 5(2):256-262(1993).
Studnicka et al.: Human-engineered monoclonal antibodies retain full specific binding activity by preserving non-CDR complementarity-modulating residues. Protein Eng. 7(6):805-814 (1994).
Sugo et al. Development of antibody-siRNA conjugate targeted to cardiac and skeletal muscles. J Control release 237:1-13 (2016).
Uckun et al.: Rational design of an immunoconjugate for selective knock-down of leukemia-specific E2A-PBX1 fusion gene expression in human Pre-B leukemia. Integrative Biology. 5:122-132 (2013) DOI:10.1039/c2ib20114c.
Verhoeyen et al.: Reshaping human antibodies: Grafting an antilysozyme activity. Science 239:1534-1536 (1988).
Wang et al.: Expanding the genetic code. Angew Chem Int Ed, 44(1):34-66(2004).
Winter et al.: Making Antibodies by Phage Display Technology. Ann. Rev. Immunol 12:433-55 (1994).
Wright et al.: The L6 membrane proteins—A new four-transmembrane superfamily, Protein Sci. 9: 1594-1600 (2000).
Yang NJ et al.: Cytosolic delivery of siRNA by ultra-high affinity dsRNA binding proteins. Nucleic Acids Res 45(13):7602-7614 (2017).
Zukauskas et al.: TM4SF1: A tetraspanin-like protein necessary for nanopodia formation and endothelial cell migration, Available in PMC Mar. 11, 2012, published in final edited form as: Angiogenesis. 14(3):345-354 (2011).
Dowdy et al.: Delivery of RNA Therapeutics: The Great Endosomal Escape! Nucleic Acid Therapeutics. 32(5):361-368 (2022).

\* cited by examiner

Fig. 24

|  |  |  | mRNA copy #/cell | | | %KD (10 pmol siRNA over not treated Ctl) | | |
|---|---|---|---|---|---|---|---|---|
|  |  |  | MCL1 | BCL2 | TM4SF1 | MCL1si | BCL2si | TM4SF1si |
| A549 |  | Ctl | 31.67 | 48.03 | 195.26 |  |  |  |
|  | siRNA | - | 12.20 | 12.44 | 6.88 | 64.7 | 75.5 | 96.5 |
|  |  | Dye | 12.70 | 13.43 | n.a. | 63.3 | 73.5 | n.a. |
|  |  | Dye-stable | 22.79 | 10.33 | n.a. | 34.1 | 79.6 | n.a. |
| MiaPaca2 |  | Ctl | 53.72 | 26.73 | 159.17 |  |  |  |
|  | siRNA | - | 23.11 | 8.37 | 16.10 | 56.7 | 69.5 | 90.0 |
|  |  | Dye | 22.98 | 7.29 | n.a. | 56.9 | 73.4 | n.a. |
|  |  | Dye-stable | 27.70 | 5.60 | n.a. | 48.1 | 79.6 | n.a. |
| SKOV3 |  | Ctl | 55.59 | 68.47 | 55.95 |  |  |  |
|  | siRNA | - | 19.74 | 22.21 | 5.27 | 66.1 | 69.2 | 91.1 |
|  |  | Dye | 23.84 | 23.08 | n.a. | 59.1 | 68.0 | n.a. |
|  |  | Dye-stable | 33.65 | 18.26 | n.a. | 42.2 | 74.7 | n.a. |
| HUVEC |  | Ctl | 31.21 | 39.15 | 91.68 |  |  |  |
|  | siRNA | - | 5.10 | 1.10 | 2.89 | 83.7 | 97.2 | 96.8 |
|  |  | Dye | 6.76 | 1.10 | n.a. | 77.2 | 97.2 | n.a. |
|  |  | Dye-stable | 15.57 | 1.10 | 8.13 | 47.6 | 97.2 | 91.1 |

Fig. 27

|  |  |  | ARC (stable linker siRNA conjugation) | |
|---|---|---|---|---|
|  |  |  | BCL2L1 | |
|  |  |  | mRNA copy #/cell | %KD (over not treated Ctl) |
| A549 |  | Ctl | 66.1±3.1 |  |
|  | ARC | Dye-stable | 56.6±2.8 | 14.38 |
| MiaPaca2 |  | Ctl | 27.1±3.4 |  |
|  | ARC | Dye-stable | 33.2±2.5 | 0.00 |
| SKOV3 |  | Ctl | 84.1±7.3 |  |
|  | ARC | Dye-stable | 79.6±13.6 | 5.29 |
| HUVEC |  | Ctl | 35.6±4.5 |  |
|  | ARC | Dye-stable | 25.1±2.8 | 29.40 |

ANTIBODY-OLIGONUCLEOTIDE CONJUGATES

CROSS-REFERENCE

This application claims the benefit of U.S. Provisional Application No. 62/684,131 filed Jun. 12, 2018, which is incorporated by reference herein in its entirety. This application is the national stage entry of International Application No. PCT/US2019/036836 filed Jun. 12, 2019, which is incorporated by reference herein in its entirety.

BACKGROUND

A primary barrier to the successful development of therapeutic RNA molecules is the problem of endosomal escape—the fact that internalization to cells proceeds through endosomes and lysosomes, and RNA, a large charged hydrophilic molecule, cannot escape endosomes or lysosomes. Endosomal-lysosomal internalization and screening of exogenous RNA is an evolved feature of mammalian cells that inhibits entry of viruses to the cell. Various studies have noted the difficulty of endosomal escape, in the context of developing RNA therapeutics. "There are several challenges presented to siRNA delivery such as efficient delivery of RNAi therapeutics to tumors . . . and then escape from the endosome into the cytoplasm." Tatiparti et al., Nanomaterials (Basel). 2017 April; 7(4): 77. "Endosomal escape is a critical biological barrier to be overcome for siRNA delivery." Ma, D Nanoscale. 2014 Jun. 21; 6(12):6415-25. The endocytic pathway is the major uptake mechanism of cells and any biological agents, such as DNA, siRNA and proteins. These agents become entrapped in endosomes . . . . Thus, a limiting step in achieving an effective biological based therapy is to facilitate the endosomal escape and ensure cytosolic delivery of the therapeutics." Varkouhi et al. J Control Release. 2011 May 10:151(3):220-8.

Previous efforts to create deliver therapeutic RNA via antibody-oligonucleotide conjugates have failed due to the inability to achieve endosomal escape. For example, a prior effort to develop antibody-RNA conjugates concluded that "All of the internalizing ARCs delivered siRNA into cells in a targeted manner, and so it seems the challenge to silencing rests in delivering the siRNA not just into cells but also out of endosomal compartments, to the productive intracellular locale for RISC engagement. Continued elucidation of ARC delivery mechanisms will likely illuminate ways to modify the conjugates to facilitate endosomal egress and access to the RISC." Cuellar et al., Nucleic Acids Res. 2015 Jan. 30; 43(2): 1189-1203. Thus, there remains a need in the art for improved delivery of therapeutic RNA molecules.

TM4SF1 is a protein expressed in endothelial cells, mesenchymal stem cells, and tumor cells which supports angiogenesis by transporting proteins to the nucleus. Previous work has shown that anti-TM4SF1 antibodies pass through the cytosol along the microtubule network and reach the nucleus in cultured endothelial cells in vitro and in angiogenic endothelial cells in vivo. See Scuito et al., Biochem Biophys Res Commun. 2015 Sep. 25; 465(3):338-43.

SUMMARY OF THE INVENTION

It was contemplated by the present inventors, without being bound by any particular theory, that the anti-TM4SF1 antibody oligonucleotides might be able to avoid the problem of endosomal escape, or replace the endosomal escape limitation with the more tractable one of cytosolic release or nuclear escape, and as such, the use of anti-TM4SF1 antibody-oligonucleotide conjugates would be able to effectively deliver oligonucleotides in the therapeutically important cell types of tumor cells and angiogenic endothelial cells, based on non-lysosomal internalization of TM4SF1, thereby avoiding the need of endosomal escape.

One embodiment provides an antibody-RNA conjugate comprising an anti-TM4SF1 antibody or an antigen binding fragment thereof conjugated to an RNA molecule. In some embodiments, the RNA is capable of specifically hybridizing with a polynucleotide encoding an apoptosis inhibitor. In some embodiments, the RNA is capable of specifically hybridizing with a polynucleotide encoding an inhibitor of p53. In some embodiments, the RNA is capable of specifically hybridizing with a polynucleotide encoding an immune checkpoint protein. In some embodiments, the RNA is capable of specifically hybridizing with a polynucleotide encoding a protein involved inactivating DNA repair. In some embodiments, the RNA is capable of specifically hybridizing with a polynucleotide encoding a protein involved suppressing sialic acid generation. In some embodiments, the RNA is capable of specifically hybridizing with a polynucleotide encoding a protein involved in nonsense mediated decay. In some embodiments, the RNA is capable of promoting costimulatory signals. In some embodiments, the RNA molecule is capable of suppressing white blood cell extravasation. In some embodiments, the RNA molecule is capable of suppressing a molecule critical for cell division. In some embodiments, the RNA molecule is capable of promoting angiogenesis. In some embodiments, the RNA molecule is capable of inhibiting angiogenesis. In some embodiments, the RNA molecule comprises an siRNA comprising a trinucleotide repeat. In some embodiments, the siRNA is a CAG/CUG trinucleotide repeat based siRNA. In some embodiments, the RNA molecule comprises an siRNA, an antisense RNA, an miRNA, an antisense miRNA, an antagomir (anti-miRNA), an shRNA, or an mRNA. In some embodiments, the RNA molecule comprises the siRNA. In some embodiments, the siRNA is capable of specifically hybridizing with a polynucleotide encoding an apoptosis inhibitor. In some embodiments, the siRNA is capable of specifically hybridizing with a polynucleotide encoding at least one of BCL-$X_L$, BCL-w, MCL-1, BCL2A1, BCL-B, or BCL2, or a functional domain thereof. In some embodiments, the siRNA is capable of specifically hybridizing to a polynucleotide encoding at least one of PD-L1, PD-L2, CD-47/IAP, SNAI1, ZEB1, B7-H3, IDO, LSECtin, galectin-9, Ceacam-1, HMGB-1, CD112, CD155, or a functional domain thereof, or any combinations thereof. In some embodiments, the siRNA is capable of suppressing MDM2 or MDM4. In some embodiments, the siRNA is capable of specifically hybridizing to a polynucleotide encoding UPF1. In some embodiments, the siRNA is capable of specifically hybridizing to a polynucleotide encoding MLH1. In some embodiments, the siRNA is capable of specifically hybridizing to a polynucleotide encoding CMAS. In some embodiments, the siRNA is capable of specifically hybridizing with a polynucleotide encoding a protein involved in suppression of white blood cell extravasation. In some embodiments, the siRNA is capable of specifically hybridizing with a polynucleotide encoding a kinase. In some embodiments, the kinase comprises a cyclin dependent kinase. In some embodiments, the cyclin dependent kinase comprises CDKL1, CDKL2, CDKL3, CDKL4, CDKL5, CDK1, CDK2, CDK3, CDK4, CDK5, CDK6, CDK7, CDK8, CDK9, CDK10, CDK11A, CDK11B, CDK12, CDK13, CDK14, CDK15, CDK16, CDK17, CDK18, CDK19, or CDK20, or a functional domain thereof, or any combinations thereof. In some embodiments, the cyclin dependent kinase comprises CDK4 or CDK6. In some embodiments, the kinase comprises a polo-like kinase, wherein the polo-like kinase comprises PLK1, PLK2, PLK3, or PLK4, or a functional domain thereof, or any combinations thereof. In some embodiments, the kinase comprises an aurora like kinase, wherein the aurora like kinase comprises AURKA, AURKB, or AURKC, or a functional domain thereof, or any combinations thereof. In some embodiments, the siRNA is capable of specifically hybridizing with a polynucleotide encoding at least one of MADCAM1, ICAM1, VCAM1, P-selectin, E-selectin, peripheral lymph node addressin (PNAd), ICAM-2, PECAM-1, JAM-A, JAM-B, JAM-C, galectin-1, galectin-3, and galectin-9. In some embodiments, the siRNA is capable of specifically hybridizing with a polynucleotide encoding TM4SF1. In some embodiments, the siRNA is capable of inhibiting expression of an oncogene. In some embodiments, the oncogene comprises ABL1, ABL2, AKT1, AKT2, ATF1, BCL11A, BCL2, BCL3, BCL6, BCR, BRAF, CARD11, CBLB, CBLC, CCND1, CCND2, CCND3, CDX2, CTNNB1, DDB2, DDIT3, DDX6, DEK, EGFR, ELK4, ERBB2, ETV4, ETV6, EVI1, EWSR1, FEV, FGFR1, FGFR1OP, FGFR2, FUS, GOLGA5, GOPC, HMGA1, HMGA2, HRAS, IRF4, JUN, KIT, KRAS, LCK, LMO2, MAF, MAFB, MAML2, MDM2, MET, MITF, MPL, MYB, MYC, MYCL1, MYCN, NCOA4, NFKB2, NRAS, NTRK1, NUP214, PAX8, PDGFB, PIK3CA, PIM1, PLAG1, PPARG, PTPN11, RAF1, REL, RET, ROS1, SMO, SS18, TCL1A, TET2, TFG, MLL, TLX1, TPR, or USP6. In some embodiments, the RNA molecule is the miRNA. In some embodiments, the miRNA is capable of promoting costimulatory signals. In some embodiments, the miRNA is miR-146a. In some embodiments, the miR-146a is capable of suppressing the expression of one or more target genes selected from the genes listed in Table I. In some embodiments, the miRNA is capable of promoting angiogenesis. In some embodiments, the miRNA is miR-26a. In some embodiments, the miRNA is capable of suppressing the expression of one or more target genes selected from: APTX, CNBP, ARL8A. In some embodiments, the miRNA is capable of suppressing white blood cell extravasation. In some embodiments, the miRNA is miR-18b. In some embodiments, the anti-TM4SF1 antibody or an antigen binding fragment thereof and the RNA molecule are covalently or non-covalently conjugated. In some embodiments, the anti-TM4SF1 antibody or an antigen binding fragment thereof and the RNA molecule are conjugated by a genetic conjugation, an enzymatic conjugation, a chemical conjugation, or any combination thereof. In some embodiments, the enzymatic conjugation comprises a microbial transglutaminase, a phosphatase, or sortase A, or any combinations thereof. In some embodiments, the anti-TM4SF1 antibody or an antigen binding fragment thereof and the RNA molecule are conjugated through one or more engineered cysteine residue or one or more non-natural amino acids in the anti-TM4SF1 antibody or an antigen binding fragment thereof. In some embodiments, the anti-TM4SF1 antibody or an antigen binding fragment thereof and the RNA molecule are conjugated by a linker in a single or multistep protocol. In some embodiments, the linker comprises a cleavable linker, a non-cleavable linker, a hydrophilic linker, a pro-charged linker, or a dicarboxylic acid based linker. In some embodiments, the linker comprises a cleavable covalent or non-covalent linker. In some embodiments, the linker comprises a non-cleavable covalent or non-covalent linker. In some embodiments, the cleavable linker comprises an acid-labile linker, a protease-sensitive linker, a photo-labile linker, or a disulfide-containing linker. In some embodiments, the linker comprises a cysteine linker or a non-cysteine linker. In some embodiments, the linker comprises a lysine linker. In some embodiments, the linker comprises a MC (6-maleimidocaproyl), a MCC (a maleimidomethyl cyclohexane-1-carboxylate), a MP (maleimidopropanoyl), a val-cit (valine-citrulline), a val-ala (valine-alanine), an ala-phe (alanine-phenylalanine), a PAB (p-aminobenzyloxycarbonyl), a SPP (N-Succinimidyl 4-(2-pyridylthio) pentanoate), 2,5-dioxopyrrolidin-1-yl 4-(pyridin-2-ylthio) hexanoate, 2,5-dioxopyrrolidin-1-yl 5-methyl-4-(pyridin-2-ylthio)hexanoate, 2,5-dioxopyrrolidin-1-yl 5-methyl-4-(pyridin-2-ylthio)heptanoate, 2,5-dioxopyrrolidin-1-yl 5-ethyl-4-(pyridin-2-ylthio)heptanoate, 2,5-dioxopyrrolidin-1-yl 4-cyclopropyl-4-(pyridin-2-ylthio)butanoate, 2,5-dioxopyrrolidin-1-yl 4-cyclobutyl-4-(pyridin-2-ylthio)butanoate, 2,5-dioxopyrrolidin-1-yl 4-cyclopentyl-4-(pyridin-2-ylthio)butanoate, 2,5-dioxopyrrolidin-1-yl 4-cyclohexyl-4-(pyridin-2-ylthio)butanoate, a SMCC (N-Succinimidyl 4-(N-maleimidomethyl)cyclohexane-1 carboxylate), or a SIAB (N-Succinimidyl (4-iodo-acetyl)aminobenzoate). In some embodiments, the linker is derived from a cross-linking reagent, wherein the cross-linking reagent comprises N-succinimidyl-3-(2-pyridyldithio)propionate (SPDP), 2,5-dioxopyrrolidin-1-yl 3-cyclopropyl-3-(pyridin-2-yldisulfaneyl)propanoate, 2,5-dioxopyrrolidin-1-yl 3-cyclobutyl-3-(pyridin-2-yldisulfaneyl)propanoate, N-succinimidyl 4-(2-pyridyldithio)pentanoate (SPP), 2,5-dioxopyrrolidin-1-yl 4-cyclopropyl-4-(pyridin-2-yldisulfaneyl)butanoate, 2,5-dioxopyrrolidin-1-yl 4-cyclobutyl-4-(pyridin-2-yldisulfaneyl) butanoate, N-succinimidyl 4-(2-pyridyldithio)butanoate (SPDB), 2,5-dioxopyrrolidin-1-yl 4-cyclopropyl-4-(pyridin-2-yldisulfaneyl)butanoate, 2,5-dioxopyrrolidin-1-yl 4-cyclobutyl-4-(pyridin-2-yldisulfaneyl)butanoate, N-succinimidyl-4-(2-pyridyldithio)-2-sulfo-butanoate (sulfo-SPDB), N-succinimidyl iodoacetate (SIA), N-succinimidyl(4-iodoacetyl)aminobenzoate (SIAB), maleimide PEG NHS, N-succinimidyl 4-(maleimidomethyl) cyclohexanecarboxylate (SMCC), N-sulfosuccinimidyl 4-(maleimidomethyl) cyclohexanecarboxylate (sulfo-SMCC), or 2,5-dioxopyrrolidin-1-yl 17-(2,5-dioxo-2,5-dihydro-1H-pyrrol-1-yl)-5,8,11,14-tetraoxo-4,7,10,13-tetraazaheptadecan-1-oate (CX1-1). In some embodiments, the anti-TM4SF1 antibody or an antigen binding fragment thereof comprises an engineered anti-TM4SF1 antibody or an antigen binding fragment thereof comprising a cysteine residue introduced in the heavy chain, wherein the RNA molecule comprises a chemically stabilized RNA, and wherein the linker comprises a reducible or a non-reducible N-hydroxysuccinimide (NHS) linker. In some embodiments, the chemically stabilized RNA comprises a 3'- or 5' tagged siRNA. In some embodiments, the chemically stabilized RNA comprises a 3'-amine tagged siRNA. In some embodiments, the reducible NHS linker comprises N-succinimidyl-4-(2-pyridyldithio)butyrate (SPDB). In some embodiments, the non-reducible NHS linker comprises succinimidyl-4-[N-maleimidomethyl]cyclohexane-1-carboxylate) (SMCC). In some embodiments, the 3'-amine tagged siRNA and the engineered anti-TM4SF1 antibody or an antigen binding fragment thereof are covalently linked via a thio-ester bond. In some embodiments, the anti-TM4SF1 antibody or an antigen binding fragment thereof comprises one or more CDRs selected from SEQ ID Nos: 6-8, 12-15, 18-20, 24-26, 30-32, 36-38, 42-44, 48-50, 54-56, 60-62, 66-68, 72-74, 78-80, 84-86, and 94-99. In some embodiments, the anti-TM4SF1 antibody or an antigen binding fragment thereof comprises a heavy chain comprising a sequence selected from SEQ ID NO: 1, 3, 15, 27, 39, 51, 63, 75, and 92, and a light chain comprising a sequence selected from SEQ ID NO: 2, 10, 21, 33, 45, 57, 69, 81, and 93. In some embodiments, the anti-TM4SF1 antibody or an antigen binding fragment thereof is an Fab' fragment.

One embodiment provides a conjugate comprising an anti-TM4SF1 antibody or an antigen binding fragment thereof and an siRNA covalently linked to the anti-TM4SF1 antibody or an antigen binding fragment thereof. In some embodiments, the anti-TM4SF1 antibody or an antigen binding fragment thereof comprises one or more CDRs selected from SEQ ID Nos: 6-8, 12-15, 18-20, 24-26, 30-32, 36-38, 42-44, 48-50, 54-56, 60-62, 66-68, 72-74, 78-80, 84-86, and 94-99. In some embodiments, the anti-TM4SF1 antibody or an antigen binding fragment thereof comprises a heavy chain comprising a sequence selected from SEQ ID NO: 1, 3, 15, 27, 39, 51, 63, 75, and 92, and a light chain comprising a sequence selected from SEQ ID NO: 2, 10, 21, 33, 45, 57, 69, 81, and 93. In some embodiments, the anti-TM4SF1 antibody or an antigen binding fragment thereof is an Fab' fragment. In some embodiments, the siRNA is capable of targeting an apoptosis inhibitor, an inhibitor of p53, an immune checkpoint protein, a protein involved inactivating DNA repair, a protein involved suppressing sialic acid generation, a protein involved in nonsense mediated decay. In some embodiments, the siRNA is capable of promoting costimulatory signals, suppressing white blood cell extravasation, suppressing a molecule critical for cell division, inhibiting or promoting angiogenesis.

One embodiment provides an antibody fragment-RNA conjugate comprising an anti-TM4SF1 Fab' fragment conjugated to an RNA molecule, wherein the RNA molecule comprises an antisense RNA, an miRNA, an antisense miRNA, an antagomir (anti-miRNA), an shRNA, or an mRNA. In some embodiments, the RNA comprises the siRNA. In some embodiments, the antibody fragment-RNA conjugate is produced by a process comprising (i) generating a maleimide modified or a (2-pyridyldithio) pentanate modified siRNA, (ii) reducing the anti-TM4SF1 Fab' fragment with cysteamine to generate an engineered anti-TM4SF1 Fab' fragment comprising two thiol groups; and (iii) incubating the maleimide modified or the (2-pyridyldithio) pentanate modified siRNA with the engineered anti-TM4SF1 Fab' fragment to produce the antibody fragment-RNA conjugate.

One embodiment provides a composition comprising an anti body-RNA conjugate as described herein, a conjugate according to this disclosure, or an antibody fragment-RNA conjugate according to this disclosure, in combination with an antibody-drug conjugate. In some embodiments, the antibody-drug conjugate comprises a cytotoxic payload for the treatment of cancer. In some embodiments, the antibody-drug conjugate comprises an anti-TM4SF1 antibody or an antigen binding fragment thereof. In some embodiments, the cytotoxic payload comprises a V-ATPase inhibitor, a pro-apoptotic agent, a Bcl2 inhibitor, an MCL1 inhibitor, a HSP90 inhibitor, an IAP inhibitor, an mTor inhibitor, a microtubule stabilizer, a microtubule destabilizer, an auristatin, a dolastatin, a maytansinoid, a MetAP (methionine aminopeptidase), an inhibitor of nuclear export of proteins CRM1, a DPPIV inhibitor, proteasome inhibitors, inhibitors of phosphoryl transfer reactions in mitochondria, a protein synthesis inhibitor, a kinase inhibitor, a CDK2 inhibitor, a CDK9 inhibitor, a kinesin inhibitor, an HDAC inhibitor, a DNA damaging agent, a DNA alkylating agent, a DNA intercalator, a DNA minor groove binder, a DHFR inhibitor, a nucleic acid, or a CRISPR enzyme. In some embodiments, the payload comprises a maytansinoid, a calicheamicin, a pyrrolobenzodiazepine, or a nemorubicin derivative. In some embodiments, the anti-TM4SF1 antibody or an antigen binding fragment thereof comprises one or more CDRs selected from SEQ ID Nos: 1-54. In some embodiments, the anti-TM4SF1 antibody or an antigen binding fragment thereof comprises a heavy chain comprising the sequence set forth as SEQ ID NO: 49-59, and a light chain comprising the sequence set forth as SEQ ID NO: 57-67. In some embodiments, the anti-TM4SF1 antibody or an antigen binding fragment thereof is an Fab' fragment.

One embodiment provides a process for synthesizing an anti-TM4SF1 antibody-siRNA conjugate, comprising: conjugating an siRNA with an anti-TM4SF1 or an antigen binding fragment thereof. In some embodiments, the process comprises introducing a cysteine residue in the heavy chain of the anti-TM4SF1 antibody or an antigen binding fragment thereof to generate an engineered anti-TM4SF1 antibody or an antigen binding fragment thereof. In some embodiments, the process comprises modifying the siRNA by adding a 3'-amine to generate a chemically stabilized 3' amine-tagged siRNA. In some embodiments, the process comprises reacting the chemically stabilized 3' amine-tagged siRNA with an NHS linker to generate a thiol-reactive siRNA-linker adduct. In some embodiments, the process comprises reacting the thiol reactive siRNA-linker adduct with a thiol group on the engineered anti-TM4SF1 antibody or an antigen binding fragment thereof, thereby generating the antibody-siRNA conjugate. In some embodiments, the process further comprises purifying the anti-TM4SF1-antibody-siRNA conjugate using a chromatographic procedure. In some embodiments, the NHS linker comprises a reducible or a non-reducible NHS linker. In some embodiments, the reducible linker comprises N-succinimidyl-4-(2-pyridyldithio)butyrate (SPDB). In some embodiments, the non-reducible linker comprises succinimidyl-4-[N-maleimidomethyl]cyclohexane-1-carboxylate) (SMCC). In some embodiments, the chromatographic procedure comprises size-exclusion chromatography.

One embodiment provides a conjugate comprising an anti-TM4SF1 antibody or an antigen binding fragment thereof conjugated to an oligonucleotide. In some embodiments, the oligonucleotide comprises a DNA molecule. In some embodiments, the oligonucleotide comprises an antisense oligonucleotide. In some embodiments, the oligonucleotide comprises a modified DNA, a triple helical DNA, a supercoiled DNA, a Z-DNA, or any combinations thereof. One embodiment provides a method of treating a cancer comprising, administering to a subject a therapeutically effective amount of a conjugate according to this disclosure. In some embodiments, the method comprises administering to the subject the therapeutically effective amount of a conjugate according to this disclosure or composition comprising a conjugate according to this disclosure.

One embodiment provides a method of treating a cancer comprising, administering to a subject a therapeutically effective amount of an antibody-RNA conjugate according to this disclosure. In some embodiments, the method comprises administering to the subject the therapeutically effective amount of an antibody-RNA conjugate according to this disclosure in combination with a composition according to this disclosure. In some embodiments the method comprises administering to the subject the therapeutically effective amount of an antibody-RNA conjugate according to this disclosure, in combination with a composition according to this disclosure, or in further combination with a further therapy. In some embodiments, the further therapy comprises chemotherapy, radiation, oncolytic viral therapy with an additional virus, treatment with an immunomodulatory agent, a CAR T cellular therapy, an anti-cancer agent, or any combinations thereof. In some embodiments, the method comprises administering to the subject the therapeutically effective amount of an antibody-RNA conjugate according to this disclosure, in combination with a composition according to this disclosure, or in further combination with the further therapy, wherein the antibody-RNA conjugate, the composition, or the further therapy, or any combinations thereof is administered in a liquid dosage form, a solid dosage form, an inhalable dosage form, an intranasal dosage form, a liposomal formulation, a dosage form comprising nanoparticles, a dosage form comprising microparticles, a polymeric dosage form, or any combinations thereof.

One embodiment provides a method of treating a cancer comprising, administering to a subject a therapeutically effective amount of a conjugate according this disclosure. In some embodiments, the method comprises administering to the subject the therapeutically effective amount of a conjugate according to this disclosure in combination with a composition according to this disclosure. In some embodiments, the method comprises administering to the subject the therapeutically effective amount of a conjugate according to this disclosure, in combination with a composition according to this disclosure, or in further combination with a further therapy. In some embodiments, the further therapy comprises chemotherapy, radiation, oncolytic viral therapy with an additional virus, treatment with an immunomodulatory agent, a CAR T cellular therapy, an anti-cancer agent, or any combinations thereof. In some embodiments, the method comprises administering to the subject the therapeutically effective amount of a conjugate according to this disclosure, in combination with a composition according to this disclosure, or in further combination with the further therapy, wherein the conjugate, the composition, or the further therapy, or any combinations thereof is administered in a liquid dosage form, a solid dosage form, an inhalable dosage form, an intranasal dosage form, a liposomal formulation, a dosage form comprising nanoparticles, a dosage form comprising microparticles, a polymeric dosage form, or any combinations thereof.

One embodiment provides a method of treating a cancer comprising, administering to a subject a therapeutically effective amount of an antibody fragment RNA conjugate according to this disclosure. In some embodiments, the method comprises administering to the subject the therapeutically effective amount of an antibody fragment-RNA conjugate according to this disclosure in combination with a composition according to this disclosure. In some embodiments, the method comprises administering to the subject the therapeutically effective amount of an antibody fragment-RNA conjugate according to this disclosure, in combination with a composition according to this disclosure, or in further combination with a further therapy. In some embodiments, the further therapy comprises chemotherapy, radiation, oncolytic viral therapy with an additional virus, treatment with an immunomodulatory agent, a CAR T cellular therapy, an anti-cancer agent, or any combinations thereof. In some embodiments, the method comprises administering to the subject the therapeutically effective amount of an antibody fragment-RNA conjugate according to this disclosure, in combination with a composition according to this disclosure, or in further combination with the further therapy, wherein the conjugate, the composition, or the further therapy, or any combinations thereof is administered in a liquid dosage form, a solid dosage form, an inhalable dosage form, an intranasal dosage form, a liposomal formulation, a dosage form comprising nanoparticles, a dosage form comprising microparticles, a polymeric dosage form, or any combinations thereof. In some embodiments, the cancer comprises the cancer comprises melanoma, hepatocellular carcinoma, breast cancer, lung cancer, peritoneal cancer, prostate cancer, bladder cancer, ovarian cancer, leukemia, lymphoma, renal carcinoma, pancreatic cancer, epithelial carcinoma, gastric cancer, colon carcinoma, duodenal cancer, pancreatic adenocarcinoma, mesothelioma, glioblastoma multiforme, astrocytoma, multiple myeloma, prostate carcinoma, hepatocellular carcinoma, cholangiosarcoma, pancreatic adenocarcinoma, head and neck squamous cell carcinoma, colorectal cancer, intestinal-type gastric adenocarcinoma, cervical squamous-cell carcinoma, osteosarcoma, epithelial ovarian carcinoma, acute lymphoblastic lymphoma, myeloproliferative neoplasms, or sarcoma.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 24 shows representative knockdown data for siRNAs in cancer cell lines and in HUVECs.

FIG. 27 shows representative knockdown data for an exemplary ARC as described herein in cancer cell lines and in HUVECs.

FIG. 28B shows mRNA expression levels for BCL2L1 mRNA following exposure to the exemplary ARC; FIG. 28C shows BCL2L1 protein expression levels (western blot): and FIG. 28D shows representative immunostaining results.

FIG. 29B shows mRNA expression levels for BCL2L1 mRNA following exposure to the exemplary ARC.

FIG. 30B shows mRNA expression levels for BCL2L1 mRNA following exposure to the exemplary ARC.

FIG. 31B shows mRNA expression levels for BCL2L1 mRNA following exposure to the exemplary ARC.

FIG. 32B shows mRNA expression levels for MCL1 mRNA following exposure to the exemplary ARC.

DETAILED DESCRIPTION OF THE INVENTION

1. Definitions

Figure 1:
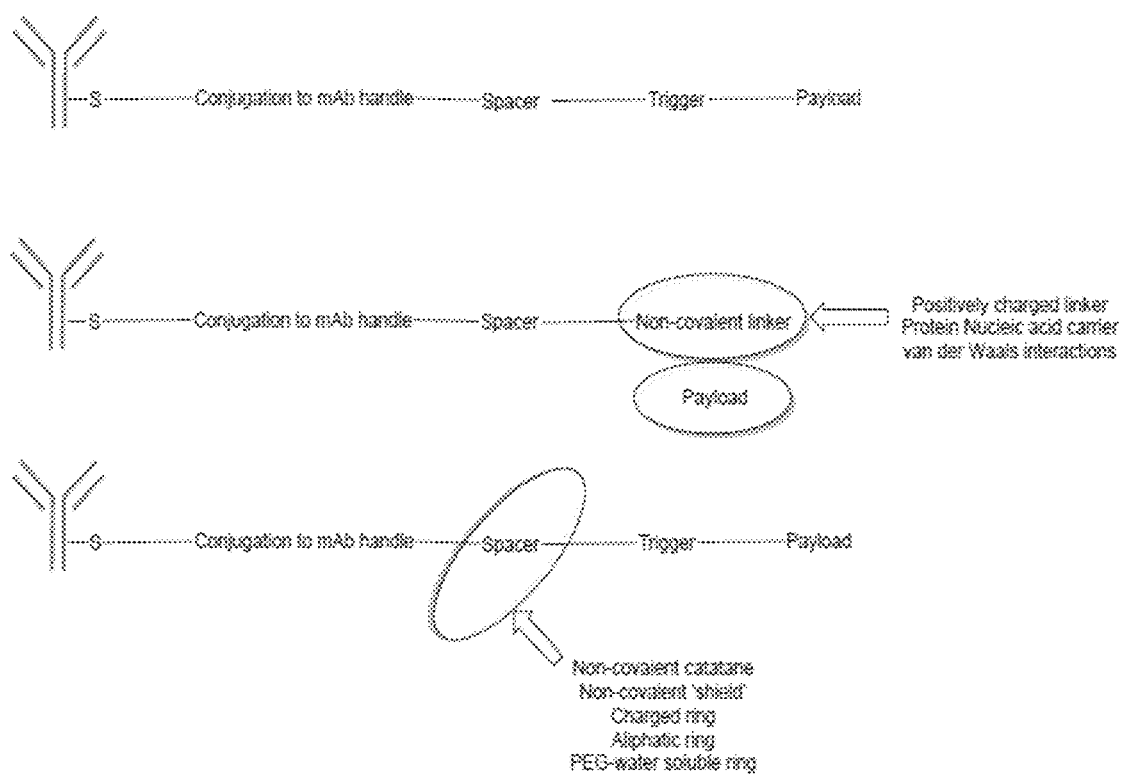
FIG. 1 shows an exemplary method of conjugating an anti-TM4SF1 antibody and an siRNA.

Unless otherwise defined herein, scientific and technical terms used in connection with the present disclosure shall have the meanings that are commonly understood by those of ordinary skill in the art. The meaning and scope of the terms should be clear, however, in the event of any latent ambiguity, definitions provided herein take precedent over any dictionary or extrinsic definition. Further, unless otherwise required by context, singular terms shall include pluralities and plural terms shall include the singular. In this application, the use of "or" means "and/or" unless stated otherwise. Furthermore, the use of the term "including", as well as other forms, such as "includes" and "included", is not limiting.

Generally, nomenclatures used in connection with, and techniques of, cell and tissue culture, molecular biology, immunology, microbiology, genetics and protein and nucleic acid chemistry and hybridization described herein are those well-known and commonly used in the art. The methods and techniques of the present disclosure are generally performed according to conventional methods well known in the art and as described in various general and more specific references that are cited and discussed throughout the present specification unless otherwise indicated. Enzymatic reactions and purification techniques are performed according to manufacturer's specifications, as commonly accomplished in the art or as described herein. The nomenclatures used in connection with, and the laboratory procedures and techniques of, analytical chemistry, synthetic organic chemistry, and medicinal and pharmaceutical chemistry described herein are those well-known and commonly used in the art. Standard techniques are used for chemical syntheses, chemical analyses, pharmaceutical preparation, formulation, and delivery, and treatment of patients.

That the present disclosure may be more readily understood, select terms are defined below. The terms "transmembrane-4 L six family member-1" or "TM4SF1", as used herein refer to a polypeptide of the transmembrane 4 superfamily/tetraspanin family, which is highly expressed on tumor vasculature endothelial cells (ECs), tumor cells (TCs), ECs of developing retinal vasculature, and angiogenic blood vessels. TM4SF1 has two extracellular loops (ECL1 and ECL2) that are separated by four transmembrane domains (M1, M2, M3, and M4), the N- and C-termini, and the intracellular loop (ICL). ECL2 contains two N-glycosylation sites. The amino acid sequence of human TM4SF1 (hTM4SF1) is described in SEQ ID NO: 90 (see also NCBI Ref Seq No. NP_055035.1).

The term "antibody", as used herein, means any antigen binding molecule comprising at least one complementarity determining region (CDR) that specifically binds to or interacts with a particular antigen (e.g., TM4SF1). The term "antibody" includes immunoglobulin molecules comprising four polypeptide chains, two heavy (H) chains and two light (L) chains inter-connected by disulfide bonds, as well as multimers thereof (e.g., IgM). Each heavy chain comprises a heavy chain variable region (abbreviated herein as HCVR or VH) and a heavy chain constant region. The heavy chain constant region comprises three domains, CH1, CH2 and CH3. Each light chain comprises a light chain variable region (abbreviated herein as LCVR or VL) and a light chain constant region. The light chain constant region comprises one domain (CL1). The VH and VL regions can be further subdivided into regions of hypervariability, termed complementarity determining regions (CDRs), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. In different embodiments of the disclosure, the FRs of the anti-TMS4F1 antibody (or antigen binding portion thereof) may be identical to the human germline sequences, or may be naturally or artificially modified. An amino acid consensus sequence may be defined based on a side-by-side analysis of two or more CDRs.

The term "intact antibody" refers to an antibody comprising four polypeptide chains, two heavy (H) chains and two light (L) chains inter-connected by disulfide bonds. In one embodiment, the anti-TM4SF1 antibody is an intact antibody. In one embodiment, the intact antibody is an intact human IgG1, IgG2 or IgG4 isotype. In certain embodiments, the anti-TM4SF1 antibody, or antigen binding fragment thereof, is a human IgG1, IgG2, or IgG4 isotype.

The terms "antigen binding portion" of an antibody, "antigen binding fragment" of an antibody, or an "antibody fragment," and the like, as used herein, include any naturally occurring, enzymatically obtainable, synthetic, or genetically engineered polypeptide or glycoprotein that specifically binds an antigen to form a complex. Antigen binding fragments of an antibody may be derived, e.g., from intact antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Non-limiting examples of antigen binding fragments can include, (i) Fab fragments; (ii) F(ab')2 fragments; (iii) Fd fragments; (iv) Fv fragments; (v) single-chain Fv (scFv) molecules; (vi) dAb fragments; and (vii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide.

The term "variable region" or "variable domain" of an antibody, or fragment thereof, as used herein refers to the portions of the light and heavy chains of antibody molecules that include amino acid sequences of complementarity determining regions (CDRs; i.e., CDR-1, CDR-2, and CDR-3), and framework regions (FRs). VH refers to the variable domain of the heavy chain. VL refers to the variable domain of the light chain. According to the methods used in this disclosure, the amino acid positions assigned to CDRs and FRs may be defined according to Kabat (Sequences of Proteins of Immunological Interest (National Institutes of Health, Bethesda, Md., 1987 and 1991)). Amino acid numbering of antibodies or antigen binding fragments is also according to that of Kabat.

The term "complementarity determining regions" or "CDRs" as used herein refers to the complementarity determining region within antibody variable sequences. There are three CDRs in each of the variable regions of the heavy chain and the light chain, which are designated CDR1, CDR2 and CDR3, for each of the variable regions. The term "CDR set" as used herein refers to a group of three CDRs that occur in a single variable region capable of binding the antigen. The exact boundaries of these CDRs have been defined differently according to different systems. The system described by Kabat (Kabat et al., Sequences of Proteins of Immunological Interest (National Institutes of Health, Bethesda, Md. (1987) and (1991)) not only provides an unambiguous residue numbering system applicable to any variable region of an antibody, but also provides precise residue boundaries defining the three CDRs. These CDRs may be referred to as Kabat CDRs. Chothia and coworkers (Chothia et al., J. Mol. Biol. 196:901-917 (1987) and Chothia et al., Nature 342:877-883 (1989)) found that certain sub-portions within Kabat CDRs adopt nearly identical peptide backbone conformations, despite having great diversity at the level of amino acid sequence. These sub-portions were designated as L1, L2 and L3 or H1, H2 and H3 where the "L" and the "H" designates the light chain and the heavy chains regions, respectively. These regions may be referred to as Chothia CDRs, which have boundaries that overlap with Rabat CDRs. Other boundaries defining CDRs overlapping with the Rabat CDRs have been described by Padlan (FASEB J. 9:133-139 (1995)) and MacCallum (J Mol Biol 262(5):732-45 (1996)). Still other CDR boundary definitions may not strictly follow one of the above systems, but will nonetheless overlap with the Rabat CDRs, although they may be shortened or lengthened in light of prediction or experimental findings that particular residues or groups of residues or even entire CDRs do not significantly impact antigen binding. The methods used herein may utilize CDRs defined according to any of these systems, although preferred embodiments use Rabat or Chothia defined CDRs.

The term "framework regions" (hereinafter FR) as used herein refers to those variable domain residues other than the CDR residues. Each variable domain typically has four FRs identified as FR1, FR2, FR3 and FR4. Common structural features among the variable regions of antibodies, or functional fragments thereof, are well known in the art. The DNA sequence encoding a particular antibody can generally be found following w ell known methods such as those described in Rabat, et al. 1987 Sequence of Proteins of Immunological Interest, U.S. Department of Health and Human Services, Bethesda Md., which is incorporated herein as a reference. In addition, a general method for cloning functional variable regions from antibodies can be found in Chaudhary, V. R., et al., 1990 Proc. Natl. Acad. Sci. USA 87:1066, which is incorporated herein as a reference.

The term "Fc region" herein is used to define a C-terminal region of an antibody heavy chain, including, for example, native sequence Fc regions, recombinant Fc regions, and variant Fc regions. Although the boundaries of the Fc region of an antibody heavy chain might vary, the human IgG heavy chain Fc region is often defined to stretch from an amino acid residue at position Cys226, or from Pro230, to the carboxyl-terminus thereof. The C-terminal lysine (residue 447 according to the EU numbering system) of the Fc region may be removed, for example, during production or purification of the antibody, or by recombinantly engineering the nucleic acid encoding a heavy chain of the antibody. Accordingly, a composition of intact antibodies may comprise antibody populations with all K447 residues removed, antibody populations with no K447 residues removed, and antibody populations having a mixture of antibodies with and without the K447 residue.

The term "humanized antibody" as used herein refers to an antibody or a variant, derivative, analog or fragment thereof, which immunospecifically binds to an antigen of interest (e.g., human TM4SF1), and which comprises a framework (FR) region having substantially the amino acid sequence of a human antibody and a complementary determining region (CDR) having substantially the amino acid sequence of a non-human antibody. Humanized forms of non-human (e.g., murine) antibodies are chimeric immunoglobulins that contain minimal sequences derived from non-human immunoglobulin. In general, a humanized antibody will comprise substantially all of at least one, and typically two, variable domains, in which all or substantially all of the CDR regions correspond to those of a non-human immunoglobulin and all or substantially all of the FR regions are those of a human immunoglobulin sequence. The humanized antibody can also comprise at least a portion of an immunoglobulin constant region (Fc), typically that of a human immunoglobulin consensus sequence. Methods of antibody humanization are known in the art. See, e.g., Riechmann et al., 1988, Nature 332:323-7; U.S. Pat. Nos. 5,530,101; 5,585,089; 5,693,761; 5,693,762; and U.S. Pat. No. 6,180,370 to Queen et al.; EP239400; PCT publication WO 91/09967; U.S. Pat. No. 5,225,539; EP592106; EP519596; Padlan, 1991, Mol. Immunol., 28:489-498; Studnicka et al., 1994, Prot. Eng. 7:805-814; Roguska et al., 1994, Proc. Natl. Acad. Sci. 91:969-973; and U.S. Pat. No. 5,565,332, all of which are hereby incorporated by reference in their entireties.

The term "monoclonal antibody" as used herein refers to an antibody obtained from a population of substantially homogeneous antibodies, i.e., the individual antibodies comprising the population are identical except for possible mutations, e.g., naturally occurring mutations that may be present in minor amounts. Thus, the modifier "monoclonal" indicates the character of the antibody as not being a mixture of discrete antibodies. In certain embodiments, such a monoclonal antibody typically includes an antibody comprising a poly peptide sequence that binds a target, wherein the target-binding poly peptide sequence was obtained by a process that includes the selection of a single target binding poly peptide sequence from a plurality of polypeptide sequences. For example, the selection process can be the selection of a unique clone from a plurality of clones, such as a pool of hybridoma clones, phage clones, or recombinant DNA clones. In contrast to polyclonal antibody preparations, which typically include different antibodies directed against different determinants (epitopes), each monoclonal antibody of a monoclonal-antibody preparation is directed against a single epitope on an antigen.

The term "chimeric antibody" as used herein refers to antibodies (immunoglobulins) that have a portion of the heavy and/or light chain identical with or homologous to corresponding sequences in antibodies derived from a particular species or belonging to a particular antibody-class or subclass, while the remainder of the chain(s) is identical with or homologous to corresponding sequences in antibodies derived from another species or belonging to another antibody class or subclass, as well as fragments of such antibodies, so long as they exhibit the desired biological activity (U.S. Pat. No. 4,816,567; and Morrison et al., Proc. Natl. Acad. Sci. USA 81:6851-6855 (1984)).

The term "epitope" as used herein refers to an antigenic determinant that interacts with a specific antigen binding site in the variable region of an antibody molecule known as a paratope. A single antigen may have more than one epitope. Thus, different antibodies may bind to different areas on an antigen and may have different biological effects. Epitopes may be defined as structural or functional. Functional epitopes are generally a subset of the structural epitopes and have those residues that directly contribute to the affinity of the interaction. Epitopes may also be conformational, that is, composed of non-linear amino acids. In certain embodiments, epitopes may include determinants that are chemically active surface groupings of molecules such as amino acids, sugar side chains, phosphoryl groups, or sulfonyl groups, and, in certain embodiments, may have specific three-dimensional structural characteristics, and/or specific charge characteristics.

"Binding affinity" generally refers to the strength of the sum total of noncovalent interactions between a single binding site of a molecule (e.g., a binding protein such as an antibody) and its binding partner (e.g., an antigen). The affinity of a binding molecule X (e.g., anti-TM4SF1 antibody) for its binding partner Y (e.g., human TM4SF1) can generally be represented by the dissociation constant (KD). Affinity can be measured by common methods known in the art, including those described herein. Low-affinity antibodies generally bind antigen slowly and tend to dissociate readily, whereas high-affinity antibodies generally bind antigen faster and tend to remain bound longer. A variety of methods of measuring binding affinity are known in the art, any of which can be used for purposes of the present disclosure. Specific illustrative embodiments include the following. In one embodiment, the "KD" or "KD value" may be measured by assays known in the art, for example by a binding assay. The KD may be measured in a RIA, for example, performed with the Fab version of an antibody of interest and its antigen (Chen et al., 1999, J. Mol Biol 293:865-81). The KD may also be measured by using FACS or surface plasmon resonance assays by BIACORE, using, for example, a BIACORE 2000 or a BIACORE 3000, or by biolayer interferometry using, for example, the OCTET QK384 system. In certain embodiments, the KD of an anti-TM4SF1 antibody is determined using a standard flow cytometry assay with HUVEC cells. An "on-rate" or "rate of association" or "association rate" or "kon" and an "off-rate" or "rate of dissociation" or "dissociation rate" or "koff" may also be determined with the same surface plasmon resonance or biolayer interferometry techniques described above using, for example, a BIACORE 2000 or a BIACORE 3000, or the OCTET QK384 system.

The term "kon", as used herein, is intended to refer to the on rate constant for association of an antibody to the antigen to form the antibody/antigen complex, as is known in the art.

The term "koff", as used herein, is intended to refer to the off rale constant for dissociation of an antibody from the antibody/antigen complex, as is known in the art.

The term "inhibition" or "inhibit," when used herein, refers to partial (such as, 1%, 2%, 5%, 10%, 20%, 25%, 50%, 75%, 90%, 95%, 99%) or complete (i.e., 100%) inhibition.

The term "interfering RNA" or "RNAi" or "interfering RNA sequence" refers to double-stranded RNA (i.e., duplex RNA) that is capable of reducing or inhibiting expression of a target gene (i.e., by mediating the degradation of mRNAs which are complementary to the sequence of the interfering RNA) when the interfering RNA is in the same cell as the target gene. Interfering RNA thus refers to the double-stranded RNA formed by two complementary strands or by a single, self-complementary strand. Interfering RNA may have substantial or complete identity to the target gene or may comprise a region of mismatch (i.e., a mismatch motif) The sequence of the interfering RNA can correspond to the full length target gene, or a subsequence thereof.

The term "cancer" as used herein, refers to or describes the physiological condition in mammals that is typically characterized by unregulated cell growth.

The term "cancer which is associated with a high risk of metastasis", as used herein, refers to a cancer that is associated with at least one factor known to increase the risk that a subject having the cancer w ill develop metastatic cancer. Examples of factors associated with increased risk for metastasis include, but are not limited to, the number of cancerous lymph nodes a subject has at the initial diagnosis of cancer, the size of the tumor, histological grading, and the stage of the cancer at initial diagnosis.

The term "hematogenous metastasis" as used herein refers to the ability of cancer cells to penetrate the walls of blood vessels, after which they are able to circulate through the bloodstream (circulating tumor cells) to other sites and tissues in the body.

The term "lymphatic metastasis" as used herein refers to the ability of cancer cells to penetrate lymph vessels and drain into blood vessels.

In the context of the disclosure, the term "treating" or "treatment", as used herein, means reversing, alleviating, inhibiting the progress of, or preventing the disorder or condition to which such term applies, or one or more symptoms of such disorder or condition. By the term "treating cancer" as used herein is meant the inhibition of the growth and/or proliferation of cancer cells. In one embodiment, the compositions and methods described herein are used to treat metastasis in a subject having metastatic cancer.

The term "preventing cancer" or "prevention of cancer" refers to delaying, inhibiting, or preventing the onset of a cancer in a mammal in which the onset of oncogenesis or tumorigenesis is not evidenced but a predisposition for cancer is identified whether determined by genetic screening, for example, or otherwise. The term also encompasses treating a mammal having premalignant conditions to stop the progression of, or cause regression of, the premalignant conditions towards malignancy. Examples of premalignant conditions include hyperplasia, dysplasia, and metaplasia. In some embodiments, preventing cancer is used in reference to a subject who is in remission from cancer.

A variety of cancers, including malignant or benign and/or primary or secondary, may be treated or prevented with a method according to the disclosure. Examples of such cancers are known to those skilled in the art and listed in standard textbooks such as the Merck Manual of Diagnosis and Therapy (published by Merck).

The term "subject" as used herein, refers to a mammal (e.g., a human).

The term "administering" as used herein refers to a method of giving a dosage of an antibody or fragment thereof, or a composition (e.g., a pharmaceutical composition) to a subject. The method of administration can vary depending on various factors (e.g., the binding protein or the pharmaceutical composition being administered and the severity of the condition, disease, or disorder being treated).

The term "effective amount" as used herein refers to the amount of an antibody or pharmaceutical composition provided herein which is sufficient to result in the desired outcome.

The terms "about" and "approximately" mean within 20%, within 15%, within 10%, within 9%, within 8%, within 7%, within 6%, within 5%, within 4%, within 3%, within 2%, within 1%, or less of a given value or range.

The term "identity," or "homology" as used interchangeable herein, may be to calculations of "identity," "homology," or "percent homology" between two or more nucleotide or amino acid sequences that can be determined by aligning the sequences for optimal comparison purposes (e.g., gaps can be introduced in the sequence of a first sequence). The nucleotides at corresponding positions may then be compared, and the percent identity between the two sequences may be a function of the number of identical positions shared by the sequences (i.e., % homology=# of identical positions/total # of positions×100). For example, a position in the first sequence may be occupied by the same nucleotide as the corresponding position in the second sequence, then the molecules are identical at that position. The percent homology between the two sequences may be a function of the number of identical positions shared by the sequences, taking into account the number of gaps, and the length of each gap, which need to be introduced for optimal alignment of the two sequences. In some embodiments, the length of a sequence aligned for comparison purposes may be at least about: 30%, 40%, 50%, 60%, 65%, 70%, 75%, 80%, 85%, 90%, 91%, 92%, 93%, 94%, 95%, 96%, 97%, 98%, or 95%, of the length of the reference sequence. A BLAST® search may determine homology between two sequences. The two sequences can be genes, nucleotides sequences, protein sequences, peptide sequences, amino acid sequences, or fragments thereof. The actual comparison of the two sequences can be accomplished by well-known methods, for example, using a mathematical algorithm. A non-limiting example of such a mathematical algorithm may be described in Karlin, S. and Altschul, S., Proc. Natl. Acad. Sci. USA, 90-5873-5877 (1993). Such an algorithm may be incorporated into the NBLAST and XBLAST programs (version 2.0), as described in Altschul, S. et al., Nucleic Acids Res., 25:3389-3402 (1997). When utilizing BLAST and Gapped BLAST programs, any relevant parameters of the respective programs (e.g., NBLAST) can be used. For example, parameters for sequence comparison can be set at score=100, word length=12, or can be varied (e.g., W=5 or W=20). Other examples include the algorithm of Myers and Miller, CABIOS (1989), ADVANCE, ADAM, BLAT, and FASTA. In another embodiment, the percent identity between two amino acid sequences can be accomplished using, for example, the GAP program in the GCG software package (Accelrys, Cambridge, UK).

In some embodiments are provided antibody-nucleic acid conjugates (also referred to herein as antibody-oligonucleotide conjugates) comprising a nucleic acid conjugated to an anti-TM4SF1 antibody as described herein. The nucleic acid can be substantially any nucleic acid which one desires to transport to the interior of a cell or, in certain embodiments, to the nucleus of a cell. As used herein, the term "nucleic acid," includes but is not limited to naturally occurring or chemically synthesized DNA, RNA, antisense oligonucleotide (ASO), modified DNA, modified RNA, or any combinations thereof. The nucleic acid can be of any number of base pairs, such as up to the full-length of a gene of interest. For example, the nucleic acid can be a linear or circular double-stranded DNA molecule having a length from about 100 to 10,000 base pairs in length, although both longer and shorter nucleic acids can be used. The nucleic acid can be DNA or RNA, linear or circular and can be single- or double-stranded. DNA includes cDNA, triple helical, supercoiled, Z-DNA, and other unusual forms of DNA, polynucleotide analogs, antisense DNA, expression constructs comprising DNA encoding proteins such as a therapeutic proteins, transcribable constructs comprising DNA encoding ribozymes or antisense RNA, viral genome fragments such as viral DNA, plasmids, cosmids, DNA encoding a portion of the genome of an organism, gene fragments, and the like. In some cases a modified nucleic acid is, for example, a fluorescent dye-modified nucleic acid, a biotinylated nucleic acid, or combinations thereof. Other modified nucleic acids include, for example, 2'-O-methyl modifications, 2'-fluoro modifications, 2'-methoxyethyl (MOE) modifications.

The nucleic acid can also be RNA. For example, antisense RNA, catalytic RNA, catalytic RNA/protein complex (a "ribozyme"), expression constructs comprising RNA that can be directly translated to generate a protein product, or that can be reverse transcribed and either transcribed or transcribed and translated to generate an RNA or protein product, respectively, transcribable constructs comprising RNA having any promoter/regulatory sequence necessary to enable generation of DNA by reverse transcription, a viral genome fragments such as viral RNA, RNA encoding a protein such as a therapeutic protein and the like. The nucleic acid can be selected on the basis of a known, anticipated, or expected biological activity that the nucleic acid will exhibit upon delivery to the interior of a target cell or its nucleus. The nucleic acid can be prepared or isolated by any conventional means typically used to prepare or isolate nucleic acids. For example, DNA and RNA molecules can be chemically synthesized using commercially available reagents and synthesizers by methods that are described, for example, by Gait, 1985, in OLIGONUCLEOTIDE SYNTHESIS: A PRACTICAL APPROACH (IRL Press, Oxford). RNA molecules also can be produced in high yield via in vitro transcription methods using plasmids such as SP65, which is available from Promega Corporation (Madison, Wis.). The nucleic acid can be purified by any suitable means. For example, the nucleic acid can be purified by reverse-phase or ion exchange HPLC, size exclusion chromatography, or gel electrophoresis. Of course, the skilled artisan will recognize that the method of purification will depend in part on the size of the DNA to be purified. The nucleic acid can also be prepared using any of the innumerable recombinant methods which are known or are hereafter developed.

Nucleic acids having modified internucleoside linkages can also be used in conjugates described herein. For example, nucleic acids containing modified internucleoside linkages which exhibit increased nuclease stability can be used. Such nucleic acids include, for example, those which contain one or more phosphonate, phosphorothioate, phosphorodithioate, phosphoramidate methoxyethyl phosphoramidate, formacetal, thioformacetal, diisopropylsilyl, acetamidate, carbamate, dimethylene-sulfide (—CH2-S—CH2-), dimethylene-sulfoxide (—CH2-SO—CH2-), dimethylene-sulfone (—CH2-SO2-CH2-), 2'-O-alkyl, and 2'-deoxy-2'-fluoro-phosphorothioate internucleoside linkages.

The nucleic acid can be a therapeutic agent, such as an antisense DNA molecule that inhibits mRNA translation. Alternatively, the nucleic acid can encode a therapeutic agent, such as a transcription or translation product which, when expressed by a target cell to which the nucleic acid-containing composition is delivered, has a favorable therapeutic effect upon the cell. Examples of therapeutic transcription products include proteins (e.g., antibodies, enzymes, receptor-binding ligands, wound healing proteins, anti-restenotic proteins, anti-oncogenic proteins, and transcriptional or translational regulatory proteins), antisense RNA molecules, ribozymes, viral genome fragments, and the like. The nucleic acid can likewise encode a product useful as a marker for cells which have been transformed using the composition. Examples of markers include proteins having easily identifiable spectroscopic properties (e.g., green fluorescent protein: GFP) and proteins that are expressed on cell surfaces (i.e., which can be detected by contacting the target cell with an agent which specifically binds the protein).

By way of example, the nucleic acid can be selected from a nucleic acid encoding an oncogenic protein and an anti-oncogenic antisense oligonucleotide. Examples of oncogenic proteins include those encoded by the following genes: ab1, akt2, apc, bcl2-alpha, bcl2-beta, bcl3, bcr, brca1, brca2, cbl, ccnd1, cdk4, crk-II, csflr/fins, dbl, dcc, dpc4/smad4, e-cad, e2fl/rbap, egfr/erbb-1, elk], elk3, eph, erg, ets1, ets2, fer, fgr/src2, fli1/ergb2, fos, fps/fes, fra1, fra2, fyn, hek, hek, her2/erbb-2/neu, her3/erbb-3, her4/erbb-4, hras1, hst2, hstf1, ink4a, ink4b, int2/fgf3, jun, junb, jund, kip2, kit, kras2a, kras2b, ck, lyn, mas, max, mcc, met, mlh1, mos, msh2, msh3, msh6, myb, myba, mybb, myc, mycl1, mycn, nf1, nf2, nras, p53, pdgfb, pim1, pms1, pms2, ptc, pten, raft, rbl, rel, ret, ros1, ski, src1, tall, tglbr2, thral, thrb, tiam1, trk, vav, vhl, waf1, wnt1, wnt2, wt1, and yes1. Oligonucleotides which inhibit expression of one of these genes can be used as anti-oncogenic antisense oligonucleotides.

The nucleic acid described herein can be recombinantly engineered into a variety of known host vector systems that provide for replication of the nucleic acid on a large scale for the preparation of composition described herein. These vectors can be designed, using known methods, to contain the elements necessary for directing transcription, translation, or both, of the nucleic acid in a cell to which it is delivered. Methods which are known to the skilled artisan can be used to construct expression constructs having the protein coding sequence operably linked with appropriate transcriptional/translational control signals. These methods include in vitro recombinant DNA techniques and synthetic techniques. For example, see Sambrook et al., 1989, MOLECULAR CLONING. A LABORATORY MANUAL, Cold Spring Harbor Laboratory (New York); Ausubel et al., 1997, CURRENT PROTOCOLS IN MOLECULAR BIOLOGY, John Wiley & Sons (New York).

The nucleic acid encoding one or more proteins of interest can be operatively associated with a variety of different promoter/regulator sequences. The promoter/regulator sequences can include a constitutive or inducible promoter, and can be used under the appropriate conditions to direct high level or regulated expression of the gene of interest. Particular examples of promoter/regulatory regions that can be used include the cytomegalovirus promoter/regulatory region and the promoter/regulatory regions associated with the SV40 early genes or the SV40 late genes. Preferably, the human cytomegalovirus (hCMV) promoter is used in the present invention. However, substantially any promoter/regulatory region which directs high level or regulated expression of the gene of interest can be used.

The nucleic acid described herein can contain a plurality of protein-coding regions, combined on a single genetic construct under control of one or more promoters. The two or more protein-coding regions can be under the transcriptional control of a single promoter, and the transcript of the nucleic acid can comprise one or more internal ribosome entry sites interposed between the protein-coding regions. Thus, an almost endless combination of different genes and genetic constructs can be employed.

II. Conjugates Comprising a Targeting Protein and an RNA Molecule

One embodiment of this disclosure provides a conjugate comprising a targeting protein, such as an antibody or antigen binding fragment thereof, and an oligonucleotide. The conjugate, in some embodiments, enable targeted delivery of RNA molecules to sites of actions, e.g., targeted delivery of an siRNA to tumors, and also improves RNA based therapeutic effects, e.g., improved siRNA mediated silencing. The conjugate, in some embodiments, achieves significant levels of knockdown of natively expressed genes.

The present disclosure, in some embodiments, provides an improved antibody-oligonucleotide conjugate (e.g., an improved antibody-RNA conjugate comprising siRNAs) that are efficacious at concentrations as low as 10 nM, in achieving high rates of knockdown, compared to prior antibody-RNA conjugates wherein concentrations of 100 nM and up to 1000 nM was used for knockdown. See, Cuellar et al., Nucleic Acids Research, 2015, Vol. 43, No. 2, 1189-1203. Furthermore, the approach provided in the present disclosure does not need engineering of cells to express high levels of a target, to achieve high rates of knockdown, thereby providing improvements over prior development efforts of antibody-RNA conjugates, where high silencing efficiency was observed only with high antigen expression. See, Id. at 1202. In some examples, an antibody-oligonucleotide conjugate of this disclosure, such as an ARC, is administered at a dosage or concentration that is just sufficient to saturate the target antigen of the antibody (such as TM4SF1) once or twice, which allows for a more efficient delivery of higher quantities of the RNA (e.g., the siRNA). A higher OAR (oligonucleotide to antibody ratio) or repeat internalization, can, in some examples, be utilized to increase the knockdown rates. For instance, if an antigen is internalized faster than the siRNA is processed, then the dose of siRNA can build up inside a cell, and adding higher quantities of conjugates (such as ARCs) that available antigen can increase the level of knockdown.

In some cases, the ability of the targeting protein to bind antigens with a high specificity can advantageously improve delivery of an siRNA molecule into cells to induce silencing that is dependent on covalent coupling and antigen expression. Further advantages of the conjugate molecules include, but are not limited to: (i) improved delivery of the oligonucleotide, e.g., siRNA, to the cytoplasm, mediated by antibody-antigen receptor mediated endocytosis, (ii) ability of the conjugate to induce or augment uptake and cross-presentation of tumor- or pathogen antigen(s) or antigenic determinant(s) by antigen presenting cells (APCydendritic cells (DC); (ii) ability to promote the maturation of dendritic cells (DCs); (iii) ability to provide CD4+ T cells help to generate CD8+ T cell memory and antibodies against a tumor or a pathogen; (iv) ability to sensitize a targeted tumor cell to antibody dependent cell cytotoxicity (ADCC) and T-cell mediated death. In some embodiments, the conjugate molecules can be used for targeted immunotherapy or immunoprophylaxis of neoplastic diseases, infectious diseases, endothelial-leukocyte interactions, cardiovascular/angiogenesis indications, and other diseases.

The oligonucleotide, in some embodiments, is an RNA molecule. Recent advances of RNA-based therapeutics have broadened the scope of therapeutic targets for a variety of human diseases. Several RNA-based therapeutics are currently under clinical investigation for diseases ranging from genetic disorders to HIV infection to various cancers. These emerging drugs, which include therapeutic ribozymes, aptamers, and small interfering RNAs (siRNAs), have begun to demonstrate the unprecedented versatility of RNA. In some embodiments, the RNA molecule is capable of specifically hybridizing with a polynucleotide encoding an apoptosis inhibitor. In some embodiments, the RNA molecule is capable of specifically hybridizing with a polynucleotide encoding an inhibitor of p53. In some embodiments, the RNA molecule is capable of specifically hybridizing with a poly nucleotide encoding an immune checkpoint protein. In some embodiments, the RNA molecule is capable of specifically hybridizing with a polynucleotide encoding a protein involved inactivating DNA repair. In some embodiments, the RNA molecule is capable of specifically hybridizing with a polynucleotide encoding a protein involved suppressing sialic acid generation. In some embodiments, the RNA molecule is capable of specifically hybridizing with a polynucleotide encoding a protein involved in nonsense mediated decay. In some embodiments, the RNA molecule is capable of promoting costimulatory signals. In some embodiments, the RNA molecule is capable of suppressing white blood cell extravasation. In some embodiments, the RNA molecule is capable of suppressing a molecule critical for cell division. In some embodiments, the RNA molecule is capable of promoting angiogenesis. In some embodiments, the RNA molecule is capable of inhibiting angiogenesis. In some embodiments, the RNA molecule is capable of suppressing an oncogene, such as ABL1, ABL2, AKT1, AKT2, ATF1, BCL11A, BCL2, BCL3, BCL6, BCR, BRAF, CARD11, CBLB, CBLC, CCND1, CCND2, CCND3, CDX2, CTNNB1, DDB2, DDIT3, DDX6, DEK, EGFR, ELK4, ERBB2, ETV4, ETV6, EVI1, EWSR1, FEV, FGFR1, FGFR1OP, FGFR2, FUS, GOLGA5, GOPC, HMGA1, HMGA2, HRAS, IRF4, JUN, KIT, KRAS, LCK, LMO2, MAF, MAFB, MAML2, MDM2, MET, MITF, MPL, MYB, MYC, MYCL1, MYCN, NCOA4, NFKB2, NRAS, NTRK1, NUP214, PAX8, PDGFB, PIK3CA, PIM1, PLAG1, PPARG, PTPN11, RAF1, REL, RET, ROS1, SMO, SS18, TCL1A, TET2, TFG, MLL, TLX1, TPR, or USP6.

In general, RNA-based therapeutics can be classified into several categories based on their mechanism of action. Non-limiting examples of such categories include: inhibitors of mRNA translation (antisense), the agents of RNA interference (RNAi), catalytically active RNA molecules (ribozymes), and RNAs that bind proteins and other molecular ligands (aptamers). Accordingly, in some embodiments of this disclosure, the oligonucleotide of the conjugate comprises an RNA molecule that is a therapeutic agent, such as an antisense oligonucleotide, an agent on RNA interference, a catalytically active RNA molecule, or an RNA that binds proteins and other molecular ligands (aptamers). In some example, the agent for RNA interference comprises a short interfering RNA (siRNA). In some examples, the oligonucleotide comprises a micro RNA (miRNA). In some examples, the oligonucleotide is a messenger RNA (mRNA). In some examples, the oligonucleotide is a short hairpin RNA (shRNA). In some examples, the oligonucleotide is an antisense miRNA. In some examples, the oligonucleotide is an antagomir (anti-miRNA). The RNA molecule of this disclosure, in some embodiments, is an RNA molecule comprising naturally occurring nucleotides. In some cases, the RNA molecule is a modified RNA molecule comprising modifications such as phosphorothioate backbone modification, 2-O-methyl (2'-OMe), 2'-fluoro (2'-F), 2'-O-methoxyethyl (2'-MOE) sugar substitutions; 2'-0,4-C-methylene linked bicyclic ribonucleotides known as a locked nucleic acid (LNA); or an L-RNA (which is an enantiomer of natural RNA) oligonucleotide, also known as spiegelmers. Without being bound by any specific theory, it is contemplated that modifications at the 2' position of the sugar ring—including 2'-OMe, 2'-F, 2'-MOE, and LNA—has the ability to confer the oligonucleotide to adopt an RNA-like C3'-endo (N-type) sugar pucker, which is the most energy-favorable conformation of RNA.

In some examples, a conjugate is provided which is couple to a modified RNA molecule, and the conjugate exhibits several advantageous properties, such as, improved resistance to nucleolytic degradation, Rnase-H-mediated cleavage of the target mRNA for antisense applications, increased affinity for plasma proteins to hinder renal clearance of the oligonucleotide, or the conjugate comprising the oligonucleotide. In some embodiments, the conjugate comprises a modified RNA molecule comprising a chemical substitution or an LNA modification, as exemplified above, and has an overall improved potency, stability, pharmacokinetic and pharmacodynamic property, as a result of the chemical substitution or the LNA modification.

One embodiment of this disclosure provides a conjugate comprising an antibody or an antigen binding fragment thereof and an agent for RNAi, to form an antibody-RNAi agent conjugate. RNAi is a natural mechanism for silencing gene expression. During the process of RNAi, intracellularly introduced double-stranded (ds) RNA is cleaved into small interfering (si) RNA duplexes (19□21 base pairs) that are incorporated into a protein complex called the RNA-induced silencing complex (RISC), which unwinds the two siRNA strands, retaining one strand to allow the recognition and sequence-specific degradation of mRNA. (See, e.g., Sledz C A, Williams B R (2005) RNA interference in biology and disease. Blood 106: 787-794). In some examples, RNAi agents such as canonical double stranded siRNAs are part of the antibody-RNAi agent conjugate. In yet other examples, other classes of siRNAs, for examples, self-annealing siRNAs, are part of the antibody-RNAi agent conjugate.

The antibody-RNAi agent, in some embodiments, targets one or more pathways related to indications, such as cancer. In some embodiments, the RNAi agent is an siRNA.

Interfering RNA includes "small-interfering RNA" or "siRNA," e.g., interfering RNA of about 15-60, 15-50, or 15-40 (duplex) nucleotides in length, more typically about 15-30, 15-25, or 19-25 (duplex) nucleotides in length, and is preferably about 20-24, 21-22, or 21-23 (duplex) nucleotides in length (e.g., each complementary sequence of the double-stranded siRNA is 15-60, 15-50, 15-40, 15-30, 15-25, or 19-25 nucleotides in length, preferably about 20-24, 21-22, or 21-23 nucleotides in length, and the double-stranded siRNA is about 15-60, 15-50, 15-40, 15-30, 15-25, or 19-25 base pairs in length, preferably about 20-24, 21-22, or 21-23 base pairs in length). siRNA duplexes may comprise 3' overhangs of about 1 to about 4 nucleotides or about 2 to about 3 nucleotides and 5' phosphate termini. Examples of siRNA include, without limitation, a double-stranded polynucleotide molecule assembled from two separate stranded molecules, wherein one strand is the sense strand and the other is the complementary antisense strand; a double-stranded polynucleotide molecule assembled from a single stranded molecule, where the sense and antisense regions are linked by a nucleic acid-based or non-nucleic acid-based linker; a double-stranded polynucleotide molecule with a hairpin secondary structure having self-complementary sense and antisense regions; and a circular single-stranded polynucleotide molecule with two or more loop structures and a stem having self-complementary sense and antisense regions, w here the circular polynucleotide can be processed in vivo or in vitro to generate an active double-stranded siRNA molecule.

In some embodiments, the siRNA is chemically synthesized. siRNA can also be generated by cleavage of longer dsRNA (e.g., dsRNA greater than about 25 nucleotides in length) with the E. coli RNase III or Dicer. These enzymes process the dsRNA into biologically active siRNA (see, e.g., Yang et al., Proc. Natl. Acad. Sci. USA, 99:9942-9947 (2002); Calegari et al., Proc. Natl. Acad. Sci. USA, 99:14236 (2002); Byrom et al., Ambion TechNotes, 10(1):4-6 (2003); Kawasaki et al., Nucleic Acids Res., 31:981-987 (2003); Knight et al., Science, 293:2269-2271 (2001); and Robertson et al., J. Biol. Chem, 243:82 (1968)). In some embodiments, dsRNAs that are cleaved to generate the siRNAs are at least 50 nucleotides to about 100, 200, 300, 400, or 500 nucleotides in length. A dsRNA may be as long as 1000, 1500, 2000, 5000 nucleotides in length, or longer. The dsRNA can encode for an entire gene transcript or a partial gene transcript. In certain instances, siRNA may be encoded by a plasmid (e.g., transcribed as sequences that automatically fold into duplexes with hairpin loops).

The siRNA molecules described herein, in some embodiments, are used to downregulate or silence the translation (i.e., expression) of a gene of interest. Genes of interest include, but are not limited to, genes associated with viral infection and survival, genes associated with metabolic diseases and disorders (e.g., liver diseases and disorders), genes associated with tumorigenesis and cell transformation, angiogenic genes, immunomodulator genes such as those associated with inflammatory and autoimmune responses, ligand receptor genes, and genes associated with neurodegenerative disorders.

Genes associated with viral infection and survival include those expressed by a virus in order to bind, enter, and replicate in a cell. Of particular interest are viral sequences associated with chronic viral diseases. Viral sequences of particular interest include sequences of Filoviruses such as Ebola virus and Marburg virus; Arenaviruses such as Lassa virus, Junin virus, Machupo virus, Guanarito virus, and Sabia virus; Influenza viruses such as Influenza A, B, and C viruses. Exemplary Filovirus nucleic acid sequences that can be silenced include, but are not limited to, nucleic acid sequences encoding structural proteins (e.g., VP30, VP35, nucleoprotein (NP), polymerase protein (L-pol)) and membrane-associated proteins (e.g., VP40, glycoprotein (GP), VP24). Complete genome sequences for Ebola virus are set forth in, e.g., Genbank Accession Nos. NC-002549; AY769362; NC-006432; NC-004161; AY729654; AY354458; AY142960; AB050936; AF522874; AF499101; AF272001; and AF086833. Ebola virus VP24 sequences are set forth in, e.g., Genbank Accession Nos. U77385 and AY058897. Ebola virus L-pol sequences are set forth in, e.g., Genbank Accession No. X67110. Ebola virus VP40 sequences are set forth in, e.g., Genbank Accession No. AY058896. Ebola virus NP sequences are set forth in, e.g., Genbank Accession No. AY058895. Ebola virus GP sequences are set forth in, e.g., Genbank Accession No. AY058898. Additional Ebola virus sequences are set forth in, e.g., Genbank Accession Nos. L11365 and X61274. Complete genome sequences for Marburg virus are set forth in. e.g., Genbank Accession Nos. NC-001608; AY430365; AY430366; and AY358025. Marburg virus GP sequences are set forth in, e.g., Genbank Accession Nos. AF005734; AF005733; and AF005732. Marburg virus VP35 sequences are set forth in, e.g., Genbank Accession Nos. AF005731 and AF005730. Additional Marburg virus sequences are set forth in, e.g., Genbank Accession Nos. X64406; Z29337; AF005735; and Z12132. Exemplary Influenza virus nucleic acid sequences that can be silenced include, but are not limited to, nucleic acid sequences encoding nucleoprotein (NP), matrix proteins (M1 and M2), nonstructural proteins (NS1 and NS2), RNA polymerase (PA, PB1, PB2), neuraminidase (NA), and haemagglutinin (HA). Influenza A NP sequences are set forth in, e.g., Genbank Accession Nos. NC-004522; AY818138; AB166863; AB188817; AB189046; AB189054; AB189062; AY646169; AY646177; AY651486; AY651493; AY651494; AY651495; AY651496; AY651497; AY651498; AY651499; AY651500; AY651501; AY651502; AY651503; AY651504; AY651505; AY651506; AY651507; AY651509; AY651528; AY770996; AY790308; AY818138; and AY818140. Influenza A PA sequences are set forth in, e.g., Genbank Accession Nos. AY818132; AY790280; AY646171; AY818132; AY818133; AY646179; AY818134; AY551934; AY651613; AY651610; AY651620; AY651617; AY651600; AY651611; AY651606; AY651618; AY651608; AY651607; AY651605; AY651609; AY651615; AY651616; AY651640; AY651614; AY651612; AY651621; AY651619; AY770995; and AY724786. Exemplary hepatitis virus nucleic acid sequences that can be silenced include, but are not limited to, nucleic acid sequences involved in transcription and translation (e.g., En1, En2, X, P) and nucleic acid sequences encoding structural proteins (e.g., core proteins including C and C-related proteins, capsid and envelope proteins including S, M, and/or L proteins, or fragments thereof). Exemplary Hepatitis C nucleic acid sequences that can be silenced include, but are not limited to, serine proteases (e.g., NS3/NS4), helicases (e.g. NS3), polymerases (e.g., NS5B), and envelope proteins (e.g., E1, E2, and p7). Hepatitis A nucleic acid sequences are set forth in, e.g., Genbank Accession No. NC-001489; Hepatitis B nucleic acid sequences are set forth in, e.g., Genbank Accession No. NC-003977; Hepatitis C nucleic acid sequences are set forth in, e.g., Genbank Accession No. NC-004102; Hepatitis D nucleic acid sequence are set forth in, e.g., Genbank Accession No. NC-001653; Hepatitis E nucleic acid sequences are set forth in, e.g., Genbank Accession No. NC-001434; and Hepatitis G nucleic acid sequences are set forth in, e.g., Genbank Accession No. NC-001710. Silencing of sequences that encode genes associated with viral infection and survival, using an antibody-RNAi conjugate of this disclosure, can, in some embodiments be carried out in using a combination with the administration of conventional agents used to treat the viral condition.

Genes associated with metabolic diseases and disorders (e.g., disorders in which the liver is the target and liver diseases and disorders) include, for example, genes expressed in dyslipidemia (e.g., liver X receptors such as LXRα and LXRβ (Genback Accession No. NM-007121), farnesoid X receptors (FXR) (Genbank Accession No. NM-005123), sterol-regulatory element binding protein (SREBP), Site-1 protease (SIP), 3-hydroxy-3-methylglutaryl coenzyme-A reductase (HMG coenzyme-A reductase), Apolipoprotein (ApoB), and Apolipoprotein (ApoE)); and diabetes (e.g., Glucose 6-phosphatase). In some embodiments, the genes associated with metabolic diseases and disorders (e.g., diseases and disorders in which the liver is a target and liver diseases and disorders) include genes that are expressed in the liver itself as well as and genes expressed in other organs and tissues. Silencing of sequences that encode genes associated with metabolic diseases and disorders can conveniently be used in combination with the administration of conventional agents used to treat the disease or disorder. Examples of gene sequences associated with tumorigenesis and cell transformation include mitotic kinesins such as Eg5; translocation sequences such as MLL fusion genes, BCR-ABL, TEL-AML1, EWS-FLI1, TLS-FUS, PAX3-FKHR, BCL-2, AML1-ETO, and AML1-MTG8; overexpressed sequences such as multidrug resistance genes, cyclins, beta-catenin, telomerase genes, c-MYC, N-MYC, BCL-2, ERBB1, and ERBB2: and mutated sequences such as RAS. Silencing of sequences that encode DNA repair enzymes find use in combination with the administration of chemotherapeutic agents. Genes encoding proteins associated with tumor migration are also target sequences of interest, for example, integrins, selectins, and metalloproteinases. The foregoing examples are not exclusive. Any whole or partial gene sequence that facilitates or promotes tumorigenesis or cell transformation, tumor growth, or tumor migration can be included as a template sequence. Angiogenic genes are able to promote the formation of new vessels. Of particular interest is Vascular Endothelial Growth Factor (VEGF) or VEGFr. In some examples, anti-angiogenic genes are able to inhibit neovascularization. These genes are particularly useful for treating those cancers in which angiogenesis play s a role in the pathological development of the disease. Examples of anti-angiogenic genes include, but are not limited to, endostatin, angiostatin, and VEGF-R2.

Immunomodulator genes are genes that modulate one or more immune responses. Examples of immunomodulator genes include, without limitation, cytokines such as growth factors (e.g., TGF-α, TGF-β, EGF, FGF, IGF, NGF, PDGF, CGF, GM-CSF, SCF, etc.), interleukins (e.g., IL-2, IL-4, IL-12, IL-15, IL-18, IL-20, etc.), interferons (e.g., IFN-α, IFN-β, IFN-γ, etc.) and TNF Fas and Fas Ligand genes are also immunomodulator target sequences of interest. Genes encoding secondary signaling molecules in hematopoietic and lymphoid cells are also included in the present invention, for example, Tec family kinases such as Bruton's tyrosine kinase (Btk).

Cell receptor ligands include ligands that are able to bind to cell surface receptors (e.g., insulin receptor, EPO receptor, G-protein coupled receptors, receptors with tyrosine kinase activity, cytokine receptors, growth factor receptors, etc.), to modulate (e.g., inhibit, activate, etc.) the physiological pathway that the receptor is involved in (e.g., glucose level modulation, blood cell development, mitogenesis, etc.). Examples of cell receptor ligands include, but are not limited to, cytokines, growth factors, interleukins, interferons, erythropoietin (EPO), insulin, glucagon, G-protein coupled receptor ligands, etc.

Trinucleotide repeat (TNR) expansions in the genome cause a number of degenerative diseases, such as trinucleotide explansion of CAG in Huntington's disease (HD); GAA in Friedreich's ataxia: CGG in fragile X tremor ataxia syndrome (FXTAS); and CCG found in fragile XE mental retardation (FRAXE). RNA generated from the TNR regions including small siRNA-sized repeat fragments. An inverse correlation between the length of the repeats in HTT and cancer incidence has been reported for HD patients. We now show that siRNAs based on the CAG TNR are toxic to cancer cells by targeting genes that contain long reverse complementary TNRs in their open reading frames. Of the siRNAs based on the different TNRs, the six members in the CAG/CUG family of related TNRs are the most toxic to both human and mouse cancer cells. siCAG/CUG TNR-based siRNAs induce cell death in vitro in all tested cancer cell lines and slow down tumor growth in a preclinical mouse model of ovarian cancer with no signs of toxicity to the mice. We propose to explore TNR-based siRNAs as a novel form of anticancer reagents. Templates coding for an expansion of trinucleotide repeats (e.g., CAG repeats) find use in silencing pathogenic sequences in neurodegenerative disorders caused by the expansion of trinucleotide repeats, such as spinobulbular muscular atrophy and Huntington's Disease. Accordingly, in some embodiments, the siRNA comprises a trinucleotide repeat (TNR) sequence, such as a CAG/CUG TNR sequence. In some embodiments, the siRNA comprising the CAG/CUG sequence comprises an IC50 of about 0.01 nM to about 10.0 nM. In some embodiments, an antibody-siRNA conjugate comprises a CAG repeat sequence. In some embodiments, an antibody-siRNA conjugate comprises a CUG repeat sequence. In some embodiments, an antibody-siRNA conjugate comprises a CAG and a CUG repeat sequence. In some embodiments, a method of treating cancer in a subject in need thereof comprises administering the antibody-siRNA conjugate comprising a trinucleotide sequence. In some embodiments, a method of treating cancer in a subject in need thereof comprises administering the antibody-siRNA conjugate comprising a CAG repeat sequence. In some embodiments, a method of treating cancer in a subject in need thereof comprises administering the antibody-siRNA conjugate comprising a CUG repeal sequence. In some embodiments, a method of treating cancer in a subject in need thereof comprises administering the antibody-siRNA conjugate comprising a CAG and a CUG repeat sequence.

In addition to its utility in silencing the expression of any of the above-described genes for therapeutic purposes, the siRNA described herein, for the antibody-RNAi conjugates, are also useful in research and development applications as well as diagnostic, prophylactic, prognostic, clinical, and other healthcare applications. As a non-limiting example, the siRNA molecules of this disclosure can be used in target validation studies directed at testing whether a gene of interest has the potential to be a therapeutic target. The siRNA molecules of this disclosure can also be used in target identification studies aimed at discovering genes as potential therapeutic targets.

Further examples of targets of the siRNA, include, but are not limited to: MCL1, BCL-XL, MDM2, MDM4, PD-L1, CD47/IAP, UPF1, MLH1, CMAS, CDK4, CDK6, PLK1, PLK4, AURKB, AURKA, MADCAM1, ICAM1, VCAM1, and TM4SF1. In some embodiments, the siRNA targets TM4SF1, CAG/CUG, P-selectin, E-selectin, peripheral lymph node addressin (PNAd), ICAM-2, PECAM-1, JAM-A, JAM-B, JAM-C, galectin-1, galectin-3, and galectin-9, PD-L2, SNAI1, ZEB1, B7-H3, IDO, LSECtin, CEACAM-1, HMGB-1, CD112, CD155. In some embodiments, the siRNA targets TM4SF1, and comprises a sense strand sequence, for example, as set forth in SEQ ID NO: 100. In some embodiments, the siRNA is a CAG and CUG trinucleotide repeat-derived siRNA (siCAG/CUG), comprising a sense strand sequence, for example, as set forth in SEQ ID NO: 101. In some embodiments, the siRNA targets CD47/IAP. In some embodiments, the siRNA targets PLK1. In some embodiments, the siRNA targets MCL1. In some embodiments, the siRNA targets ICAM1.

Induced myeoloid leukemia cell differentiation protein (MCL1) is a protein encoded by the MCL1 gene which belongs to the Bcl-2 family. MCL1 expression is frequently elevated in cancers, such as breast cancer. Evasion of apoptosis promotes tumor development and also acts as a barrier to cancer therapy-induced cell death. Mitochondrial-dependent apoptosis is controlled by Bcl-2 family members—these proteins control cell fate by regulating mitochondrial integrity. During apoptosis, upregulation of pro-apoptotic Bcl-2 members overwhelms anti-apoptotic Bcl-2 function resulting in mitochondrial outer membrane permeabilisation and cell death. Aberrant increases in the level of anti-apoptotic Bcl-2 proteins such as BCL-2, MCL-1, or BCL-XL prevent apoptosis, which promotes cancer and permits resistance to cancer therapy-induced cell death. Therefore, reducing the expression of or inactivating MCL-1 or BCL-XL provides a method of treating and/or delaying the progression of cancer. Accordingly, one embodiment of this disclosure provides an antibody-siRNA conjugate targeting MCL-1. In some embodiments, the siRNA is capable of specifically hybridizing with a polynucleotide encoding MCL-1. In some embodiments, the siRNA silences, inactivates, down-regulates, inhibits, or reduces the expression of MCL-1. In some embodiments, a method of treating cancer in a subject in need thereof comprises administering the antibody-siRNA conjugate targeting MCL-1. Another embodiment of this disclosure provides an antibody-siRNA conjugate targeting BCL-XL. In some embodiments, the siRNA is capable of specifically hybridizing with a polynucleotide encoding BCL-XL. In some embodiments, the siRNA silences, inactivates, down-regulates, inhibits, and/or reduces the expression of BCL-XL. In some embodiments, a method of treating cancer in a subject in need thereof comprises administering the antibody-siRNA conjugate targeting BCL-XL.

Mouse double minute 2 homolog (Mdm2) is a human, oncogenic protein encoded by the MDM2 gene. Mdm2 has been identified as a p53 responsive protein that represses the transcriptional activity of the tumor suppressor p53 protein (i.e., Mdm2 is an antagonist of p53). Mdm2 represses p53 by binding to and blocking the N-terminal trans-activation domain of p53. The transcription of Mdm2 is activated by p53. A number of cancers, such as acute myeloid leukemia (AML) and some solid tumors, have a p53 dysfunction due to abnormal activity of Mdm2. Blocking Mdm2 interactions with p53 induces apoptosis in cancerous cells and/or cells over-expressing Mdm2. Thus, reducing the expression of or inactivating Mdm2 provides a method of treating and/or delaying the progression of cancer. Accordingly, one embodiment of this disclosure provides an antibody-siRNA conjugate targeting Mdm2. In some embodiments, the siRNA targets Mdm2. In some embodiments, the siRNA is capable of specifically hybridizing with a polynucleotide encoding Mdm2. In some embodiments, the siRNA silences, inactivates, down-regulates, inhibits, or reduces the expression of Mdm2. In some embodiments, a method of treating cancer in a subject in need thereof comprises administering the antibody-siRNA conjugate targeting Mdm2.

Mouse double minute 4 homolog (Mdm4) is a human, oncogenic protein encoded by the MDM4 gene. Similarly to Mdm2, Mdm4 has been identified as an inhibitor of p53 and has structural similarities to Mdm2. Mdm4 inhibits p53 by also binding to its transcritptional activation domain. In addition, Mdm4 has been shown to interact with Mdm2 via the RING finger domain and inhibiting the latter's degradation. Mdm4 promotes survival of cancerous cells, such as melanoma cells, by antagonizing the proapoptotic function of p53. Inhibition of the Mdm4 interactions with p53 restores p53 function which leads to apoptosis in cancerous cells and/or increased sensitivity to cancer-targeting therapeutic agents. Thus, reducing the expression of or inactivating Mdm4 is provides a method of treating and/or delaying the progression of cancer. Accordingly, one embodiment of this disclosure provides an antibody-siRNA conjugate targeting Mdm4. In some embodiments, the siRNA is capable of specifically hybridizing with a polynucleotide encoding Mdm4. In some embodiments, the siRNA targets Mdm4. In some embodiments, the siRNA silences, inactivates, down-regulates, inhibits, or reduces the expression of Mdm4. In some embodiments, a method of treating cancer in a subject in need thereof comprises administering the antibody-siRNA conjugate targeting Mdm4.

Programmed death-ligand 1 (PD-L1) is a human protein encoded by the CD274 gene. PD-L1 play s a major role in suppressing the immune system during particular events: for example, in cancer and autoimmune diseases. PD-L1 binds to PD-1 or B7-1, which triggers an inhibitory signal that reduces the proliferation of antigen-specific T-cells and reduces apoptosis in anti-inflammatory T-cells. The PD-1/PD-L1 pathway is an adaptive immune resistance mechanism exerted by cancerous cells in response to endogenous immune anti-tumor activity. PD-L1 is commonly overexpressed in tumor cells. PD-L1 binds to PD-1 receptors on activated T-cells, which leads to the inhibition of cytotoxic T-cells that would otherwise target the tumor cells. Inhibition of the PD-1/PD-L1 pathway allows native cytotoxic T-cells to target and eliminate cancerous cells. Consequently, reducing the expression of or inactivating PD-L1 provides a method of treating and/or delaying the progression of cancer. Accordingly, one embodiment of this disclosure provides an antibody-siRNA conjugate targeting PD-L1. In some embodiments, the siRNA targets PD-L1. In some embodiments, the siRNA is capable of specifically hybridizing with a polynucleotide encoding PD-L1. In some embodiments, the siRNA silences, inactivates, down-regulates, inhibits, or reduces the expression of PD-L1. In some embodiments, a method of treating cancer in a subject in need thereof comprises administering the antibody-siRNA conjugate targeting PD-L1.

In addition to PD-L1, PD-L2 is another ligand for PD-1. Inhibition of the PD-1/PD-L2 pathway enables immune evasion by tumor cells. As such, one embodiment of this disclosure provides an antibody-siRNA conjugate targeting PD-L2. In some embodiments, the siRNA targets PD-L2. In some embodiments, the siRNA is capable of specifically hybridizing with a polynucleotide encoding PD-L2. In some embodiments, the siRNA silences, inactivates, down-regulates, inhibits, or reduces the expression of PD-L2. In some embodiments, a method of treating cancer in a subject in need thereof comprises administering the antibody-siRNA conjugate targeting PD-L2.

Cluster of differentiation 47, also known as integrin associated protein (CD47/IAP) is a human transmembrane protein encoded by the CD47 gene. CD47 is a widely expressed cell membrane receptor belonging to the immunoglobulin (Ig) superfamily. CD47 has been implicated in several physiologic processes such as, but not limited to cell migration, cell proliferation, apoptosis, and cell adhesion. Additionally, CD47 functions as an inhibitor of phagocytosis through ligation of signal-regulatory protein alpha (SIRP-α) expressed on phagocytes (e.g., macrophages). CD47 plays a role on inhibition of tumor growth and prevention of metastasis. For example, blocking CD47 interrupts the CD47-SIRPα pathway which enables cancer cells to escape phagocytosis by native macrophages. In addition, ligation of CD47 induces cancer cell apoptosis. Furthermore, targeting CD47 improves the tumor microenvironment. Accordingly, one embodiment of this disclosure provides an antibody-siRNA conjugate targeting CD47. In some embodiments, the siRNA targets CD47. In some embodiments, the siRNA is capable of specifically hybridizing with a polynucleotide encoding CD47. In some embodiments, the siRNA silences, inactivates, down-regulates, inhibits, or reduces the expression of CD47. In some embodiments, a method of treating cancer in a subject in need thereof comprises administering the antibody-siRNA conjugate targeting CD47.

Upframeshift 1 (UPF1) is an RNA helicase is plays an important role in non-sense mediated mRNA decay (NMD), a cellular process that actively degrades mRNAs. UPF1 is part of a post-splicing multi protein complex involved in both mRNA nuclear export and mRNA surveillance. One embodiment of this disclosure provides an antibody-siRNA conjugate targeting UPF1. In some embodiments, UPF1 promotes presentation of neoantigens. In some embodiments, the siRNA targets UPF1. In some embodiments, the siRNA is capable of specifically hybridizing with a polynucleotide encoding UPF1. In some embodiments, the siRNA silences, inactivates, down-regulates, inhibits, or reduces the expression of UPF1. In some embodiments, a method of treating cancer in a subject in need thereof comprises administering the antibody-siRNA conjugate targeting UPF1. Nonsense-mediated mRNA decay (NMD) is an mRNA quality-control mechanism that degrades aberrant mRNAs containing premature translation termination codons (PTCs). The essential proteins for NMD include SMG-1, a protein kinase, and UPF1, a substrate of SMG-1 with RNA helicase activity. UPF1 eliminates aberrant mRNAs harboring premature termination codons, and regulates the steady-state levels of normal physiological mRNAs. UPF1 knockdown leads to survival of aberrant mRNAs, and their translation into aberrant proteins that do not occur elsewhere in the body. These aberrant proteins can be seen as foreign by B cells. Accordingly, one embodiment of the present disclosure provides an antibody-siRNA conjugate targeting UPF1. In some embodiments, the siRNA is capable of specifically hybridizing to a polynucleotide encoding UPF1. In some embodiments, UPF1 promotes presentation of neoantigens. In some embodiments, a method of treating cancer in a subject in need thereof comprises administering the antibody-siRNA conjugate targeting UPF1.

MutL (*E. coli*) homolog 1 (colon cancer, nonpolyposis type 2) also known as MLH1 is a protein involved in the mismatch repair process after DNA replication. In some embodiments, a transient knockdown of MLH1 downregulates mismatch repair creating neoantigens and sensitizing to PD-1. Accordingly, one embodiment of this disclosure provides an antibody-siRNA conjugate targeting MLH1. In some embodiments, the siRNA targets MLH1. In some embodiments, the siRNA is capable of specifically hybridizing with a polynucleotide encoding MLH1. In some embodiments, the siRNA silences, inactivates, down-regulates, inhibits, or reduces the expression of MLH1. In some embodiments, a method of treating cancer in a subject in need thereof comprises administering the antibody-siRNA conjugate targeting MLH1.

N-acylneuraminate cytidylyltransferase (CMAS) is an enzyme that is encoded by the CMAS gene in humans. CMAS converts N-acetylneuraminic acid (NeuNAc) to cytidine 5'-monophosphate N-acetylneuraminic acid (CMP-NeuNAc). This process is important in the formation of sialylated glycoprotein and glycolipids. This modification plays a role in cell-cell communications and immune responses. Overexpression of CMAS generates increased sialic acid levels, which in turn maintains a transcriptional signature rich in expression of genes involved in cancer cell pathogenicity, such as breast cancer. Reducing cellular sialylation through knockdown of CMAS leads to transcriptional reprogramming and reduced breast cancer pathogenicity. Accordingly, one embodiment of this disclosure provides an antibody-siRNA conjugate targeting CMAS. In some embodiments, the siRNA is capable of specifically hybridizing with a polynucleotide encoding CMAS. In some embodiments, the siRNA targets CMAS. In some embodiments, the siRNA silences, inactivates, down-regulates, inhibits, or reduces the expression of CMAS. In some embodiments, a method of treating cancer in a subject in need thereof comprises administering the antibody-siRNA conjugate targeting CMAS.

Cyclin-dependent kinase 4 (CDK4), also known as cell division protein kinase 4, and CDK6 are both enzymes that are part of the cyclin-dependent kinase family. CDK4 and CDK6 play important roles in mammalian cell proliferation. The cyclin D-CDK4/CDK6-inhibitor of CDK4(INK4)-retinoblastoma (Rb) pathway regulates cellular proliferation by controlling the G1 (pre-DNA synthesis) to S (DNA synthesis) cell cycle checkpoint. Dysregulation of the cyclin D-CDK4/CDK6-INK4-Rb pathway is frequently observed in cancer and contributes to cell cycle progression and continued growth. CDK4 and CDK6 mediates the transition from G1 to S phase by associating with D-type cyclins and regulating the phosphorylation state of Rb. Unphosphorylated Rb binds and represses the function of E2 family (E2F) transcription factors; upon phosphorylation, Rb dissociates from E2F transcription factors, freeing them to be able to participate in DNA replication and cell division. Increased cyclin CDK4 and CDK6 activity, which promotes phosphorylation of Rb, can occur through several mechanisms, including overexpression of D-type cyclins, mutation or amplification of the CDK4 and/or CDK6 genes, or loss of cyclin CDK4 and CDK6 negative regulators such as p16INK4A. Ultimately, increased CDK4 and CDK6 activity leads to cancer cell growth. Thus, inhibiting CDK4 and/or CDK6 offers a novel therapeutic approach for patients with advanced cancer. Accordingly, one embodiment of this disclosure provides an antibody-siRNA conjugate targeting CDK4. In some embodiments, the siRNA targets CDK4. In some embodiments, the siRNA is capable of specifically hybridizing with a polynucleotide encoding CDK4. In some embodiments, the siRNA silences, inactivates, down-regulates, inhibits, or reduces the expression of CDK4. In some embodiments, a method of treating cancer in a subject in need thereof comprises administering the antibody-siRNA conjugate targeting CDK4. Yet another embodiment of this disclosure provides an antibody-siRNA conjugate targeting CDK6. In some embodiments, the siRNA targets CDK6. In some embodiments, the siRNA is capable of specifically hybridizing with a polynucleotide encoding CDK6. In some embodiments, the siRNA silences, inactivates, down-regulates, inhibits, or reduces the expression of CDK6. In some embodiments, a method of treating cancer in a subject in need thereof comprises administering the antibody-siRNA conjugate targeting CDK6.

7) Serine/threonine-protein kinase (PLK1), also known as polo-like kinase 1, or serine/threonine-protein kinase 13 (STPK13), and serine/threonine-protein kinase (PLK4) also known as polo-like kinase 4, are both enzymes that are part of the polo family of serine/threonine protein kinases. PLK1 performs several important functions throughout M phase of the cell cycle, including the regulation of centrosome maturation and spindle assembly, the removal of cohesins from chromosome arms, the inactivation of anaphase-promoting complex/cyclosome (APC/C) inhibitors, and the regulation of mitotic exit and cytokinesis. Dysfunction of PLK1 promotes cancerous transformation and drives its progression. PLK1 overexpression is found in a variety of human cancers and is associated with poor prognoses in cancers. Inhibition of PLK1 leads to death of cancer cells by interfering with multiple stages of mitosis. Thus, PLK1 is an attractive target for cancer therapy. Accordingly, one embodiment of this disclosure provides an antibody-siRNA conjugate targeting PLK1. In some embodiments, the siRNA targets PLK1. In some embodiments, the siRNA is capable of specifically hybridizing with a polynucleotide encoding PLK1. In some embodiments, the siRNA silences, inactivates, down-regulates, inhibits, or reduces the expression of PLK1. In some embodiments, a method of treating cancer in a subject in need thereof comprises administering the antibody-siRNA conjugate targeting PLK1.

PLK4 regulates centriole duplication during the cell cycle; i.e., PLK4 is essential for duplication of the centrosome. Overexpression of PLK4 leads to altered mitotic fidelity and triggers tumorigenesis. Hence, inhibition of PLK4 has antineoplastic effects against cancer. Accordingly, yet another embodiment of this disclosure provides an antibody-siRNA conjugate targeting PLK4. In some embodiments, the siRNA targets PLK4. In some embodiments, the siRNA is capable of specifically hybridizing with a polynucleotide encoding PLK4. In some embodiments, the siRNA silences, inactivates, down-regulates, inhibits, or reduces the expression of PLK4. In some embodiments, a method of treating cancer in a subject in need thereof comprises administering the antibody-siRNA conjugate targeting PLK4.

Aurora B kinase (AURKB) and aurora A kinase (AURKA) are proteins that are members of the Aurora kinase family, which regulate mitosis. The Aurora kinases associate with microtubules during chromosome movement and segregation. Aurora kinase B localizes to microtubules near kinetochores, specifically to the specialized microtubules called K-fibers, and Aurora kinase A localizes to the centrosomes. AURKB and AURKA are overexpressed in a wide variety of human tumors. Overexpression of AURKB and AURKA induces abnormal cell division resulting in centrosome amplification and multinucleation in cells. AURKB and AURKA inhibition induces apoptosis of cancerous cells through distinct mechanisms. AURKA inhibition induces defects in mitotic spindle assembly, which causes a transient spindle checkpoint-dependent mitotic arrest. This cell cycle arrest is not maintained, and subsequently, AURKA-inhibited cells exit from mitosis leading to apoptosis, either by induction of a G1 arrest, followed by apoptosis, or by a p5 3-independent mechanism. In contrast, inhibition of AURKB also interferes with normal chromosome alignment during mitosis and overrides the mitotic spindle checkpoint causing polyploidy, failure of cytokinesis and endoreduplication followed by cell death. Accordingly, one embodiment of this disclosure provides an antibody-siRNA conjugate targeting AURKB. In some embodiments, the siRNA targets AURKB. In some embodiments, the siRNA is capable of specifically hybridizing with a polynucleotide encoding AURKB. In some embodiments, the siRNA silences, inactivates, down-regulates, inhibits, or reduces the expression of AURKB. In some embodiments, a method of treating cancer in a subject in need thereof comprises administering the antibody-siRNA conjugate targeting AURKB. Another embodiment of this disclosure provides an antibody-siRNA conjugate targeting AURKA. In some embodiments, the siRNA targets AURKA. In some embodiments, the siRNA is capable of specifically hybridizing with a polynucleotide encoding AURKA. In some embodiments, the siRNA silences, inactivates, down-regulates, inhibits, or reduces the expression of AURKA. In some embodiments, a method of treating cancer in a subject in need thereof comprises administering the antibody-siRNA conjugate targeting AURKA.

Cancer metastasis is facilitated by cell-cell interactions between tumor cells and the endothelium in distant tissues. Two major cell adhesion molecule families, selectins and integrins, participate in metastasis. Within blood vessels, circulating tumor cells ultimately interact with the endothelium which leads to tumor cell arrest and extravasation. During leukocyte recruitment to tumor microenvironemnts, immune cells first undergo "rolling," which is initiated by interactions between endothelial P/E-selectins, peripheral lymph node addressin (PNAd), and mucosal vascular addressin cell adhesion molecule 1 (MADCAM-1), as well as leukocyte L-selectin, PSGL-1, and E-selectin ligand. This step is reversible unless firm adhesion occurs. Firm adhesion is mediated by the interaction of endothelial intercellular cell adhesion molecule 1/2 (ICAM-1/2), vascular cell adhesion molecule (VCAM-1), MADCAM-1 with leukocyte α4β7 integrin, α4β1 integrin (VLA4), and αLβ2 integrin (LFA-1). αMβ2 integrin (Mac-1) triggers apical leukocyte flattening and crawling along the endothelium. Transmigration is the final step which is regulated by endothelial platelet endothelial cell adhesion molecule-1 (PECAM-1) and junctional adhesion molecule-A/B/C (JAM-A/B/C), interacting with leukocyte PECAM-1, LFA-1, VLA-4, and Mac-1. Tumor cell-endothelial contact formations parallel these leukocyte-endothelial cell interactions during inflammation and/or recruitment to leukocytes to tumor microenvironments. Although the mechanism of tumor cell adhesion certainly differs from leukocyte recruitment to inflammatory sites, the cell adhesion molecules involved in the contact formation of tumor cells with endothelium are the same.

Selectins and integrins have an important role in cancer progression of various cancer types; for example, colon and lung carcinomas and melanomas. While selectin-mediated tumor cells arrest and adhesion contribute to metastasis, integrin-mediated interaction from both tumor cells and the surrounding environment further contribute to cancer progression. Selectins are vascular cell adhesion molecules involved in adhesive interactions of leukocytes and platelets and endothelium within the blood circulation. There are three members of the selectin family: P-, E-, and L-selectin. P-selectin is present in the storage granules of platelets (α-granules) and endothelial cells (Weibel-Palade bodies), thus enabling rapid translocation on cell surfaces upon activation. On the contrary, endothelial expression of E-selectin requires de novo transcription, leading to expression on activated endothelial cell surfaces several hours after stimulation. L-selectin is constitutively expressed on cell surfaces of almost all leukocyte subpopulations. L-selectin mediates fast rolling of leukocytes on endothelium, P- and E-selectins support rolling at lower velocities. The initial steps in leukocyte tethering and rolling on endothelium are supported by rapid and reversible interactions of selectins with their carbohydrate ligands.

P-, L-, or E-selectin mediates contacts with tumor cells within the vasculature. For example, formation of platelet-tumor cell thrombi via expression of P-selectin helps evade host responses, thereby contributing to metastasis. Furthermore, E-selectin expression is detected during metastatic colonization of certain tissues such as the liver. Inhibition of E-selectin expression results in attenuation of metastasis. Accordingly, one embodiment of this disclosure provides an antibody-siRNA conjugate targeting P-selectin. In some embodiments, the siRNA is capable of specifically hybridizing with a polynucleotide encoding P-selectin. In some embodiments, the siRNA targets P-selectin. In some embodiments, the siRNA silences, inactivates, down-regulates, inhibits, or reduces the expression of P-selectin. In some embodiments, a method of treating cancer in a subject in need thereof comprises administering the antibody-siRNA conjugate targeting P-selectin. Yet another embodiment of the present disclosure provides an antibody-siRNA conjugate targeting E-selectin. In some embodiments, the siRNA targets E-selectin. In some embodiments, the siRNA is capable of specifically hybridizing with a polynucleotide encoding E-selectin. In some embodiments, the siRNA silences, inactivates, down-regulates, inhibits, or reduces the expression of E-selectin. In some embodiments, a method of treating cancer in a subject in need thereof comprises administering the antibody-siRNA conjugate targeting E-selectin.

In addition to selectins, cell adhesion molecules and integrins play a role in cancer metastasis. The binding of vascular integrins to ECM components in the tumor microenvironment contributes to invasion and migration of endothelial cells. For example, the binding of vascular cell adhesion molecule 1 (VCAM-1) to integrin α4β1 (VLA-4) on endothelium is required for tumor cell adhesion and endothelial transmigration in certain cancers, such as melanoma. Silencing of β1 integrins and thus, loss of VLA-4 and VCAM-1 binding, strongly reduced metastasis. Accordingly, one embodiment of this disclosure provides an antibody-siRNA conjugate targeting VCAM-1. In some embodiments, the siRNA targets VCAM-1. In some embodiments, the siRNA is capable of specifically hybridizing with a polynucleotide encoding VCAM-1. In some embodiments, the siRNA silences, inactivates, down-regulates, inhibits, or reduces the expression of VCAM-1. In some embodiments, a method of treating cancer in a subject in need thereof comprises administering the antibody-siRNA conjugate targeting VCAM-1. Furthermore, mucosal vascular addressin cell adhesion molecule 1 (MADCAM1), also known as addressin, is a ligand of integrin α4β7 and participates in cancer metastasis. Accordingly, one embodiment of this disclosure provides an antibody-siRNA conjugate targeting MADCAM1. In some embodiments, the siRNA targets MADCAM1. In some embodiments, the siRNA is capable of specifically hybridizing with a polynucleotide encoding MADCAM1. In some embodiments, the siRNA silences, inactivates, down-regulates, inhibits, or reduces the expression of MADCAM1. In some embodiments, a method of treating cancer in a subject in need thereof comprises administering the antibody-siRNA conjugate targeting MADCAM1.

One embodiment of this disclosure provides an antibody-siRNA conjugate targeting ICAM-1. In some embodiments, the siRNA targets ICAM-1. In some embodiments, the siRNA is capable of specifically hybridizing with a polynucleotide encoding ICAM-1. In some embodiments, the siRNA silences, inactivates, down-regulates, inhibits, or reduces the expression of ICAM-1. In some embodiments, a method of treating cancer in a subject in need thereof comprises administering the antibody-siRNA conjugate targeting ICAM-1. Yet another embodiment of this disclosure provides an antibody-siRNA conjugate targeting ICAM-2. In some embodiments, the siRNA targets ICAM-2. In some embodiments, the siRNA is capable of specifically hybridizing with a polynucleotide encoding ICAM-2. In some embodiments, the siRNA silences, inactivates, down-regulates, inhibits, or reduces the expression of ICAM-2. In some embodiments, a method of treating cancer in a subject in need thereof comprises administering the antibody-siRNA conjugate targeting ICAM-2.

One embodiment of this disclosure provides an antibody-siRNA conjugate targeting PNAd. In some embodiments, the siRNA targets PNAd. In some embodiments, the siRNA is capable of specifically hybridizing with a polynucleotide encoding PNAd. In some embodiments, the siRNA silences, inactivates, down-regulates, inhibits, or reduces the expression of PNAd. In some embodiments, a method of treating cancer in a subject in need thereof comprises administering the antibody-siRNA conjugate targeting PNAd. Yet another embodiment of this disclosure provides an antibody-siRNA conjugate targeting PECAM-1. In some embodiments, the siRNA targets PECAM-1. In some embodiments, the siRNA is capable of specifically hybridizing with a polynucleotide encoding PECAM-1. In some embodiments, the siRNA silences, inactivates, down-regulates, inhibits, or reduces the expression of PECAM-1. In some embodiments, a method of treating cancer in a subject in need thereof comprises administering the antibody-siRNA conjugate targeting PECAM-1.

Another embodiment of this disclosure provides an antibody-siRNA conjugate targeting JAM-A. In some embodiments, the siRNA targets JAM-A. In some embodiments, the siRNA is capable of specifically hybridizing with a polynucleotide encoding JAM-A. In some embodiments, the siRNA silences, inactivates, down-regulates, inhibits, or reduces the expression of JAM-A. In some embodiments, a method of treating cancer in a subject in need thereof comprises administering the antibody-siRNA conjugate targeting JAM-A. Another embodiment of this disclosure provides an antibody-siRNA conjugate targeting JAM-B. In some embodiments, the siRNA targets JAM-B. In some embodiments, the siRNA is capable of specifically hybridizing with a polynucleotide encoding JAM-B. In some embodiments, the siRNA silences, inactivates, down-regulates, inhibits, or reduces the expression of JAM-B. In some embodiments, a method of treating cancer in a subject in need thereof comprises administering the antibody-siRNA conjugate targeting JAM-B. Another embodiment of this disclosure provides an antibody-siRNA conjugate targeting JAM-C. In some embodiments, the siRNA targets JAM-C. In some embodiments, the siRNA is capable of specifically hybridizing with a polynucleotide encoding JAM-C. In some embodiments, the siRNA silences, inactivates, down-regulates, inhibits, or reduces the expression of JAM-C. In some embodiments, a method of treating cancer in a subject in need thereof comprises administering the antibody-siRNA conjugate targeting JAM-C.

Carcinoembryonic antigen-related cell adhesion molecule 1 (biliary glycoprotein) (CEACAM1), also known as CD66a (Cluster of Differentiation 66a), is a human glycoprotein and a member of the carcinoembryonic antigen (CEA) cell adhesion molecule family. CEACAM1 is expressed in cancer cells and also promotes cancer metastasis. Accordingly, one embodiment of this disclosure provides an antibody-siRNA conjugate targeting CEACAM1. In some embodiments, the siRNA targets CEACAM1. In some embodiments, the siRNA is capable of specifically hybridizing with a polynucleotide encoding CEACAM1. In some embodiments, the siRNA silences, inactivates, down-regulates, inhibits, or reduces the expression of CEACAM1. In some embodiments, a method of treating cancer in a subject in need thereof comprises administering the antibody-siRNA conjugate targeting CEACAM1.

Co-inhibitory receptors, such as CTLA-4, PD-1, Lag-3, Tim-3, and TIGIT, are expressed on T-cells. These receptors control proper contraction of effector T-cell responses and guarantee the proper function of Treg cells. Targeting of these receptors improves anti-tumor T cell responses to cancerous cells. Lymphocyte activation gene-3 (Lag-3) is upregulated on activated CD4+ and CD8+ T cells and a subset of natural killer (NK) cells. LSECtin is a ligand for Lag-3. Liver and lymph node sinusoidal endothelial cell C-type lectin (LSECtin) is a cell surface, C-type lectin that show's cell adhesion functions and contributes to different steps of cancer metastasis. Accordingly, one embodiment of this disclosure provides an antibody-siRNA conjugate targeting LSECtin. In some embodiments, the siRNA targets LSECtin. In some embodiments, the siRNA is capable of specifically hybridizing with a polynucleotide encoding LSECtin. In some embodiments, the siRNA silences, inactivates, down-regulates, inhibits, or reduces the expression of LSECtin. In some embodiments, a method of treating cancer in a subject in need thereof comprises administering the antibody-siRNA conjugate targeting LSECtin.

In addition to Lag-3, Tim-3 and TIGIT are also transiently upregulated on activated CD4+ and CD8+ T-cells. T-cell immunoglobulin-3 (Tim-3) is expressed on peripheral blood monocytes, macrophages. T-cells, and natural killer (NK) cells. Tim-3 is an inhibitory receptor that is critical for the inhibition of T-cell responses against tumors. Tim-3 is also expressed on endothelial cells and promotes metastasis. Tim-3 ligands, including galectin-9, high mobility group box 1 protein (HMGB1), and CEACAM1, are upregulated in tumor cells. The Tim-3 and galectin-9, HMGB1, and CEACAM1 pathways are considered to be a negative regulator for T-cell-mediated immune responses. In other words, upregulation of the immunosuppressive Tim-3 ligands in tumor cells results in tumor cells evading immune surveillance and enables tumor progression. Accordingly, one embodiment of this disclosure provides an antibody-siRNA conjugate targeting galectin-9. In some embodiments, the siRNA targets galectin-9. In some embodiments, the siRNA is capable of specifically hybridizing with a polynucleotide encoding galectin-9. In some embodiments, the siRNA silences, inactivates, down-regulates, inhibits, or reduces the expression of galectin-9. In some embodiments, the siRNA silences, inactivates, down-regulates, or inhibits the Tim-3-galectin-9 pathway. In some embodiments, a method of treating cancer in a subject in need thereof comprises administering the antibody-siRNA conjugate targeting galectin-9. Another embodiment of the present disclosure provides an antibody-siRNA conjugate targeting HMGB1. In some embodiments, the siRNA targets HMGB1. In some embodiments, the siRNA is capable of specifically hybridizing with a polynucleotide encoding HMGB1. In some embodiments, the siRNA silences, inactivates, down-regulates, inhibits, or reduces the expression of HMGB1. In some embodiments, the siRNA silences, inactivates, down-regulates, or inhibits the Tim-3-HMGB1 pathway. In some embodiments, a method of treating cancer in a subject in need thereof comprises administering the antibody-siRNA conjugate targeting HMGB1.

T-cell immunoreceptor with Ig and immunoreceptor tyrosine-based inhibitory motif domains (TIGIT) is expressed on about one third of CD4+ FoxP3+ Treg cells and NK cells and is highly upregulated on Treg cells at sites of tissue inflammation. Similarly to Tim-3, TIGIT also plays a role in many of the steps that generate cancer immunity. TIGIT ligands, including CD155 and CD112, are overexpressed in tumor cells. Inhibition of TIGIT ligands, including CD155 and CD112, alone or in combination with inhibition of other inhibitory receptors, suppresses tumor progression and/or metastasis. Accordingly, one embodiment of this disclosure provides an antibody-siRNA conjugate targeting CD155. In some embodiments, the siRNA targets CD155. In some embodiments, the siRNA is capable of specifically hybridizing with a polynucleotide encoding CD155. In some embodiments, the siRNA silences, inactivates, down-regulates, inhibits, or reduces the expression of CD155. In some embodiments, the siRNA silences, inactivates, down-regulates, or inhibits the TIGIT-CD155 pathway. In some embodiments, a method of treating cancer in a subject in need thereof comprises administering the antibody-siRNA conjugate targeting CD155. Another embodiment of this disclosure provides an antibody-siRNA conjugate targeting CD112. In some embodiments, the siRNA targets CD112. In some embodiments, the siRNA is capable of specifically hybridizing with a polynucleotide encoding CD112. In some embodiments, the siRNA silences, inactivates, down-regulates, inhibits, or reduces the expression of CD112. In some embodiments, the siRNA silences, inactivates, down-regulates, or inhibits the TIGIT-CD112 pathway. In some embodiments, a method of treating cancer in a subject in need thereof comprises administering the antibody-siRNA conjugate targeting CD112.

Similar to PD-1, Tim-3, TIGIT, and Lag-3, B7H3 negatively regulates T-cell function albeit through a distinct molecular mechanism. B7-H3 is an immune checkpoint molecule that is overexpressed in a wide range of solid cancers and often correlates to poor prognosis and negative clinical outcomes in patients. Accordingly, one embodiment of this disclosure provides an antibody-siRNA conjugate targeting B7-H3. In some embodiments, the siRNA is capable of specifically hybridizing with a polynucleotide encoding B7-H3. In some embodiments, the siRNA targets B7-H3. In some embodiments, the siRNA silences, inactivates, down-regulates, inhibits, or reduces the expression of B7-H3. In some embodiments, the siRNA silences, inactivates, down-regulates, or inhibits the B7-H3 pathway. In some embodiments, a method of treating cancer in a subject in need thereof comprises administering the antibody-siRNA conjugate targeting B7-H3.

Similar to PD-1, Tim-3, TIGIT, Lag-3, and B7H3, indoleamine 2,3-dioxygenase-1 (IDO) is a checkpoint protein involved in generating the immunosuppressive tumor microenvironment that supports tumor growth. IDO is overexpressed in tumor cells and cells surrounding the tumor microenvironment. IDO exerts its immunomodulatory effects by inhibiting the effector T cells of the immune system. Increased IDO protein levels then drive growth arrest and apoptosis of the effector T cells that mediate the immune system's ability to destroy pathogens and tumor cells. By reducing the number of effector T cells, IDO overexpression prevents the immune system from effectively destroying cancer cells. Accordingly, one embodiment of this disclosure provides an antibody-siRNA conjugate targeting IDO. In some embodiments, the siRNA targets IDO. In some embodiments, the siRNA is capable of specifically hybridizing with a polynucleotide encoding IDO. In some embodiments, the siRNA silences, inactivates, down-regulates, inhibits, or reduces the expression of IDO. In some embodiments, the siRNA silences, inactivates, down-regulates, or inhibits the IDO pathway. In some embodiments, a method of treating cancer in a subject in need thereof comprises administering the antibody-siRNA conjugate targeting IDO.

Galectins are a class of proteins that bind specifically to β-galactoside sugars that are abundant and distributed widely throughout the body. Galectin-3, galectin-1, and galectin-9 are associated with cancer. For example, galectin-3 plays a role in tumorigenesis, including transformation to a malignant form, metastasis, and increased invasiveness. Accordingly, one embodiment of this disclosure provides an antibody-siRNA conjugate targeting galectin-3. In some embodiments, the siRNA targets galectin-3. In some embodiments, the siRNA is capable of specifically hybridizing with a poly nucleotide encoding galectin-3. In some embodiments, the siRNA silences, inactivates, down-regulates, inhibits, or reduces the expression of galectin-3. In some embodiments, a method of treating cancer in a subject in need thereof comprises administering the antibody-siRNA conjugate targeting galectin-3. Furthermore, galectin-1 is overexpressed in cancer progression. Galectin-1 is involved in various processes such as cellular adhesion, mobility and invasion, tumor-induced angiogenesis, and apoptosis. As such, one embodiment of this disclosure provides an antibody-siRNA conjugate targeting galectin-1. In some embodiments, the siRNA targets galectin-1. In some embodiments, the siRNA is capable of specifically hybridizing with a polynucleotide encoding galectin-1. In some embodiments, the siRNA silences, inactivates, down-regulates, inhibits, or reduces the expression of galectin-1. In some embodiments, a method of treating cancer in a subject in need thereof comprises administering the antibody-siRNA conjugate targeting galectin-1.

Zinc finger protein SNAI1, also known as Snail, is a human transcription factor that is part of the transcription factor family that promotes the repression of adhesion molecule, E-cadherin. SNAI1 is overexpressed in epithelial and endothelial cells of invasive tumors. Expression of SNAI1 is associated with metastasis, tumor recurrence, and poor prognosis. Accordingly, one embodiment of this disclosure provides an antibody-siRNA conjugate targeting SNAI1. In some embodiments, the siRNA targets SNAI1. In some embodiments, the siRNA is capable of specifically hybridizing with a polynucleotide encoding SNAKI1. In some embodiments, the siRNA silences, inactivates, down-regulates, inhibits, or reduces the expression of SNAI1. In some embodiments, a method of treating cancer in a subject in need thereof comprises administering the antibody-siRNA conjugate targeting SNAI1.

Zinc finger E-box-binding homeobox 1 (ZEB1) is a human protein that contributes to cancer invasiveness and metastasis development. ZEB1 acts as a driver of the epithelial to mesenchymal transition (EMT) and cancer progression, due to its pivotal role in the downregulation of epithelial genes, such as E-cadherin and the miR-200 family of microRNAs. Accordingly, one embodiment of this disclosure provides an antibody-siRNA conjugate targeting ZEB1. In some embodiments, the siRNA targets ZEB1. In some embodiments, the siRNA is capable of specifically hybridizing with a polynucleotide encoding ZEB1. In some embodiments, the siRNA silences, inactivates, down-regulates, inhibits, or reduces the expression of ZEB1. In some embodiments, a method of treating cancer in a subject in need thereof comprises administering the antibody-siRNA conjugate targeting ZEB1.

One embodiment of this disclosure provides a conjugate comprising an antibody or an antigen binding fragment thereof and an miRNA. MicroRNAs (miRNAs) are endogenous, small, noncoding RNAs that are highly conserved across various species of eukaryotes. MiRNAs repress cellular translation and stability of a myriad of protein-coding transcripts by primarily targeting their 3' untranslated regions (UTRs) in a sequence-specific manner. This selective silencing of gene expression by miRNAs is expected to have profound impact on human health and disease. Over 2500 miRNAs are known in humans. (See, e.g., miRBase: annotating high confidence microRNAs using deep sequencing data.) MiRNA genes are predominantly transcribed by RNA polymerase II as primary miRNAs (pri-miRNAs) which are processed to precursor miRNAs (pre-miRNAs) in the nucleus by a microprocessor complex (composed of Drosha and DGCR8 (DiGeorge syndrome critical region 8)). Subsequently, pre-miRNAs are exported to the cytoplasm by Exportin-5-Ran-GTP complex, where Dicer1 cleaves the hairpin loop of pre-miRNA and TARBP2 (TAR RNA-binding protein 2) facilitates RNA duplex loading onto Argonaute protein AGO2. The antisense strand (mature) is retained by AGO2 and the sense strand is degraded, thus configuring a silencing complex. Non-canonical miRNA biogenesis has also been reported in further studies. (See, e.g., Regulation of microRNA biogenesis, Ha M, Kim V N Nat Rev Mol Cell Biol. 2014 August; 15(8):509-24.).

A gene coding for a miRNA may be transcribed leading to production of an miRNA precursor known as the pre-miRNA. The pre-miRNA may be part of a polycistronic RNA comprising multiple pre-miRNAs. The pre-miRNA may form a hairpin with a stem and loop. The hairpin structure of the pre-miRNA may be recognized by Drosha, which is an RNase III endonuclease. Drosha may recognize terminal loops in the pre-miRNA and cleave approximately two helical turns into the stem to produce a 60-70 nt precursor known as the pre-miRNA. Drosha may cleave the pri-miRNA with a staggered cut typical of RNase III endonucleases yielding a pre-miRNA stem loop with a 5' phosphate and ~2 nucleotide 3' overhang. Approximately one helical turn of the stem (~10 nucleotides) extending beyond the Drosha cleavage site may be essential for efficient processing. The pre-miRNA may then be actively transported from the nucleus to the cytoplasm by Ran-GTP and the export receptor Ex-portin-5. The pre-miRNA may be recognized by Dicer, which is also an RNase III endonuclease. Dicer may recognize the double-stranded stem of the pre-miRNA. Dicer may also recognize the 5' phosphate and 3' overhang at the base of the stem loop. Dicer may cleave off the terminal loop two helical turns away from the base of the stem loop leaving an additional 5' phosphate and ~2 nucleotide 3' overhang. The resulting siRNA-like duplex, which may comprise mismatches, comprises the mature miRNA and a similar-sized fragment known as the miRNA*. The miRNA and miRNA* may be derived from opposing arms of the pre-miRNA and pre-miRNA. MiRNA* sequences may be found in libraries of cloned miRNAs but typically at lower frequency than the miRNAs. Although initially present as a double-stranded species with miRNA*, the miRNA may eventually become incorporated as a single-stranded RNA into a ribonucleoprotein complex known as the RNA-induced silencing complex (RISC). Various proteins can form the RISC, which can lead to variability in specificity for miRNA/miRNA* duplexes, binding site of the target gene, activity of miRNA (repress or activate), and which strand of the miRNA/miRNA* duplex is loaded in to the RISC. When the miRNA strand of the miRNA:miRNA* duplex is loaded into the RISC, the miRNA* may be removed and degraded. The strand of the miRNA:miRNA* duplex that is loaded into the RISC may be the strand whose 5' end is less tightly paired. In cases where both ends of the miRNA:miRNA* have roughly equivalent 5' pairing, both miRNA and miRNA* may have gene silencing activity.

The RISC may identify target nucleic acids based on high levels of complementarity between the miRNA and the mRNA, especially by nucleotides 2-8 of the miRNA. A number of studies have looked at the base-pairing requirement between miRNA and its mRNA target for achieving efficient inhibition of translation. In mammalian cells, the first 8 nucleotides of the miRNA may be important. However, other parts of the microRNA may also participate in mRNA binding. Moreover, sufficient base pairing at the 3' can compensate for insufficient pairing at the 5'. Computation studies, analyzing miRNA binding on whole genomes have suggested a specific role for bases 2-7 at the 5' of the miRNA in target binding but the role of the first nucleotide, found usually to be "A" was also recognized. The target sites in the mRNA may be in the 5' UTR, the 3' UTR or in the coding region. Interestingly, multiple miRNAs may regulate the same mRNA target by recognizing the same or multiple sites. The presence of multiple miRNA binding sites in most genetically identified targets may indicate that the cooperative action of multiple RISCs provides the most efficient translational inhibition.

MiRNAs may direct the RISC to down regulate gene expression by either of two mechanisms: mRNA cleavage or translational repression. The miRNA may specify cleavage of the mRNA if the mRNA has a certain degree of complementarity to the miRNA. When a miRNA guides cleavage, the cut may be between the nucleotides pairing to residues 10 and 11 of the miRNA. Alternatively, the miRNA may repress translation if the miRNA does not have the requisite degree of complementarity to the miRNA. Translational repression may be more prevalent in animals since animals may have a lower degree of complementarity between the miRNA and binding site.

It should be noted that there may be variability in the 5' and 3' ends of any pair of miRNA and miRNA*. This variability may be due to variability in the enzymatic processing of Drosha and Dicer with respect to the site of cleavage. Variability at the 5' and 3' ends of miRNA and miRNA* may also be due to mismatches in the stem structures of the pri-miRNA and pre-miRNA. The mismatches of the stem strands may lead to a population of different hairpin structures. Variability in the stem structures may also lead to variability in the products of cleavage by Drosha and Dicer.

The miRNA sequence, in some embodiments, comprises from 13-33, 18-24 or 21-23 nucleotides. In some embodiments, the miRNA comprises 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 nucleotides. The sequence of the mature miRNA, in some embodiments, comprises 13-33 nucleotides of the pre-miRNA. In some embodiments, the sequence of the miRNA comprises the last 13-33 nucleotides of the pre-miRNA.

In some embodiments, the RNA molecule is an anti-miRNA that is capable of blocking the activity of a miRNA or miRNA*, such as by binding to the pri-miRNA, pre-miRNA, miRNA or miRNA* (e.g., antisense or RNA silencing), or by binding to the target binding site. The anti-miRNA may comprise a total of 5-100 or 10-60 nucleotides. The anti-miRNA may also comprise a total of at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 nucleotides. The sequence of the anti-miRNA may comprise (a) at least 5 nucleotides that are substantially complementary to the 5' of a miRNA and at least 5-12 nucleotides that are substantially identical to the flanking regions of the target site from the 5' end of the miRNA, for the purposes of binding to a miRNA and repressing its activity; or (b) at least 5-12 nucleotides that are substantially identical to the 3' of a miRNA and at least 5 nucleotide that are substantially complementary to the flanking region of the target site from the 3' end of the miRNA, for the purposes of inhibiting the ability of a miRNA to bind to its target.

The nucleic acid may also comprise a sequence of a target miRNA binding site, or a variant thereof. The target site sequence may comprise a total of 5-100 or 10-60 nucleotides. The target site sequence may also comprise a total of at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62 or 63 nucleotides. Exemplary miRNAs that have been implicated in cancer, and are conjugated to an anti-TM4SF1 antibody or an antigen binding fragment thereof, in some embodiments of this disclosure, are listed below in Table 1 along with their targets.

TABLE 1

Exemplary List of miRNAs involved in cancer and their targets

| Cancer | miRNA | Phenotype | Targets |
|---|---|---|---|
| Lung cancer (NSCLC) | miR-132/212 | Tumor suppressor | CyclinD1 |
| | miR-124 | Tumor suppressor | SOX8 |
| | miR-126 | Tumor suppressor | VEGF-PI3K-Akt-MRP1 |
| | miR-181 | Tumor suppressor | Bcl2 |
| | miR-34a | Tumor suppressor | TGFβR2 |
| | miR-145 | Tumor suppressor | Oct-4 |
| | miR-21 | Oncogenic | PDCD4 |
| | miR-137 | Prognostic marker | SLC22A18 |
| Gastric cancer | miR-335 | Tumor suppressor | RASA1 |
| | miR-374b-5p | Oncogenic | RECK |
| | miR-490-3p | Oncogenic | SMARCD1 |
| | miR-199a-3p | Oncogenic | ZHX1 |
| Colorectal cancer | miR-185 | Tumor suppressor-Prognostic marker | STIM1 |
| | miR-92a | Oncogenic-Prognostic marker | PTEN |
| | miR-7 | Tumor suppressor-Prognostic marker | EGFR |
| Hepatocellular carcinoma | miR-9 | Prognostic marker | |
| | miR-150-5p | Tumor suppressor | MMP14 |
| | miR-21 | Oncogenic-Prognostic marker | AP1 |
| | miR-122 | Tumor suppressor | Hnf4α-GALNT10-EGFR |
| | miR-486-5p | Tumor suppressor | PIK3R1 |
| Esophageal cancer | miR-101, miR-127 | Tumor suppressor | MALAT1 |
| | miR-126 | Tumor suppressor | DNMT1/ADAM9-EGFR |
| | miR-27a | Tumor suppressor | K-Ras |
| Lymphoma | miR-155-3p | Tumor suppressor | LT-β |
| | miR-224 | Tumor suppressor-Prognostic marker | CD59 |
| | miR-17-92 | Oncogenic | Sin3b, Hbp1, Suv420h1, Btg1, Bim |
| Leukemia | miR-486-5p | Oncogenic | AKT-FOXO1 |
| | miR-22 | Oncogenic | PTEN |
| | miR-638 | Tumor suppressor | CDK2 |
| Cervical cancer | miR-126 | Tumor suppressor-Prognostic marker | PTEN |
| | miR-21, Let-7a | Oncogenic/Tumor suppressor | STAT3 |
| | miR-375 | Drug resistance | E-cadherin |
| Prostate cancer | miR-3195, miR-374b | Tumor suppressor | HIF-1α, HIF-2α and VEGF |
| | miR-218 | Tumor suppressor | TPD52 |
| | miR-449b | Prognostic marker | |
| Breast cancer | miR-873 | Tumor suppressor-Drug resistance | ERα-CDK3 |
| | miR-18b, miR-103, miR-107 and miR-652 | Prognostic marker | |
| | miR-7 | Tumor suppressor-Drug resistance | EGFR, Src kinase |

TABLE 1-continued

Exemplary List of miRNAs involved in cancer and their targets

| Cancer | miRNA | Phenotype | Targets |
|---|---|---|---|
| Glioblastoma | miR-125a-5p | Tumor suppressor | TAZ |
| | miR-155 | Oncogenic-Drug resistance | MAPK13 and MAPK14 |
| | miR-449a | Tumor suppressor | MAZ |
| | miR-148a | Tumor suppressor | Oct4, Sox-2 |

In some embodiments of this disclosure a conjugate comprising an antibody or an antigen binding fragment thereof and an mRNA is provided. In vitro transcribed (IVT) mRNA has recently come into focus as a potential new drug class to deliver genetic information. Such synthetic mRNA can be engineered to transiently express proteins by structurally resembling natural mRNA. mRNA-based cancer immunotherapies and infectious disease vaccines have entered clinical development. Emerging novel approaches include in vivo delivery of IVT mRNA to replace or supplement proteins, IVT mRNA-based generation of pluripotent stem cells and genome engineering using IVT mRNA-encoded designer nucleases. Conjugates comprising mRNAs, in some embodiments, are used for therapy or inoculation, such as, vaccination, for treatment or prevention (prophylaxis) of cancer diseases, in some embodiments. The vaccination, in some examples, is based on the introduction of an antigen (or several antigens) of a tumour, in the form of the mRNA which codes for the antigen(s), into an organism. The mRNA of the conjugate, in some embodiments, is translated into a (tumour) antigen, a polypeptide or antigenic peptide coded by the modified mRNA is expressed, as a result of which an immune response directed against the polypeptide or the antigenic polypeptide is stimulated. In some embodiments, the use of the mRNAs within conjugates elicits immune response which codes for such a cancer antigen. By this means, the cancer antigen(s) is (are) expressed in the organism, as a result of which an immune response which is directed effectively against the cancer cells is provoked. Non-limiting examples of tumour antigens are, inter alia, 707-AP, AFP, ART-4, BAGE, β-catenine/m, Bcr-abl, CAMEL, CAP-1, CASP-8, CDC27/m, CDK4/m, CEA, CT, Cyp-B, DAM, ELF2M, ETV6-AML1, G250, GAGE, GnT-V, Gp100, HAGE, HER-2/neu, HLA-A*0201-R170I, HPV-E7, HSP70-2M, HAST-2, hTERT (or hTRT), iCE, KIAA0205, LAGE, LDLR/FUT, MAGE, MART-1/melan-A, MC1R, myosine/m, MUC1, MUM-1, -2, -3, NA88-A, NY-ESO-1, p190 minor bcr-abl, Pml/RARα, PRAME, PSA, PSM, RAGE, RU1 or RU2, SAGE, SART-1 or SART-3, TEL/AML1, TPI/m, TRP-1, TRP-2, TRP-2/INT2 and WT1.

In some embodiments, the conjugate targets exemplary pathways. In some embodiments, the conjugate comprising the mRNA is a personalized cancer vaccine. In some embodiments, the mRNA of the conjugate is translated into at least one patient-specific neoantigen. In some embodiments, the at least one patient-specific neoantigen is present in the specific tumor of the patient. In some embodiments, the at least one patient-specific neoantigen is identified by analyzing the tumor exome. In some embodiments, the patient-specific neoantigen activates the immune system of the patient in order to better target and eliminate tumor cells.

In some embodiments, the conjugate comprising the mRNA is a cancer vaccine that activates, boosts, and/or enhances the immune system. In some embodiments, the conjugate comprising the mRNA is a cancer vaccine that enhances the function and/or survival of T-cells. In some embodiments, the conjugate comprising the mRNA is a cancer vaccine that increases the number of T-cells in vivo. In some embodiments, the mRNA of the conjugate is translated into OX40 ligand (OX40L). OX40L promotes T-cell division and survival. In some embodiments, the mRNA of the conjugate is translated into IL-12. IL-12 is a cytokine that is produced by dendritic cells, macrophaghes, and neutrophils in response to antigenic stimulation. IL-12 is a T-cell stimulating factor, which stimulates growth and function of T-cells. IL-12 is also involved in the differentiation of naïve T-cells into Th1 cells. Other co-stimulatory molecules include, but are not limited to, CD28, CD54, CD58, CD80, CD86, CD25, CD83, and p55. In some embodiments, the mRNA of the conjugate is translated into CD28. In some embodiments, the mRNA of the conjugate is translated into CD58. In some embodiments, the mRNA of the conjugate is translated into CD54. In some embodiments, the mRNA of the conjugate is translated into CD80. In some embodiments, the mRNA of the conjugate is translated into CD86. In some embodiments, the mRNA of the conjugate is translated into CD25. In some embodiments, the mRNA of the conjugate is translated into CD83. In some embodiments, the mRNA of the conjugate is translated into p55.

In some embodiments, the conjugate comprising the mRNA is used in or in combination with cellular therapy. In some embodiments, the conjugate comprising the mRNA is used in the in vitro transfection of patient-derived immune cells, such as but not limited to dendritic cells. In some embodiments, the manipulated patient-derived cells are infused back into the patient. In some embodiments, the mRNA translates into a tumor-associated antigen and is expressed by the patient-derived immune cell (e.g., patient-derived dendritic cell). In some embodiments, administration of the conjugate comprising the mRNA to patient-derived cells results in presentation of TAA-derived peptides on patient-derived dendritic cells. In some embodiments, administration of the conjugate comprising the mRNA to patient-derived cells results in activation of antigen-specific T-cells in vivo, once the manipulated patient-derived cells are infused back into the patient. In some embodiments, the patient-derived immune cells are T-cells. In some embodiments, the conjugate comprising the mRNA is used in the in vitro transfection of patient-derived T-cells. In some embodiments, the patient-derived T-cells are able to directly recognize a specific antigen expressed on a tumor after treatment with the conjugate comprising the mRNA. In some embodiments, the mRNA translates into a chimeric antigen receptor (CAR) on the patient-derived T-cells. In some embodiments, the conjugate comprising the mRNA is used in combination with CAR-T cells.

Antibody-oligonucleotide conjugates (such as antibody-RNA conjugates, antibody-DNA conjugates, antibody-antisense oligonucleotide conjugates) as provided herein are, in some cases, able to achieve knockdown rates of from at least about 40% to about 100%, such as at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, or at least about 100%.

III. Conjugates Comprising a Targeting Protein and an Oligonucleotide

In some embodiments, the disclosure provides conjugates comprising an antisense oligonucleotide and an anti-TM4SF1 antibody as described herein. Various features of antisense oligonucleotides useful in the context of the present disclosure are described herein. It should be noted that, when describing functional properties of an antisense oligonucleotide, such properties can also be used to describe a conjugate comprising an antisense oligonucleotide and an anti-TM4SF1 antibody, as described herein. Accordingly, any description of a functional or structural property of an antisense oligonucleotide may, in certain embodiments, be used to describe an antisense conjugate of the disclosure, comprising an antisense oligonucleotide and an anti-TM4SF1 antibody, as described herein.

In some examples, suitable antisense oligonucleotides, including conjugates comprising antisense oligonucleotides, hybridize to DNA. In some examples, suitable antisense oligonucleotides, including conjugates comprising antisense oligonucleotides, hybridize to RNA. In certain embodiments, the antisense oligonucleotides (including when present as part of a conjugate) hybridize to a 3'UTR of an RNA transcript, such as one or more CUG repeats in the 3'UTR. In certain embodiments, the antisense oligonucleotides (including when present as part of a conjugate) hybridize to a coding sequence of a transcript. In some embodiments, the antisense oligonucleotides selectively bind to a transcript, e.g., to a 3'UTR of a transcript. In some embodiments, the antisense oligonucleotides selectively bind to transcripts having expanded CUG repeats (>50 CUG repeats).

Without being bound by theory, the specific hybridization of an antisense molecule (e.g., an antisense oligonucleotide) with an RNA molecule, e.g., CUG-expanded RNA molecule, may alter the processing of the RNA or alter the physical and/or chemical interactions between the RNA and another protein or nucleic acid molecule. For example, the specific hybridization of the antisense molecules of the present disclosure with a CUG-expanded RNA may alter the degradation of the RNA, including by RNaseH-mediated degradation, the splicing patterns of RNA, or may prevent proteins or nucleic acids from binding to the RNA, or may liberate a nucleic acid or protein bound to the CUG-expanded RNA.

In some embodiments, the antisense molecules target a region that includes the start codon (AUG in RNA and ATG in DNA) or the stop codon(s) (UAA, UAG and UGA in RNA and TAA, TAG and TGA in DNA). In some embodiments, the antisense molecules target a region within 50 nucleotides of the start or stop codons. In some embodiments, the antisense molecules target a region that includes a portion of the open reading frame (ORF) of a DNA or RNA molecule, including the ORF of a CUG-expanded DNA or RNA. The ORF includes the region of the RNA between the start and stop codons. In some embodiments, the antisense molecules bind to coding regions of the DNA or RNA (i.e., exons) and/or non-coding regions of the DNA or RNA (i.e., introns). In some embodiments, the antisense molecules bind to splice signals, such as to intron-exon junctions. In certain embodiments of any of the foregoing, the antisense oligonucleotide hybridizes to an RNA, wildtype and/or CUG expanded.

In some embodiments, the antisense molecules target a region of RNA that includes the 5' UTR or the 3' UTR. The 5' UTR includes untranslated sequences may include, for example, regulatory sequences (e.g., iron response element sequences, introns or riboswitches), the 5' methylguanylate cap, or combinations thereof. The 3' UTR may include sequences such as a poly-adenylation signal, binding sequences for proteins (e.g. SECIS elements or AU-rich elements) or binding sequences for miRNAs.

In some embodiments, the antisense molecules hybridize to an RNA, such as a CUG-expanded RNA, in such a way that the antisense molecules prevent binding of the RNA to another protein. For example, the antisense molecules may hybridize to the RNA such that the RNA is incapable of binding to a protein. For example, the antisense molecules may compete with the protein for the same binding site on an RNA molecule, e.g., a "YGCY" motif, in which "Y" is a pyrimidine (Goers, E S, 2010, Nucl. Acids Res., 38(7): 2467-84).

In certain embodiments, the antisense molecules hybridize to RNA molecules that carry an excess (>50) of CUG or CCUG repeats. For example, the antisense molecules may bind to a CUG-expanded (e.g., mutant) RNA having excess CUG or CCUG repeats. In some embodiments, the antisense molecules hybridize to one or more of CUG repeats, CAG repeats, CCUG, CCG or CGG repeats.

The antisense oligonucleotides of the present disclosure hybridize to RNA or DNA via one or more regions of complementary nucleoside or nucleotide bases. "Complementary," is the capacity for specific pairing between two nucleotides, e.g., between adenine and thymine, between adenine and uracil, and between guanine and cytosine. However, an antisense oligonucleotide need not be 100% complementary to that of its target nucleic acid in order to hybridize with that target DNA or RNA molecule. An antisense compound is capable of hybridizing with a target DNA molecule when it binds to the target molecule to such an extent that it interferes with the transcription of that DNA molecule. An antisense compound is capable of hybridizing with a target RNA molecule, e.g., a mutant RNA, when it binds to the RNA molecule to such an extent that it alters the pre-existing state of the RNA molecule in a cell. For example, the antisense compound is capable of hybridizing with a target RNA molecule, e.g., a mutant RNA, when it binds to the RNA molecule to such an extent that it causes the degradation of the RNA molecule by an enzyme such as RNaseH, or it alters (i.e., induces or inhibits) the splicing of the RNA molecule, or it interacts with the RNA molecule in such a way that it prevents the binding of proteins or nucleic acids to the RNA molecule, or it interacts with the RNA molecule in such a way that it liberates proteins previously bound to the RNA molecule.

In some embodiments, the antisense molecule (e.g., the antisense oligonucleotide portion of the antisense conjugate) is 8-50 nucleotides in length. In other embodiments, the antisense molecule is 12-35 nucleotides in length. In other embodiments, the antisense molecule is 12-30 nucleotides in length. In other embodiments, the antisense molecule is 14-25 nucleotides in length. In other embodiments, the antisense oligonucleotide comprises 14-30, 14-25, 14-20, 14-18, 14-17, 15-30, 15-25, 15-20, 15-18, 16-30, 16-25, 16-20, 16-18, 17-30, 17-25, 17-20, or 17-18 nucleotides. In other embodiments, the antisense oligonucleotide comprises or consists of 14, 15, 16, 17, 18, 19, 20, 21, 22, 23, 24, 25, 26, 27, 28, 29, 30, 31, 32, 33, 34, 35, 36, 37, 38, 39, or 40 nucleotides. In some embodiments, the antisense oligonucleotide comprises a nucleotide sequence that hybridizes under stringent hybridization conditions of at least about 0.2*SSC at 65° C. to an RNA transcript (coding or noncoding region).

The antisense oligonucleotides of the present disclosure, in some embodiments, are oligomers or polymers of ribonucleic acid (RNA) or deoxyribonucleic acid (DNA) or mimetics thereof, or combinations of any of the foregoing. The antisense oligonucleotides may include oligonucleotides that are composed of naturally-occurring nucleobases, sugars and covalent internucleoside (backbone) linkages as well as oligonucleotides having non-naturally-occurring nucleobases, sugars and covalent internucleoside (backbone) linkages. Non-naturally-occurring portions of the antisense molecules are used in some cases, as these portions may endow the antisense molecules with desirable properties such as, for example, enhanced affinity for nucleic acid target and increased stability in the presence of nucleases.

In some cases, the nucleic acid/antisense oligonucleotides, modified nucleic acid/modified antisense oligonucleotides of this disclosure comprises nucleosides or nucleotides. Nucleosides are, for example, base-sugar combinations. In some cases, the base portion of a nucleoside is a heterocyclic base, e.g., a purine or a pyrimidines base. Nucleotides are nucleosides that further include a phosphate group covalently linked to the sugar portion of the nucleoside. For those nucleosides that include a pentofuranosyl sugar, the phosphate group can be linked to either the 2', 3' or 5' hydroxyl moiety of the sugar. In forming oligonucleotides, the phosphate groups covalently link adjacent nucleosides to one another to form a linear polymeric compound. In turn the respective ends of this linear polymeric structure can be further joined to form a circular structure. Within the oligonucleotide structure, the phosphate groups are commonly referred to as forming the internucleoside backbone of the oligonucleotide. The normal linkage or backbone of RNA and DNA is a 3' to 5' phosphodiester linkage.

In some embodiments, the antisense oligonucleotides of the present disclosure include oligonucleotides containing modified backbones or non-natural internucleoside linkages. In some embodiments, the oligonucleotides having modified backbones include those that retain a phosphorus atom in the backbone. In other embodiments, the oligonucleotides having modified backbones include those that do not have a phosphorus atom in the backbone.

In some embodiments, modified oligonucleotide backbones that do not include a phosphorus atom therein have backbones that are formed by short chain alkyl or cycloalkyl internucleoside linkages, mixed heteroatom and alkyl or cycloalkyl internucleoside linkages, or one or more short chain heteroatomic or heterocyclic internucleoside linkages. These include those having morpholino linkages (formed in part from the sugar portion of a nucleoside); siloxane backbones: sulfide, sulfoxide and sulfone backbones; formacetyl and thioformacetyl backbones; methylene formacetyl and thioformacetyl backbones; riboacetyl backbones; alkene containing backbones; sulfamate backbones; methyleneimino and methylenehydrazino backbones; sulfonate and sulfonamide backbones: amide backbones; and others having mixed N, O, S and CH2 component parts.

In some embodiments of the present disclosure, the oligonucleotide backbone of a nucleic acid, such as that of an antisense oligonucleotide, an RNA, a DNA or the like, includes, for example, phosphorothioates, chiral phosphorothioates, phosphorodithioates, phosphotriesters, aminoalkylphosphotriesters, methyl and other alkyl phosphonates including 3'-alkylene phosphonates, 5'-alkylene phosphonates and chiral phosphonates, phosphinates, phosphoramidates including 3'-amino phosphoramidate and aminoalkylphosphoramidates, thionophosphoramidates, thionoalkylphosphonates, thionoalkylphosphotriesters, selenophosphates and boranophosphates having normal 3'-5' linkages, 2'-3' linked analogs of these, and those having inverted polarity wherein one or more internucleotide linkages is a 3' to 3', 5' to 5' or 2' to 2' linkage.

In some embodiments, in modified oligonucleotide, both the sugar and the internucleoside linkage, i.e., the backbone, of the nucleotide units are replaced with novel groups. The base units are maintained for hybridization with an appropriate nucleic acid target compound. One such oligomeric compound, an oligonucleotide mimetic that has been shown to have excellent hybridization properties, is referred to as a peptide nucleic acid (PNA). In PNA compounds, the sugar-backbone of an oligonucleotide is replaced with an amide containing backbone, in particular an aminoethylglycine backbone. The nucleobases are retained and are bound directly or indirectly to aza nitrogen atoms of the amide portion of the backbone.

In some embodiments of the present disclosure are provided conjugates comprising oligonucleotides with phosphorothioate backbones and oligonucleosides with heteroatom backbones, such as —CH2-NH—O—CH2-, —CH2-N(CH3)-O—CH2-[known as a methylene (methylimino) or MMI backbone], —CH2-O—N(CH3)-CH2-, —CH2-N(CH3)-N(CH3)-CH2- and —O—N(CH3)-CH2-CH2- wherein the native phosphodiester backbone is represented as —O—P(=O)(OH)—O—CH2-], and a suitable amide backbone, or a morpholino backbone structure.

Modified oligonucleotides may also contain one or more substituted sugar moieties. In some embodiments, the oligonucleotides comprise one of the following at the 2' position: OH; F; O-, S-, or N-alkyl; O-, S-, or N-alkenyl; O-, S- or N-alkynyl; or O-alkyl-O-alkyl, wherein the alkyl, alkenyl and alkynyl may be substituted or unsubstituted C1 to C10 alkyl or C2 to C10 alkenyl and alkynyl. In some embodiments, the oligonucleotides comprise O[(CH2)nO]mCH3, O(CH2)nOCH3, O(CH2)nNH2, O(CH2)nCH3, O(CH2)nONH2, and O(CH2)nON[(CH2)nCH3)]2, where n and m are from 1 to about 10. In other embodiments, oligonucleotides comprise one of the following at the 2' position: C1 to C10 lower alkyl, substituted lower alkyl, alkenyl, alkynyl, alkaryl, aralkyl, O-alkaryl or O-aralkyl, SH, SCH3, OCN, Cl, Br, CN, CF3, OCF3, SOCH3, SO2CH3, ONO2, NO2, N3, NH2, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties. Some embodiments include antisense molecules comprising 2'-dimethylaminooxyethoxy, i.e., a O(CH2)2ON(CH3)2 group, also known as 2'-DMAOE or 2'-dimethylaminoethoxyethoxy (also known in the art as 2'-O-dimethylaminoethoxyethyl or 2'-DMAEOE), i.e., 2'-O—CH2-O—CH2-N(CH2)2.

In some embodiments, the antisense oligonucleotides of the present disclosure includes an alkoxyalkoxy group, e.g., 2'-methoxyethoxy (2'-O—CH2CH2OCH3, also known as 2'-O-(2-methoxyethyl) or 2'-MOE) (See, e.g., Martin et al., Helv. Chim. Acta, 1995, 78, 486-504). In one embodiment, the antisense oligonucleotides of the present disclosure include 2'-MOE. In some embodiments, the antisense oligonucleotides comprise 1-10 MOE nucleotides. In other embodiments, the antisense oligonucleotides comprise 2-7 MOE nucleotides. In other embodiments, the antisense oligonucleotides comprise 3-6 MOE nucleotides.

In some embodiments, the antisense oligonucleotides of the present disclosure include a nucleotide analog having a constrained furanose ring conformation, such as Locked Nucleic Acids (LNAs). In LNAs, a 2'-hydroxyl group is linked to the 3' or 4' carbon atom of the sugar ring thereby forming a bicyclic sugar moiety. In some embodiments, the linkage in the LNA is a methylene (—CH2-)n group bridging the 2' oxygen atom and the 4' carbon atom wherein n is 1 or 2. In some embodiments, the antisense oligonucleotides comprise 1-10 LNA nucleotides. In other embodiments, the antisense molecules comprise 2-7 LNA nucleotides. In other embodiments, the antisense molecules comprise 3-6 LNA nucleotides.

In other embodiments of the antisense oligonucleotides of the present disclosure, modifications to the antisense molecules include 2'-methoxy (2'-O—CH3), 2'-aminopropoxy (2'-OCH2CH2CH2NH2), 2'-allyl(2'-CH2-CH═CH2), 2'-O-allyl(2'-O—CH2-CH═CH2) and 2'-fluoro (2'-F). The 2'-modification may be in the arabino (up) position or ribo (down) position. An example of a 2'-arabino modification is 2'-F. Similar modifications may also be made at other positions on the oligonucleotide, particularly the 3' position of the sugar on the 3' terminal nucleotide or in 2'-5' linked oligonucleotides and the 5' position of 5' terminal nucleotide. Oligonucleotides may also have sugar mimetics such as cyclobutyl moieties in place of the pentofuranosyl sugar.

The antisense oligonucleotides of the present disclosure may also include nucleobase (often referred to in the art simply as "base") modifications or substitutions. An "unmodified" or "natural" nucleobase, as used herein, includes the purine bases adenine (A) and guanine (G), and the pyrimidine bases thymine (T), cytosine (C) and uracil (U). Modified nucleobases include other synthetic and natural nucleobases such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine and other alkynyl derivatives of pyrimidine bases, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 2-F-adenine, 2-aminoadenine, 8-azaguanine and 8-azaadenine, 7-deazaguanine and 7-deazaadenine and 3-deazaguanine and 3-deazaadenine. Further modified nucleobases include tricyclic pyrimidines such as phenoxazine cytidine (1H-pyrimido[5,4-b][1,4]benzoxazin-2 (3H)-one), phenothiazine cytidine (1H-pyrimido[5,4-b][1,4] benzothiazin-2(3H)-one), G-clamps such as a substituted phenoxazine cytidine (e.g. 9-(2-aminoethoxy)-H-pyrimido [5,4-b][1,4]benzoxazin-2(3H)-one), carbazole cytidine (2H-pyrimido[4,5-b]indol-2-one), pyridoindole cytidine (H-pyrido[3',2':4,5]pyrrolo[2,3-d]pyrimidin-2-one). Modified nucleobases may also include those in which the purine or pyrimidine base is replaced with other heterocycles, for example 7-deazaadenine, 7-deazaguanosine, 2-aminopyridine and 2-pyridone. In some examples nucleobases include, for example, 5-substituted pyrimidines, 6-azapyrimidines and N-2, N-6 and O-6 substituted purines, including 2-aminopropyladenine, 5-propynyluracil and 5-propynylcytosine. 5-methylcytosine substitutions have been shown to increase nucleic acid duplex stability by 0.6-1.2° C.

Protocols for conjugating DNA and ASO are in some embodiments similar to double stranded oligonucleotides except for inclusion of nucleobases that are non-3'/5' terminating within the sequence. Any nucleobase phosphate group may be modified with a conjugation handle suitable for functionalization with a homo or heterofunctional linker/spacer. Common stabilization can be via phosphothioation of a phosphate to a phosphothioate. Thio-ethers may be of suitable functionality to install a terminal conjugation group, such as an activated ester, an azide, an alkyne or a cycloaddition group. Cyclic oligonucleotides may be included with the conjugation handle installed at the cyclization point on the circular oligonucleotide. Functionalization and conjugation to a protein of interest can be the same as with other linker-oligonucleotides described herein.

It is not necessary for all positions in a given compound to be uniformly modified, and in fact more than one of the aforementioned modifications may be incorporated in a single compound or even at a single nucleoside within an oligonucleotide. The present disclosure also includes antisense oligonucleotides which are chimeric compounds. "Chimeric" antisense compounds or "chimeras," in the context of this disclosure, are antisense compounds, particularly oligonucleotides, which contain two or more chemically distinct regions, each made up of at least one monomer unit, i.e., a nucleotide in the case of an oligonucleotide compound. These oligonucleotides typically contain at least one region wherein the oligonucleotide is modified so as to confer upon the oligonucleotide increased resistance to nuclease degradation, increased cellular uptake, and/or increased binding affinity for the target nucleic acid. An additional region of the oligonucleotide may serve as a substrate for enzymes capable of cleaving RNA:DNA or RNA:RNA hybrids. By way of example, RNase H is a cellular endonuclease which cleaves the RNA strand of an RNA:DNA duplex. Activation of RNase H, therefore, results in cleavage of the RNA target, thereby greatly enhancing the efficiency of oligonucleotide inhibition of gene expression. Consequently, comparable results can often be obtained with shorter oligonucleotides when chimeric oligonucleotides are used, compared to phosphorothioate deoxyoligonucleotides hybridizing to the same target region. Cleavage of the RNA target can be routinely detected by gel electrophoresis and, if necessary, associated nucleic acid hybridization techniques known in the art.

Chimeric antisense oligonucleotides of the disclosure may be formed as composite structures of two or more oligonucleotides, modified oligonucleotides, oligonucleosides and/or oligonucleotide mimetics as described above. Such compounds have also been referred to as hybrids or gapmers.

A "gapmer," in some cases, is an oligomeric compound, generally an oligonucleotide, having a 2'-deoxyoligonucleotide region flanked by non-deoxyoligonucleotide segments. The central region is referred to as the "gap." The flanking segments are referred to as "wings." While not wishing to be bound by theory, the gap of the gapmer presents a substrate recognizable by RNaseH when bound to the RNA target whereas the wings do not provide such a substrate but can confer other properties such as contributing to duplex stability or advantageous pharmacokinetic effects. Each wing can be one or more non-deoxy oligonucleotide monomers (if one of the wings has zero non-deoxyoligonucleotide monomers, a "hemimer" is described). In one embodiment, the gapmer is a ten deoxyribonucleotide gap flanked by five non-deoxyribonucleotide wings. This is referred to as a 5-10-5 gapmer. In other embodiments, the gapmer is an eight deoxyribonucleotide gap flanked by three non-deoxy ribonucleotide wings. This is referred to as a 3-8-3 gapmer. In other embodiments, the gapmer is a ten deoxyribonucleotide gap flanked by three non-deoxyribonucleotide wings. This is referred to as a 3-10-3 gapmer. Other configurations are readily recognized by those skilled in the art, such as a 3-7-3 gapmer.

In some embodiments, the gapmer described above comprises LNA and MOE nucleotides. In some embodiments, the gapmer comprises 1-10 LNA and/or MOE nucleotides. In some embodiments, the gapmer comprises 2-7 LNA and/or MOE nucleotides. In other embodiments, the gapmer comprises 3-6 MOE and/or LNA nucleotides. In some embodiments the flanking blocks of ribonucleotides comprise LNA and/or MOE nucleotides.

In some embodiments, the gapmers described above induce RNase H degradation of the target RNA nucleotide, e.g., the mutant DMPK RNA molecule. In other embodiments, the gapmers induce degradation of the target RNA nucleotide, e.g., the mutant DMPK RNA molecule by means of an RNase H-independent pathway. In some embodiments, the gapmers prevents the binding of a protein to a DNA or RNA sequence, e.g., to a mutant RNA. In some embodiments, the gapmers induce degradation of the target RNA molecule, e.g., a mutant RNA, and also sterically inhibit the binding of a protein, e.g. to a DNA or RNA sequence, e.g., a mutant RNA.

In some embodiments, the antisense oligonucleotide is a gapmer that binds to expanded CUG repeats in an RNA molecule. In some embodiments, the gapmer binds to CUG repeats in a mutant RNA sequence. In some embodiments, the antisense oligonucleotide is a morpholino molecule that sterically blocks the binding of a protein or nucleic acid to a target RNA or DNA sequence. In some embodiments, the morpholino also triggers degradation of the target RNA or DNA sequence. In some embodiments, the morpholino molecule binds to mutant RNA and prevents the binding of a protein to the RNA molecule. In some embodiments, the protein that is prevented from binding to the RNA molecule is free to bind to other RNA molecule substrates. In some embodiments, the morpholino molecule comprises 20-30 nucleotides. In other embodiments, the morpholino molecule comprises 23-27 nucleotides. In other embodiments, the morpholino molecule comprises 25 nucleotides. In some embodiments, the morpholino binds CUG repeats in an RNA molecule. In some embodiments, the morpholino binds to CUG repeats in a mutant RNA sequence.

In some embodiments, the antisense oligonucleotides of the present disclosure are molecules including 2'-O-methyl (2'-OMe) and/or phosphorothioate modifications and that specifically trigger the degradation of an RNA molecule, e.g., mutant RNA. In some embodiments, these molecules include 2'-O-methyl (2'-OMe) and phosphorothioate modifications. In some embodiments, these molecules induce degradation of a target RNA sequence, e.g., a mutant RNA, by means an RNaseH mediated degradation or by other than RNase H degradation.

For all of the foregoing, it should be appreciated that certain antisense oligonucleotides promote RNaseH mediated degradation following hybridization to target. However, even for such antisense oligonucleotides, such capability does not mean or imply that this is the sole mechanism by which the antisense oligonucleotide functions.

IV. TM4SF1 Binding Proteins as the Targeting Protein

In some embodiments, the conjugate comprises a TM4SF1 binding protein as the targeting protein, an anti-TM4SF1 antibody-RNA conjugate. TM4SF1 is a small plasma membrane glycoprotein (NCBI Ref Seq No. NP_055035.1) with tetraspanin topology but not homology (Wright et al. Protein Sci. 9: 1594-1600, 2000). It forms TM4SF1-enriched domains (TMED) on plasma membranes, where, like genuine tetraspanins, it serves as a molecular facilitator that recruits functionally related membrane and cytosolic molecules (Shih et al. Cancer Res. 69: 3272-3277, 2009: Zukauskas et al., Angiogenesis. 14: 345-354, 2011), and plays important roles in cancer cell growth (Hellstrom et al. Cancer Res. 46: 3917-3923, 1986), motility (Chang et al. Int J Cancer. 1 16: 243-252, 2005), and metastasis (Richman et al. Cancer Res. 5916s-5920s, 1995). The amino acid sequence of human TM4SF1 protein (NCBI RefSeq No. NP_055035.1) is shown below as SEQ ID NO: 91.

```
                                      (SEQ ID NO: 91)
MCYGKCARCI GHSLVGLALL CIAANILLYF PNGETKYASE

NHLSRFVWFF SGIVGGGLLM LLPAFVFIGL EQDDCCGCCG

HENCGKRCAM LSSVLAALIG IAGSGYCVIV

AALGLAEGPLCLDSLGQWNYTFASTEGQYLLDTSTWSECTEPKHIVEWN

VSLFSILLALGGIEFILCLIQVINGVLGGIC GFCCSHQQQY DC
```

The anti-TM4SF1 antibodies and antigen binding fragments thereof, of the disclosure are, in some embodiments, specific to the ECL2 domain of TM4SF1. The amino acid sequence of human TM4SF1 ECL2 domain is

```
                                      (SEQ ID NO: 92)
EGPLCLDSLGQWNYTFASTEGQYLLDTSTWSECTEPKHIVEWNVSLFS.
```

As described in Table 3 below, included in the disclosure are conjugates comprising antibodies that are specific to TM4SF1. The antibodies described in Table 3 are monoclonal murine antibodies 8G4, AGX-A03, AGX-A04, AGX-A05, AGX-A07, AGX-A08, AGX-A09, and AGX-A11, each of which can bind the ECL2 region of TM4SF1.

In some embodiments, the anti-TM4SF1 antibodies or antigen binding fragments thereof, comprise an IgG heavy chain constant region comprising an amino acid sequence set forth in SEQ ID NO: 87 or 88, or a sequence that is at least about 60%, at least about 65%, at least about 70%, at least about 75%, at least about, at least about 80%, at least about 85%, at least about 90%, at least about 95%, at least about 96%, at least about 97%, at least about 98%, at least about 99%, or 100% identical to SEQ ID NO: 73 or 74.

In another embodiment, the anti-TM4SF1 antibody or antigen binding fragment thereof, comprises a light chain constant region comprising the amino acid sequence set forth in SEQ ID NO: 89, or a sequence that is at least about 60%, at least about 65%, at least about 70%, at least about 75%, at least about 80%, at least about 85%, at least about 90%, at least about 95%, at least about 96%, at least about 97%, at least about 98%, at least about 99% identical, or 100% identical to SEQ ID NO: 89.

In another embodiment, the anti-TM4SF1 antibody or antigen binding fragment thereof, comprises a heavy chain variable domain comprising the amino acid sequence set forth in SEQ ID NO: 3, 15, 27, 39, 51, 63, 75, or 92, or a sequence that is at least about 60%, at least about 65%, at least about 70%, at least about 75%, at least about 80%, at least about 85%, at least about 90%, at least about 95%, at least about 96%, at least about 97%, at least about 98%, at least about 99% identical, or 100% identical to SEQ ID NO: 3, 15, 27, 39, 51, 63, 75, or 92.

In another embodiment, the anti-TM4SF1 antibody or antigen binding fragment thereof, comprises a light chain variable domain comprising the amino acid sequence set forth in SEQ ID NO: 9, 21, 33, 45, 57, 69, 81, or 93, or a sequence that is at least about 60%, at least about 65%, at least about 70%, at least about 75%, at least about 80%, at least about 85%, at least about 90%, at least about 95%, at least about 96%, at least about 97%, at least about 98%, at least about 99% identical, or 100% identical to SEQ ID NO: 9, 21, 33, 45, 57, 69, 81, or 93.

In some embodiments, the anti-TM4SF1 antibody or antigen binding fragment thereof comprises a heavy chain CDR1 comprising an amino acid sequence that is from at least about 80% to at least about 85%, from at least about 85% to at least about 90%, from at least about 90% to at least about 91%, from at least about 91% to at least about 92%, from at least about 92% to at least about 93%, from at least about 93% to at least about 94%, from at least about 94% to at least about 95%, from at least about 95% to at least about 96%, from at least about 96% to at least about 97%, from at least about 97% to at least about 98%, from at least about 98% to at least about 99%, or from at least about 99% to 100% identical to SEQ ID NO: 6, 18, 30, 42, 54, 66, 78, or 94. In some embodiments, the anti-TM4SF1 antibody or antigen binding fragment thereof comprises a heavy chain CDR2 comprising an amino acid sequence that is from at least about 80% to at least about 85%, from at least about 85% to at least about 90%, from at least about 90% to at least about 91%, from at least about 91% to at least about 92%, from at least about 92% to at least about 93%, from at least about 93% to at least about 94%, from at least about 94% to at least about 95%, from at least about 95% to at least about 96%, from at least about 96% to at least about 97%, from at least about 97% to at least about 98%, from at least about 98% to at least about 99%, or from at least about 99% to 100% identical to SEQ ID NO: 7, 19, 31, 43, 55, 67, 79, or 95. In some embodiments, the anti-TM4SF1 antibody or antigen binding fragment thereof comprises a heavy chain CDR3 comprising an amino acid sequence that is from at least about 80% to at least about 85%, from at least about 85% to at least about 90%, from at least about 90% to at least about 91%, from at least about 91% to at least about 92%, from at least about 92% to at least about 93%, from at least about 93% to at least about 94%, from at least about 94% to at least about 95%, from at least about 95% to at least about 96%, from at least about 96% to at least about 97%, from at least about 97% to at least about 98%, from at least about 98% to at least about 99%, or from at least about 99% to 100% identical to SEQ ID NO: 8, 20, 32, 44, 56, 68, 80, or 96.

In some embodiments, the anti-TM4SF1 antibody or antigen binding fragment thereof comprises a light chain CDR1 comprising an amino acid sequence that is from at least about 80% to at least about 85%, from at least about 85% to at least about 90%, from at least about 90% to at least about 91%, from at least about 91% to at least about 92%, from at least about 92% to at least about 93%, from at least about 93% to at least about 94%, from at least about 94% to at least about 95%, from at least about 95% to at least about 96%, from at least about 96% to at least about 97%, from at least about 97% to at least about 98%, from at least about 98% to at least about 99%, or from at least about 99% to 100% identical to SEQ ID NO: 12, 24, 36, 48, 60, 72, 84, or 97. In some embodiments, the anti-TM4SF1 antibody or antigen binding fragment thereof comprises a light chain CDR2 comprising an amino acid sequence that is from at least about 80% to at least about 85%, from at least about 85% to at least about 90%, from at least about 90% to at least about 91%, from at least about 91% to at least about 92%, from at least about 92% to at least about 93%, from at least about 93% to at least about 94%, from at least about 94% to at least about 95%, from at least about 95% to at least about 96%, from at least about 96% to at least about 97%, from at least about 97% to at least about 98%, from at least about 98% to at least about 99%, or from at least about 99% to 100% identical to SEQ ID NO: 13, 25, 37, 49, 61, 73, 85, or 98. In some embodiments, the anti-TM4SF1 antibody or antigen binding fragment thereof comprises a light chain CDR3 comprising an amino acid sequence that is from at least about 80% to at least about 85%, from at least about 85% to at least about 90%, from at least about 90% to at least about 91%, from at least about 91% to at least about 92%, from at least about 92% to at least about 93%, from at least about 93% to at least about 94%, from at least about 94% to at least about 95%, from at least about 95% to at least about 96%, from at least about 96% to at least about 97%, from at least about 97% to at least about 98%, from at least about 98% to at least about 99%, or from at least about 99% to 100% identical to SEQ ID NO: 14, 26, 38, 50, 62, 74, 86, or 99.

The amino acid sequences of murine monoclonal antibody AGX-A03 are described in Table 3. Specifically, the heavy chain CDR sequences are set forth in SEQ ID Nos: 6, 7, and 8 (CDR1, CDR2, and CDR3), and the light chain CDR amino acid sequences are set forth in SEQ ID Nos: 12, 13, and 14 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 6, 7, and 8 and/or a light chain variable region comprising CDRs as set forth in the amino acid sequences of SEQ ID Nos: 12, 13, and 14. Included in the disclosure are conjugates comprising humanized anti-TM4SF1 antibodies or antigen binding fragments comprising the CDRs of AGX-A03. Further, the heavy chain variable amino acid sequences and the light chain variable amino acid sequences of AGX-A03 are described in SEQ ID NOS: 3 and 9, respectively.

The amino acid sequences of murine monoclonal anti-TM4SF1 antibody AGX-A04 are described in Table 3. Specifically, the heavy chain CDR sequences are set forth in SEQ ID Nos. 18, 19, and 20 (CDR1, CDR2, and CDR3), and the light chain CDR amino acid sequences are set forth in SEQ ID Nos: 24, 25, and 26 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 18, 19, and 20 and/or a light chain variable region comprising CDRs as set forth in the amino acid sequences of SEQ ID Nos: 24, 25, and 26. Included in the disclosure are conjugates comprising humanized anti-TM4SF1 antibodies or antigen binding fragments comprising the CDRs of AGX-A04. Further, the heavy chain variable amino acid sequences and the light chain variable amino acid sequences of AGX-A04 are described in SEQ ID NOS. 15 and 21, respectively.

91) The amino acid sequences of murine monoclonal antibody AGX-A05 are described in Table 3. Specifically, the heavy chain CDR sequences are set forth in SEQ ID Nos: 30, 31, and 32 (CDR1. CDR2, and CDR3), and the light chain CDR amino acid sequences are set forth in SEQ ID Nos: 36, 37, and 38 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 30, 31, and 32 and/or a light chain variable region comprising CDRs as set forth in the amino acid sequences of SEQ ID Nos: 36, 37, and 38. Included in the disclosure are conjugates comprising humanized anti-TM4SF1 antibodies or antigen binding fragments comprising the CDRs of AGX-A05. Further, the heavy chain variable amino acid sequences and the light chain variable amino acid sequences of AGX-A05 are described in SEQ ID NOS. 27 and 33, respectively.

The amino acid sequences of murine monoclonal antibody AGX-A07 are described in Table 3. Specifically, the heavy chain CDR sequences are set forth in SEQ ID Nos: 42, 43, and 44 (CDR1, CDR2, and CDR3), and the light chain CDR amino acid sequences are set forth in SEQ ID Nos: 48, 49, and 50 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 42, 43, and 44 and/or a light chain variable region comprising CDRs as set forth in the amino acid sequences of SEQ ID Nos: 48.49, and 50. Included in the disclosure are conjugates comprising humanized anti-TM4SF1 antibodies or antigen binding fragments comprising the CDRs of AGX-A07. Further, the heavy chain variable amino acid sequences and the light chain variable amino acid sequences of AGX-A07 are described in SEQ ID NOs: 39 and 45, respectively.

The amino acid sequences of murine monoclonal antibody AGX-A08 are described in Table 3. Specifically, the heavy chain CDR sequences are set forth in SEQ ID Nos: 54, 55, and 56 (CDR1, CDR2, and CDR3), and the light chain CDR amino acid sequences are set forth in SEQ ID Nos: 60, 61, and 62 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 54, 55, and 56 and/or a light chain variable region comprising CDRs as set forth in the amino acid sequences of SEQ ID Nos: 60, 61, and 62. Included in the disclosure are conjugates comprising humanized anti-TM4SF1 antibodies or antigen binding fragments comprising the CDRs of AGX-A08. Further, the heavy chain variable amino acid sequences and the light chain variable amino acid sequences of AGX-A08 are described in SEQ ID NOs: 51 and 57, respectively.

The amino acid sequences of murine monoclonal antibody AGX-A09 are described in Table 3. Specifically, the heavy chain CDR sequences are set forth in SEQ ID Nos: 66, 67, and 68 (CDR1, CDR2, and CDR3), and the light chain CDR amino acid sequences are set forth in SEQ ID Nos: 72, 73, and 74 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 66, 67, and 68 and/or a light chain variable region comprising CDRs as set forth in the amino acid sequences of SEQ ID Nos: 72, 73, and 74. Included in the disclosure are conjugates comprising humanized anti-TM4SF1 antibodies or antigen binding fragments comprising the CDRs of AGX-A09. Further, the heavy chain variable amino acid sequences and the light chain variable amino acid sequences of AGX-A09 are described in SEQ ID NOs: 63 and 69, respectively.

The amino acid sequences of murine monoclonal antibody AGX-A11 are described in Table 3. Specifically, the heavy chain CDR sequences are set forth in SEQ ID Nos: 78, 79, and 80 (CDR1. CDR2, and CDR3), and the light chain CDR amino acid sequences are set forth in SEQ ID Nos: 84, 85, and 86 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 78, 79, and 80 and/or a light chain variable region comprising CDRs as set forth in the amino acid sequences of SEQ ID Nos: 84, 85, and 862. Included in the disclosure are conjugates comprising humanized anti-TM4SF1 antibodies or antigen binding fragments comprising the CDRs of AGX-A11. Further, the heavy chain variable amino acid sequences and the light chain variable amino acid sequences of AGX-A11 are described in SEQ ID NOS: 75 and 81, respectively.

The amino acid sequences of monoclonal antibody 8G4 are described in Table 3. Specifically, the heavy chain CDR sequences are set forth in SEQ ID Nos: 94, 95, and 96 (CDR1, CDR2, and CDR3), and the light chain CDR amino acid sequences are set forth in SEQ ID Nos: 97, 98, and 99 (CDR1, CDR2, and CDR3). Included in the disclosure are conjugates comprising anti-TM4SF1 antibodies, or antigen binding fragments comprising a heavy chain variable region comprising CDRs as set forth in the amino acid sequences of SEQ ID Nos: 94, 95, and % and/or a light chain variable region comprising CDRs as set forth in the amino acid sequences of SEQ ID Nos: 97, 98, and 99. Included in the disclosure are conjugates comprising humanized anti-TM4SF1 antibodies or antigen binding fragments comprising the CDRs of 8G4.

In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 3, and a light chain variable domain encoded by a nucleic acid sequence as set forth in SEQ ID NO: 9. In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 15, and a light chain variable domain encoded by a nucleic acid sequence as set forth in SEQ ID NO: 21 In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 27, and a light chain variable domain encoded by a nucleic acid sequence as set forth in SEQ ID NO: 33. In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 39, and a light chain variable domain encoded by a nucleic acid sequence as set forth in SEQ ID NO: 45. In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 51, and a light chain variable domain encoded by a nucleic acid sequence as set forth in SEQ ID NO: 57. In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 63, and a light chain variable domain encoded by a nucleic acid sequence as set forth in SEQ ID NO: 69. In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 75, and a light chain variable domain encoded by a nucleic acid sequence as set forth in SEQ ID NO: 81. In one embodiment, the disclosure provides a conjugate comprising an anti-TM4SF1 antibody, or antigen binding fragment thereof, that comprises a heavy chain variable domain encoded by a nucleic acid sequence as set forth in SEQ ID NO: 92, and a light chain variable domain encoded by a nucleic acid sequence as set forth in SEQ ID NO: 93.

In one embodiment, the present disclosure provides a conjugate comprising an anti-TM4SF1 antibody, or antigen binding fragment thereof, that has a heavy chain variable domain sequence that is at least 95% identical, at least 96% identical, at least 97% identical, at least 98% identical, at least 99% identical, or 100% identical to an amino acid sequence selected from SEQ ID NO: 3, SEQ ID NO: 15, SEQ ID NO: 27, SEQ ID NO: 39, SEQ ID NO: 51, SEQ ID NO: 63, or SEQ ID NO: 75; and that has a light chain variable domain sequence that is at least 95% identical, at least 96% identical, at least 97% identical, at least 98% identical, at least 99% identical, or 100% identical to an amino acid sequence selected from SEQ ID NO: 9, SEQ ID NO: 21, SEQ ID NO: 33, SEQ ID NO: 45, SEQ ID NO: 57, SEQ ID NO: 69, or SEQ ID NO: 81.

In one embodiment, the disclosure includes a conjugate comprising an anti-TM4SF1 antibody which is an IgG and comprises four polypeptide chains including two heavy chains each comprising a heavy chain variable domain and heavy chain constant regions CH1, CH2 and CH3, and two light chains each comprising a light chain variable domain and a light chain constant region (CL). In certain embodiments, the antibody is a human IgG1, IgG2, or an IgG4. In certain embodiments, the antibody is a human IgG1. In other embodiments, the antibody is an IgG2. The heavy and light chain variable domain sequences may contain CDRs as set forth in Table 3.

Complementarity determining regions (CDRs) are known as hypervariable regions both in the light chain and the heavy chain variable domains. The more highly conserved portions of variable domains are called the framework (FR). CDRs and framework regions (FR) of a given antibody may be identified using the system described by Kabat et al. supra; Lefranc et al., supra and/or Honegger and Pluckthun, supra. Also familiar to those in the art is the numbering system described in Kabat et al. (1991, NIH Publication 91-3242, National Technical Information Service, Springfield, Va.). In this regard Kabat et al. defined a numbering system for variable domain sequences, including the identification of CDRs, that is applicable to any antibody.

One or more CDRs may be incorporated into a molecule either covalently or noncovalently to make it an antigen binding protein.

An antigen binding protein may incorporate the CDR(s) as part of a larger polypeptide chain, may covalently link the CDR(s) to another polypeptide chain, or may incorporate the CDR(s) noncovalently. The CDRs permit the antigen binding protein to specifically bind to a particular antigen of interest. The CDR3, in particular, is known to play an important role in antigen binding of an antibody or antibody fragment.

In one embodiment, the disclosure provides a conjugate comprising an anti-TM4SF1 antibody, or an antigen binding fragment thereof, comprising a heavy chain comprising a CDR3 domain as set forth in any one of SEQ ID NO; 8, SEQ ID NO; 20, SEQ ID NO; 32, SEQ ID NO: 44, SEQ ID NO: 56, SEQ ID NO: 68. SEQ ID NO: 80, or SEQ ID NO: 96, and comprising a variable domain comprising an amino acid sequence that has at least about 60%, at least about 65%, at least about 70%, at least about 75%, at least about 80%, at least about 85%, at least about 90%, at least about 95%, at least about 96%, at least about 97%, at least about 98%, at least about 99%, or 100% identical to a sequence as set forth in any one of SEQ ID NO: 3, SEQ ID NO: 15, SEQ ID NO: 27, SEQ ID NO: 39, SEQ ID NO: 51, SEQ ID NO: 63, SEQ ID NO: 75, or SEQ ID NO: 92. In one embodiment, the disclosure provides an anti-TM4SF1 antibody, or an antigen binding fragment thereof, comprising a light chain comprising a CDR3 domain as set forth in any one of SEQ ID NO: 14, SEQ ID NO: 26, SEQ ID NO: 38, SEQ ID NO: 50, SEQ ID NO: 62, SEQ ID NO: 74, SEQ ID NO: 86, or SEQ ID NO: 99, and having a light chain variable domain comprising an amino acid sequence that has at least at least about 60%, at least about 65%, at least about 70%, at least about 75%, at least about 80%, at least about 85%, at least about 90%, at least about 95%, at least about 96%, at least about 97%, at least about 98%, or at least about 99%, or 100% identical to a sequence as set forth in any one of SEQ ID NO: 9, SEQ ID NO: 21, SEQ ID NO: 33, SEQ ID NO: 45, SEQ ID NO: 57, SEQ ID NO: 69, SEQ ID NO: 81, or SEQ ID NO: 93. Thus, in certain embodiments, the CDR3 domain is held constant, while variability may be introduced into the remaining CDRs and/or framework regions of the heavy and/or light chains, while the antibody, or antigen binding fragment thereof, retains the ability to bind to TM4SF1 and retains the functional characteristics, e.g., binding affinity, of the parent.

In one embodiment, the disclosure provides a conjugate comprising an anti-TM4SF1 antibody, or an antigen binding fragment thereof, comprising a heavy chain comprising a CDR2 domain as set forth in any one of SEQ ID NO: 7, SEQ ID NO: 19, SEQ ID NO: 31, SEQ ID NO: 43, SEQ ID NO: 55, SEQ ID NO: 67, SEQ ID NO: 79, or SEQ ID NO: 95, and comprising a variable domain comprising an amino acid sequence that has at least at least about 60%, at least about 65%, at least about 70%, at least about 75%, at least about 80%, at least about 85%, at least about 90%, at least about 95%, at least about 96%, at least about 97%, at least about 98%, or at least about 99%, or 100% identical to a sequence as set forth in any one of SEQ ID NO: 3, SEQ ID NO: 15, SEQ ID NO: 27, SEQ ID NO: 39, SEQ ID NO: 51, SEQ ID NO: 63, SEQ ID NO: 75, or SEQ ID NO: 92. In one embodiment, the disclosure provides a conjugate comprising an anti-TM4SF1 antibody, or an antigen binding fragment thereof, comprising a light chain comprising a CDR2 domain as set forth in any one of SEQ ID NO: 13, SEQ ID NO: 25, SEQ ID NO: 37, SEQ ID NO: 49, SEQ ID NO: 61, SEQ ID NO: 73, SEQ ID NO: 85, or SEQ ID NO: 98, and having a light chain variable domain comprising an amino acid sequence that has at least at least about 60%, at least about 65%, at least about 70%, at least about 75%, at least about 80%, at least about 85%, at least about 90%, at least about 95%, at least about 96%, at least about 97%, at least about 98%, or at least about 99%, or 100% identical to a sequence as set forth in any one of SEQ ID NO: 9, SEQ ID NO: 21, SEQ ID NO: 33, SEQ ID NO: 45, SEQ ID NO: 57, SEQ ID NO: 69, SEQ ID NO: 81, or SEQ ID NO: 93. Thus, in certain embodiments, the CDR2 domain is held constant, while variability may be introduced into the remaining CDRs and/or framework regions of the heavy and/or light chains, while the antibody, or antigen binding fragment thereof, retains the ability to bind to TM4SF1 and retains the functional characteristics, e.g., binding affinity, of the parent.

In one embodiment, the disclosure provides a conjugate comprising an anti-TM4SF1 antibody, or an antigen binding fragment thereof, comprising a heavy chain comprising a CDR1 domain as set forth in any one of SEQ ID NO: 6, SEQ ID NO: 18, SEQ ID NO: 30, SEQ ID NO: 42. SEQ ID NO: 54, SEQ ID NO: 66, SEQ ID NO: 78, or SEQ ID NO: 94, and comprising a variable domain comprising an amino acid sequence that has at least at least about 60%, at least about 65%, at least about 70%, at least about 75%, at least about 80%, at least about 85%, at least about 90%, at least about 95%, at least about 96%, at least about 97%, at least about 98%, or at least about 99%, or 100% identical to a sequence as set forth in any one of SEQ ID NO: 3. SEQ ID NO: 15, SEQ ID NO: 27, SEQ ID NO: 39, SEQ ID NO: 51, SEQ ID NO: 63, SEQ ID NO: 75, or SEQ ID NO: 92. In one embodiment, the disclosure provides a conjugate comprising an anti-TM4SF1 antibody, or an antigen binding fragment thereof, comprising a light chain comprising a CDR1 domain as set forth in any one of SEQ ID NO: 12, SEQ ID NO: 24, SEQ ID NO: 36, SEQ ID NO: 48, SEQ ID NO: 60, SEQ ID NO: 72, SEQ ID NO: 84, or SEQ ID NO: 97, and having a light chain variable domain comprising an amino acid sequence that has at least at least about 60%, at least about 65%, at least about 70%, at least about 75%, at least about 80%, at least about 85%, at least about 90%, at least about 95%, at least about 96%, at least about 97%, at least about 98%, or at least about 99%, or 100% identical to a sequence a set forth in any one of SEQ ID NO: 9, SEQ ID NO: 21, SEQ ID NO: 33. SEQ ID NO: 45, SEQ ID NO: 57, SEQ ID NO: 69, SEQ ID NO: 81, or SEQ ID NO: 93. Thus, in certain embodiments, the CDR1 domain is held constant, while variability may be introduced into the remaining CDRs and/or framework regions of the heavy and/or light chains, while the antibody, or antigen binding fragment thereof, retains the ability to bind to TM4SF1 and retains the functional characteristics, e.g., binding affinity, of the parent.

The anti-TM4SF1 antibodies and fragments described in Table 3 may also be humanized. Various methods for humanizing non-human antibodies are known in the art. For example, a humanized antibody can have one or more amino acid residues introduced into it from a source that is non-human. These non-human amino acid residues are often referred to as "import" residues, which are typically taken from an "import" variable domain. Humanization may be performed, for example, following the method of Jones et al., 1986, Nature 321:522-25; Riechmann et al., 1988, Nature 332:323-27; and Verhoeyen et al., 1988, Science 239:1534-36), by substituting hypervariable region sequences for the corresponding sequences of a human antibody.

In some cases, the humanized antibodies are constructed by CDR grafting, in which the amino acid sequences of the six CDRs of the parent non-human antibody (e.g., rodent) are grafted onto a human antibody framework. For example, Padlan et al. determined that only about one third of the residues in the CDRs actually contact the antigen, and termed these the "specificity determining residues," or SDRs (Padlan et al., 1995, FASEB J. 9:133-39). In the technique of SDR grafting, only the SDR residues are grafted onto the human antibody framework (see, e.g., Kashmiri et al., 2005, Methods 36:25-34).

The choice of human variable domains, both light and heavy, to be used in making the humanized antibodies can be important to reduce antigenicity. For example, according to the so-called "best-fit" method, the sequence of the variable domain of a non-human (e.g., rodent) antibody is screened against the entire library of known human variable-domain sequences. The human sequence that is closest to that of the rodent may be selected as the human framework for the humanized antibody (Sims et al., 1993, J. Immunol. 151:2296-308; and Chothia et al., 1987, J. Mol. Biol. 196:901-17). Another method uses a particular framework derived from the consensus sequence of all human antibodies of a particular subgroup of light or heavy chains. The same framework may be used for several different humanized antibodies (Carter et al., 1992, Proc. Natl. Acad. Sci. USA 89:4285-89; and Presta et al., 1993, J. Immunol. 151:2623-32). In some cases, the framework is derived from the consensus sequences of the most abundant human subclasses, VL6 subgroup I (VL6 I) and VH subgroup III (VHIII). In another method, human germline genes are used as the source of the framework regions.

It is further generally desirable that antibodies be humanized with retention of their affinity for the antigen and other favorable biological properties. To achieve this goal, according to one method, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional conformational structures of selected candidate immunoglobulin sequences. These include, for example, WAM (Whitelegg and Rees, 2000, Protein Eng. 13:819-24), Modeller (Sali and Blundell, 1993, J. Mol. Biol. 234:779-815), and Swiss PDB Viewer (Guex and Peitsch, 1997, Electrophoresis 18:2714-23). Inspection of these displays permits analysis of the likely role of the residues in the functioning of the candidate immunoglobulin sequence, e.g., the analysis of residues that influence the ability of the candidate immunoglobulin to bind its antigen. In this way, FR residues can be selected and combined from the recipient and import sequences so that the desired antibody characteristic, such as increased affinity for the target antigen(s), is achieved. In general, the hypervariable region residues are directly and most substantially involved in influencing antigen binding.

Human framework regions that may be used for humanization include but are not limited to: framework regions selected using the "best-fit" method (see, e.g., Sims, et al., J. Immunol. 151 (1993) 2296); framework regions derived from the consensus sequence of human antibodies of a particular subgroup of light or heavy chain variable regions (see, e.g., Carter, et al., Proc. Natl. Acad. Sci. USA, 89 (1992) 4285; and Presta, et al., J. Immunol., 151 (1993) 2623); human mature (somatically mutated) framework regions or human germline framework regions (see, e.g., Almagro, and Fransson, Front. Biosci. 13 (2008) 1619-1633); and framework regions derived from screening FR libraries (see, e.g., Baca, et al., J. Biol. Chem. 272 (1997) 10678-10684 and Rosok, et al., J. Biol. Chem. 271 (1996) 22611-22618).

Humanized antibodies and methods of making them are reviewed, e.g., in Almagro, and Fransson, Front. Biosci. 13 (2008) 1619-1633, and are further described, e.g., in Riechmann, et al., Nature 332 (1988) 323-329; Queen, et al., Proc. Nat'l Acad. Sci. USA 86 (1989) 10029-10033; U.S. Pat. Nos. 5,821,337, 7,527,791, 6,982,321, and 7,087,409; Kashmiri, et al., Methods 36 (2005) 25-34 (describing SDR (a-CDR) grafting); Padlan, Mol. Immunol. 28 (1991) 489-498 (describing "resurfacing"); Dall'Acqua, et al., Methods 36 (2005) 43-60 (describing "FR shuffling"); and Osbourn, et al., Methods 36 (2005) 61-68 and Klimka, et al., Br. J. Cancer, 83 (2000) 252-260 (describing the "guided selection" approach to FR shuffling).

In one embodiment, an anti-TM4SF1 antibody, or antigen binding fragment thereof of the conjugate binds to cynomolgous TM4SF1 with a KD about 1×10-6 M or less.

An anti-TM4SF1 antibody, or antigen binding fragment thereof of the conjugate in certain embodiments, binds to an epitope on the ECL2 loop of human TM4SF1 with a KD about 5×10-8 M or less as determined in a standard flow cytometry assay using HUVEC cells.

An anti-TM4SF1 antibody, or antigen binding fragment thereof of the conjugate, in certain embodiments, binds to human TM4SF1 with a KD of about 1×10-8 M or less in a standard flow cytometry assay using HUVEC cells.

An anti-TM4SF1 antibody, or antigen binding fragment thereof of the conjugate, in certain embodiments, binds to human TM4SF1 with a KD of about $1\times10^{-3}$ M to about $1\times10^{-4}$ M, about $1\times10^{-4}$ M to about $1\times10^{-5}$ M, about $1\times10^{-5}$ M to about $1\times10^{-6}$ M, about $1\times10^{-6}$ to about $1\times10^{-7}$ M, about $1\times10^{-7}$ to about $1\times10^{-8}$ M, about $1\times10^{-8}$ M to about $1\times10^{-9}$ M, about $1\times10^{-9}$ M to about $1\times10^{-10}$ M, about $1\times10^{-10}$ M to about $1\times10^{-11}$ M, about $1\times10^{-11}$ M to about $1\times10^{-12}$ M, about $2\times10^{-3}$ M to about $2\times10^{-4}$ M, about $2\times10^{-4}$ M to about $2\times10^{-5}$ M, about $2\times10^{-5}$ M to about $2\times10^{-6}$ M, about $2\times10^{-6}$ to about $2\times10^{-7}$ M, about $2\times10^{-7}$ to about $2\times10^{-8}$ M, about $2\times10^{-8}$ M to about $2\times10^{-9}$ M, about $2\times10^{-9}$ M to about $2\times10^{-10}$ M, about $2\times10^{-10}$ M to about $2\times10^{-11}$ M, about $2\times10^{-11}$ M to about $2\times10^{-12}$ M, about $3\times10^{-3}$ M to about $3\times10^{-4}$ M, about $3\times10^{-4}$ M to about $3\times10^{-5}$ M, about $3\times10^{-5}$ M to about $3\times10^{-6}$ M, about $3\times10^{-6}$ to about $3\times10^{-7}$ M, about $3\times10^{-7}$ to about $3\times10^{-8}$ M, about $3\times10^{-8}$ M to about $3\times10^{-9}$ M, about $3\times10^{-9}$ M to about $3\times10^{-10}$ M, about $3\times10^{-10}$ M to about $3\times10^{-11}$ M, about $3\times10^{-11}$ M to about $3\times10^{-12}$ M, about $4\times10^{-3}$ M to about $4\times10^{-4}$ M, about $4\times10^{-4}$ M to about $4\times10^{-5}$ M, about $4\times10^{-5}$ M to about $4\times10^{-6}$ M, about $4\times10^{-6}$ to about $4\times10^{-7}$ M, about $4\times10^{-7}$ to about $4\times10^{-8}$ M, about $4\times10^{-8}$ M to about $4\times10^{-9}$ M, about $4\times10^{-9}$ M to about $4\times10^{-10}$ M, about $4\times10^{-10}$ M to about $4\times10^{-11}$ M, about $4\times10^{-11}$ M to about $4\times10^{-12}$ M, about $5\times10^{-3}$ M to about $5\times10^{-4}$ M, about $5\times10^{-4}$ M to about $5\times10^{-5}$ M, about $5\times10^{-5}$ M to about $5\times10^{-6}$ M, about $5\times10^{-6}$ to about $5\times10^{-7}$ M, about $5\times10^{-7}$ to about $5\times10^{-8}$ M, about $5\times10^{-8}$ M to about $5\times10^{-9}$ M, about $5\times10^{-9}$ M to about $5\times10^{-10}$ M, about $5\times10^{-10}$ M to about $5\times10^{-11}$ M, about $5\times10^{-11}$ M to about $5\times10^{-12}$ M, about $5\times10^{-7}$ M to about $5\times10^{-11}$ M, about $5\times10^{-7}$ M, about $1\times10^{-7}$ M, about $5\times10^{-8}$ M, about $1\times10^{-8}$ M, about $5\times10^{-9}$ M, about $1\times10^{-9}$ M, about $5\times10^{-10}$ M, about $1\times10^{-10}$ M, about $5\times10^{-11}$ M or about $1\times10^{-11}$ M. In some embodiments, the KD is determined in a standard flow cytometry assay using HUVEC cells.

An anti-TM4SF1 antibody, or antigen binding fragment thereof of the conjugate, in certain embodiments, binds to human TM4SF1 with a KD of about 5×10-10 M or less in a standard flow cytometry assay using HUVEC cells.

An anti-TM4SF1 antibody, or antigen binding fragment thereof of the conjugate, in certain embodiments, binds to cynomolgus TM4SF1 with a KD about 1×10-6 M or less in a standard flow cytometry assay using HEK293 overexpressing cells. In one embodiment, the HEK293 cells are transfected to express cynomolgus TM4SF1. In a further embodiment, HEK293 cells express cynomolgus TM4SF1 at about 600 mRNA copies per 106 copies 18S rRNA.

Methods of determining the KD of an antibody or antibody fragment can be, for example, surface plasmon resonance may be used to determine the KD of the antibody to the antigen (e.g., using a BIACORE 2000 or a BIACORE 3000 (BIAcore, Inc., Piscataway, N.J.) at 25° C. with immobilized antigen or Fc receptor CM5 chips at about 10 response units (RU)). In certain embodiments FACS or flow cytometry is used to determine the KD, whereby cells, such as HEK293 cells or HUVEC cells, that express TM4SF1 are used to bind the antibody or fragment and measure the KD according to standard methods. Affinity determination of antibodies using flow cytometry is described, for example, in Geuijen et al (2005) J Immunol Methods. 302(1-2) 68-77. In certain embodiments, FACS is used to determine affinity of antibodies.

In one embodiment, the disclosure provides a conjugate comprising an anti-TM4SF1 antibody or antigen binding fragment thereof, having CDR amino acid sequences described herein with conservative amino acid substitutions, such that the anti-TM4SF1 antibody or antigen binding fragment thereof comprises an amino acid sequence of a CDR that is at least 95% identical (or al least 96% identical, or at least 97% identical, or at least 98% identical, or at least 99% identical) to a CDR amino acid sequence set forth in Table 3. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of similarity may be adjusted upwards to correct for the conservative nature of the substitution. Means for making this adjustment are well-known to those of skill in the art. See, e.g., Pearson (1994) Methods Mol. Biol. 24: 307-331, herein incorporated by reference. Examples of groups of amino acids that have side chains with similar chemical properties include (1) aliphatic side chains, glycine, alanine, valine, leucine and isoleucine; (2) aliphatic-hydroxyl side chains: serine and threonine; (3) amide-containing side chains: asparagine and glutamine; (4) aromatic side chains: phenylalanine, tyrosine, and tryptophan; (5) basic side chains; lysine, arginine, and histidine; (6) acidic side chains: aspartate and glutamate, and (7) sulfur-containing side chains are cysteine and methionine.

The disclosure further provides, in some embodiments, a conjugate comprising an anti-TM4SF1 antibody, or antigen binding fragment thereof, that binds to an epitope on the ECL2 loop of human TM4SF1 with a KD of about 5×10-8 M or less as determined in a standard flow cytometry assay using HUVEC cells, wherein the anti-TM4SF1 antibody, or antigen binding fragment thereof, comprises a light chain variable region comprising a human IgG framework region and comprises a heavy chain variable region comprising a human IgG framework region. In one embodiment, the anti-TM4SF1 antibody, or antigen binding fragment thereof, is humanized. In one embodiment, the anti-TM4SF1 antibody, or antigen binding fragment thereof, cross reacts with cynomolgus TM4SF1.

In another aspect of the disclosure, the anti-TM4SF1 antibody, or antigen binding fragment thereof, is a humanized anti-TM4SF1 antibody, or antigen binding fragment thereof, that binds to an epitope on the ECL2 loop of human TM4SF1 with a KD about $5 \times 10\text{-}8$ M or less as determined in a standard flow cytometry assay using HUVEC cells. In one embodiment, the anti-TM4SF1 antibody, or antigen binding fragment thereof, binds to cynomolgus TM4SF1 with a KD about $1 \times 10\text{-}6$ M or less in a standard flow cytometry assay using HEK293 overexpressing cells. In one embodiment, the anti-TM4SF1 antibody, or antigen binding fragment thereof, binds to human TM4SF1 with a KD of about $1 \times 10^{-8}$ M or less in a standard flow cytometry assay-using HUVEC cells. In one embodiment, the anti-TM4SF1 antibody, or antigen binding fragment thereof, binds to human TM4SF1 with a KD of $1 \times 10^{-3}$ M to about $1 \times 10^{-4}$ M, about $1 \times 10^{-4}$ M to about $1 \times 10^{-5}$ M, about $1 \times 10^{-5}$ M to about $1 \times 10^{-6}$ M, about $1 \times 10^{-6}$ to about $1 \times 10^{-7}$ M, about $1 \times 10^{-7}$ to about $1 \times 10^{-8}$ M, about $1 \times 10^{-8}$ M to about $1 \times 10^{-9}$ M, about $1 \times 10^{-9}$ M to about $1 \times 10^{-10}$ M, about $1 \times 10^{-10}$ M to about $1 \times 10^{-11}$ M, about $1 \times 10^{-11}$ M to about $1 \times 10^{-12}$ M, about $2 \times 10^{-3}$ M to about $2 \times 10^{-4}$ M, about $2 \times 10^{-4}$ M to about $2 \times 10^{-5}$ M, about $2 \times 10^{-5}$ M to about $2 \times 10^{-6}$ M, about $2 \times 10^{-6}$ to about $2 \times 10^{-7}$ M, about $2 \times 10^{-7}$ to about $2 \times 10^{-8}$ M, about $2 \times 10^{-8}$ M to about $2 \times 10^{-9}$ M, about $2 \times 10^{-9}$ M to about $2 \times 10^{-10}$ M, about $2 \times 10^{-10}$ M to about $2 \times 10^{-11}$ M, about $2 \times 10^{-11}$ M to about $2 \times 10^{-12}$ M, about $3 \times 10^{-3}$ M to about $3 \times 10^{-4}$ M, about $3 \times 10^{-4}$ M to about $3 \times 10^{-5}$ M, about $3 \times 10^{-5}$ M to about $3 \times 10^{-6}$ M, about $3 \times 10^{-6}$ to about $3 \times 10^{-7}$ M, about $3 \times 10^{-7}$ to about $3 \times 10^{-8}$ M, about $3 \times 10^{-8}$ M to about $3 \times 10^{-9}$ M, about $3 \times 10^{-9}$ M to about $3 \times 10^{-10}$ M, about $3 \times 10^{-10}$ M to about $3 \times 10^{-11}$ M, about $3 \times 10^{-11}$ M to about $3 \times 10^{-12}$ M, about $4 \times 10^{-3}$ M to about $4 \times 10^{-4}$ M, about $4 \times 10^{-4}$ M to about $4 \times 10^{-5}$ M, about $4 \times 10^{-5}$ M to about $4 \times 10^{-6}$ M, about $4 \times 10^{-6}$ to about $4 \times 10^{-7}$ M, about $4 \times 10^{-7}$ to about $4 \times 10^{-8}$ M, about $4 \times 10^{-8}$ M to about $4 \times 10^{-9}$ M, about $4 \times 10^{-9}$ M to about $4 \times 10^{-10}$ M, about $4 \times 10^{-10}$ M to about $4 \times 10^{-11}$ M, about $4 \times 10^{-11}$ M to about $4 \times 10^{-12}$ M, about $5 \times 10^{-3}$ M to about $5 \times 10^{-4}$ M, about $5 \times 10^{-4}$ M to about $5 \times 10^{-5}$ M, about $5 \times 10^{-5}$ M to about $5 \times 10^{-6}$ M, about $5 \times 10^{-6}$ to about $5 \times 10^{-7}$ M, about $5 \times 10^{-7}$ to about $5 \times 10^{-8}$ M, about $5 \times 10^{-8}$ M to about $5 \times 10^{-9}$ M, about $5 \times 10^{-9}$ M to about $5 \times 10^{-10}$ M, about $5 \times 10^{-10}$ M to about $5 \times 10^{-11}$ M, about $5 \times 10^{-11}$ M to about $5 \times 10^{-12}$ M, about $5 \times 10^{-7}$ M to about $5 \times 10^{-11}$ M, about $5 \times 10^{-7}$ M, about $1 \times 10^{-7}$ M, about $5 \times 10^{-8}$ M, about $1 \times 10^{-8}$ M, about $5 \times 10^{-9}$ M, about $1 \times 10^{-9}$ M, about $5 \times 10^{-10}$ M, about $1 \times 10^{-10}$ M, about $5 \times 10^{-11}$ M or about $1 \times 10^{-11}$ M. In some embodiments, the KD is determined in a standard flow cytometry assay using HUVEC cells. In one embodiment, the anti-TM4SF1 antibody, or antigen binding fragment thereof, binds to human TM4SF1 with a KD of about $5 \times 10^{-10}$ M or less in a standard flow cytometry assay using TM4SF1 expressing HUVEC cells.

In one embodiment, binding of an anti-TM4SF1 antibody, or antigen binding fragment, of the disclosure to human TM4SF1 is not dependent on glycosylation of the ECL2 loop of human TM4SF1, i.e., binding of the antibody is independent of glycosylation of TM4SF1 within the ECL2 loop (SEQ ID NO: 77).

The anti-TM4SF1 antibodies, or antigen binding fragments thereof of the conjugate, may be any of any isotype (for example, but not limited to IgG, IgM, and IgE). In certain embodiments, antibodies, or antigen binding fragments thereof of the conjugate are IgG isotypes. In a specific embodiment, antibodies, or antigen binding fragments thereof of the conjugate are of the IgG1, IgG2 or IgG4 isotype. In certain embodiments, the anti-TM4SF1 antibody, or antigen binding fragment thereof, are human IgG1, human IgG2, or human IgG4 isotype.

IgG2 is naturally the lowest in ADCC and/or CDC activity (An et al., MAbs. 2009 November-December; 1(6): 572-579). Accordingly, in certain embodiments IgG2 is advantageously used. However, IgG2 has two extra cysteines (leading to 4 inter-hinge disulfide bonds) which make it prone to aggregation via formation of inter-antibody disulfide bonds. In a related embodiment, mutations to the IgG2 cysteines are made to decrease aggregation.

The present disclosure provides conjugates comprising an antibody fragments that bind to TM4SF1. In certain circumstances there are advantages of using antibody fragments, rather than whole antibodies. The smaller size of the fragments allows for rapid clearance, and may lead to improved access to cells, tissues, or organs. For a review of certain antibody fragments, see Hudson et al., 2003, Nature Med. 9:129-34.

Various techniques have been developed for the production of antibody fragments. Traditionally, these fragments were derived via proteolytic digestion of intact antibodies (see, e.g., Morimoto et al., 1992, J. Biochem. Biophys. Methods 24:107-17: and Brennan et al., 1985, Science 229:81-83). However, these fragments can now be produced directly by recombinant host cells. Fab, Fv, and scFv antibody fragments can all be expressed in and secreted from E. coli or yeast cells, thus allowing the facile production of large amounts of these fragments. Antibody fragments can be isolated from the antibody phage libraries discussed above. Alternatively, Fab'-SH fragments can be directly recovered from E. coli and chemically coupled to form F(ab')2 fragments. According to another approach, F(ab')2 fragments can be isolated directly from recombinant host cell culture. Fab and F(ab')2 fragment with increased in vivo half-life comprising salvage receptor binding epitope residues. Other techniques for the production of antibody fragments will be apparent to the skilled practitioner. In certain embodiments, an antibody is a single chain Fv fragment (scFv). Fv and scFv have intact combining sites that are devoid of constant regions; thus, they may be suitable for reduced nonspecific binding during in vivo use. Single chain Fv (scFv) fusion proteins may be constructed to yield fusion of an effector protein at either the amino or the carboxy terminus of an scFv (See, e.g., Borrebaeck ed., supra). The antibody fragment may also be a "linear antibody," for example, as described in the references cited above. Such linear antibodies may be monospecific or multi-specific, such as bispecific. In certain embodiments, the antigen binding fragment can be selected from the group consisting of a Fab, a Fab', a F(ab')2, an Fv, and an scFv.

Anti-TM4SF1 antibodies (and fragments) that, for example, have a high affinity for human TM4SF1, can be identified using screening techniques known in the art. For example, monoclonal antibodies may be made using the hybridoma method first described by Kohler et al., 1975, Nature 256:495-97, or may be made by recombinant DNA methods (see, e.g., U.S. Pat. No. 4,816,567).

In the hybridoma method, a mouse or other appropriate host animal, such as a hamster, is immunized using, for example, the ECL2 loop of human TM4SF1 or cells expressing TM4SF1 (whereby the ECL2 loop is expressed on the cell surface), to elicit lymphocytes that produce or are capable of producing antibodies that will specifically bind to the protein used for immunization. Alternatively, lymphocytes may be immunized in vitro. After immunization, lymphocytes are isolated and then fused with a myeloma cell line using a suitable fusing agent, such as polyethylene glycol, to form a hybridoma cell.

The hybridoma cells thus prepared are seeded and grown in a suitable culture medium which, in certain embodiments, contains one or more substances that inhibit the growth or survival of the unfused, parental myeloma cells (also referred to as fusion partner). For example, if the parental myeloma cells lack the enzyme hypoxanthine guanine phosphoribosyl transferase (HGPRT or HPRT), the selective culture medium for the hybridomas typically will include hypoxanthine, aminopterin, and thymidine (HAT medium), which prevent the growth of HGPRT-deficient cells.

Exemplary fusion partner myeloma cells are those that fuse efficiently, support stable high-level production of antibody by the selected antibody-producing cells, and are sensitive to a selective medium that selects against the unfused parental cells. Exemplary myeloma cell lines are murine myeloma lines, such as SP-2 and derivatives, for example, X63-Ag8-653 cells available from the American Type Culture Collection (Manassas, Va.), and those derived from MOPC-21 and MPC-11 mouse tumors available from the Salk Institute Cell Distribution Center (San Diego, Calif.). Human myeloma and mouse-human heteromyeloma cell lines also have been described for the production of human monoclonal antibodies (Kozbor, 1984, Immunol. 133:3001-05; and Brodeur et al., Monoclonal Antibody Production Techniques and Applications 51-63 (1987)).

Culture medium in which hybridoma cells are growing is assayed for production of monoclonal antibodies directed against the antigen. The binding specificity of monoclonal antibodies produced by hybridoma cells is determined by immunoprecipitation or by an in vitro binding assay, such as RIA or ELISA. The binding affinity of the monoclonal antibody can, for example, be determined by the Scatchard analysis described in Munson et al., 1980, Anal. Biochem. 107:220-39.

Once hybridoma cells that produce antibodies of the desired specificity, affinity, and/or activity are identified, the clones may be subcloned by limiting dilution procedures and grown by standard methods (Goding, supra). Suitable culture media for this purpose include, for example, DMEM or RPMI-1640 medium. In addition, the hybridoma cells may be grown in vivo as ascites tumors in an animal, for example, by i.p. injection of the cells into mice.

The monoclonal antibodies secreted by the subclones are suitably separated from the culture medium, ascites fluid, or serum by conventional antibody purification procedures such as, for example, affinity chromatography (e.g., using protein A or protein G-Sepharose) or ion-exchange chromatography, hydroxylapatite chromatography, gel electrophoresis, dialysis, etc.

DNA encoding the monoclonal antibodies is readily isolated and sequenced using conventional procedures (e.g., by using oligonucleotide probes that are capable of binding specifically to genes encoding the heavy and light chains of murine antibodies). The hybridoma cells can serve as a source of such DNA. Once isolated, the DNA may be placed into expression vectors, which are then transfected into host cells, such as *E. coli* cells, simian COS cells, Chinese Hamster Ovary (CHO) cells, or myeloma cells that do not otherwise produce antibody-protein, to obtain the synthesis of monoclonal antibodies in the recombinant host cells. Review articles on recombinant expression in bacteria of DNA encoding the antibody include Skerra et al., 1993, Curr. Opinion in Immunol. 5:256-62 and Pluckthun, 1992, Immunol. Revs. 130:151-88.

In a further embodiment, monoclonal antibodies or antibody fragments can be isolated from antibody phage libraries generated using the techniques described in, for example, Antibody Phage Display: Methods and Protocols (O'Brien and Aitken eds., 2002). In principle, synthetic antibody clones are selected by screening phage libraries containing phages that display various fragments of antibody variable region (Fv) fused to phage coat protein. Such phage libraries are screened against the desired antigen. Clones expressing Fv fragments capable of binding to the desired antigen are adsorbed to the antigen and thus separated from the non-binding clones in the library-. The binding clones are then eluted from the antigen and can be further enriched by additional cycles of antigen adsorption/elution.

Variable domains can be displayed functionally on phage, either as single-chain Fv (scFv) fragments, in which VH and VL are covalently linked through a short, flexible peptide, or as Fab fragments, in which they are each fused to a constant domain and interact non-covalently, as described, for example, in Winter et al., 1994, Ann. Rev. Immunol. 12:433-55.

Repertoires of VH and VL genes can be separately cloned by PCR and recombined randomly in phage libraries, which can then be searched for antigen binding clones as described in Winter et al., supra. Libraries from immunized sources provide high-affinity antibodies to the immunogen without the requirement of constructing hybridomas. Alternatively, the naive repertoire can be cloned to provide a single source of human antibodies to a wide range of non-self and also self-antigens without any immunization as described by Griffiths et al., 1993, EMBO J 12:725-34. Finally, naive libraries can also be made synthetically by cloning the unrearranged V-gene segments from stem cells, and using PCR primers containing random sequence to encode the highly variable CDR3 regions and to accomplish rearrangement in vitro as described, for example, by Hoogenboom and Winter, 1992, J. Mol. Biol. 227:381-88.

Screening of the libraries can be accomplished by various techniques known in the art. For example, TM4SF1 (e.g., a soluble form of the ECL2 loop or cells expressing said loop) can be used to coat the w ells of adsorption plates, expressed on host cells affixed to adsorption plates or used in cell sorting, conjugated to biotin for capture with streptavidin-coated beads, or used in any other method for panning display libraries. The selection of antibodies with slow dissociation kinetics (e.g., good binding affinities) can be promoted by use of long w ashes and monovalent phage display as described in Bass et al., 1990, Proteins 8:309-14 and WO 92/09690, and by use of a low coating density of antigen as described in Marks et al., 1992, Biotechnol. 10:779-83.

Anti-TM4SF1 antibodies can be obtained by designing a suitable antigen screening procedure to select for the phage clone of interest followed by construction of a full length anti-TM4SF1 antibody clone using VH and/or VL sequences (e.g., the Fv sequences), or various CDR sequences from VH and VL sequences, from the phage clone of interest and suitable constant region (e.g., Fc) sequences described in Rabat et al., supra.

Screening of anti-TM4SF1 antibodies can be performed using binding assays known in the art and described herein for determining whether the antibody has a therapeutic affinity for the ECL2 loop of TM4SF1. The ability of the antibody to inhibit or decrease metastatic cell activity can be measured using standard assays in the art, as well as those described herein. Preclinical assays require use of an animal model of metastasis, commonly of one of three types: (i) injection of metastatic mouse tumor cells such as B16F10 melanoma TCs into mice, commonly via tail vein injection to generate lung metastases, via portal vein or intrasplenic injection to generate liver metastases, or via left ventricular cardiac injection to generate bone and other metastases; (ii) orthotopic transplantation of metastatic tumor cells or intact tumor fragments into mice, which methods often require later surgical resection of the primary tumor to prevent morbidity associated with primary tumor growth; and (iii) genetically engineered mouse models of spontaneous metastasis, of which the most common is the MMTV-Pyt (mouse mammary tumor virus-polyomavirus middle T Antigen) mouse mammary carcinoma model which provides a highly realistic mouse model of human cancer metastasis; greater than 85% of hemizygous MMTV-PyMT females spontaneously develop palpable mammary tumors which metastasize to the lung at age to 8-16 weeks. Quantifying the metastatic burden in the lung, either by live animal imaging or direct counting of metastatic nodules in the lungs of sacrificed animals, as a function of the degree of TM4SF1 immunoblockade and achieving a therapeutic level, e.g., at least a 50% reduction in lung metastasis, would be indicative, for example, of a therapeutic antibody that could be used in the methods of the disclosure. Further, cross-species reactivity assays are known in the art. Examples of assays that can be used are described, for example, in Khanna and Hunter (Carcinogenesis. 2005 March; 26(3):513-23) and Saxena and Christofori (Mol Oncol. 2013 April; 7(2):283-96), incorporated by reference in their entireties herein.

In one embodiment of the disclosure, the anti-TM4SF1 antibody, or antigen binding fragment thereof, contains a mutation(s) that reduces or ablates the ADCC and/or CDC effector function of the antibody or fragment. The term "antibody-dependent cell-mediated cytotoxicity (ADCC)" as used herein refers to the killing of an antibody-coated target cell by a cytotoxic effector cell through a nonphagocytic process, characterized by the release of the content of cytotoxic granules or by the expression of cell death-inducing molecules. ADCC is triggered through interaction of target-bound antibodies (belonging to IgG or IgA or IgE classes) with certain Fc receptors (FcRs), glycoproteins present on the effector cell surface that bind the Fc region of immunoglobulins (Ig). Effector cells that mediate ADCC include natural killer (NK) cells, monocytes, macrophages, neutrophils, eosinophils and dendritic cells. ADCC is a rapid effector mechanism whose efficacy is dependent on a number of parameters (density and stability of the antigen on the surface of the target cell; antibody affinity and FcR-binding affinity). PBMC-based ADCC assays and natural kill cell-based ADCC assay s can be used to detect ADCC. The readout in these assay s is endpoint-driven (target cell lysis).

Complement dependent cytotoxicity" or "CDC" refers to the lysis of a target cell in the presence of complement. Activation of the classical complement pathway is initiated by the binding of the first component of the complement system (C1q) to antibodies (of the appropriate subclass) which are bound to their cognate antigen. To assess complement activation, a CDC assay (see, e.g., Gazzano-Santoro et al., 1996, J. Immunol. Methods 202:163) may be performed. Polypeptide variants with altered Fc region amino acid sequences (polypeptides with a variant Fc region) and increased or decreased C1q binding capability have been described (see, e.g., U.S. Pat. No. 6,194,551; WO 1999/51642; Idusogie et al., 2000, J. Immunol. 164: 4178-84). Antibodies (or fragments) with little or no CDC activity may be selected for use.

The term "effector function" as used herein refers to a function contributed by an Fc effector domain(s) of an IgG (e.g., the Fc region of an immunoglobulin). Such function can be effected by, for example, binding of an Fc effector domain(s) to an Fc receptor on an immune cell with phagocytic or lytic activity or by binding of an Fc effector domain(s) to components of the complement system. Examples of antibody effector functions include: C1q binding and complement dependent cytotoxicity (CDC); Fc receptor binding; antibody-dependent cell-mediated cytotoxicity (ADCC); phagocytosis (ADCP); down regulation of cell surface receptors (e.g. B cell receptor); and B cell activation.

The term "reduce" or "ablate" as used herein refers to the ability to cause an overall decrease preferably of 20% or greater, more preferably of 50% or greater, and most preferably of 75%, 85%, 90%, 95%, or greater. Reduce or ablate can refer to the symptoms of the disorder (e.g., cancer) being treated, the presence or size of metastases or the size of the primary tumor.

The term "reduced ADCC/CDC function" as used herein refers to a reduction of a specific effector function, e.g. ADCC and/or CDC, in comparison to a control (for example an antibody with a Fc region not including the mutation(s)), by at least about 5%, at least about 10%, at least about 15%, at least about 20%, at least about 30%, at least about 40%, al least about 50%, at least about 60%, at least about 70%, at least about 80% at least, at least about 90% or more.

Accordingly, in certain embodiments the mutated antibodies of the disclosure have reduced or ablated affinity for an Fc ligand responsible for facilitating effector function compared to an antibody having the same amino acid sequence as the antibody of the disclosure but not comprising the addition, substitution, or deletion of at least one amino acid residue to the Fc region (also referred to herein as an "unmodified antibody").

In one embodiment, the anti-TM4SF1 antibody, or antigen binding fragment thereof, comprises an Fc region comprising at least two mutations that reduce or ablate ADCC and/or CDC effector function of the antibody, or antigen binding fragment thereof. In further embodiments, the anti-TM4SF1 antibody, or antigen binding fragment thereof, comprises an Fc region comprising at least three, at least four, at least five, at least six, at least seven, at least eight, at least nine, at least ten or more mutations that reduce or ablate ADCC and/or CDC effector function of the antibody, or antigen binding fragment thereof.

In certain embodiments, the anti-TM4SF1 antibody, or antigen binding fragment thereof, is an IgG1 isotype and comprises an Fc region comprising one or more mutations selected from the group consisting of E233P, L234V, L234A, L235A, G236Delta (deletion), G237A, V263L, N297A, N297D, N297G, N297Q, K322A, A327G, P329A, P329G, P329R, A330S, P331A and P331S.

In one embodiment, the anti-TM4SF1 antibody, or antigen binding fragment thereof, is an IgG1 isotype and comprises an Fc region comprising an L234A/L235A mutation, with or without a G237A mutation. In one embodiment, the anti-TM4SF1 antibody, or antigen binding fragment thereof, is an IgG1 isotype and comprises an Fc region comprising L234A, L235A, and G237A mutations.

In one embodiment, the anti-TM4SF1 antibody, or antigen binding fragment thereof, is an IgG1 isotype and comprises an Fc region comprising an A327G/A330S/P331S mutation.

In one embodiment, the anti-TM4SF1 antibody, or antigen binding fragment thereof, is an IgG1 isotype and comprises an Fc region comprising an E233P/L234V/L235A/delta G236 (deletion) mutation, which provides reduced binding to FcγRI, FcγRIIA, FcγRIIIA and reduced ADCC and CDC effector function.

In one embodiment, the anti-TM4SF1 antibody, or antigen binding fragment thereof, is an IgG1 isotype and comprises an Fc region comprising an N297x mutation, where x=A, D, G, Q.

In one embodiment, the anti-TM4SF1 antibody, or antigen binding fragment thereof, is an IgG1 isotype and comprises an Fc region comprising an A327G/A330S/P331S mutation.

In one embodiment, the anti-TM4SF1 antibody, or antigen binding fragment thereof, is an IgG1 isotype and comprises an Fc region comprising a mutation in one or more of K322A, P329A, and P331A, which provides reduced binding to C1q.

In one embodiment, the anti-TM4SF1 antibody, or antigen binding fragment thereof, is an IgG1 isotype and comprises an Fc region comprising a V263L mutation, which provides enhanced binding to FcγRIIB and enhanced ADCC.

In other embodiments, the anti-TM4SF1 antibody, or antigen binding fragment thereof, is an IgG1 isotype and comprises an Fc region comprising a L234A/L235A, G237A or L23SE mutation.

In other embodiments, the anti-TM4SF1 antibody, or antigen binding fragment thereof, is an IgG1 isotype and comprises an Fc region comprising a L234F, L235E or P331S mutation.

In certain embodiments, the anti-TM4SF1 antibody, or antigen binding fragment thereof, is an IgG2 isotype and comprises an Fc region comprising a one or more mutations selected from the group consisting of V234A, G237A, P238S, H268A or H268Q, V309L, A330S and P331S.

In one embodiment, the anti-TM4SF1 antibody, or antigen binding fragment thereof, is an IgG2 isotype and comprises an Fc region comprising an A330S/P331S mutation.

In one embodiment, the anti-TM4SF1 antibody, or antigen binding fragment thereof, is an IgG2 isotype and comprises an Fc region comprising an A330S/P331S, V234A/G237A/P238S/H268A/V309L/A330S/P331S or H268Q/V309L/A330S/P331S mutation.

In other embodiments, the anti-TM4SF1 antibody, or antigen binding fragment thereof, is an IgG4 isotype and comprises an Fc region comprising a one or more mutations selected from the group consisting of S228P, E233P, F234A, F234V, L235E, L235A, G236Delta (deletion), N297A N297D, N297G, N297Q, P329G. P329R.

In certain embodiments, the anti-TM4SF1 antibody, or antigen binding fragment thereof, is an IgG4 isotype and comprises an Fc region comprising an S228P mutation, which provides reduced Fab-arm exchange and reduced aggregation.

In one embodiment, the anti-TM4SF1 antibody, or antigen binding fragment thereof, is an IgG4 isotype and comprises an Fc region comprising an S228P/L235E mutation.

In one embodiment, the anti-TM4SF1 antibody, or antigen binding fragment thereof, is an IgG4 isotype and comprises an Fc region comprising an S228P/E233P/F234V/L235A/delta G236 (deletion) mutation.

In one embodiment, the anti-TM4SF1 antibody, or antigen binding fragment thereof, is an IgG4 isotype and comprises an Fc region comprising an N297x mutation, where x=A, D, G, Q.

In one embodiment, the anti-TM4SF1 antibody, or antigen binding fragment thereof, is an IgG4 isotype and comprises an Fc region comprising an S228P/F234A/L235A mutation.

In one embodiment, the anti-TM4SF1 antibody, or antigen binding fragment thereof, is an IgG4 isotype and comprises an Fc region comprising a L23SE mutation, which provides reduced binding to FcγRI, FcγRIIA, FcγRIIIA and reduced ADCC and CDC effector activity.

In other embodiments, the anti-TM4SF1 antibody, or antigen binding fragment thereof, is an IgG4 isotype and comprises an Fc region comprising a S228P/F234A/L235A or E233P/L235A/G236Delta mutation.

In one embodiment, the anti-TM4SF1 antibody, or antigen binding fragment thereof, is an IgG4 isotype and comprises an Fc region comprising at least a S228P mutation. Angal et al. (Mol Immunol. 1993 January; 30(1): 105-8) describe an analysis of the hinge sequences of human IgG4 heavy chains to determine that the presence of serine at residue 241 (according to EU numbering system, and now corresponding to residue 228 in Rabat numbering) as the cause of heterogeneity of the inter-heavy chain disulphide bridges in the hinge region in a proportion of secreted human IgG4. Silva et al. (J Biol Chem. 2015 Feb. 27; 290(9):5462-9) describe the S228P mutation in human IgG4 that prevents in vivo and in vitro IgG4 Fab-arm exchange.

In other embodiments, the anti-TM4SF1 antibody, or antigen binding fragment thereof, is an IgG4 isotype and comprises an Fc region comprising a L235E or S228P mutation.

In other embodiments, the anti-TM4SF1 antibody, or antigen binding fragment thereof, is an IgG4 or IgG1 isotype and comprises an Fc region comprising a N297A, N297D or N297G mutation.

In other embodiments, the anti-TM4SF1 antibody, or antigen binding fragment thereof, is an IgG4 or IgG1 isotype and comprises an Fc region comprising a P329G, P329R mutation.

In one exemplary embodiment, the mutated Fc region of any IgG isotype comprises one or more mutations at positions 234, 235, 236, 237, 297, 318, 320, 322.

In vitro and/or in vivo cytotoxicity assay s can be conducted to confirm the reduction or ablation of CDC and/or ADCC activities. For example, Fc receptor (FcR) binding assays can be conducted to ensure that the antibody lacks FcγR binding (hence likely lacking ADCC activity), but retains FcRn binding ability. The primary cells for mediating ADCC, NK cells, express FcγRIII only, whereas monocytes express FcγRI, RII and RIII. Non-limiting examples of in vitro assay s to assess ADCC activity of a molecule of interest is described in U.S. Pat. No. 5,500,362 (see, e.g. Hellstrom, I., et al., Proc. Nat'l Acad. Sci. USA 83 (1986) 7059-7063) and Hellstrom, I., et al., Proc. Nat'l Acad. Sci. USA 82 (1985) 1499-1502; U.S. Pat. No. 5,821,337 (see Bruggemann, M., et al., J. Exp. Med. 166 (1987) 1351-1361). Alternatively, non-radioactive assay s methods may be employed (see, for example, ACTI™ non-radioactive cytotoxicity assay for flow cytometry (CellTechnology, Inc. Mountain View, Calif.: and CytoTox 96® non-radioactive cytotoxicity assay (Promega, Madison, Wis.). Useful effector cells for such assays include peripheral blood mononuclear cells (PBMC) and Natural Killer (NK) cells. Alternatively, or additionally, ADCC activity of the molecule of interest may be assessed in vivo, e.g., in a animal model such as that disclosed in Clynes, et al., Proc. Nat'l Acad. Sci. USA 95 (1998) 652-656. C1q binding assays may also be carried out to confirm that the antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro, et al., J. Immunol. Methods 202 (1996) 163; Cragg, M. S., et al., Blood 101 (2003) 1045-1052; and Cragg, M. S., and Glennie, M. J., Blood 103 (2004) 2738-2743). FcRn binding and in vivo clearance/half-life determinations can also be performed using methods known in the art (see, e.g., Petkova, S. B., et al., Int'l. Immunol. 18(12) (2006) 1759-1769).

In one embodiment, antibodies, or antigen binding fragments thereof, of the disclosure exhibit reduced or ablated ADCC effector function as compared to unmodified antibodies. In another embodiment, antibodies, or antigen binding fragments thereof, of the disclosure exhibit reduced ADCC effector function that is at least 2 fold, or at least 3 fold, or at least 5 fold or at least 10 fold or at least 50 fold or at least 100 fold less than that of an unmodified antibody. In still another embodiment, antibodies of the disclosure exhibit ADCC effector function that is reduced by at least 10%, or at least 20%, or by at least 30%, or by at least 40%, or by at least 50%, or by at least 60%, or by at least 70%, or by at least 80%, or by at least 90%, or by at least 100%, relative to an unmodified antibody. In a further aspect of tire disclosure the reduction or down-modulation of ADCC effector function induced by the antibodies, or antigen binding fragments thereof, of the present disclosure, is a reduction to 0, 2.5, 5, 10, 20, 50 or 75% of the value observed for induction of ADCC by unmodified antibodies. In certain embodiments, the reduction and/or ablation of ADCC activity may be attributed to the reduced affinity of the antibodies, or antigen binding fragments thereof, of the disclosure for Fc ligands and/or receptors.

V. Linkers

The components of the conjugate, targeting protein (e.g., an anti-TM4SF1 antibody or an antigen binding fragment thereof as described herein) and an oligonucleotide (e.g., an RNA molecule or a DNA molecule) can be conjugates using various approaches, such as a genetic conjugation, an enzymatic conjugation, a chemical conjugation, or any combination thereof. In various examples, properties of a linker are modified, such as length of a linker or location of cleavage (in cases where the linker is cleavable).

In some embodiments, the RNA or DNA molecules within the conjugates may be conjugated to the targeting proteins using an enzymatic site-specific conjugation method which involves the use of a mammalian or bacterial transglutaminase enzyme. Microbial transglutaminases (mTGs) are versatile tools in modern research and biotechnology. The availability of large quantities of relatively pure enzymes, ease of use, and lack of regulation by calcium and guanosine-5'-triphosphate (GTP) has propelled mTG to be the main cross-linking enzyme used in both the food industry and biotechnology. Currently, mTGs are used in many applications to attach proteins and peptides to small molecules, polymers, surfaces, DNA, as well as to other proteins. See, e.g., Pavel Strp, Veracity of microbial transglutaminase, Bioconjugate Chem 25, 5, 855-862).

In some embodiments, the RNA or DNA molecules within the conjugates may be conjugated to the targeting proteins by way of a linker with direct covalent or non-covalent interactions. Linkers can be amino acid or peptide based linkers, or chemical linking agents, such as homobifunctional and heterobifunctional cross-linkers, which are available from many commercial sources. Regions available for cross-linking may be found on the binding protein (e.g., anti-TM4SF1 antibodies) of the disclosure. The linker may comprise a flexible arm. e.g., 2, 3, 4, 5, 6, 7, 8, 9, 10, 11, 12, 13, 14, or 15 carbon atoms. Exemplary linkers include a non-cleavable covalent or non-covalent linker. The cleavable linker, in some embodiments, comprises an acid-labile linker, a protease-sensitive linker, a photo-labile linker, or a disulfide-containing linker. In some embodiments, the linker comprises a cysteine linker or a non-cysteine linker, such as a lysine linker. In some embodiments, the antibody or antibody fragment comprises an unnatural amino acid, wherein the antibody or antibody fragment and the oligonucleotide are linked/conjugated via the unnatural amino acid. In some embodiments, the antibody or antibody fragment comprises a natural amino acid, wherein the antibody or antibody fragment and the oligonucleotide are linked/conjugated via the natural amino acid.

In some embodiments, the antibody or antibody fragment comprises an unnatural amino acid, wherein the antibody or antibody fragment and the oligonucleotide are linked/conjugated via the unnatural amino acid. The unnatural amino acid may be inserted between two naturally occurring amino acids in the antibody or antibody fragment. The one or more unnatural amino acids may replace one or more naturally occurring amino acids in the antibody or antibody fragment. The one or more unnatural amino acids may be incorporated at the N terminus of the antibody or antibody fragment. The one or more unnatural amino acids may be incorporated at the C terminus of the antibody or antibody fragment. The unnatural amino acid may be incorporated distal to the binding region of antibody or antibody fragment. The unnatural amino acid may be incorporated near the binding region of the antibody or antibody fragment. The unnatural amino acid may be incorporated in the binding region of the antibody or antibody fragment.

The one or more unnatural amino acids may be encoded by a codon that does not code for one of the twenty natural amino acids. The one or more unnatural amino acids may be encoded by a nonsense codon (stop codon). The stop codon may be an amber codon. The amber codon may comprise a UAG sequence. The stop codon may be an ochre codon. The ochre codon may comprise a UAA sequence. The stop codon may be an opal or umber codon. The opal or umber codon may comprise a UGA sequence. The one or more unnatural amino acids may be encoded by a four-base codon.

The one or more unnatural amino acids may be p-acetylphenylalanine (pAcF or pAcPhe). The one or more unnatural amino acids may be selenocysteine. The one or more unnatural amino acids may be p-fluorophenylalanine (pFPhe). The one or more unnatural amino acids may be selected from the group comprising p-azidophenylalanine (pAzF), p-azidomethylphenylalanine (pAzCH2F), p-benzoylphenylalanine (pBpF), p-propargyloxyphenylalanine (pPrF), p-iodophenylalanine (pIF), p-cyanophenylalanine (pCNF), p-carboxylmethylphenylalanine (pCmF), 3-(2-naphthyl)alanine (NapA), p-boronophenylalanine (pBoF), o-nitrophenylalanine (oNiF), (8-hydroxyquinolin-3-yl)alanine (HQA), selenocysteine, and (2,2'-bipyridin-5-yl)alanine (BipyA). The one or more unnatural amino acids may be 4-(6-methyl-s-tetrazin-3-yl)aminophenyl alanine.

The one or more unnatural amino acids may be β-amino acids (β3 and β2), homo-amino acids, proline and pyruvic acid derivatives, 3-substituted alanine derivatives, glycine derivatives, ring-substituted phenylalanine and tyrosine derivatives, linear core amino acids, diamino acids, D-amino acids, N-methyl amino acids, or a combination thereof.

Additional examples of unnatural amino acids include, but are not limited to, 1) various substituted tyrosine and phenylalanine analogues such as O-methyl-L-tyrosine, p-amino-L-phenylalanine, 3-nitro-L-tyrosine, p-nitro-L-phenylalanine, m-methoxy-L-phenylalanine and p-isopropyl-L-phenylalanine; 2) amino acids with aryl azide and benzophenone groups that may be photo-cross-linked; 3) amino acids that have unique chemical reactivity including acetyl-L-phenylalanine and m-acetyl-L-phenylalanine, O-allyl-L-tyrosine, O-(2-propynyl)-L-tyrosine, p-ethylthiocarbonyl-L-phenylalanine and p-(3-oxobutanoyl)-L-phenylalanine; 4) heavy-atom-containing amino acids for phasing in X-ray crystallography including p-iodo and p-bromo-L-phenylalanine: 5) the redox-active amino acid dihydroxy-L-phenylalanine: 6) glycosylated amino acids including b-N-acetylglucosamine-O-serine and a-N-acetylgalactosamine-O-threonine; 7) fluorescent amino acids with naphthyl, dansyl, and 7-aminocoumarin side chains; 8) photocleavable and photoisomerizable amino acids with azobenzene and nitrobenzyl Cys, Ser, and Tyr side chains; 9) the phosphotyrosine mimetic p-carboxymethyl-L-phenylalanine; 10) the glutamine homologue homoglutamine; and 11) 2-aminooctanoic acid. The unnatural amino acid may be modified to incorporate a chemical group. The unnatural amino acid may be modified to incorporate a ketone group.

The one or more unnatural amino acids may comprise at least one oxime, carbonyl, dicarbonyl, hydroxylamine group or a combination thereof. The one or more unnatural amino acids may comprise at least one carbonyl, dicarbonyl, alkoxy-amine, hydrazine, acyclic alkene, acyclic alkyne, cyclooctyne, aryl/alkyl azide, norbornene, cyclopropene, trans-cyclooctene, or tetrazine functional group or a combination thereof.

The one or more unnatural amino acids may be incorporated into the antibody or antibody-fragment by methods known in the art. Cell-based or cell-free systems may be used to alter the genetic sequence of antibody or antibody fragment, thereby producing the antibody or antibody-fragment with one or more unnatural amino acids. Auxotrophic strains may be used in place of engineered tRNA and synthetase. The one or more unnatural amino acids may be produced through selective reaction of one or more natural amino acids. The selective reaction may be mediated by one or more enzymes. In one non-limiting example, the selective reaction of one or more cysteines with formylglycine generating enzyme (FGE) may produce one or more formylglycines as described in Rabuka et al., Nature Protocols 7:1052-1067 (2012).

The one or more unnatural amino acids may take part in a chemical reaction to form a linker. The chemical reaction to form the linker may be a bioorthogonal reaction. The chemical reaction to form the linker may be click chemistry.

Additional unnatural amino acids are disclosed in Liu et al. (Annu Rev Biochem, 79:413-44, 2010), Wang et al. (Angew Chem Int Ed, 44:34-66, 2005) and PCT application numbers PCT/US2012/039472, PCT/US2012/039468, PCT/US2007/088009, PCT/US2009/058668, PCT/US2007/089142, PCT/US2007/088011, PCT/US2007/001485, PCT/US2006/049397, PCT/US2006/047822 and PCT/US2006/044682, all of which are incorporated by reference in their entireties.

The one or more unnatural amino acids may replace one or more amino acids in the antibody or antibody fragment. The one or more unnatural amino acids may replace any natural amino acid in the antibody or antibody fragment.

The one or more unnatural amino acids may be incorporated in a light chain of the antibody or antibody fragment. The one or more unnatural amino acids may be incorporated in a heavy chain of the antibody or antibody fragment. The one or more unnatural amino acids may be incorporated in a heavy chain and a light chain of antibody or antibody fragment. The one or more unnatural amino acids may replace an amino acid in the light chain of the antibody or antibody fragment. The one or more unnatural amino acids may replace an amino acid in a heavy chain of the antibody or antibody fragment. The one or more unnatural amino acids may replace an amino acid in a heavy chain and a light chain of the antibody or antibody fragment.

In some embodiments, the antibody fragment and the therapeutic agent are linked/conjugated via a linker. In some embodiments, the linker comprises a small molecule fragment, a spacer, a non-covalent linker, or a combination thereof. In some embodiments, the linker comprises one or more of small molecule fragments. In some embodiments, the linker comprises a spacer.

In some embodiments, a linker comprises one or more of reactive moieties. In some embodiments, a linker comprises a reactive moiety selected from a Michael acceptor moiety, a leaving group moiety, or a moiety capable of forming a covalent bond with the antibody fragment and/or the therapeutic agent.

In some embodiments, a small molecule fragment comprises a reactive moiety. In some embodiments, a small molecule fragment comprises a reactive moiety selected from a Michael acceptor moiety, a leaving group moiety, or a moiety capable of forming a covalent bond with the thiol group of a cysteine residue.

In some embodiments, the Michael acceptor moiety comprises an alkene or an alkyne moiety. In some embodiments, a small molecule fragment is obtained from a compound library. In some embodiments, the compound library comprises ChemBridge fragment library, Pyramid Platform Fragment-Based Drug Discovery, May bridge fragment library, FRGx from AnalytiCon, TCI-Frag from AnCoreX, Bio Building Blocks from ASINEX, BioFocus 3D from Charles River, Fragments of Life (FOL) from Emerald Bio, Enamine Fragment Library, IOTA Diverse 1500, BIONET fragments library, Life Chemicals Fragments Collection, OTAVA fragment library, Prestwick fragment library, Selcia fragment library, TimTec fragment-based library, Allium from Vitas-M Laboratory, or Zenobia fragment library.

In some embodiments, a small molecule fragment comprises a carbodiimide. N-hydroxysuccinimide (NHS) ester, imidoester, pentafluorophenyl ester, hydroxymethyl phosphine, maleimide, haloacetyl, pyridyl disulfide, thiosulfonate, vinylsulfone, hydrazide, alkoxyamine, alky ne, azide, or isocyanate group. In some embodiments, a small molecule fragment comprises an alky ne or an azide group. In some embodiments, a small molecule fragment comprises an alky ne group. In some embodiments, a small molecule fragment comprises an azide group.

In some embodiments, a small molecule fragment covalently interacts with a spacer. In some embodiments, the spacer comprises an amide moiety, an ester moiety, an ether moiety, substituted or unsubstituted C1-C6alkylene moiety, substituted or unsubstituted C1-C6haloalkylene moiety, substituted or unsubstituted C1-C6heteroalkylene moiety, substituted or unsubstituted C3-C8cycloalkylene moiety, substituted or unsubstituted C2-C7heterocycloalkylene moiety, substituted or unsubstituted arylene moiety, a substituted or unsubstituted heteroarylene moiety or any combination thereof.

In some embodiments, the linker comprises MC (6-maleimidocaproyl). MCC (a maleimidomethyl cyclohexane-1-carboxylate), MP (maleimidopropanoyl), val-cit (valine-citrulline), val-ala (valine-alanine), ala-phe (alanine-phenylalanine), PAB (p-aminobenzyloxycarbonyl), SPP (N-Succinimidyl 4-(2-pyridylthio) pentanoate), SMCC (N-Succinimidyl 4-(N-maleimidomethyl)cyclohexane-1 carboxylate), SIAB (N-Succinimidyl (4-iodo-acetyl)amino-benzoate. Further examples of linkers include: BS3 ([Bis (sulfosuccinimidyl)suberate]; BS3 is a homobifunctional N-hydroxysuccinimideester that targets accessible primary amines), NHS/EDC (N-hydroxysuccinimide and N-ethyl-(dimethylaminopropyl)carbodimide; NHS/EDC allows for the conjugation of primary amine groups with carboxyl groups), sulfo-EMCS ([N-e-Maleimidocaproic acid]hydrazide; sulfo-EMCS are heterobifunctional reactive groups (maleimide and NHS-ester) that are reactive toward sulfhydryl and amino groups), hydrazide (most proteins contain exposed carbohydrates and hydrazide is a useful reagent for linking carboxyl groups to primary amines), and SATA (N-succinimidyl-S-acetylthioacetate; SATA is reactive towards amines and adds protected sulfhydryls groups). To form covalent bonds, a chemically reactive group a wide variety of active carboxyl groups (e.g., esters) where the hydroxyl moiety is physiologically acceptable at the levels required to modify the peptide. Particular agents include N-hydroxysuccinimide (NHS), N-hydroxy-sulfosuccinimide (sulfo-NHS), maleimide-benzoyl-succinimide (MBS), gamma-maleimido-butylyloxy succinimide ester (GMBS), maleimido propionic acid (MPA) maleimido hexanoic acid (MHA), and maleimido undecanoic acid (MUA). Primary amines are the principal targets for NHS esters. Accessible a-amino groups present on the N-termini of proteins and the ε-amine of lysine react with NHS esters. An amide bond is formed when the NHS ester conjugation reaction reacts with primary amines releasing N-hydroxysuccinimide. These succinimide containing reactive groups are herein referred to as succinimidyl groups. In certain embodiments of the disclosure, the functional group on the protein will be a thiol group and the chemically reactive group will be a maleimido-containing group such as gamma-maleimide-butyl-amide (GMBA or MPA). Such maleimide containing groups are referred to herein as maleido groups. The maleimido group is most selective for sulfhydryl groups on peptides when the pH of the reaction mixture is 6.5-7.4. At pH 7.0, the rate of reaction of maleimido groups with sulfhydryls (e.g., thiol groups on proteins such as serum albumin or IgG) is 1000-fold faster than with amines. Thus, a stable thioether linkage between the maleimido group and the sulfhydryl can be formed.

In other embodiments, the linker includes at least one amino acid (e.g., a peptide of at least 2, 3, 4, 5, 6, 7, 10, 15, 20, 25, 40, or 50 amino acids). In certain embodiments, the linker is a single amino acid (e.g., any naturally occurring amino acid such as Cys or Lys). In other embodiments, a glycine-rich peptide such as a peptide can be used. In some cases, the linker can be a single amino acid (e.g., any amino acid, such as Gly or Cys or Lys). Examples of suitable linkers are succinic acid, Lys, Glu, and Asp, or a dipeptide such as Gly-Lys. When the linker is succinic acid, one carboxyl group thereof may form an amide bond with an amino group of the amino acid residue, and the other carboxyl group thereof may, for example, form an amide bond with an amino group of the peptide or substituent. When the linker is Lys, Glu, or Asp, the carboxyl group thereof may form an amide bond with an amino group of the amino acid residue, and the amino group thereof may, for example, form an amide bond with a carboxyl group of the substituent. When Lys is used as the linker, a further linker may be inserted between the ε-amino group of Lys and the substituent. In one particular embodiment, the further linker is succinic acid which, e.g., forms an amide bond with the ε-amino group of Lys and with an amino group present in the substituent. In one embodiment, the further linker is Glu or Asp (e.g., which forms an amide bond with the ε-amino group of Lys and another amide bond with a carboxyl group present in the substituent), that is, the substituent is a NE-acylated lysine residue. In some embodiments, a linker comprises a single-amino acid peptide consisting of a lysine. In some embodiments, a linker comprises a LysLys dipeptide. In some embodiments, a linker comprises a *Lys and/or Lys* dipeptide. In some embodiments, a linker comprises a LysLys* and/or *LysLys, Lys*Lys tripeptide. In some embodiments, a linker comprises a LysLysLys tripeptide.

In some embodiments, the conjugation of the targeting proteins and the RNA molecules is carried out in a manner to produce a ring threaded molecule. In some embodiments, the spacer additionally comprises a macrocycle. In some embodiments, the macrocycle comprises a non-covalent macrocycle. In some embodiments, the macrocycle comprises a covalent macrocycle.

In some embodiments, the macrocycle comprises cucurbit[X]uril, wherein X is 5, 6, 7, 8, 9, 10, 11, 12, 13, 14, 15, 16, 17, 18, 19, or 20. In some embodiments, the macrocycle comprises cucurbit[X]uril, wherein X is 5, 6, 7, 8, 9, 10, 11, 12, 13, 14, or 15. In some embodiments, the macrocycle comprises cucurbit[X]uril, wherein X is 5, 6, 7, or 8. In some embodiments, the cucurbit[X]uril has a structure represented by:

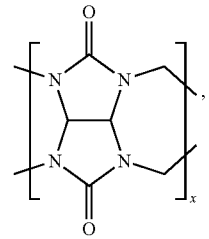

wherein x is 5, 6, 7, or 8.

In some embodiments, x is 5. In some embodiments, x is 6. In some embodiments, x is 7. In some embodiments, x is 8.

In some embodiments, the macrocycle comprises cucurbit[6]uril (CB6). In some embodiments, the macrocycle comprises cucurbit[7]uril (CB7). In some embodiments, the cucurbit[7]uril has a structure represented by:

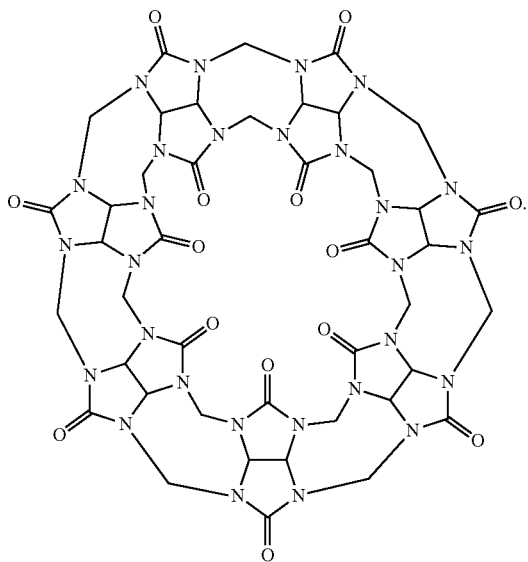 [SMILES: O=C1N2CN3C(=O)N4CN5C(=O)N6CN7C(=O)N8CN9C(=O)N%10CN%11C(=O)N%12CN%13C(=O)N%14CN1C1C2N2CN%15C(=O)N(CN%16C(=O)N(CN%17C(=O)N(CN%18C(=O)N(CN%19C(=O)N(CN%20C(=O)N(CN1C2=O)C%14C%13%20)C%12C%11%19)C%10C9%18)C8C7%17)C6C5%16)C4C3%15]

In some embodiments, the macrocycle comprises a cyclodextrin (CD). In some embodiments, the cyclodextrin has a structure represented by:

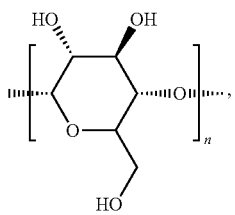

wherein n is 5, 6, 7, or 8.

In some embodiments, the macrocycle comprises a beta-cyclodextrin (n=7). In some embodiments, macrocycle comprises a gamma-cyclodextrin (n=8). In some embodiments, the beta-cyclodextrin has a structure represented by:

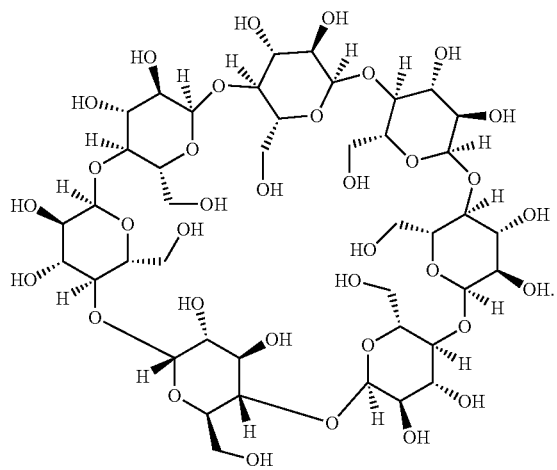 [SMILES: OC[C@H]1O[C@@H]2O[C@H]3[C@H](O)[C@@H](O)[C@@H](O[C@H]4[C@H](O)[C@@H](O)[C@@H](O[C@H]5[C@H](O)[C@@H](O)[C@@H](O[C@H]6[C@H](O)[C@@H](O)[C@@H](O[C@H]7[C@H](O)[C@@H](O)[C@@H](O[C@H]8[C@H](O)[C@@H](O)[C@@H](O[C@H]1[C@H](O)[C@H]2O)O[C@@H]8CO)O[C@@H]7CO)O[C@@H]6CO)O[C@@H]5CO)O[C@@H]4CO)O[C@@H]3CO]

In some embodiments, the macrocycle comprises a polypeptide. In some embodiments, the polypeptide has a structure represented by:

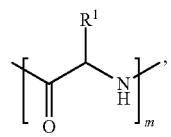

wherein $R^1$ is H, D, F, —CN, substituted or unsubstituted $C_1$-$C_6$alkyl, substituted or unsubstituted $C_1$-$C_6$fluoroalkyl, substituted or unsubstituted $C_1$-$C_6$heteroalkyl, substituted or unsubstituted $C_3$-$C_8$cycloalkyl, substituted or unsubstituted aryl, and substituted or unsubstituted heteroaryl; and m is 5, 6, 7, or 8.

In some embodiments, the macrocycle comprises a cycloglycine. In some embodiments, the macrocycle comprises cyclo(glycylglycylglycylglycyglycyllglycyl). In some embodiments, the macrocycle comprises cyclo (glycylglycylglycylglycylglycylglycylglycylglycyl). In some embodiments, the cyclo (glycylglycylglycylglycylglycylglvcylglycylglycyl) has a structure represented by:

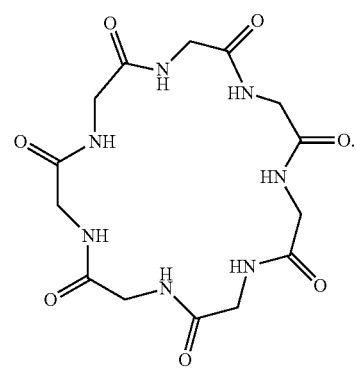 [SMILES: O=C1CNC(=O)CNC(=O)CNC(=O)CNC(=O)CNC(=O)CNC(=O)CN1]

In some embodiments, the macrocycle comprises a crown ether. In some embodiments, the crown ether is a 15-crown-5, 18-crown-6, dibenzo-18-crown-6, or diaza-18-crown-6.

In some embodiments, the macrocycle comprises a cycloalkane. In some embodiments, the cycloalkane is a cyclopentadecane, cyclohexadecane, cycloheptadecane, or cyclooctadecane.

In some embodiments, the macrocycle comprises cyclobis (paraquat-p-phenylene) (CBPQT$^{4+}$). In some embodiments, the cyclobis(paraquat-p-phenylene) (CBPQT$^{4+}$) has a structure represented by:

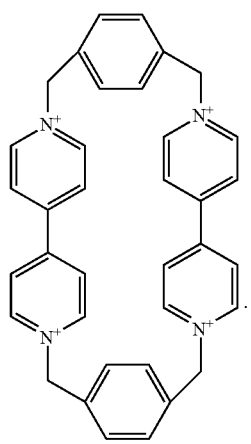 [SMILES: c1cc2ccc1C[n+]1ccc(cc1)-c1cc[n+](cc1)Cc1ccc(cc1)C[n+]1ccc(cc1)-c1cc[n+](cc1)C2]
In some embodiments, a linker comprises quaternary nitrogen. In some embodiments, the linker is:
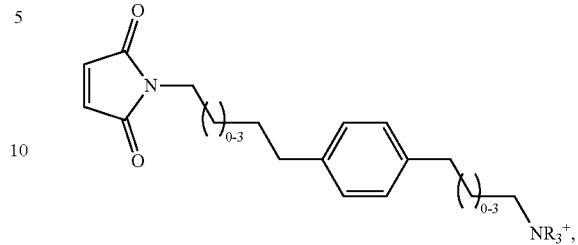
wherein each R is independently H or C1-C6 alkyl. In some embodiments, the linker is:
wherein each R is independently H or C1-C6 alkyl. In some embodiments, the linker is:
wherein each R is independently H or C1-C6 alkyl. In some embodiments, the linker is:
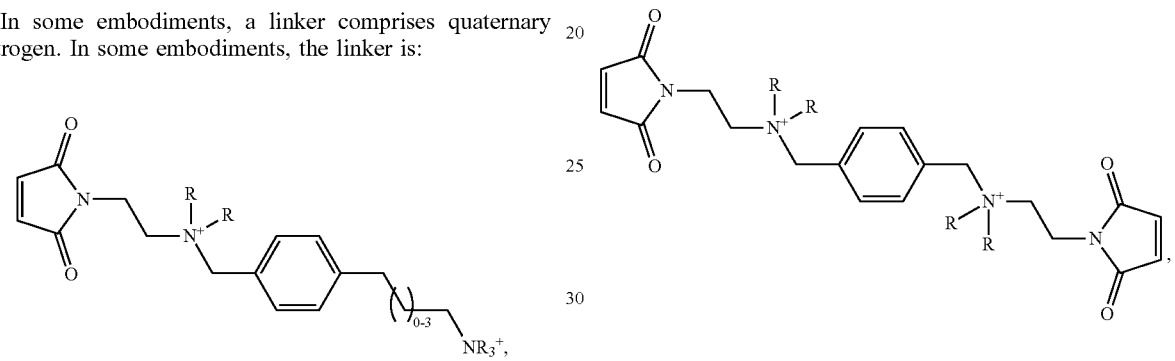
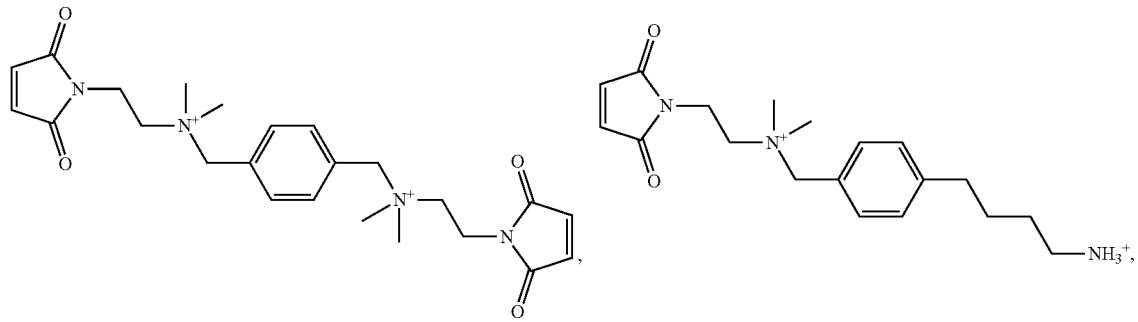
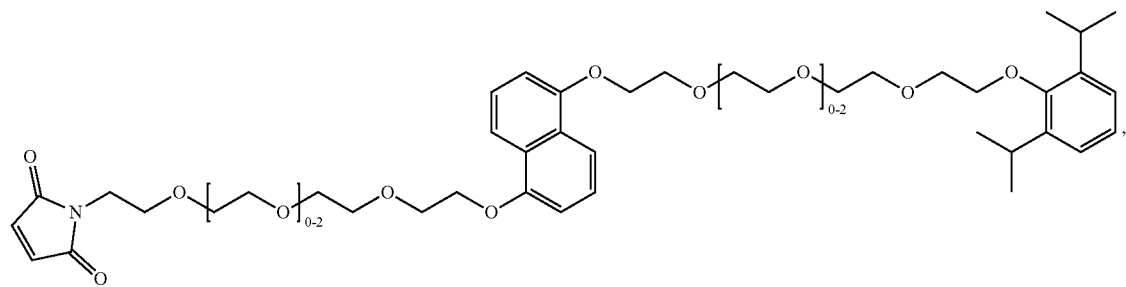

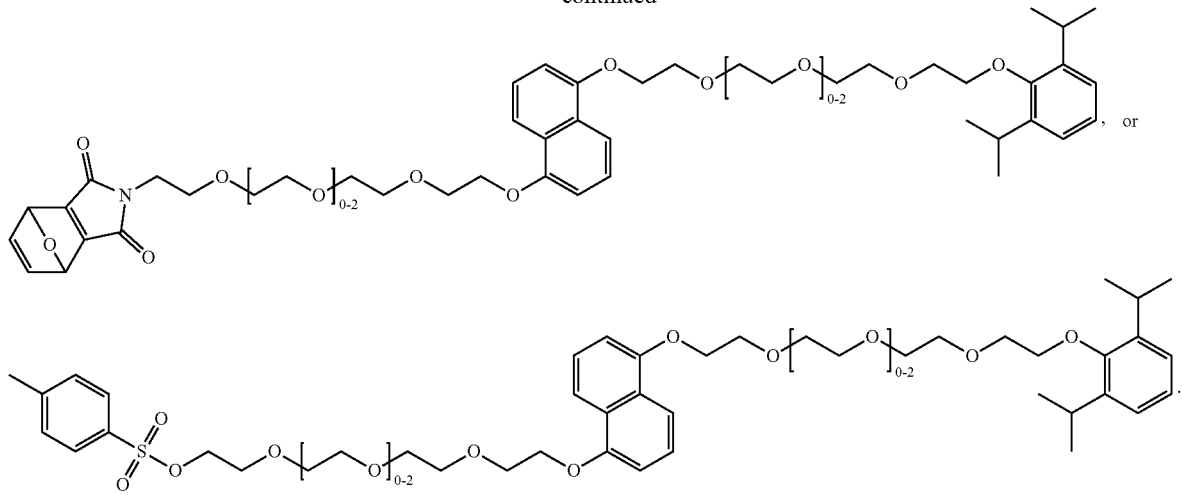

In some embodiments, the conjugates are produced by linking a first portion of the linker to the antibody or antigen binding fragment thereof and a second portion of the linker to the oligonucleotide. Conjugating the linker to the antibody or antigen binding fragment thereof or the therapeutic agent may comprise production of an ionic bond, a covalent bond, a non-covalent bond or a combination thereof between the linker and the antibody, antigen binding fragment thereof or therapeutic agent. Conjugating the linker to the antibody or antigen binding fragment thereof or the oligonucleotide may be performed as described in Roberts et al., Advanced Drug Delivery Reviews 54:459-476 (2002). The linker may be selected from a bifunctional linker, a cleavable linker, a non-cleavable linker, an ethylene glycol linker, a bifunctional ethylene glycol linker, a flexible linker, or an inflexible linker. The linker may comprise a chemical group selected from a cyclooctyne, a cyclopropene, an aryl/alkyl azide, a trans-cyclooctene, a norborene, and a tetrazine. In some embodiments, a terminus of the linker comprises an alkoxy-amine. In some embodiments, a terminus of the linker comprises an azide or cyclooctyne group. In some embodiments, the antibody or antibody fragment or therapeutic agent may be coupled to the linker by a chemical group selected from a cyclooctyne, cyclopropene, aryl/alkyl azide, trans-cyclooctene, norborene, and tetrazine. Linking the antibody or antibody fragment or an oligonucleotide to the linker may comprise conducting one or more copper-free reactions. Linking the antibody or antibody fragment or an oligonucleotide to the linker may comprise conducting one or more copper-containing reactions. Linking the antibody or antibody fragment or an oligonucleotide to the linker may comprise one or more cycloadditions. Linking the antibody or antibody fragment or an oligonucleotide to the linker may comprise one or more Huisgen-cycloadditions. Linking the antibody or antibody fragment or an oligonucleotide to the linker may comprise one or more Diels Alder reactions. Linking the antibody or antibody fragment or an oligonucleotide to the linker may comprise one or more Hetero Diels Alder reaction. In some embodiments, a terminus of the linker comprises a leaving group.

In some embodiments, a first portion of the linker covalently interacts with a cysteine containing antibody or an antigen binding fragment thereof, as described herein. In some embodiments, a first portion of the linker covalently interacts with a cysteine containing TM4SF1 antibody or an antigen binding fragment thereof, as described herein. In some embodiments, an oligonucleotide described herein covalently interacts with a second portion of the linker. In some embodiments, an oligonucleotide described herein non-covalently interacts with a second portion of the linker.

In some embodiments, a viral protein p19 based siRNA carrier is contemplated, which protein has been shown to have a high affinity for siRNA. See, e.g., Yang et al. Cytosolic delivery of siRNA by ultra-high affinity dsRNA binding proteins, Nucleic Acids Res. 2017 Jul. 27; 45(13): 7602-7614. In some examples, a p19-siRNA complex is generated and fused to an anti-TM4SF1 antibody or antigen-binding fragment thereof. In additional embodiments, a statistical or random conjugation methods via Cys, Lys, or Arginine residues within the antibody or antigen binding fragment thereof.

Figure 2:
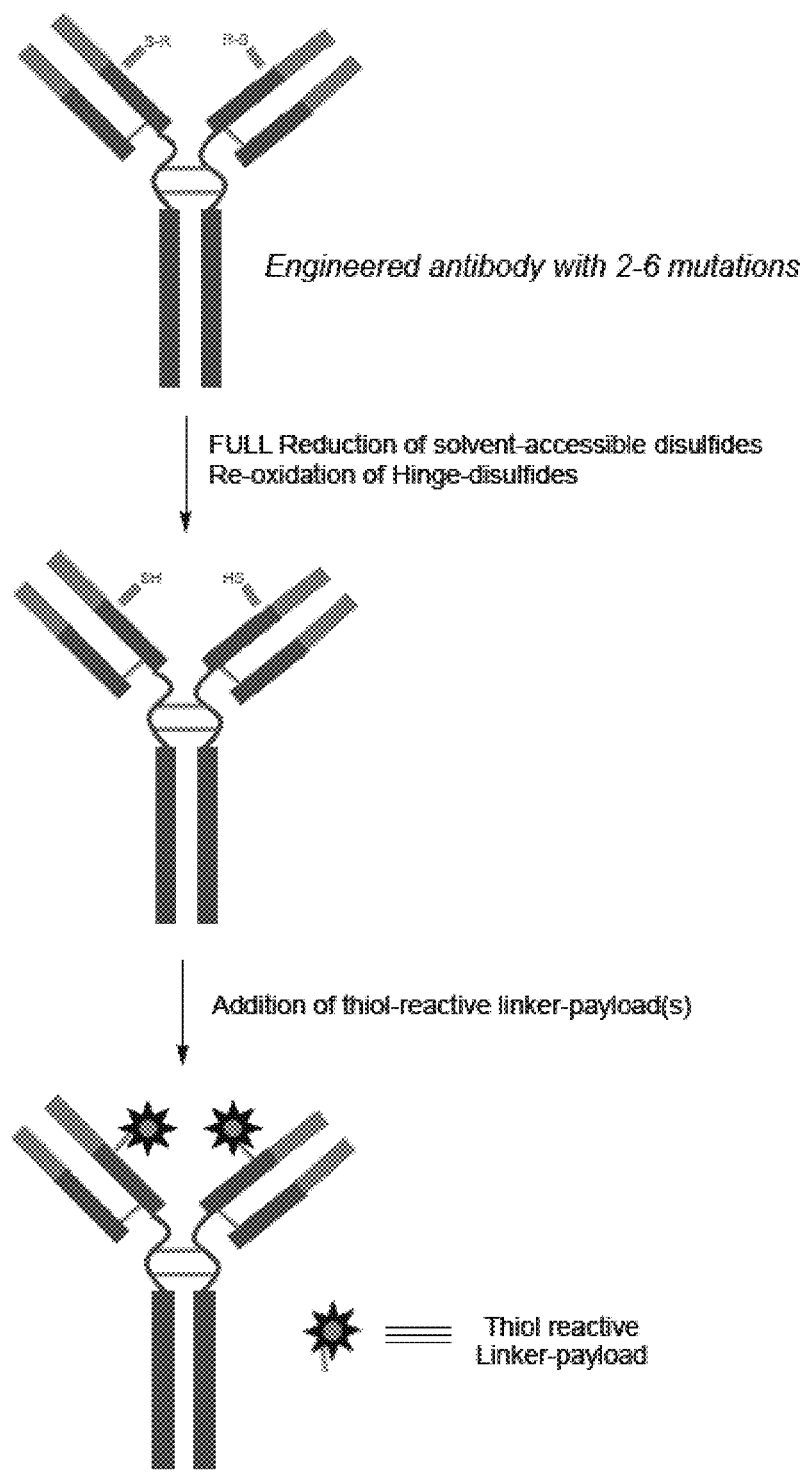
FIG. 2 shows an exemplary illustration of an engineered antibody.

VI. Synthesis of a Conjugate Comprising Antibody or an Antigen Binding Fragment Thereof and an siRNA In one embodiment, a conjugate comprising an antibody or an antigen binding fragment thereof (e.g., an anti-TM4SF1 antibody or an antigen binding fragment thereof) and an oligonucleotide is developed by covalent conjugation of the antibody or antigen binding fragment and the RNA molecule (e.g., siRNA). As a first step of such an exemplary process, an engineered anti-TM4SF1 antibody is generated, in which a cysteine residue had been introduced in the heavy chain (thereby producing an anti-TM4SF1 HC with an engineered cysteine). The anti-TM4SF1 antibody with an engineered cysteine, in some examples, provides at least two discrete positions for coupling with an RNA molecule, such as with an siRNA. For instance, one siRNA molecule can be coupled to each heavy chain of the anti-TM4SF1 antibody with an engineered cysteine. In a separate or subsequent step in the conjugation process, a chemically stabilized siRNA (synthesized, using siSTABLE chemistry) modified with a 3'-amine for coupling to the passenger strand with a sequence targeting peptidlyprolyl isomerase B (PPIB, cyclophilin B) is generated. The conjugation, in some embodiments, further involves a reducible N-succinimidyl-4-(2-pyridyldithio)butyrate (SPDB) or a non-reducible succinimidyl-4-[N-maleimidomethyl]cyclohexane-1-carboxylate) (SMCC) NHS (N-hydroxysuccinimide) linkers. In some embodiments, using the anti-TM4SF1 antibody with an engineered cysteine, an exemplary conjugate molecule according to this disclosure is generated in a multi step process involving at least two primary steps: (i) reaction of an amine-tagged siRNA with an NHS-linker to form a thiol-reactive siRNA-linker adduct, and (ii) reacting the adduct with thiol groups on the antibody with an engineered cysteine to covalently link the siRNA via a thio-ester bond. This process is illustrated in FIG. 1. The exemplary conjugate molecule is subsequently purified using anion exchange chromatography to remove free siRNA and then by size-exclusion chromatography to remove un-coupled antibody. Further techniques, such as gel electrophoresis and electrospray TOF mass spectrometry can then be used to assess the yield of the exemplary conjugate molecule, as well characteristics such as monomeric conjugates with one or two linked siRNAs per antibody. An exemplary engineered antibody comprising a thiol reactive linker-payload is illustrated in FIG. 2.

Additional methods that can be employed for the conjugation involve the use or chemical or peptide based linkers, chemical or enzymatic conjugation methods (e.g., using mammalian or bacterial transglutaminase), or any combinations thereof. Any of the linkers and/or methods described above can be used to couple the antibody or antigen binding fragment thereof and the oligonucleotides of the conjugate.

Using appropriate coupling methods, it is possible to generate conjugates of this disclosure, which comprise, for example, oligonucleotide to antibody or antigen binding fragment ratio (OAR) of about 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1 or higher. An increased OAR (oligonucleotide to antibody or antigen binding fragment thereof, ratio), for example in an antibody-RNA conjugate (an ARC) increases the RNA (e.g., siRNA) per antibody. In some examples, the number of RNA per antibody is increased while maintaining monomeric ARC design. In some embodiments, the conjugate comprises an antibody or antigen binding fragment to oligonucleotide ratios of 1:1. This can be achieved, for example, by using an antigen binding fragment or a portion of an antibody, e.g., a half-antibody. Fab, or other fragments that comprise an engineered cysteine. In some examples, the conjugate can be designed to comprise 1:1 ratios of an antibody or antigen binding fragment to oligonucleotide using a whole antibody which is conjugated to an oligonucleotide by a conjugation method that utilize a multi metallic protein (e.g., a hexa-rhodium metallopeptide) to enable modification of proteins, on the basis of molecular recognition. For example, the antibody and the oligonucleotide can be conjugated using a site-specific antibody functionalization, based on molecular recognition of the Fc domain constant region of the antibody by the multimetallic protein. In some embodiments, the multimetallic protein comprises three rhodium complexes attached to specific sites of a protein that binds to the Fc domain of an antibody. Upon binding, the multimetallic protein can catalyze site-specific conjugation of the oligonucleotide to the antibody. An advantage of using the multimetallic protein can be that the antibody is minimally disrupted, such as by avoiding engineering residues within the antibody, during the conjugation.

VII. Pharmaceutical Compositions

Disclosed herein is a pharmaceutical composition comprising one or more of the conjugates disclosed herein, comprising an antibody or an antigen binding fragment thereof. The pharmaceutical composition may further comprise one or more pharmaceutically acceptable salts, excipients or vehicles. Pharmaceutically acceptable salts, excipients, or vehicles for use in the present pharmaceutical compositions include carriers, excipients, diluents, antioxidants, preservatives, coloring, flavoring and diluting agents, emulsifying agents, suspending agents, solvents, fillers, bulking agents, buffers, delivery vehicles, tonicity agents, cosolvents, wetting agents, complexing agents, buffering agents, antimicrobials, and surfactants.

Neutral buffered saline or saline mixed with serum albumin are exemplary appropriate carriers. The pharmaceutical compositions may include antioxidants such as ascorbic acid: low molecular weight polypeptides; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as Tween, pluronics, or poly ethylene gly col (PEG). Also by way of example, suitable tonicity enhancing agents include alkali metal halides (preferably sodium or potassium chloride), mannitol, sorbitol, and the like. Suitable preservatives include benzalkonium chloride, thimerosal, phenethyl alcohol, methylparaben, propylparaben, chlorhexidine, sorbic acid and the like. Hydrogen peroxide also may be used as preservative. Suitable cosolvents include glycerin, propylene glycol, and PEG. Suitable complexing agents include caffeine, polyvinylpyrrolidone, beta-cyclodextrin or hydroxy-propyl-beta-cyclodextrin. Suitable surfactants or wetting agents include sorbitan esters, polysorbates such as polysorbate 80, tromethamine, lecithin, cholesterol, tyloxapal, and the like. The buffers may be conventional buffers such as acetate, borate, citrate, phosphate, bicarbonate, or Tris-HCl. Acetate buffer may be about pH 4-5.5, and Tris buffer may be about pH 7-8.5. Additional pharmaceutical agents are set forth in Remington's Pharmaceutical Sciences, 18th Edition, A. R. Gennaro, ed., Mack Publishing Company, 1990.

The pharmaceutical composition may be in liquid form or in a lyophilized or freeze-dried form and may include one or more lyoprotectants, excipients, surfactants, high molecular weight structural additives and/or bulking agents (see, for example, U.S. Pat. Nos. 6,685,940, 6,566,329, and 6,372, 716). In one embodiment, a lyoprotectant is included, which is a non-reducing sugar such as sucrose, lactose or trehalose. The amount of lyoprotectant generally included is such that, upon reconstitution, the resulting formulation will be isotonic, although hypertonic or slightly hypotonic formulations also may be suitable. In addition, the amount of lyoprotectant should be sufficient to prevent an unacceptable amount of degradation and/or aggregation of the protein upon lyophilization. Exemplary lyoprotectant concentrations for sugars (e.g., sucrose, lactose, trehalose) in the pre-lyophilized formulation are from about 10 mM to about 400 mM. In another embodiment, a surfactant is included, such as for example, nonionic surfactants and ionic surfactants such as polysorbates (e.g., polysorbate 20, polysorbate 80); poloxamers (e.g., poloxamer 188); polyethylene glycol) phenyl ethers (e.g., Triton); sodium dodecyl sulfate (SDS); sodium laurel sulfate; sodium octyl glycoside; lauryl-, myristyl-, linoleyl-, or stearyl-sulfobetaine; lauryl-, myristyl-, linoleyl- or stearyl-sarcosine; linoleyl, myristyl-, or cetyl-betaine; lauroamidopropyl-, cocamidopropyl-, linoleamidopropyl-, myristamidopropyl-, palmidopropyl-, or isostearamidopropyl-betaine (e.g., lauroamidopropyl); myristamidopropyl-, palmidopropyl-, or isostearamidopropyl-dimethylamine: sodium methyl cocoyl-, or disodium methyl ofeyl-taurate; and the MONAQUAT™ series (Mona Industries, Inc., Paterson, N.J.), polyethyl glycol, polypropyl glycol, and copolymers of ethylene and propylene glycol (e.g., Pluronics, PF68 etc). Exemplary amounts of surfactant that may be present in the pre-lyophilized formulation are from about 0.001-0.5%. High molecular weight structural additives (e.g., fillers, binders) may include for example, acacia, albumin, alginic acid, calcium phosphate (dibasic), cellulose, carboxymethylcellulose, carboxymethylcellulose sodium, hydroxyethylcellulose, hydroxypropylcellulose, hydroxy propylmethylcellulose, microcrystalline cellulose, dextran, dextrin, dextrates, sucrose, tylose, pregelatinized starch, calcium sulfate, amylose, glycine, bentonite, maltose, sorbitol, ethylcellulose, disodium hydrogen phosphate, disodium phosphate, disodium pyrosulfite, polyvinyl alcohol, gelatin, glucose, guar gum, liquid glucose, compressible sugar, magnesium aluminum silicate, maltodextrin, polyethylene oxide, polymethacrylates, povidone, sodium alginate, tragacanth microcrystalline cellulose, starch, and zein. Exemplary concentrations of high molecular weight structural additives are from 0.1% to 10% by weight. In other embodiments, a bulking agent (e.g., mannitol, glycine) may be included.

Compositions may be suitable for parenteral administration. Exemplary compositions are suitable for injection or infusion into an animal by any route available to the skilled worker, such as intraarticular, subcutaneous, intravenous, intramuscular, intraperitoneal, intracerebral (intraparenchymal), intracerebroventricular, intramuscular, intraocular, intraarterial, or intralesional routes. A parenteral formulation typically will be a sterile, pyrogen-free, isotonic aqueous solution, optionally containing pharmaceutically acceptable preservatives.

Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media Parenteral vehicles include sodium chloride solution, Ringers' dextrose, dextrose and sodium chloride, lactated Ringer's, or fixed oils. Intravenous vehicles include fluid and nutrient replenishes, electrolyte replenishes, such as those based on Ringer's dextrose, and the like. Preservatives and other additives may also be present, such as, for example, anti-microbials, antioxidants, chelating agents, inert gases and the like. See generally. Remington's Pharmaceutical Science, 16th Ed., Mack Eds., 1980.

Pharmaceutical compositions described herein may be formulated for controlled or sustained delivery in a manner that provides local concentration of the product (e.g., bolus, depot effect) and/or increased stability or half-life in a particular local environment. The compositions may comprise the formulation of antibody drug conjugates disclosed herein with particulate preparations of polymeric compounds such as polylactic acid, polyglycolic acid, etc., as well as agents such as a biodegradable matrix, injectable microspheres, microcapsular particles, microcapsules, bio-erodible particles beads, liposomes, and implantable delivery devices that provide for the controlled or sustained release of the active agent which then may be delivered as a depot injection. Techniques for formulating such sustained- or controlled-delivery means are known and a variety of polymers have been developed and used for the controlled release and delivery of drugs. Such polymers are typically biodegradable and biocompatible. Polymer hydrogels, including those formed by complexation of enantiomeric polymer or polypeptide segments, and hydrogels with temperature or pH sensitive properties, may be desirable for providing drug depot effect because of the mild and aqueous conditions involved in trapping bioactive protein agents (e.g., antibodies comprising an ultralong CDR3). See, for example, the description of controlled release porous polymeric microparticles for the delivery of pharmaceutical compositions in WO 93/15722. Suitable materials for this purpose include polylactides (see, e.g., U.S. Pat. No. 3,773, 919), polymers of poly-(a-hydroxycarboxylic acids), such as poly-D-(−)-3-hydroxybutyric acid (EP 133,988A), copolymers of L-glutamic acid and gamma ethyl-L-glutamate (Sidman et al., Biopolymers, 22: 547-556 (1983)), poly (2-hydroxyethyl-methacrylate) (Langer et al., J. Biomed. Mater. Res., 15: 167-277 (1981), and Langer, Chem. Tech., 12: 98-105 (1982)), ethylene vinyl acetate, or poly-D(−)-3-hydroxybutyric acid. Other biodegradable polymers include poly(lactones), poly(acetals), poly(orthoesters), and poly (orthocarbonates). Sustained-release compositions also may include liposomes, which may be prepared by any of several methods known in the art (see, e.g., Eppstein et al., Proc. Natl. Acad. Sci. USA, 82: 3688-92 (1985)). The carrier itself, or its degradation products, should be nontoxic in the target tissue and should not further aggravate the condition. This may be determined by routine screening in animal models of the target disorder or, if such models are unavailable, in normal animals. Microencapsulation of recombinant proteins for sustained release has been performed successfully with human growth hormone (rhGH), interferon- (rhIFN−), interleukin-2, and MN rgp120. Johnson et al., Nat. Med., 2:795-799 (1996); Yasuda, Biomed. Ther., 27:1221- 1223 (1993): Hora et al., Bio/Technology. 8:755-758 (1990); Cleland, "Design and Production of Single Immunization Vaccines Using Poly lactide Poly glycolide Microsphere Systems," in Vaccine Design: The Subunit and Adjuvant Approach, Powell and Newman, eds, (Plenum Press: New York, 1995), pp. 439-462; WO 97/03692, WO 96/40072, WO 96/07399; and U.S. Pat. No. 5,654,010. The sustained-release formulations of these proteins were developed using poly-lactic-coglycolic acid (PLGA) polymer due to its biocompatibility and wide range of biodegradable properties. The degradation products of PLGA, lactic and glycolic acids may be cleared quickly within the human body. Moreover, the degradability of this polymer may be depending on its molecular weight and composition. Lewis, "Controlled release of bioactive agents from lactide/glycolide polymer," in: M. Chasin and R. Langer (Eds.), Biodegradable Polymers as Drug Delivery Systems (Marcel Dekker: New York, 1990). pp. 1-41. Additional examples of sustained release compositions include, for example, EP 58,481A, U.S. Pat. No. 3,887,699, EP 158,277A, Canadian Patent No. 1176565, U. Sidman et al., Biopolymers 22, 547 [1983], R. Langer et al., Chem. Tech. 12, 98 [1982], Sinha et al., J. Control. Release 90, 261 [2003], Zhu et al., Nat. Biotechnol. 18, 24 [2000], and Dai et al., Colloids Surf B Biointerfaces 41, 117 [2005].

Bioadhesive polymers are also contemplated for use in or with compositions of the present disclosure. Bioadhesives are synthetic and naturally occurring materials able to adhere to biological substrates for extended time periods. For example, Carbopol and polycarbophil are both synthetic cross-linked derivatives of poly(acrylic acid). Bioadhesive delivery systems based on naturally occurring substances include for example hyaluronic acid, also known as hyaluronan. Hyaluronic acid is a naturally occurring mucopolysaccharide consisting of residues of D-glucuronic and N-acetyl-D-glucosamine. Hyaluronic acid is found in the extracellular tissue matrix of vertebrates, including in connective tissues, as well as in synovial fluid and in the vitreous and aqueous humor of the eye. Esterified derivatives of hyaluronic acid have been used to produce microspheres for use in delivery that are biocompatible and biodegradable (see, for example, Cortivo et al., Biomaterials (1991) 12:727-730; EP 517,565; WO 96/29998; Ilium et al., J. Controlled Rel. (1994) 29:133-141).

Both biodegradable and non-biodegradable polymeric matrices may be used to deliver compositions of the present disclosure, and such polymeric matrices may comprise natural or synthetic polymers. Biodegradable matrices are preferred. The period of time over which release occurs is based on selection of the polymer. Typically, release over a period ranging from between a few hours and three to twelve months is most desirable. Exemplary synthetic polymers which may be used to form the biodegradable delivery system include: polymers of lactic acid and glycolic acid, polyamides, polycarbonates, polyalkylenes, polyalkylene glycols, polyalkylene oxides, polyalkylene terepthalates, polyvinyl alcohols, polyvinyl ethers, polyvinyl esters, polyvinyl halides, polyvinylpyrrolidone, polyglycolides, polysiloxanes, polyanhydrides, polyurethanes and co-polymers thereof, poly(butic acid), poly(valeric acid), alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxypropyl methyl cellulose, hydroxybutyl methyl cellulose, cellulose acetate, cellulose propionate, cellulose acetate buty rate, cellulose acetate phthalate, carboxylethyl cellulose, cellulose triacetate, cellulose sulphate sodium salt, poly(methyl methacrylate), poly(ethyl methacrylate), poly (butylmethacrylate), poly(isobutyl methacrylate), poly(hexylmethacrylate), poly(isodecyl methacrylate), poly(lauryl methacrylate), poly(phenyl methacrylate), poly(methyl acrylate), poly(isopropyl acrylate), poly(isobutyl acrylate), poly(octadecyl acrylate), polyethylene, polypropylene, polyethylene glycol), poly(ethylene oxide), poly(ethylene terephthalate), poly(vinyl alcohols), polyvinyl acetate, poly vinyl chloride, polystyrene and polyvinylpyrrolidone. Exemplary natural polymers include alginate and other polysaccharides including dextran and cellulose, collagen, chemical derivatives thereof (substitutions, additions of chemical groups, for example, alkyl, alkyl ene, hydroxylations, oxidations, and other modifications routinely made by those skilled in the art), albumin and other hydrophilic proteins, zein and other prolamines and hydrophobic proteins, copolymers and mixtures thereof, in general, these materials degrade either by enzymatic hydrolysis or exposure to water in vivo, by surface or bulk erosion. The polymer optionally is in the form of a hydrogel (see, for example, WO 04/009664, WO 05/087201, Sawhney, et al., Macromolecules, 1993, 26, 581-587) that can absorb up to about 90% of its weight in water and further, optionally is cross-linked with multi-valent ions or other polymers.

Delivery systems also include non-polymer systems dial are lipids including sterols such as cholesterol, cholesterol esters and fatty acids or neutral fats such as mono-di- and tri-glycerides; hydrogel release systems; silastic systems; peptide based systems; wax coatings; compressed tablets using conventional binders and excipients; partially fused implants; and the like. Specific examples include, but are not limited to: (a) erosional systems in which the product is contained in a form within a matrix such as those described in U.S. Pat. Nos. 4,452,775, 4,675,189 and 5,736,152 and (b) diffusional systems in which a product permeates at a controlled rate from a polymer such as described in U.S. Pat. Nos. 3,854,480, 5,133,974 and 5,407,686. Liposomes containing the product may be prepared by methods known methods, such as for example (DE 3,218,121; Epstein et al., Proc. Natl. Acad. Sci. USA, 82: 3688-3692 (1985); Hwang et al., Proc. Natl. Acad. Sci. USA, 77: 4030-4034 (1980); EP 52,322; EP 36,676; EP 88,046; EP 143,949; EP 142,641; JP 83-118008; U.S. Pat. Nos. 4,485,045 and 4,544,545; and EP 102,324).

Alternatively or additionally, the compositions may be administered locally via implantation into the affected area of a membrane, sponge, or other appropriate material on to which an antibody drug conjugate disclosed herein has been absorbed or encapsulated. Where an implantation device is used, the device may be implanted into any suitable tissue or organ, and delivery of an antibody drug conjugate disclosed herein may be directly through the device via bolus, or via continuous administration, or via catheter using continuous infusion.

A pharmaceutical composition comprising an antibody drug conjugate disclosed herein may be formulated for inhalation, such as for example, as a dry powder. Inhalation solutions also may be formulated in a liquefied propellant for aerosol delivery. In yet another formulation, solutions may be nebulized. Additional pharmaceutical composition for pulmonary administration include, those described, for example, in WO 94/20069, which discloses pulmonary delivery of chemically modified proteins. For pulmonary delivery, the particle size should be suitable for delivery to the distal lung. For example, the particle size may be from 1 µm to 5 µm; however, larger particles may be used, for example, if each particle is fairly porous.

Certain formulations containing an antibody drug conjugate disclosed herein may be administered orally. Formulations administered in this fashion may be formulated with or without those carriers customarily used in the compounding of solid dosage forms such as tablets and capsules. For example, a capsule may be designed to release the active portion of the formulation at the point in the gastrointestinal tract when bioavailability is maximized and pre-systemic degradation is minimized. Additional agents may be included to facilitate absorption of a selective binding agent. Diluents, flavorings, low melting point waxes, vegetable oils, lubricants, suspending agents, tablet disintegrating agents, and binders also may be employed.

Another preparation may involve an effective quantity of an antibody drug conjugate disclosed herein in a mixture with non-toxic excipients which are suitable for the manufacture of tablets. By dissolving the tablets in sterile water, or another appropriate vehicle, solutions may be prepared in unit dose form. Suitable excipients include, but are not limited to, inert diluents, such as calcium carbonate, sodium carbonate or bicarbonate, lactose, or calcium phosphate; or binding agents, such as starch, gelatin, or acacia; or lubricating agents such as magnesium stearate, stearic acid, or talc.

Suitable and/or preferred pharmaceutical formulations may be determined in view of the present disclosure and general knowledge of formulation technology, depending upon the intended route of administration, delivery format, and desired dosage. Regardless of the manner of administration, an effective dose may be calculated according to patient body w eight, body surface area, or organ size. Further refinement of the calculations for determining the appropriate dosage for treatment involving each of the formulations described herein are routinely made in the art and is within the ambit of tasks routinely performed in the art. Appropriate dosages may be ascertained through use of appropriate dose-response data.

VIII. Combination with an Antibody-Drug Conjugate

In some embodiments are provided a composition comprising a conjugate of this disclosure combined with an antibody-drug conjugate. The antibody-drug conjugate, in some embodiments, comprises a TM4SF1 binding protein, such as an anti-TM4SF1 antibody or an antigen binding fragment thereof. The TM4SF1 binding protein can be as described in any of the above embodiments, and the ADC comprises one or more agents (e.g., 1, 2, 3, or 4 or more agents), such as therapeutic agents, that act additively or synergistically with the TM4SF1 binding protein, for example, to kill or inhibit tumor cells (TCs) and/or tumor vasculature endothelial cells (ECs) in the treatment of a disorder associated with pathological angiogenesis, such as cancer. The therapeutic agent, for example, can be a biologically active moiety, such as a cytotoxic agent, a chemotherapeutic agent, a protein, a peptide, an antibody, a growth inhibitory agent, an anti-hormonal agent, or any combinations thereof.

Examples of tubulin inhibitors that can be conjugated, either directly or indirectly, to the TM4SF1 binding protein of the ADC, includes, without limitation, polymerization inhibitors (e.g., vinblastine, vincristine, vinorelbine, vinflunine, cryptophycin 52, hallchondrins, dolastatins, hemiasterlins that can bind to the vinca domain of tubulin; colchine, combretastatins, 2-methoxy-estradiol, E7010 that can bind to the cholchicine domain of tubulin; depolymerization inhibitors, such as paclitaxel, docetaxel, epothilon, discodermolide that can bind to the taxane site).

Examples of chemotherapeutic agents that can be conjugated, either directly or indirectly, to the TM4SF1 binding protein of the ADC, include, but are not limited to, methotrexate, adriamicin, vinca alkaloids (vincristine, vinblastine, etoposide), doxorubicin, melphalan, mitomycin C, chlorambucil, daunorubicin or other intercalating agents; enzymes and fragments thereof such as nucleolytic enzymes, antibiotics, and toxins such as small molecule toxins or enzymatically active toxins of bacterial, fungal, plant or animal origin, including fragments and/or variants thereof. Enzymatically active toxins and fragments thereof that can be used include diphtheria A chain, nonbinding active fragments of diphtheria toxin, exotoxin A chain (from *Pseudomonas aeruginosa*), ricin A chain, abrin A chain, modeccin A chain, alpha-sarcin, *Aleurites fordii* proteins, dianthin proteins, *Phytolaca americana* proteins (PAPI, PAPII, and PAP-S), *Momordica charantia* inhibitor, curcin, crotin, *Sapaonaria officinalis* inhibitor, gelonin, mitogellin, restrictocin, phenomycin, enomycin, and the tricothecenes.

In addition, a variety of radionuclides can be used for conjugation to the TM4SF1 binding protein of the ADC. Examples include At211, I131, I125, Y90, Re186, Sm153, Bi212, P32, and radioactive isotopes of Lu. Alternatively, the TM4SF1 binding proteins of the ADC can be conjugated to one or smaller molecule toxins, such as a calicheamicin, maytansinoids, dolastatins, aurostatins, a trichothecene, and CC1065, and the derivatives of these toxins that have toxin activity, are also contemplated herein. Other therapeutic agents that can be conjugated to TM4SF1 binding protein of the ADC include, in various examples, BCNU, streptozoicin, vincristine and 5-fluorouracil etc.

The diagnostic agent for conjugation, in some embodiments, is a label, such as a fluorescent label, a chromogenic label, or a radiolabel. Accordingly, the label may be used for detection purposes, and may be a fluorescent compound, an enzyme, a prosthetic group, a luminescent material, a bioluminescent material, or a radioactive material. The radiolabel, for example, may comprise a radioactive atom for scintigraphic studies, for example Tc99m or I123, or a spin label for nuclear magnetic resonance (NMR) imaging (also known as magnetic resonance imaging, MRI), such as iodine-123 again, iodine-131, indium-111, fluorine-19, carbon-13, nitrogen-15, oxygen-17, gadolinium, manganese or iron.

The one or more agents (e.g., therapeutic agents and/or diagnostic agents) may be directly conjugated to a TM4SF1 binding protein of the ADC (e.g., by way of a direct covalent or non-covalent interaction), such that the agent is immediately conjugated to the protein. An agent may be directly conjugated to a binding protein of the disclosure, for example, by a direct peptide bond. In other instances, the direct conjugation is by way of a direct non-covalent interaction, such as an interaction between the TM4SF1 binding protein of the ADC and an agent that specifically binds to the TM4SF1 binding protein (e.g., an antibody agent).

IX. Polynucleotides

Also provided, in some embodiments, are polynucleotides encoding a TM4SF1 binding protein as described herein, such as an anti-TM4SF1 antibody or an antigen binding fragment thereof. In some embodiments, the polynucleotide molecules are provided as a DNA construct. In other embodiments, the polynucleotide molecules are provided as a messenger RNA transcript.

In some examples, an anti-TM4SF1 antibody of the present disclosure comprises a heavy chain variable domain encoded by a nucleic acid sequence as set forth in any one of SEQ ID NOs: 4, 16, 28, 40, 52, 64, or 76. In some examples, an anti-TM4SF1 antibody of the present disclosure comprises a light chain variable domain encoded by a nucleic acid sequence as set forth in any one of SEQ ID NOs: 10, 22, 34, 46, 58, 70, or 82.

In some embodiments are provided nucleic acid sequences that are codon optimized for expression in a host cell, e.g., a bacterium, such as *E. coli*, or a eukaryotic cell, such as a CHO cell. In some examples, the nucleic acid sequences are codon optimized for expression in CHO cells. In some examples, an anti-TM4SF1 antibody of the present disclosure comprises a heavy chain variable domain encoded by a codon optimized nucleic acid sequence as set forth in any-one of SEQ ID NOs: 5, 17, 29, 41, 53, 65, or 77. In some examples, an anti-TM4SF1 antibody of the present disclosure comprises a light chain variable domain encoded by a codon optimized nucleic acid sequence as set forth in any one of SEQ ID NOs: 11, 23, 35, 47, 59, 71, or 83. In certain instances, the nucleic acid sequence of any one of SEQ ID NOs: 5, 17, 29, 41, 53, 65, or 77 is a nucleic acid sequence codon optimized for expression in CHO cell. In certain instances, the nucleic acid sequence of any one of SEQ ID NOs: 11, 23, 35, 47, 59, 71, or 83 is a nucleic acid sequence codon optimized for expression in CHO cell.

The polynucleotide molecules are constructed by known methods such as by incorporating the genes encoding the binding proteins into a genetic construct linked to a suitable promoter, and optionally a suitable transcription terminator, and expressing it in bacteria or other appropriate expression system such as, for example CHO cells. Depending on the vector system and host utilized, any number of suitable transcription and translation elements, including constitutive and inducible promoters, may be used. The promoter is selected such that it drives the expression of the polynucleotide in the respective host cell.

In some embodiments, a polynucleotide as described herein is inserted into a vector, preferably an expression vector, which represents a further embodiment. This recombinant vector can be constructed according to known methods. Vectors of particular interest include plasmids, phagemids, phage derivatives, virii (e.g., retroviruses, adenoviruses, adeno-associated viruses, herpes viruses, lentiviruses, and the like), and cosmids.

A variety of expression vector/host systems may be utilized to contain and express the polynucleotide encoding the polypeptide of the described TM4SF1 binding protein. Examples of expression vectors for expression in E. coli are pSKK (Le Gall et al., J Immunol Methods. (2004) 285(1):111-27) or pcDNA5 (Invitrogen) for expression in mammalian cells.

Thus, the TM4SF1 binding proteins as described herein, in some embodiments, are produced by introducing a vector encoding the protein as described above into a host cell and culturing said host cell under conditions whereby the protein domains are expressed, may be isolated and, optionally, further purified.

X. Methods of Treatment

The disclosure further provides a method for inhibiting cell-cell interactions that are endothelial cell (EC) specific, for example, but not limited to EC-EC, EC-mesenchymal stem cell, EC-fibroblast, EC-smooth muscle cell, EC-tumor cell, EC-leukocyte, EC-adipose cell and EC-neuronal cell interactions. In certain embodiments, the anti-TM4SF1 antibody-oligonucleotide conjugates of this disclosure, can be used to treat any human disease or disorder with a pathology that is characterized by abnormal EC-cell interactions. In certain embodiments, the EC-cell interaction is an EC-leukocyte interaction, where inhibition of the EC-leukocyte interaction is used to prevent inflammation. In some embodiments, the EC-cell interatioc is an EC-tumor cell interaction, where inhibition of the EC-tumor cell interaction is used to prevent, treat, and/or slow down the progression of cancer.

In other embodiments, the disclosure features a method of treating or preventing a disease or disorder in a subject, wherein the disease or disorder is characterized by abnormal endothelial cell (EC)-cell interactions, said method comprising administering the antibody, or antigen binding fragment thereof, as described herein. In certain embodiments, the EC-cell interactions include one or more of EC-mesenchymal stem cell, EC-fibroblast, EC-smooth muscle cell, EC-tumor cell, EC-leukocyte, EC-adipose cell and EC-neuronal cell interactions. In exemplary embodiments, the disease is an inflammatory disease or disorder, and the antibodies and fragments of the disclosure are used to inhibit EC-leukocyte interactions. In another exemplary embodiment, the disease or disorder is selected from an inflammatory disease or cancer. The adhesion of leukocytes to vascular endothelium is a hallmark of the inflammatory process. Accordingly, in one embodiment, an antibody-RNA conjugate comprising an anti-TM4SF1 antibody, or an antigen binding fragment thereof, conjugated to an RNA molecule, of the present disclosure is used to treat an inflammatory disease in which inhibiting leukocyte attachment to endothelial cells, or leukocyte transmigration across the endothelium is helpful for treatment (see, e.g. Rychly et al., Curr Pharm Des. 2006; 12(29):3799-806, incorporated by reference in its entirety herein). Examples include, but are not limited to, sepsis, inflammatory bowel disease, psoriasis or multiple sclerosis.

Each year approximately half a million patients the from cancer in the United States alone. Tumor metastasis is responsible for ~90% of these deaths. No therapy that blocks metastasis is known. The present disclosure provides antibody-RNA conjugates comprising anti-TM4SF1 antibodies, and antigen binding fragments thereof, conjugated to an RNA molecule, that can treat cancer and inhibit metastatic cells based on immunoblockade of tumor cell (TC)-endothelial cell (EC) interactions mediated by a novel target, TM4SF1.

As described above, TM4SF1 is a small, tetraspanin-like, cell surface glycoprotein originally discovered as a TC antigen with roles in TC invasion and metastasis. TM4SF1 is selectively expressed by TCs and ECs. TM4SF1 is expressed at low levels on the vascular ECs supplying normal tissues in both mice and humans. It has been shown that TM4SF1 is expressed at ~10-20 fold higher levels on the vascular ECs lining the blood vessels supplying many human cancers, and at equivalent high levels on cultured ECs. TM4SF1-enriched microdomains (TMED) recruit cell surface proteins like integrins to assist the formation of nanopodia, thin membrane channels that extend from the cell surface and mediate cell-cell interactions. Thus, in certain instances, anti-TM4SF1 antibodies and fragments described herein interfere with nanopodia-mediated interactions and inhibit TC interactions with EC that are necessary for TC extravasation.

Any one of the TM4SF1 binding proteins, antibody-oligonucleotide conjugates, or pharmaceutical compositions described herein may be formulated for treating a subject (e.g., a human) having a disorder associated with pathological angiogenesis (e.g., cancer, such as breast cancer, ovarian cancer, renal cancer, colorectal cancer, liver cancer, gastric cancer, melanoma, multiple myeloma, leukemia, lymphoma, prostate cancer, colon cancer, neuroblastoma, glioma, glioblastoma, sarcoma, mesothelioma, retinoblastoma, thyroid cancer, pancreatic cancer, carcinoid, head and neck cancer, stomach cancer, urothelial cancer, testis cancer, endometrial cancer, cervical cancer, skin cancer, bladder cancer, pituitary cancer, pheochromocytoma, esophageal cancer, and lung cancer; obesity; macular degeneration; diabetic retinopathy; psoriasis; rheumatoid arthritis; cellular immunity; and rosacea. In some embodiments the lymphoma is B-cell lymphoma or Burkitt's lymphoma. In some embodiments, the skin cancer is Merkel cell skin cancer or Merkel cell carcinoma. In some embodiments, the lung cancer is non-small cell lung cancer or lung adenocarcinoma. In some embodiments, the sarcoma is a pediatric rhabdomyiosarcoma, soft tissue sarcoma osteosarcoma pleomorphic sarcoma, leiomyosarcoma liposarcoma Ewing's sarcoma or synovial sarcoma.

TM4SF1 is highly expressed on the surface of most epithelial TCs, and, is also highly expressed on the EC lining tumor blood vessels and on cultured EC. It is expressed at ~10-20 fold lower levels on the surface of normal vascular ECs. In mouse models, tumor metastasis to lungs is related to TM4SF1 expression on both ECs and TCs. Metastasis requires initial attachment of TC to vascular EC and their subsequent migration across ECs to enter the lung or other metastatic sites. The examples below show that, in some instances, the anti-TM4SF1 antibodies, or antibody-oligonucleotide conjugates of the present disclosure interfere with TC-EC interactions in culture and can also inhibit tumor metastasis in vivo.

Thus, the antibodies and fragments of the present disclosure and the antibody-oligonucleotide conjugates comprising the same can be used to block one or both of the earliest steps in metastasis (see FIG. 1), namely, TC attachment to vascular ECs and/or transmigration of TCs across ECs, and thereby prevent or substantially reduce the number of metastases in at risk cancer patients.

The present disclosure further provides a method for preventing metastasis. Human tumors typically shed TCs into the blood and lymphatics at early stages of growth; hence, early treatment of primary tumors provides no guarantee that metastasis has not already taken place. Thus, immunoblockade of TM4SF1 can be used to treat or prevent hematogenous metastases or to treat or prevent lymphatic metastases.

The methods of this disclosure are, in some embodiments, directed to inhibiting metastatic cells in a subject. In one embodiment, the subject has a cancer, e.g., a cancer that is associated with metastasis or a cancer that has already metastasized. In other embodiments, the subject was already treated for cancer and is in remission or partial remission, wherein the benefits of administering the anti-TM4SF1 antibodies or fragments described herein are that they work to prevent metastasis and maintain remission or partial remission.

In certain embodiments, the disclosure provides a method of treating a person having a greater risk of developing metastasis, wherein administration of the anti-TM4SF1 antibody-oligonucleotide conjugates (such as anti-TM4SF1 anti body-RNA conjugates) and fragments described herein can be used to inhibit or delay onset of metastasis.

Included in the disclosure is a method of blocking tumor metastasis, particularly metastasis to the lung, by administering an anti-TM4SF1 antibody-oligonucleotide (such as an anti-TM4SF1 antibody-RNA conjugate) to a subject in need thereof. In some examples, the anti-TM4SF1 antibody-oligonucleotide conjugate (such as an anti-TM4SF1 antibody-RNA conjugate) comprises a human anti-TM4SF1 antibody, also referred to herein as anti-hTM4SF1. In certain embodiments, the methods include administration of an effective amount of an anti-hTM4SF1 antibody-oligonucleotide (such as an anti-TM4SF1 antibody-RNA conjugate) to a subject in need thereof, wherein the effective amount of the antibody prevents tumor cell (TC) attachment to and migration across vascular endothelial cells (ECs).

In certain embodiments, a conjugate of this disclosure, such as an anti-TM4SF1 antibody-RNA conjugate is administered to a subject having cancer or at risk of having metastasis such that the dose amount and frequency maintains long term TM4SF1 immunoblockade. The dosing regimen will maximally inhibit TM4SF1-mediated metastasis by administering a conjugate such as an anti-TM4SF1 antibody-RNA conjugate to a subject in an amount sufficient to saturate TM4SF1 expressed on normal vascular ECs of the subject.

In certain embodiments, the effective amount of a conjugate such as an anti-TM4SF1 antibody-RNA conjugate, or an antigen binding fragment thereof conjugated to an RNA molecule, that is administered is an amount sufficient to, at one week, achieve circulating antibody concentrations >1 µg/ml.

In certain embodiments, the effective amount of a conjugate such as an anti-TM4SF1 antibody-RNA conjugate, or an antigen binding fragment thereof conjugated to an RNA molecule that is administered is an amount sufficient to maintain serum concentrations of the antibody at or above 1 µg/ml continuously for about 1 month.

In one embodiment, the disclosure provides a method of treating or preventing metastasis in a human subject comprising administering to the subject an effective amount of an anti-TM4SF1 antibody conjugate, or an antigen binding fragment thereof conjugated to an RNA molecule, wherein the effective amount of the antibody-RNA conjugate, or antigen binding fragment thereof, comprises 1 to 80 mg/kg of the amount of the antibody conjugate, or antigen binding fragment thereof.

The present disclosure further provides a method of treating or preventing an infectious disease in a human subject comprising administering to the subject an effective amount of a conjugate of this disclosure, such as an anti-TM4SF1 antibody-mRNA conjugate. In some embodiments, the anti-TM4SF1 antibody-mRNA conjugate is a prophylactic vaccine that prevents an infectious disease. In some embodiments, the mRNA of the anti-TM4SF1 antibody-mRNA conjugate translates into a viral protein in order to mimic a native miral infection and elicit an immune response. In some embodiments, the mRNA of the anti-TM4SF1 antibody-mRNA conjugate translates into a cytomegalovirus (CMV) protein, a human metapneumovirus (HMPV) protein, a parainfluenza virus 3 (PIV3) protein, an influenza protein, a Zika virus protein, or a Chikungunya virus (CHIKV) protein. In some embodiments, the influenza protein is a hemagglutinin 10 (H10) protein or an H7 protein. In some embodiments, the infectious disease is CMV, HPMV, PIV3, influenza, Zika virus, or Chikungunya virus.

In one embodiment, the present disclosure further provides a method of treating or preventing a cardiovascular disease in a human subject comprising administering to the subject an effective amount of a conjugate of this disclosure, such as an anti-TM4SF1 antibody-mRNA conjugate. In some embodiments, the mRNA of the anti-TM4SF1 antibody-mRNA conjugate translates into vascular endothelial growth factor (VEGF). In some embodiments, the anti-TM4SF1 antibody-mRNA encoding VEGF leads to generation of blood vessels and improves blood supply.

In certain embodiments, the present disclosure further provides a method of treating or preventing a cystic fibrosis in a human subject comprising administering to the subject an effective amount of an anti-TM4SF1 antibody-mRNA conjugate. In some embodiments, the mRNA of the anti-TM4SF1 antibody-mRNA conjugate translates into a cystic fibrosis transmembrane conductance regulator (CFTR) protein. In cystic fibrosis, there is a deficiency of CFTR protein due to a mutation that causes abnormal folding and a resulting quick degradation. In some embodiments, the anti-TM4SF1 antibody-mRNA conjugate provides functional expression of the CFTR protein.

The mode of administration for therapeutic use of the conjugate of this disclosure, such as the antibody-RNA conjugates of the disclosure may be any suitable route that delivers the antibody to the host, such as parenteral administration, e.g., intradermal, intramuscular, intraperitoneal, intravenous or subcutaneous, pulmonary, transmucosal (oral, intranasal, intravaginal, rectal), using a formulation in a tablet, capsule, solution, powder, gel, particle; and contained in a syringe, an implanted device, osmotic pump, cartridge, micropump; or other means appreciated by the skilled artisan, as well known in the art. Site specific administration may be achieved by for example intrarticular, intrabronchial, intraabdominal, intracapsular, intracartilaginous, intracavitary, intracelial, intracerebellar, intracerebroventricular, intracolic, intracervical, intragastric, intrahepatic, intracardial, intraosteal, intrapelvic, intrapericardiac, intrapentoneal, intrapleural, intraprostatic, intrapulmonary, intrarectal, intrarenal, intraretinal, intraspinal, intrasynovial, intrathoracic, intrauterine, intravascular, intravesical, intralesional, vaginal, rectal, buccal, sublingual, intranasal, or transdermal delivery.

In some embodiments, the conjugates of this disclosure, such as the antibody-RNA conjugates of the disclosure may be administered to a subject by any suitable route, for example parentally by intravenous (i.v.) infusion or bolus injection, intramuscularly or subcutaneously or intraperitoneally, i.v. infusion may be given over for example 15, 30, 60, 90, 120, 180, or 240 minutes, or from 1, 2, 3, 4, 5, 6, 7, 8, 9, 10, 11 or 12 hours. The dose given to a subject in some embodiments is about 0.005 mg to about 100 mg/kg, e.g., about 0.05 mg to about 30 mg/kg or about 5 mg to about 25 mg/kg, or about 4 mg/kg, about 8 mg/kg, about 16 mg/kg or about 24 mg/kg, or for example about 0.1, 0.2, 0.3, 0.4, 0.5, 0.6, 0.7, 0.8, 0.9, 1, 2, 3, 4, 5, 6, 7, 8, 9 or 10 mg/kg. In certain embodiments, the dose given to a subject is, for example about 15, 16, 17, 18, 19, 20, 21, 22, 23, 24, 25, 30, 40, 50, 60, 70, 80, 90 or 100 mg/kg. In some instances, the dose of the antibody-RNA conjugates of the disclosure given to a subject may be about 0.1 mg/kg to 10 mg/kg via intravenous administration. In some instances, the dose of the conjugates of this disclosure, such as the antibody-RNA conjugates of the disclosure given to a subject is about 0.1 mg/kg to 10 mg/kg via subcutaneous administration. In some instances, the dose of the conjugates of this disclosure, such as the antibody-RNA conjugates of the disclosure given to a subject is about 0.1 mg/kg via intravenous administration. In some instances, the dose of the conjugates of this disclosure, such as the antibody-RNA conjugates of the disclosure given to a subject is about 0.1 mg/kg via subcutaneous administration. In some embodiments, the dose of the conjugates of this disclosure, such as the antibody-RNA conjugates of the disclosure given to a subject is about 0.3 mg/kg via intravenous administration. In some examples, the dose of the conjugates of this disclosure, such as the antibody-RNA conjugates of the disclosure given to a subject is about 0.3 mg/kg via subcutaneous administration. In some examples, the dose of the conjugates of this disclosure, such as the antibody-RNA conjugates of the disclosure given to a subject is about 1.0 mg/kg via intravenous administration. In some examples, the dose of the conjugates of this disclosure, such as the antibody-RNA conjugates of the disclosure given to a subject is about 1.0 mg/kg via subcutaneous administration. In some examples, the dose of the conjugates of this disclosure, such as the antibody-RNA conjugates of the disclosure given to a subject is about 3.0 mg/kg via intravenous administration. In some examples, the dose of the conjugates of this disclosure, such as the antibody-RN A conjugates of the disclosure given to a subject is about 3.0 mg/kg via subcutaneous administration. In some examples, the dose of the conjugates of this disclosure, such as the antibody-RN A conjugates of the disclosure given to a subject may be about 10.0 mg/kg via intravenous administration. In some examples, the dose of the conjugates of this disclosure, such as the antibody-RNA conjugates of the disclosure given to a subject is about 10.0 mg/kg via subcutaneous administration.

In certain embodiments, a fixed unit dose of the conjugates of this disclosure, such as the antibody-RNA conjugates of the disclosure is given, for example, 50, 100, 200, 500 or 1000 mg, or the dose may be based on the patient's surface area, e.g., 500, 400, 300, 250, 200, or 100 mg/m2. In some instances, between 1 and 8 doses, (e.g., 1, 2, 3, 4, 5, 6, 7 or 8) is administered to treat the patient, but 9, 10, 11, 12, 13, 14, 15, 16, 17, 18, 19, 20 or more doses are given.

The administration of the conjugates of this disclosure, such as the antibody-RNA conjugates of the disclosure described herein, in some embodiments, is repeated after one day, two days, three days, four day s, five days, six day s, one week, two weeks, three weeks, one month, five weeks, six weeks, seven weeks, two months, three months, four months, five months, six months or longer. Repealed courses of treatment are also possible, as is chronic administration. The repeated administration is at the same dose or at a different dose. In some examples, the conjugates of this disclosure, such as the antibody-RNA conjugates of the disclosure described herein is administered at 8 mg/kg or at 16 mg/kg at weekly interval for 8 weeks, followed by administration at 8 mg/kg or at 16 mg/kg every two weeks for an additional 16 weeks, followed by administration at 8 mg/kg or at 16 mg/kg every four weeks by intravenous infusion. Alternatively, in some embodiments, the conjugates of this disclosure, such as the antibody-RNA conjugates of the disclosure described herein are administered at between 0.1 mg/kg to about 10 mg/kg at weekly interval for 17 weeks. For example, in some cases the antibodies of the disclosure are provided as a daily dosage in an amount of about 0.1-100 mg/kg, such as 0.5, 0.9, 1.0, 1.1, 1.5, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 45, 50, 60, 70, 80, 90 or 100 mg/kg, per day, on at least one of day 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or alternatively, at least one of week 1, 2, 3, 4, 5, 6, 7, 8, 9, 10, 11, 12, 13, 14, 15, 16, 17, 18, 19 or 20 after initiation of treatment, or any combination thereof, using single or divided doses of every 24, 12, 8, 6, 4, or 2 hours, or any combination thereof. In some embodiments, the conjugates of this disclosure, such as the antibody-RNA conjugates of the disclosure described herein is administered prophylactically in order to reduce the risk of dev eloping an inflammatory disease such as RA, psoriatic arthritis or psoriasis, delay the onset of the occurrence of an event in progression of the inflammatory disease such as RA, psoriatic arthritis or psoriasis. In some examples, the conjugates of this disclosure, such as the antibody-RNA conjugates of the disclosure is lyophilized for storage and reconstituted in a suitable carrier prior to use. In some cases, the conjugates of this disclosure, such as the antibody-RNA conjugates of the disclosure are supplied as a sterile, frozen liquid in a glass vial with stopper and aluminum seal with flip-off cap. In some examples, each vial contains 3.3 mL of a 50 mg/mL solution of the antibody-RNA conjugate (including a 10% overfill) in a formulation of 10 mM histidine, 8.5% (w/v) sucrose, and 0.04% (w/v) Polysorbate 80 at pH 5.8. In some examples, the vials contain no preservatives and are for single use. Vials may be stored frozen and protected from light. To prepare the antibody-RNA conjugate for IV administration, the conjugates of this disclosure, such as the antibody-RNA conjugate formulations, in some examples, are filtered with a 0.22 micron filter before being diluted in sterile diluent. In some examples, diluted conjugates of this disclosure, such as diluted antibody-RNA conjugates at volumes up to approximately 100 mL is administered by IV infusion over a period of at least 30 minutes using an in-line 0.22 micron filter. Alternatively, in some embodiments, the conjugates of this disclosure, such as the antibody-RNA conjugate are administered as 1 or 2 subcutaneous injections of 50 mg/mL antibody-RNA conjugate in about 3.3 mL. The subcutaneous injection site may be, for example, within the abdominal area.

XI. Pharmaceutical Compositions

Any one of the TM4SF1 binding proteins of the disclosure (e.g., anti-TM4SF1 antibodies, or antigen binding fragments thereof) and anti body-oligonucleotide conjugates of this disclosure (such as an anti-TM4SF1 antibody-RNA or DNA conjugate) or polynucleotides encoding the same, can be included in compositions (e.g., pharmaceutical compositions). The pharmaceutical compositions of the disclosure may further include a pharmaceutically acceptable carrier, excipient, or diluent.

The term "pharmaceutical composition" as used herein refers to a composition containing a TM4SF1 binding protein described herein formulated with a pharmaceutically acceptable carrier, and manufactured or sold with the approval of a governmental regulatory agency as part of a therapeutic regimen for the treatment of disease in a mammal. Pharmaceutical compositions can be formulated, for example, for oral administration in unit dosage form (e.g., a tablet, capsule, caplet, gel cap, or syrup); for topical administration (e.g., as a cream, gel, lotion, or ointment); for intravenous administration (e.g., as a sterile solution free of particulate emboli and in a solvent system suitable for intravenous use); or in any other formulation described herein.

The term "pharmaceutically acceptable carrier" as used herein refers to a carrier which is physiologically acceptable to a treated mammal (e.g., a human) while retaining the therapeutic properties of the protein with which it is administered. One exemplary pharmaceutically acceptable carrier is physiological saline. Other physiologically acceptable carriers and their formulations are known to one skilled in the art and described, for example, in Remington's Pharmaceutical Sciences (18th edition, A. Gennaro, 1990, Mack Publishing Company, Easton, Pa.), incorporated herein by reference.

Pharmaceutical compositions containing a TM4SF1 binding protein containing conjugate as described above, are, in some embodiments, prepared as solutions, dispersions in glycerol, liquid polyethylene glycols, and any combinations thereof in oils, in solid dosage forms, as inhalable dosage forms, as intranasal dosage forms, as liposomal formulations, dosage forms comprising nanoparticles, dosage forms comprising microparticles, polymeric dosage forms, or any combinations thereof.

A pharmaceutically acceptable excipient is, in some examples, an excipient described in the Handbook of Pharmaceutical Excipients, American Pharmaceutical Association (1986). Non-limiting examples of suitable excipients include a buffering agent, a preservative, a stabilizer, a binder, a compaction agent, a lubricant, a chelator, a dispersion enhancer, a disintegration agent, a flavoring agent, a sweetener, a coloring agent.

In some embodiments an excipient is a buffering agent. Non-limiting examples of suitable buffering agents include sodium citrate, magnesium carbonate, magnesium bicarbonate, calcium carbonate, and calcium bicarbonate. As a buffering agent, sodium bicarbonate, potassium bicarbonate, magnesium hydroxide, magnesium lactate, magnesium gluconate, aluminium hydroxide, sodium citrate, sodium tartrate, sodium acetate, sodium carbonate, sodium polyphosphate, potassium polyphosphate, sodium pyrophosphate, potassium pyrophosphate, disodium hydrogen phosphate, dipotassium hydrogen phosphate, trisodium phosphate, tripotassium phosphate, potassium metaphosphate, magnesium oxide, magnesium hydroxide, magnesium carbonate, magnesium silicate, calcium acetate, calcium glycerophosphate, calcium chloride, calcium hydroxide and other calcium salts or combinations thereof is used, in some embodiments, in a pharmaceutical composition of the present disclosure.

In some embodiments an excipient comprises a preservative. Non-limiting examples of suitable preservatives include antioxidants, such as alpha-tocopherol and ascorbate, and antimicrobials, such as parabens, chlorobutanol, and phenol. In some examples, antioxidants further include but are not limited to EDTA, citric acid, ascorbic acid, butylated hydroxytoluene (BHT), butylated hydroxy anisole (BHA), sodium sulfite, p-amino benzoic acid, glutathione, propyl gallate, cysteine, methionine, ethanol and N-acetyl cysteine. In some instances preservatives include validamycin A, TL-3, sodium ortho vanadate, sodium fluoride, N-a-tosyl-Phe-chloromethylketone, N-a-tosyl-Lys-chloromethylketone, aprotinin, phenylmethylsulfonyl fluoride, diisopropylfluorophosphate, kinase inhibitor, phosphatase inhibitor, caspase inhibitor, granzyme inhibitor, cell adhesion inhibitor, cell division inhibitor, cell cycle inhibitor, lipid signaling inhibitor, protease inhibitor, reducing agent, alkylating agent, antimicrobial agent, oxidase inhibitor, or other inhibitor.

In some embodiments a pharmaceutical composition as described herein comprises a binder as an excipient. Non-limiting examples of suitable binders include starches, pregelatinized starches, gelatin, polyvinylpyrolidone, cellulose, methylcellulose, sodium carboxymethylcellulose, ethylcellulose, polyacrylamides, polyvinyloxoazolidone, polyvinylalcohols, C12-C18 fatty acid alcohol, polyethylene glycol, polyols, saccharides, oligosaccharides, and combinations thereof. The binders used in a pharmaceutical formulation are, in some examples, selected from starches such as potato starch, corn starch, wheat starch; sugars such as sucrose, glucose, dextrose, lactose, maltodextrin; natural and synthetic gums; gelatine; cellulose derivatives such as microcrystalline cellulose, hydroxypropyl cellulose, hydroxyethyl cellulose, hydroxypropyl methyl cellulose, carboxymethyl cellulose, methyl cellulose, ethyl cellulose; polyvinylpyrrolidone (povidone); polyethylene glycol (PEG); waxes; calcium carbonate; calcium phosphate; alcohols such as sorbitol, xylitol, mannitol and water or any combinations thereof.

In some embodiments a pharmaceutical composition as described herein comprises a lubricant as an excipient. Non-limiting examples of suitable lubricants include magnesium stearate, calcium stearate, zinc stearate, hydrogenated vegetable oils, sterotex, polyoxyethylene monostearate, talc, polyethyleneglycol, sodium benzoate, sodium lauryl sulfate, magnesium lauryl sulfate, and light mineral oil. The lubricants that are used in a pharmaceutical formulation, in some embodiments, are be selected from metallic stearates (such as magnesium stearate, calcium stearate, aluminium stearate), fatty acid esters (such as sodium stearyl fumarate), fatty acids (such as stearic acid), fatty alcohols, glyceryl behenate, mineral oil, paraffins, hydrogenated vegetable oils, leucine, polyethylene gly cols (PEG), metallic lauryl sulphates (such as sodium lauryl sulphate, magnesium lauryl sulphate), sodium chloride, sodium benzoate, sodium acetate and talc or a combination thereof.

In some embodiments a pharmaceutical formulation comprises a dispersion enhancer as an excipient. Non-limiting examples of suitable dispersants include, in some examples, starch, alginic acid, poly vinylpyrrolidones, guar gum, kaolin, bentonite, purified wood cellulose, sodium starch glycolate, isoamorphous silicate, and microcrystalline cellulose as high HLB emulsifier surfactants.

In some embodiments a pharmaceutical composition as described herein comprises a disintegrant as an excipient. In some embodiments a disintegrant is a non-effervescent disintegrant. Non-limiting examples of suitable non-effervescent disintegrants include starches such as corn starch, potato starch, pregelatinized and modified starches thereof, sweeteners, clays, such as bentonite, micro-crystalline cellulose, alginates, sodium starch glycolate, gums such as agar, guar, locust bean, karaya, pecitin, and tragacanth. In some embodiments a disintegrant is an effervescent disintegrant. Non-limiting examples of suitable effervescent disintegrants include sodium bicarbonate in combination with citric acid, and sodium bicarbonate in combination with tartaric acid.

In some embodiments an excipient comprises a flavoring agent. Flavoring agents incorporated into an outer layer are, in some examples, chosen from synthetic flavor oils and flavoring aromatics; natural oils; extracts from plants, leaves, flowers, and fruits; and combinations thereof. In some embodiments a flavoring agent can be selected from the group consisting of cinnamon oils; oil of wintergreen; peppermint oils; clover oil; hay oil; anise oil; eucalyptus; vanilla; citrus oil such as lemon oil, orange oil, grape and grapefruit oil; and fruit essences including apple, peach, pear, strawberry, raspberry, cherry, plum, pineapple, and apricot.

In some embodiments an excipient comprises a sweetener. Non-limiting examples of suitable sweeteners include glucose (corn syrup), dextrose, invert sugar, fructose, and mixtures thereof (when not used as a carrier); saccharin and its various salts such as a sodium salt; dipeptide sweeteners such as aspartame; dihydrochalcone compounds, glycyrrhizin; Stevia Rebaudiana (Stevioside); chloro derivatives of sucrose such as sucralose; and sugar alcohols such as sorbitol, mannitol, sylitol, and the like.

In some instances, a pharmaceutical composition as described herein comprises a coloring agent. Non-limiting examples of suitable color agents include food, drug and cosmetic colors (FD&C), drug and cosmetic colors (D&C), and external drug and cosmetic colors (Ext. D&C). A coloring agents can be used as dyes or their corresponding lakes.

In some instances, a pharmaceutical composition as described herein comprises a chelator. In some cases, a chelator is a fungicidal chelator. Examples include, but are not limited to: ethylenediamine-N,N,N',N'-tetraacetic acid (EDTA); a disodium, trisodium, tetrasodium, dipotassium, tripotassium, dilithium and diammonium salt of EDTA; a barium, calcium, cobalt, copper, dysprosium, europium, iron, indium, lanthanum, magnesium, manganese, nickel, samarium, strontium, or zinc chelate of EDTA; trans-1,2-diaminocyclohexane-N,N,N',N'-tetraacetic acid monohydrate; N,N-bis(2-hydroxyethyl)glycine; 1,3-diamino-2-hydroxypropane-N,N,N',N'-tetraacetic acid; 1,3-diaminopropane-N,N,N',N'-tetraacetic acid; ethylenediamine-N,N'-diacetic acid; ethylenediamine-N,N'-dipropionic acid dihydrochloride; ethylenediamine-N,N'-bis(methylenephosphonic acid) hemihydrate; N-(2-hydroxyethyl)ethylenediamine-N,N',N'-triacetic acid; ethylenediamine-N,N,N',N'-tetrakis (methylenephosponic acid); O,O'-bis(2-aminoethyl)ethyleneglycol-N,N,N',N'-tetraacetic acid; N,N-bis(2-hydroxybenzyl)ethylenediamine-N,N-diacetic acid; 1,6-hexamethylenediamine-N,N,N',N'-tetraacetic acid; N-(2-hydroxyethyl)iminodiacetic acid; iminodiacetic acid; 1,2-diaminopropane-N,N,N',N'-tetraacetic acid; nitrilotriacetic acid; nitrilotripropionic acid; the trisodium salt of nitrilotris (methylenephosphoric acid); 7,19,30-trioxa-1,4,10,13,16,22,27,33-octaazabicyclo[11,11,11]pentatriacontane hexahydrobromide; or triethylenetetramine-N,N,N',N'',N''',N'''-hexaacetic acid.

Also contemplated are combination products that include an anti-TM4SF1 antibody as disclosed herein and one or more other antimicrobial or antifungal agents, for example, polyenes such as amphotericin B, amphotericin B lipid complex (ABCD), liposomal amphotericin B (L-AMB), and liposomal nystatin, azoles and triazoles such as voriconazole, fluconazole, ketoconazole, itraconazole, pozaconazole and the like: glucan synthase inhibitors such as caspofungin, micafungin (FK463), and V-echinocandin (LY303366); griseofulvin; allylamines such as terbinafine; flucytosine or other antifungal agents, including those described herein. In addition, it is contemplated that a peptide can be combined with topical antifungal agents such as ciclopiroxolamine, haloprogin, tolnaftate, undecylenale, topical nysatin, amorolfine, butenafine, naftifine, terbinafine, and other topical agents. In some instances, a pharmaceutical composition comprises an additional agent. In some cases, an additional agent is present in a therapeutically effective amount in a pharmaceutical composition.

Under ordinary conditions of storage and use, the pharmaceutical compositions as described herein comprise a preservative to prevent the growth of microorganisms. In certain examples, the pharmaceutical compositions as described herein do not comprise a preservative. The pharmaceutical forms suitable for injectable use include sterile aqueous solutions or dispersions and sterile powders for the extemporaneous preparation of sterile injectable solutions or dispersions. The pharmaceutical compositions comprise a carrier which is a solvent or a dispersion medium containing, for example, water, ethanol, polyol (e.g., glycerol, propylene glycol, and liquid polyethylene glycol, and the like), and/or vegetable oils, or any combinations thereof. Proper fluidity is maintained, for example, by the use of a coating, such as lecithin, by the maintenance of the required particle size in the case of dispersion and by the use of surfactants. The prevention of the action of microorganisms is brought about by various antibacterial and antifungal agents, for example, parabens, chlorobutanol, phenol, sorbic acid, thimerosal, and the like. In many cases, isotonic agents are included, for example, sugars or sodium chloride. Prolonged absorption of the injectable compositions can be brought about by the use in the compositions of agents delaying absorption, for example, aluminum monostearate and gelatin.

For parenteral administration in an aqueous solution, for example, the liquid dosage form is suitably buffered if necessary and the liquid diluent rendered isotonic with sufficient saline or glucose. The liquid dosage forms are especially suitable for intravenous, intramuscular, subcutaneous, intratumoral, and intraperitoneal administration. In this connection, sterile aqueous media that can be employed will be known to those of skill in the art in light of the present disclosure. For example, one dosage is dissolved, in certain cases, in 1 mL to 20 mL of isotonic NaCl solution and either added to 100 mL to 1000 mL of a fluid, e.g., sodium-bicarbonate buffered saline, or injected at the proposed site of infusion.

In certain embodiments, sterile injectable solutions is prepared by incorporating a immunotherapy agent, in the required amount in the appropriate solvent with various of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. The compositions disclosed herein are, in some instances, formulated in a neutral or salt form. Pharmaceutically-acceptable salts include, for example, the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups are, in some cases, derived from inorganic bases such as, for example, sodium, potassium, ammonium, calcium, or ferric hydroxides, and such organic bases as isopropylamine, trimethylamine, histidine, procaine and the like. Upon formulation, the pharmaceutical compositions are administered, in some embodiments, in a manner compatible with the dosage formulation and in such amount as is therapeutically effective.

In certain embodiments, a pharmaceutical composition of this disclosure comprises an effective amount of an anti-TM4SF1 antibody, as disclosed herein, combined with a pharmaceutically acceptable carrier. "Pharmaceutically acceptable," as used herein, includes any carrier which does not interfere with the effectiveness of the biological activity of the active ingredients and/or that is not toxic to the patient to whom it is administered. Non-limiting examples of suitable pharmaceutical carriers include phosphate buffered saline solutions, water, emulsions, such as oil/water emulsions, various types of wetting agents and sterile solutions. Additional non-limiting examples of pharmaceutically compatible carriers can include gels, bioadsorbable matrix materials, implantation elements containing the immunotherapeutic agents or any other suitable vehicle, delivery or dispensing means or material. Such carriers are formulated, for example, by conventional methods and administered to the subject at an effective amount.

XII. Combination Therapies

In certain embodiments, the methods of this disclosure comprise administering a conjugate as disclosed herein, followed by, preceded by or in combination with one or more further therapy. Examples of the further therapy can include, but are not limited to, chemotherapy, radiation, an anti-cancer agent, or any combinations thereof. The further therapy can be administered concurrently or sequentially with respect to administration of the conjugate. In certain embodiments, the methods of this disclosure comprise administering a conjugate as disclosed herein, followed by, preceded by, or in combination with one or more anti-cancer agents or cancer therapies. Anti-cancer agents include, but are not limited to, chemotherapeutic agents, radiotherapeutic agents, cytokines, immune checkpoint inhibitors, anti-angiogenic agents, apoptosis-inducing agents, anti-cancer antibodies and/or anti-cyclin-dependent kinase agents. In certain embodiments, the cancer therapies include chemotherapy, biological therapy, radiotherapy, immunotherapy, hormone therapy, anti-vascular therapy, cryotherapy, toxin therapy and/or surgery or combinations thereof. In certain embodiments, the methods of this disclosure include administering a conjugate, as disclosed herein, followed by, preceded by or in combination with one or more further immunomodulatory agents. An immunomodulatory agent includes, in some examples, any compound, molecule or substance capable of suppressing antiviral immunity associated with a tumor or cancer. Non-limiting examples of the further immunomodulatory agents include anti-CD33 antibody or variable region thereof, an anti-CD11b antibody or variable region thereof, a COX2 inhibitor, celecoxib, cytokines, such as IL-12, GM-CSF, IL-2, IFNβ and IFNγ, and chemokines, such as MIP-1, MCP-1 and IL-8.

In certain examples, where the further therapy is radiation exemplary doses are 5,000 Rads (50 Gy) to 100,000 Rads (1000 Gy), or 50,000 Rads (500 Gy), or other appropriate doses within the recited ranges. Alternatively, the radiation dose are about 30 to 60 Gy, about 40 to about 50 Gy, about 40 to 48 Gy, or about 44 Gy, or other appropriate doses within the recited ranges, with the dose determined, example, by means of a dosimetry study as described above. "Gy" as used herein can refer to a unit for a specific absorbed dose of radiation equal to 100 Rads. Gy is the abbreviation for "Gray."

In certain examples, where the further therapy is chemotherapy, exemplary chemotherapeutic agents include without limitation alkylating agents (e.g., nitrogen mustard derivatives, ethylenimines, alkylsulfonates, hydrazines and triazines, nitrosureas, and metal salts), plant alkaloids (e.g., vinca alkaloids, taxanes, podophyllotoxins, and camptothecan analogs), antitumor antibiotics (e.g., anthracyclines, chromomycins, and the like), antimetabolites (e.g., folic acid antagonists, pyrimidine antagonists, purine antagonists, and adenosine deaminase inhibitors), topoisomerase I inhibitors, topoisomerase II inhibitors, and miscellaneous antineoplastics (e.g., ribonucleotide reductase inhibitors, adrenocortical steroid inhibitors, enzymes, antimicrotubule agents, and retinoids). Exemplary chemotherapeutic agents can include, without limitation, anastrozole (Arimidex®), bicalutamide (Casodex®), bleomycin sulfate (Blenoxane®), busulfan (Myleran®), busulfan injection (Busulfex®), capecitabine (Xeloda®), N4-pentoxycarbonyl-5-deoxy-5-fluorocytidine, carboplatin (Paraplatin®), carmustine (BiCNU®), chlorambucil (Leukeran®), cisplatin (Platinol®), cladribine (Leustatin®), cyclophosphamide (Cytoxan® or Neosar®), cytarabine, cytosine arabinoside (Cytosar-U®), cytarabine liposome injection (DepoCyt®), dacarbazine (DTIC-Dome®), dactinomycin (Actinomycin D, Cosmegan), daunorubicin hydrochloride (Cerubidine®), daunorubicin citrate liposome injection (DaunoXome®), dexamethasone, docetaxel (Taxotere®), doxorubicin hydrochloride (Adriamycin®, Rubex®), etoposide (Vepesid®), fludarabine phosphate (Fludara®), 5-fluorouracil (Adrucil®, Efudex®), flutamide (Eulexin®), tezacitibine, Gemcitabine (difluorodeoxy citidine), hydroxyurea (Hydrea®), Idarubicin (Idamycin®), ifosfamide (IFEX®), irinotecan (Camptosar®), L-asparaginase (ELSPAR®), leucovorin calcium, melphalan (Alkeran®), 6-mercaptopurine (Purinethol®), methotrexate (Folex®), mitoxantrone (Novantrone®), mylotarg, paclitaxel (Taxol®), phoenix (Yttrium90/MX-DTPA), pentostatin, polifeprosan 20 with carmustine implant (Gliadel®), tamoxifen citrate (Nolvadex®), teniposide (Vumon®), 6-thioguanine, thiotepa, tirapazamine (Tirazone®), topotecan hydrochloride for injection (Hycamptin®), vinblastine (Velban®), vincristine (Oncovin®), and vinorelbine (Navelbine®), Ibrutinib, idelalisib, and brentuximab vedotin.

Exemplary alkylating agents include, without limitation, nitrogen mustards, ethylenimine derivatives, alkyl sulfonates, nitrosoureas and triazenes): uracil mustard (Aminouracil Mustard®, Chlorethaminacil®, Demethyldopan®, Desmethyldopan®, Haemanthamine®, Nordopan®, Uracil nitrogen Mustard®, Uracillost®, Uracilmostaza®, Uramustin®, Uramustine®), chlormethine (Mustargen®), cyclophosphamide (Cytoxan®, Neosar®, Clafen®, Endoxan®, Procytox®, Revimmune™), ifosfamide (Mitoxana®), melphalan (Alkeran®), Chlorambucil (Leukeran®), pipobroman (Amedel®, Vercyte®), triethylenemelamine (Hemel®, Hexalen®, Hexastat®), triethylenethiophosphoramine, Temozolomide (Temodar®), thiotepa (Hiioplex®), busulfan (Busilvex®, Myleran®), carmustine (BiCNU®), lomustine (CeeNU®), streptozocin (Zanosar®), and Dacarbazine (DTIC-Dome®). Additional exemplary alkylating agents include, without limitation, Oxaliplatin (Eloxatin®); Temozolomide (Temodar® and Temodal®); Dactinomycin (also known as actinomycin-D, Cosmegen®); Melphalan (also known as L-PAM, L-sarcolysin, and phenylalanine mustard, Alkeran®); Altretamine (also known as hexamethylmelamine (HMM), Hexalen®); Carmustine (BiCNU®); Bendamustine (Treanda®); Busulfan (Busulfex® and Myleran®); Carboplatin (Paraplatin®); Lomustine (also known as CCNU, CeeNU®); Cisplatin (also known as CDDP, Platinol® and Platinol®-AQ); Chlorambucil (Leukeran®); Cyclophosphamide (Cytoxan® and Neosar®); Dacarbazine (also known as DTIC, DIC and imidazole carboxamide, DTIC-Dome®); Altretamine (also known as hexamethylmelamine (HMM), Hexalen®), Ifosfamide (Ifex®): Prednumustine; Procarbazine (Matulane®); Mechlorethamine (also known as nitrogen mustard, mustine and mechloroethamine hydrochloride, Mustargen®); Streptozocin (Zanosar®); Thiotepa (also known as thiophosphoamide, TESPA and TSPA, Thioplex®); Cyclophosphamide (Endoxan®, Cytoxan®, Neosar®, Procytox®, Revimmune®), and Bendamustine HCl (Treanda®).

Exemplary anthracyclines can include, without limitation, doxorubicin (Adriantycin® and Rubex®); bleomycin (Lenoxane®); daunorubicin (dauorubicin hydrochloride, daunomycin, and rubidomycin hydrochloride, Cerubidine®); daunorubicin liposomal (daunorubicin citrate liposome, DaunoXome®); mitoxantrone (DHAD, Novantrone®); epirubicin (Ellence™); idarubicin (Idamycin®, Idamycin PFS®); mitomycin C (Mutamycin®); geldanamycin; herbimycin; ravidomycin; and desacetylravidomycin.

Exemplary vinca alkaloids include, but are not limited to, vinorelbine tartrate (Navelbine®), Vincristine (Oncovin®), and Vindesine (Eldisine®)); vinblastine (also known as vinblastine sulfate, vincaleukoblastine and VLB, Alkaban-AQ® and Velban®); and vinorelbine (Navelbine®).

Exemplary proteosome inhibitors can, but are not limited to, bortezomib (Velcade®); carfilzomib (PX-171-007, (S)-4-Methyl-N-((S)-1-(((S)-4-methyl-1-((R)-2-methyloxiran-2-yl)-1-oxopentan-2-yl)amino)-1-oxo-3-phenylpropan-2-yl)-2-((S)-2-(2-morpholinoacetamido)-4-phenylbutanamido)-pentanamide); marizomib (NPI-0052); ixazomib citrate (MLN-9708); delanzomib (CEP-18770); and O-Methyl-N-[(2-methyl-5-thiazolyl)carbonyl]-L-seryl-O-methyl-N-[(1S)-2-[(2R)-2-methyl-2-oxiranyl]-2-oxo-1-(phenylmethyl)ethyl]-L-serinamide (ONX-0912).

"In combination with," as used herein, means that the conjugate and the further therapy are administered to a subject as part of a treatment regimen or plan. In certain embodiments, being used in combination does not require that the conjugate and the further therapy are physically combined prior to administration or that they be administered over the same time frame. For example, and not by way of limitation, the conjugate and the one or more agents are administered concurrently to the subject being treated, or are administered at the same time or sequentially in any order or at different points in time.

EXAMPLES

The following examples are provided to illustrate, but not to limit the presently claimed disclosure.

Example 1. Anti-Angiogenic and Anti-Metastatic Potential of Anti-TM4SF1 Antibody-Anti-TM4SF1 siRNA Conjugates in Subjects with Solid Tumors A Phase 1, open-label, dose escalation study is conducted. The study is designed to evaluate the safety and pharmacokinetics of an exemplary anti body-RNA conjugate, composed of an anti-TM4SF1 antibody and TM4SF1-targeted siRNA, of this disclosure and determine the recommended Phase 2 dose (as monotherapy or in combination with standard therapies) in subjects with advanced solid tumors. The inclusion criteria of the study include participants with advanced solid tumor that is not amenable to surgical resection or other approved therapeutic options. Furthermore, the participants must have measurable disease per Response Evaluation Criteria in Solid Tumors (RECIST) version 1.1 or disease evaluable by assessment of tumor antigens. Moreover, participants must have adequate bone marrow, renal, hepatic and cardiac function. Some of exclusion criteria of the study include participants have received anticancer therapy or any investigational therapy within a period of 21 days prior to the first dose of the exemplary conjugate comprising the anti-TM4SF1 antibody-TM4SF1-targeted siRNA; uncontrolled metastases to the central nervous system (CNS); unresolved adverse events; and history of major immunologic reaction to any auristatin-based and/or IgG-containing agent.

A group of 30 participants having solid tumors and meeting the inclusion criteria of the study are administered the exemplary anti-TM4SF1 antibody-RNA conjugate, where the RNA is siRNA targeting TM4SF1, as an intravenous infusion every 28 day s at a dose of about 100 µg/kg for 24 months. The terminal elimination half-life of the anti-TM4SF1 antibody-siRNA conjugate is measured in every participant. In addition, the maximum observed plasma concentration (Cmax) of the anti-TM4SF1 antibody-siRNA conjugate is also determined. Furthermore, the number of participants with adverse events is noted. The area under the curve (AUC) from time zero to the last measurable concentration AUC(0-t) of the anti-TM4SF1 antibody-RNA conjugate is also measured. Moreover, the objective response rate (ORR), the progression free survival (PFS), and the duration of overall response (DOR) are measured in all participants. ORR is defined as the proportion of the participants who achieve a complete response (CR) or partial response (PR). PFS is defined as the time from the first dose date of the anti-TM4SF1 antibody-siRNA conjugate to either disease progression or death, whichever occurs first. DOR is defined as the time from the participant's initial CR or PR to the time of disease progression.

Example 2. Anti-TM4SF1 Antibody-Anti-LSECtin siRNA Conjugates Inhibit Melanoma Cell Proliferation In Vitro An in vitro study is conducted to evaluate the tumor cell inhibitory potential using an exemplary antibody-RNA conjugate comprising an anti-TM4SF1 antibody- and an siRNA targeting LSECtin. B16 cells, which are cells from an established melanoma cell line, are cultured in DMEM supplemented with 10% heat-inactivated FBS and 100 U/mL penicillin. Cells are maintained at 37° C. in a humidified incubator with 5% $CO_2$ and are used for experiments at a limited number of passages. Growth medium is changed the day after cell seeding and every other day thereafter.

B16 cells are seeded in 24-well plates prior to experiments and grown to confluence in DMEM media supplemented with 10% FBS. Two different amounts of the antibody-RNA conjugate are tested. 1 and 5 micrograms (μg) of the anti-TM4SF1 antibody-anti-LSECtin siRNA conjugates are added to cells in complete media and are allowed to incubate on cells for 72 h, before silencing analysis is performed. For positive controls, an IgG antibody is conjugated to an siRNA molecule that is known to achieve a high level of knockdown (e.g., >70%). For negative controls, an IgG antibody is conjugated with a nonspecific siRNA. After 72 h of incubation with the anti-TM4SF1 antibody-anti-LSECtin siRNA conjugates, mRNA levels of the LSECtin gene are assessed. Results of the silencing analysis show successful knockdown of LSECtin. In addition, a cell proliferation assay is conducted to evaluate the B16 cell proliferation rate after incubation with the anti-TM4SF1 antibody-anti-LSECtin siRNA conjugates. Cell death was observed in both conditions (i.e., 1 and 5 μg of anti-TM4SF1 antibody-anti-LSECtin siRNA conjugates). No cell death is observed in the negative or positive controls.

Example 3. In Vivo Study of Anti-Metastatic Potential of Anti-TM4SF1 Antibody-Anti-VCAM-1 siRNA Conjugates in Breast Cancer An in vivo study is conducted to assess the anti-metastatic potential of antibody-RNA conjugates comprising an anti-TM4SF1 antibody and a VCAM-1-targeting siRNA. VCAM-1 expression can be induced in many breast cancer epithelial cells by cytokine stimulation in vitro, and its up-regulation is directly correlated with advanced clinical breast cancer stage. VCAM-1 over-expression in the NMuMG breast epithelial cells controls the epithelial and mesenchymal transition (EMT) program which results in an increase in cell motility rates and increase in chemoresistance to doxorubicin and cisplatin in vitro.

To further confirm if these in vitro results translate to into an in vivo model. B6 severe combined immunodeficiency (SCID) mice are subcutaneously injected in two flanks with human breast adenocarcinoma cells (i.e., MDA-MB-231 cells) stably transfected with eGFP shRNA positive control cells and the anti-TM4SF1 antibody-anti-VCAM-1 siRNA conjugate at three different doses: 10 μg/kg, 500 μg/kg, and 30 mg/kg. Two months later, considerable gross tumor enlargement is found in mice injected with the control vector and the anti-TM4SF1 antibody-anti-VCAM-1 siRNA conjugate transfected cells before mice are humanely sacrificed and autopsies are performed. As expected. VCAM-1 knockdown MDA-MB-231 cells show 2-3 fold reduced tumorigenicity in vivo compared to control groups. Meanwhile, western blot assays confirmed that anti-TM4SF1 antibody-anti-VCAM-1 siRNA conjugate effectively suppressed VCAM-1 expression in MDA-MB-231 xenograft tumor samples.

Furthermore, in order to find a minimum effective dose and a maximum tolerated dose, a second experiment is conducted comprising SCID mice that are subcutaneously injected in two flanks with human breast adenocarcinoma cells (i.e., MDA-MB-231 cells) in order to induce tumor growth. Once considerable gross tumor enlargement is found in the mice, the anti-TM4SF1 antibody-anti-VCAM-1 siRNA conjugate is administered to three groups of mice receiving the antibody-RNA conjugate at three different doses: 10 μg/kg, 500 μg/kg, and 30 mg/kg. Two months later, the mice are humanely sacrificed and autopsies are performed. Tumorigenicity is reduced in vivo in both the 10 μg/kg and 500 μg/kg groups compared to control groups. Thus, the minimum effective dose is found to be 10 μg/kg while the maximum tolerated dose is 500 μg/kg. Mice injected with the 30 mg/kg dose of the anti-TM4SF1 antibody-anti-VCAM-1 siRNA conjugate only survive 1 month post-injection.

Synergistic knockdown of endogenous VCAM-1 expression and targeting of TM4SF1 reduces tumor cell proliferation, inhibits TGFβ1 or IL-6 mediated cell migration of tumor cells, and increases chemosensitivity in vivo. Furthermore, it is demonstrated that knockdown of endogenous VCAM-1 expression and targeting of TM4SF1 in MDA-MB-231 cells reduces tumor formation in a SCID xenograft mouse model.

Example 4. Preparation and Characterization of Exemplary Antibody-Oligonucleotide Conjugates of this Disclosure Preparation of a cysteine engineered anti-TM4SF1 antibody, for conjugation: A cysteine engineered anti-TM4SF1 monoclonal antibody (anti-Tm4SF1 antibody with an engineered cysteine) was prepared for conjugation with an oligonucleotide, according to the following protocol: About 145 μg to 1 mg of a naked cysteine engineered anti-TM4SF1 antibody was buffer exchanged into 10-100 mM phosphate buffered saline (PBS) 7.4-8.0 using a 50 KDa molecular weight cutoff (MWCO) spin-column (three rounds of centrifugation w as carried out for the buffer exchange). Freshly diluted 5 mM tris(2-carboxyethyl)phosphine (TCEP)-HCl pH 7 (5 mM TCEP aliquots from ampule 0.5N stock were frozen until needed), was prepared. About 10 eq. of TCEP was added to the antibody solution for full reduction of 4 hinge disulfides and two engineered cysteine residues, of the anti-TM4SF1 antibody. The mixture was incubated at 37° C. for about 2 hrs in shaker plate at 300 rpm in a thermomixer. The fully reduced antibody was cooled at about 4° C. followed by buffer exchange thrice using a 50 k MWCO spin column (at 14K rpm, 4° C.) into 100 mM PBS 8.0 with 5 mM EDTA. Following the buffer exchange, 25 eq.-50 eq. of dehydroascorbic acid of 25 mM stock solution in PBS 8.0 was added. Analytical size exclusion chromatography (analytical-SEC) was conducted to check if the fully reduced antibody was intact and not fragmented into light and heavy chains. The antibody was reoxidized for a period of time (from about 3 hrs to about 18 hrs at 4° C.). The fully re-oxidized antibody was checked again via analytical-SEC. Results of the analytical SEC of the reduced mAb and that of the naked mAb were compared. It was expected that the reduced and re-oxidized anti-TM4SF1 antibody with an engineered cysteine should right-shift by about greater than 0.5 min to about 0.9 min RT (retention time).

The difference in retention time, between the reduced and re-oxidized antibody with an engineered cysteine (having a small molecular weight) and the naked mAb indicated cysteine de-capping into free thiols. At this stage, the fully reduced and re-oxidized anti-Tm4SF1 mAb was considered to be ready for conjugation, or alternatively or in addition, for storage in refrigerator, at 4° C. if the prepared antibody was not to be used immediately.

Preparation of a non-engineered anti-TM4SF1 antibody, for conjugation: An anti-TM4SF1 monoclonal antibody (anti-Tm4SF1 mAb) was prepared for conjugation with an oligonucleotide, according to the following protocol: About 145 µg to 1 mg of a naked non-cysteine engineered anti-TM4SF1 antibody was buffer exchanged into 10-100 mM PBS 7.4-8.0 using a 50 KDa molecular weight cutoff (MWCO) spin-column (three rounds of centrifugation was carried out for the buffer exchange). Freshly diluted 5 mM tris(2-carboxyethyl)phosphine (TCEP)-HCl pH 7 (5 mM TCEP aliquots from Sigma Ampule 0.5N stock were frozen until needed), was prepared. About 10 eq. of TCEP w as added to the antibody solution for partial reduction of 2 hinge disulfides, of the anti-TM4SF1 antibody. The mixture was incubated at 37° C. for about 2 hrs in shaker plate at 300 rpm in a thermomixer. The reduced antibody was cooled at about 4° C. Analytical size exclusion chromatography (analytical-SEC) was conducted to check if the reduced antibody was intact and not fragmented into light and heavy chains. Results of the analytical SEC of the reduced mAb and that of a naked mAb (which did not go through the reduction) were compared. It was expected that the reduced mAb should show a right-shift, relative to the naked mAb. At this stage, the reduced anti-Tm4SF1 mAb was considered to be ready for conjugation, or alternatively or in addition, for storage in refrigerator, at 4° C. if the prepared antibody was not to be used immediately.

Conjugation of an oligonucleotide payload to a cleavable linker: An oligonucleotide with a primary amine-conjugation handle at 3' or 5' strand was aliquoted on 20 nmol scale at 1 mM concentration in water or 50 mM phosphate buffered saline. If the oligonucleotide is a solid then it was diluted at 1 nmol/1 µL concentration. If the oligonucleotide was dissolved in a buffer then an Amicon 3K molecular weight cut-off filter was used to exchange into 50-100 mM PBS with a pH between about 7.2-8.0. To the oligonucleotide was added 50 eq. of NHS-activated disulfide (with an S-pyridyl group) and reacted for 3 hours at room temperature or overnight at 4° C. The crude conjugate (volume 20 µL to 100 µL) was then purified using a G-45 Sephadex column or a PD-10 column into 100% pure water. The eluted fractions w as lyophilized to a solid overnight. A stock solution, having a concentration of the conjugate from about 1 mM to about 10 mM was prepared via reconstitution into 50 mM-100 mM PBS. The concentration was quantitated using NanoDrop at 260 nM.

Conjugation of an oligonucleotide payload to a noncleavable linker. An oligonucleotide with a primary amine-conjugation handle at 3' or 5' strand was aliquoted on 20 nmol scale at 1 mM concentration in water or 50 mM phosphate buffered saline. A 100 mM DMSO stock solution of a maleimide or bromo-acetamide heterofunctional linker with an activated carboxylic acid with N-hydroxy succinimide or tetrafluorophenyl activated groups was prepared. About 50 eq. to about 100 eq. of the linker w as added to the primary amine containing oligonucleotide in PBS at pH of about 7.4 and reacted for 1-2 hours at room temperature. The crude linker-oligonucleotide conjugate was purified using a PD-10 column equilibrated with pure water. For example, a PD-10 column could be equilibrated with 5 volumes (25 ml) of pure water, the crude mixture loaded in less than or equal to about 2.5 ml then eluted with 3.5 ml of water. The linker-payload conjugate was lyophilized overnight to generate a solid, which w as subsequently diluted in PBS at pH of about 7.4 and used as needed.

Figure 4:
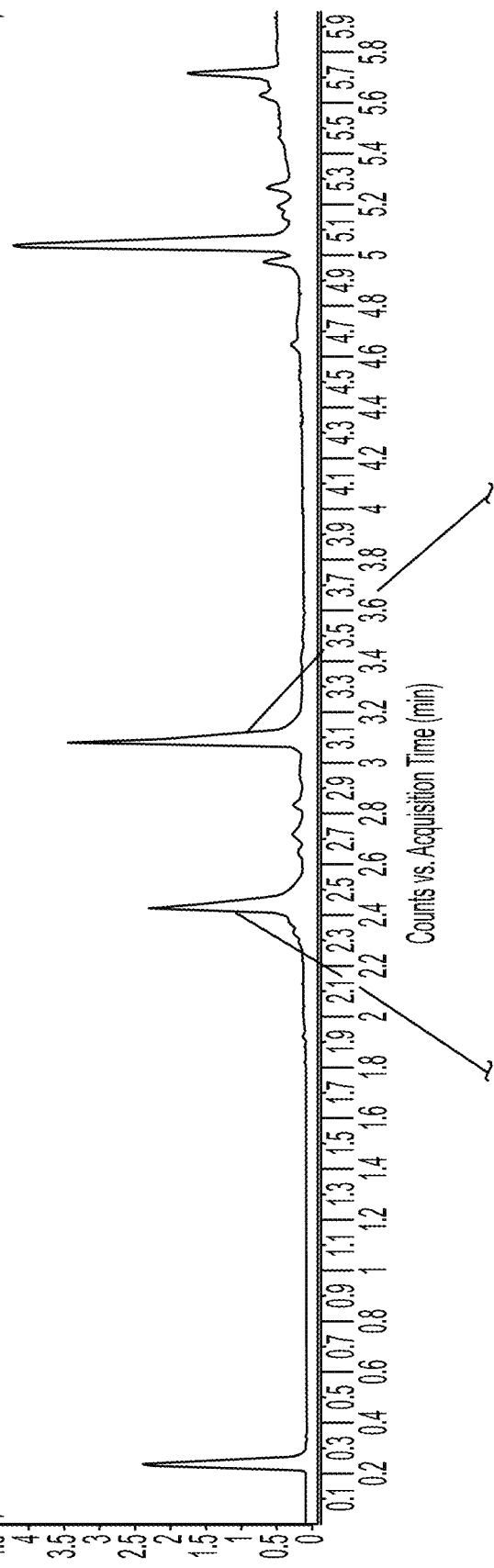
FIG. 4 shows representative LC-MS (liquid chromatography-mass spectrometry) results for a naked oligo (Hu S).
Figure 4:
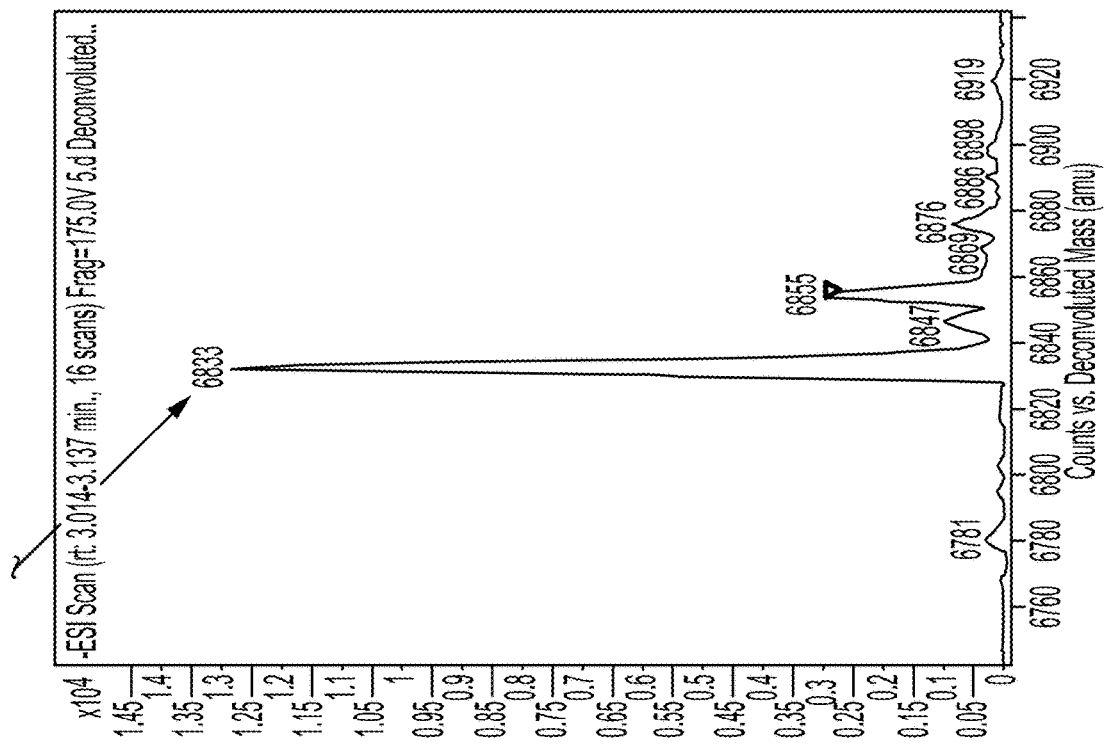
Figure 4:
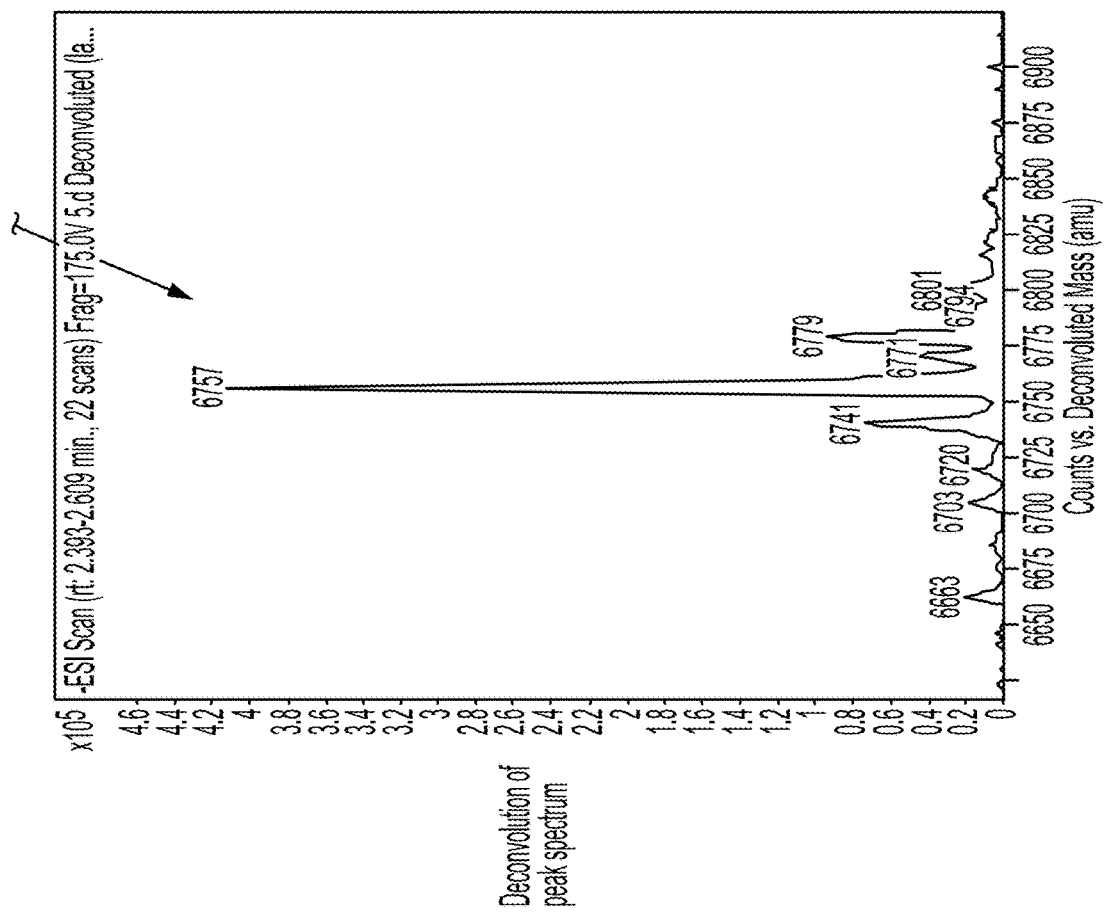
Figure 5:
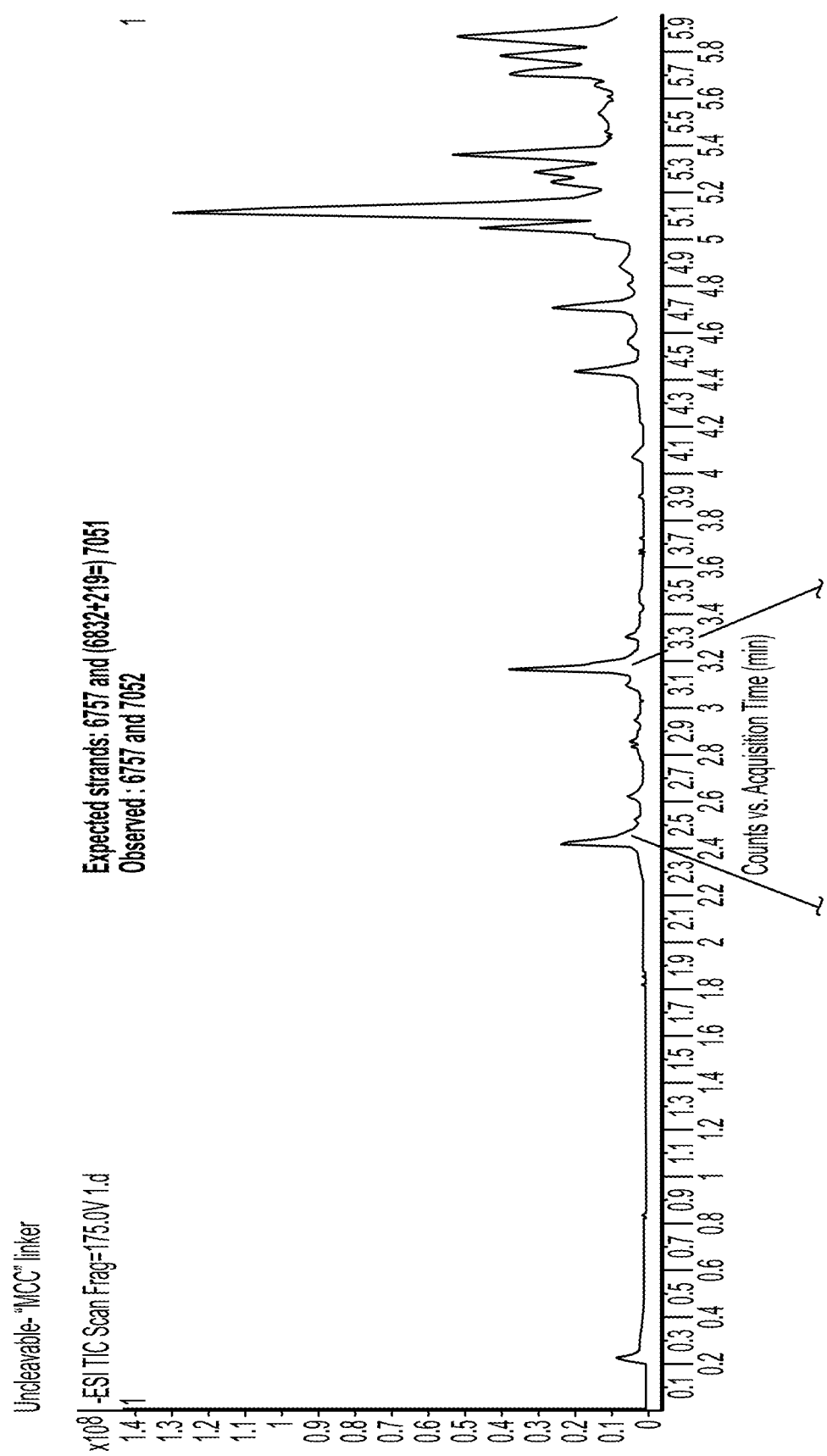
FIG. 5 shows representative LC-MS results for a linker oligonucleotide conjugate.
Figure 5:
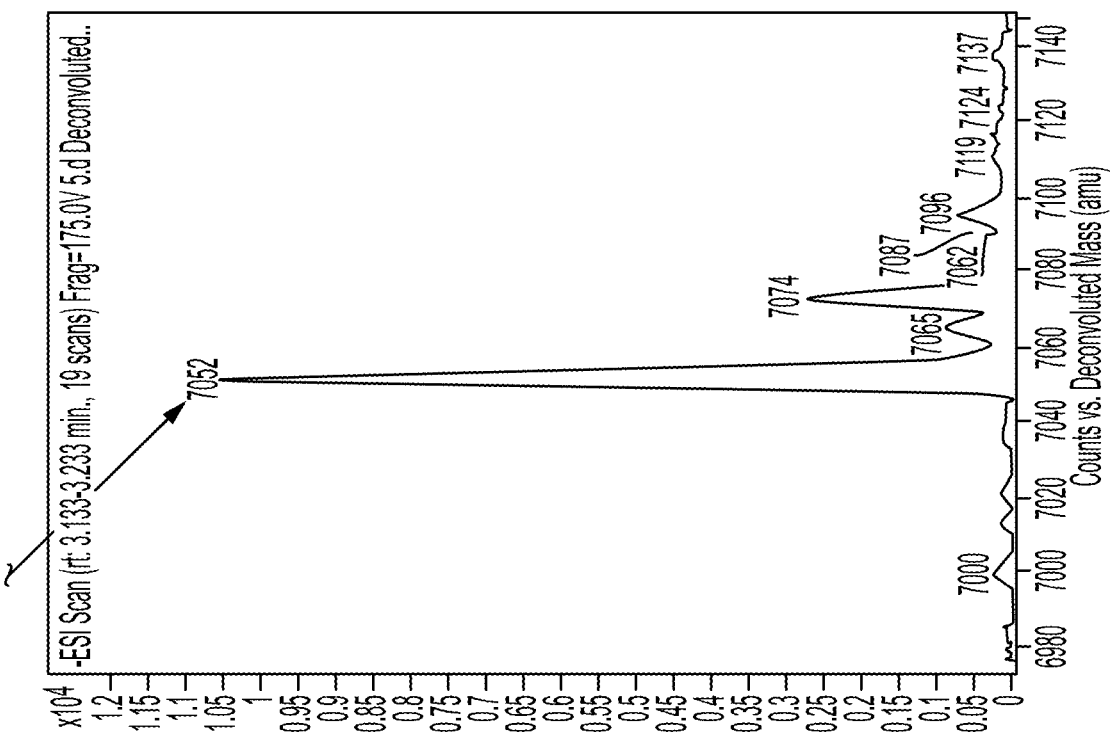
Figure 5:
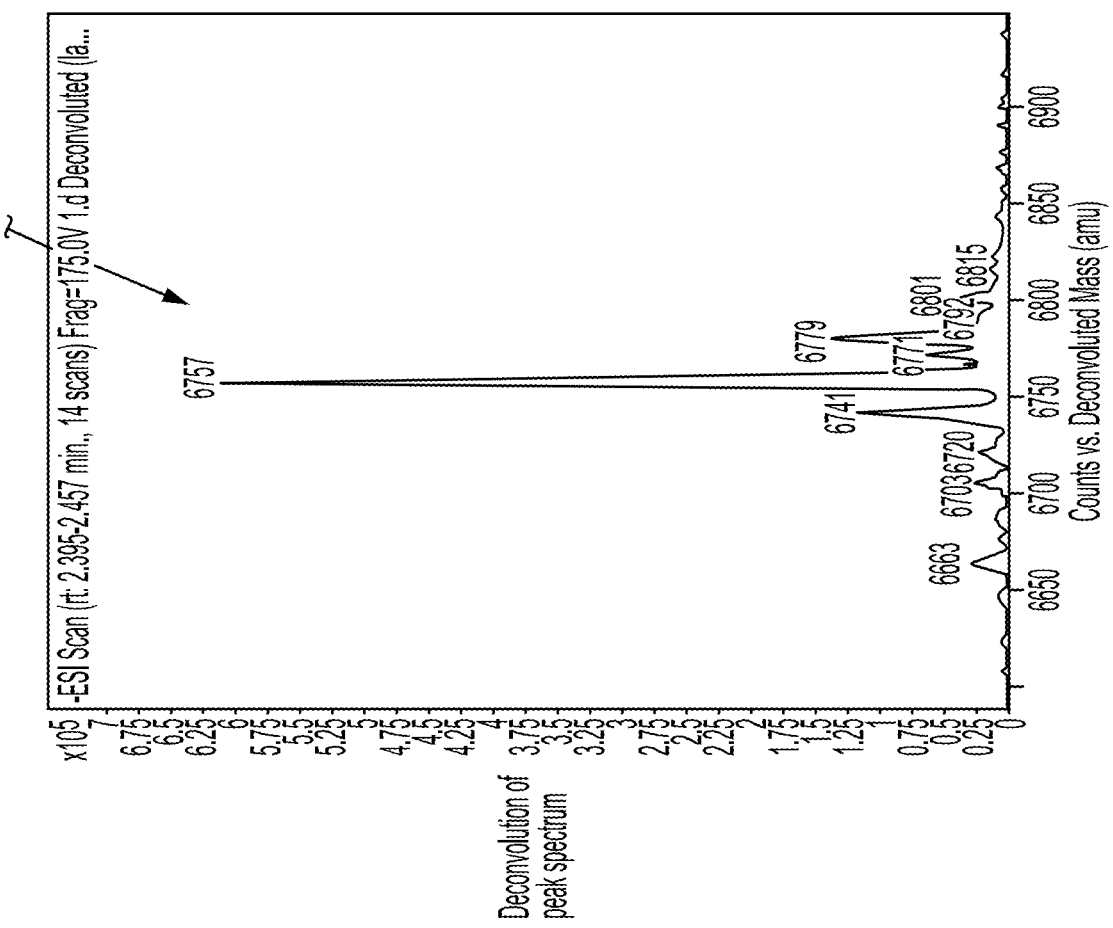
Figure 6:
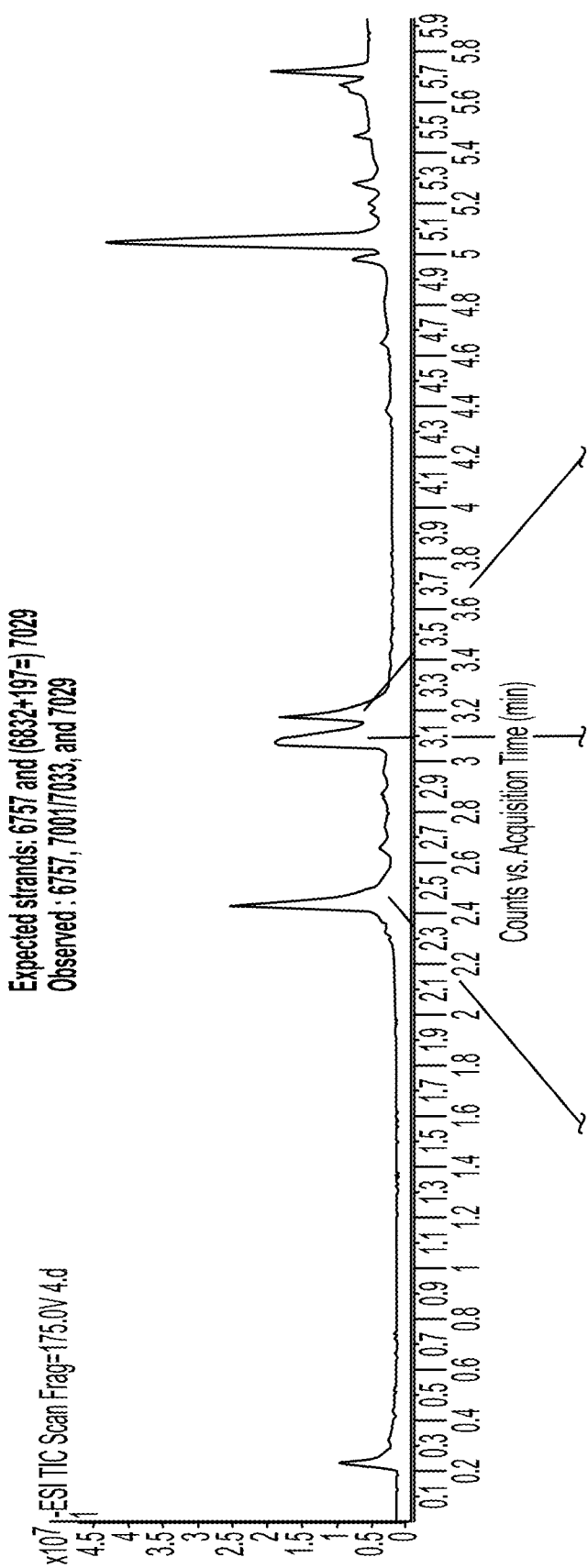
FIG. 6 shows representative LC-MS results for a linker oligonucleotide conjugate.
Figure 6:
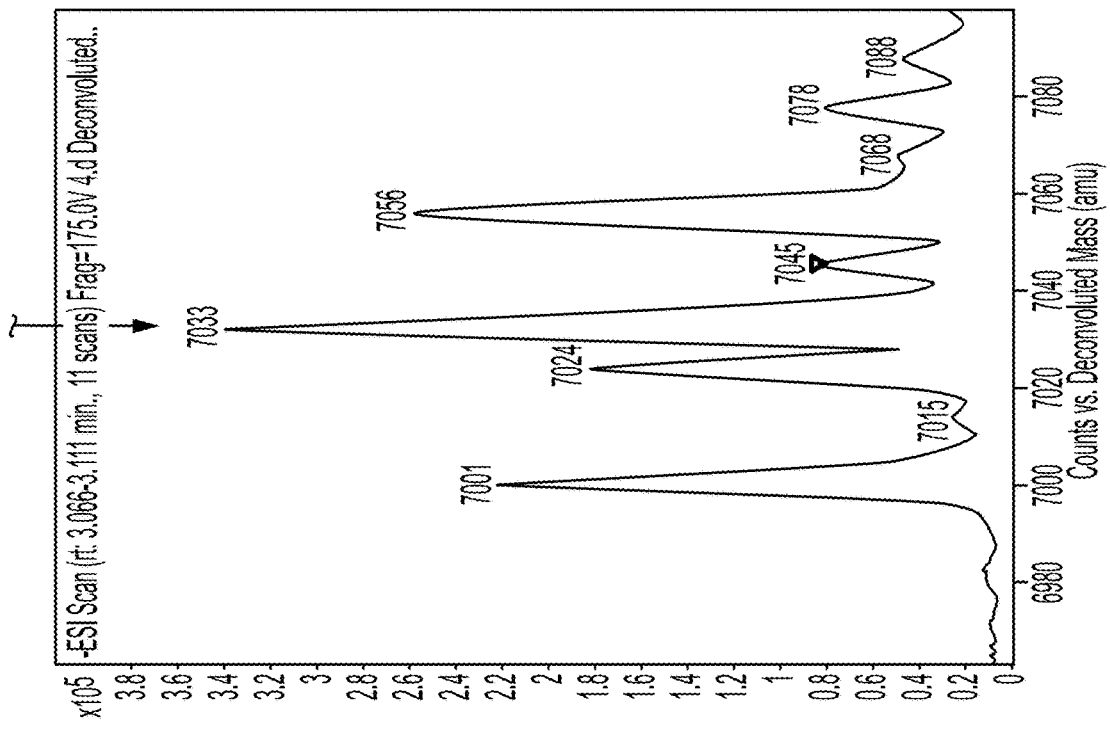
Figure 6:
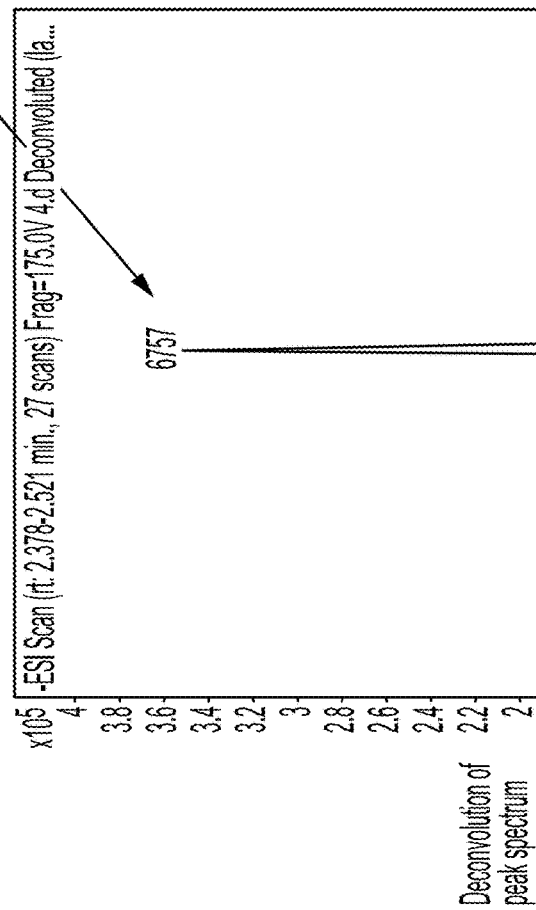
Figure 6:
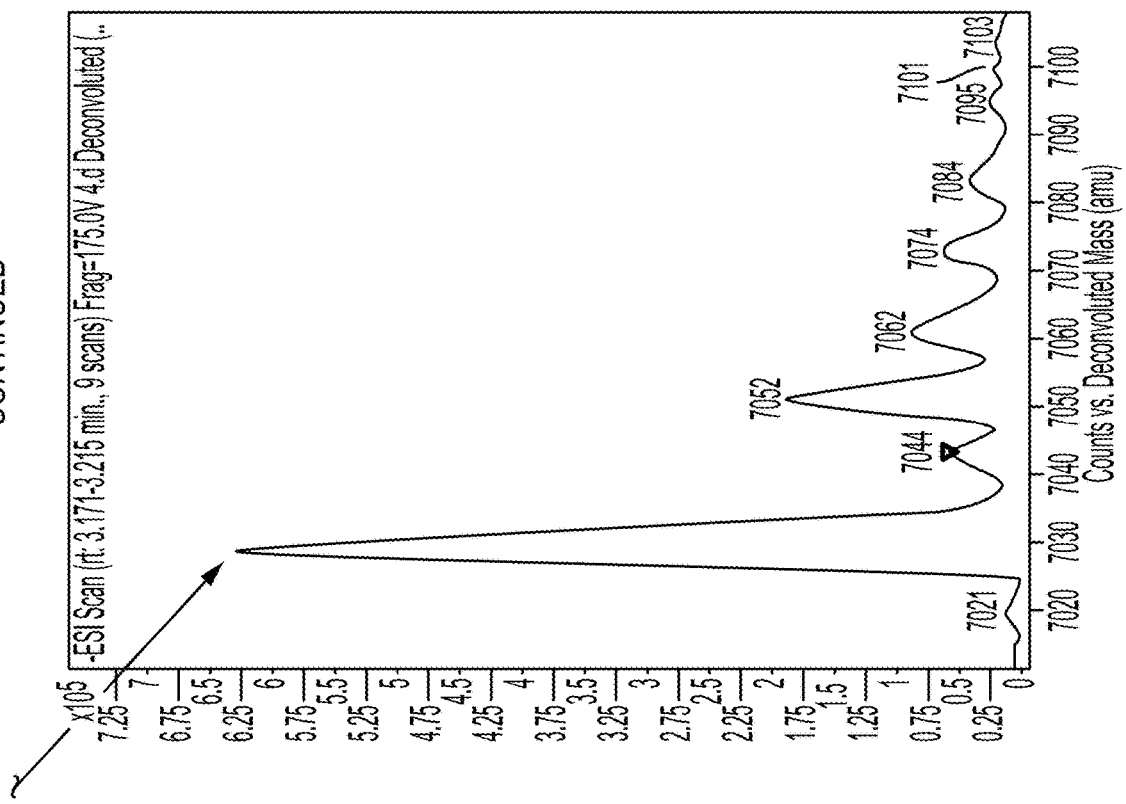

Characterization of exemplary linker-oligonucleotide conjugates: Mass spec data on native oligonucleotides and linker-oligonucleotide conjugates w ere done on an Agilent 6545XT Q-ToF LCMS in negative mode. Each crude or purified sample was lyophilized to a powder. Approximately 10-12 µg were resuspended in 80 µL of water to produce stock solutions having concentration of about 10 µM. 5 µM samples w ere made in plastic vials via dilution of 20 µL of stock solution with 20 µL of water. All injections w-ere 5 µL volume. The gradient method is showed in below table and FIG. 4, FIG. 5, and FIG. 6 respectively show LC-MS results for a naked oligo (Hu S), a linker oligonucleotide conjugate (conjugated using an uncleavable, MCC linker), and a linker oligonucleotide conjugate (conjugated using a cleavable linker "SPDD or Disulside or S—S").

TABLE 2

Exemplary experimental conditions for LC-MS (liquid chromatography-mass spectrometry) characterization of exemplary ARCs
LC-MS Conditions

| | |
|---|---|
| Column | AdvanceBio Oligonucleotide Column, 2.1 × 50, 2.7 um (P.N. 659750-702) |
| Column temperature | 50° C. |
| Injection volume | 5 µl |
| Autosampler temp | 4° C. |
| Needle wash | Multiwash with needle seat backflush (30 s) |
| Mobile phase | A = 400 mM HFIP + 15 mM TEA in water B = methanol |
| Flow rate | 0.400 mL/min |
| Gradient | 0.0 min 5% B |
| | 1.0 min 5% B |
| | 5.0 min 95% B |
| | 5.5 min 95% B |
| | 5.6 min 5% B |
| | 6.0 min 5% B |
| Stop time | 6.0 min |
| Post time | 1.0 min |

Figure 3:
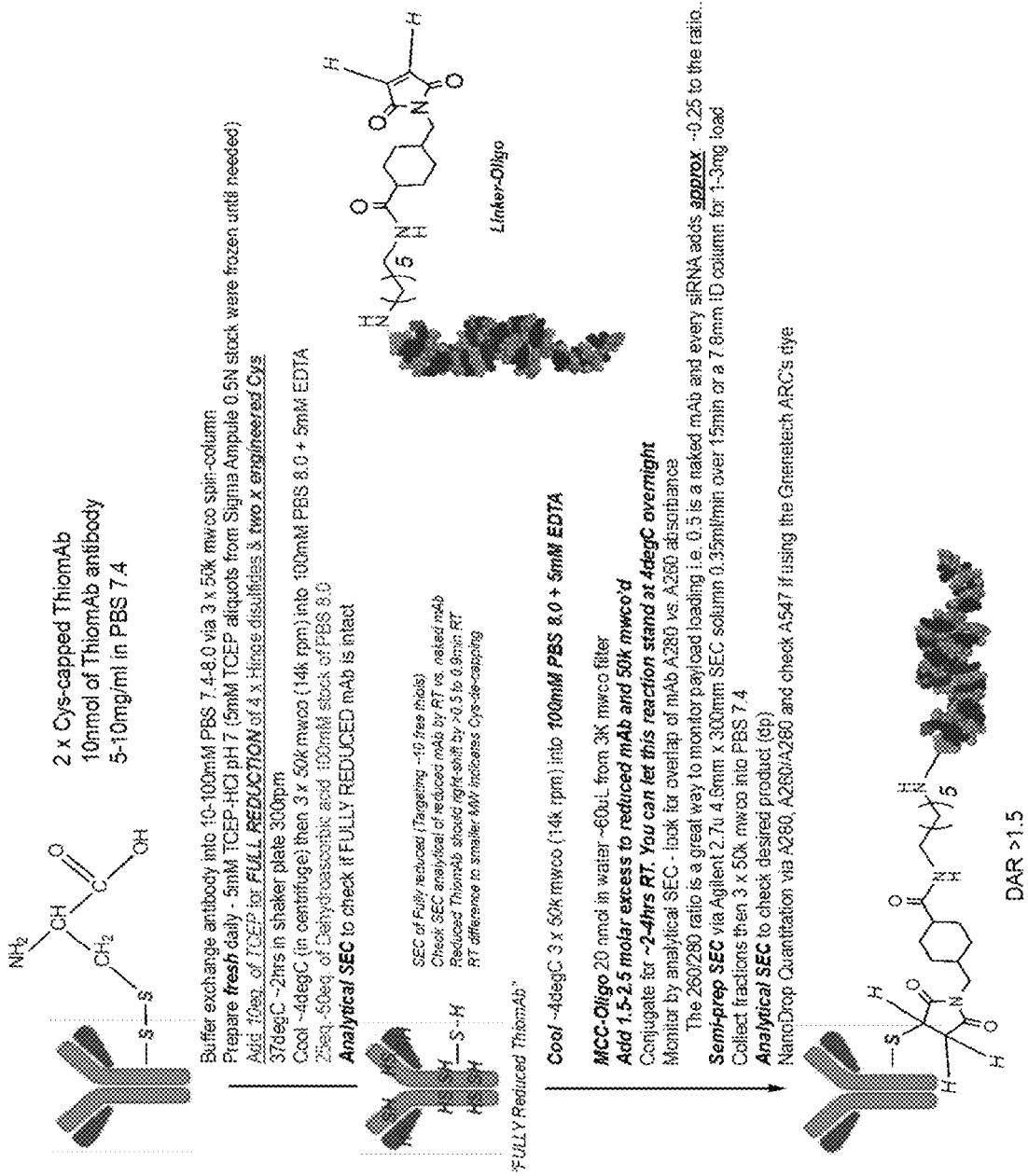
FIG. 3 shows an exemplary flowchart for preparation on an antibody oligonucleotide conjugate as described herein.

Conjugation of a linker-oligonucleotide payload to an anti-TM4SF1 antibody that is ready for conjugation (such as the fully reduced antibody with an engineered cysteine, generated as described above): About 1.5 to 2.5 molar excess of the oligo linker payload (such as the MCC-oligo prepared as described above) was added to the reduced mAb and buffer exchanged using a 50 kDa MWCO spin column. The linker-oligonucleotide payload and the mAb were conjugated for about 2 to 4 hours at room temperature (alternately, it is possible to let the reaction proceed overnight at 4° C. The conjugate was monitored by analytical SEC, to identify overlap of absorbance at 280 nM (from the mAb) and at 260 nM (from the linker-oligonucleotide payload). A semi-prep SEC was carried out via Agilent 2.7 micron, 4.6 mm to 300 mm SEC column, at a flowrate of 0.35 mL/min over a period of 15 mins. Alternatively, a 7.8 mm ID column could be used for a load of about 1 mg to about 3 mg. Fractions were collected from the semi-prep SEC run and concentrated using PBS at pH of about 7.4, using 50 kDa MWCO spin column (three rounds of centrifugation). Analytical SEC was used to check the characteristics of the desired final product, followed by NanoDrop Quantitation via absorbance at 280 nm, and the ratio of absorbance's at 280 nm and 260 nm (A260/A280), and in some instances (depending on the dye used), absorbance was measured at 547 nm. A flowchart outlining the processes described in this example is shown in FIG. 3.

Figure 7:
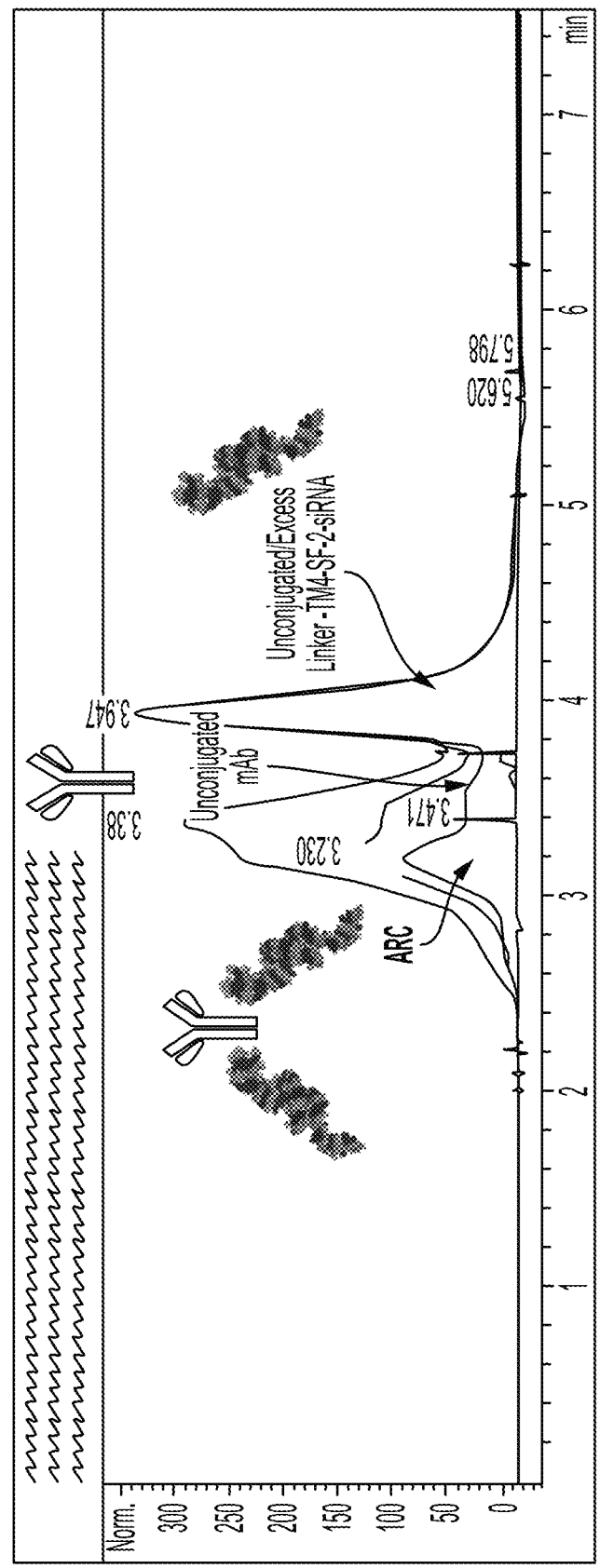
FIG. 7 shows representative results for analytical-SEC (size exclusion chromatography) carried out with an exemplary antibody oligonucleotide conjugate as described herein.

Transglutaminase-based conjugation of a linker-oligonucleotide to an antibody A native TM4SF-1 antibody was buffer exchanged via 50 kDa MWCO filter into 25 mM TRIS, 150 mM NaCl, pH of about 8.5 to at least 50 µM final concentration. About 1.5-10 eq. of nucleophilic amine containing oligonucleotide was added to the antibody. The acyl-acceptor can be any non-sulfur heteroatom. Finally, catalytic to stoichiometric equivalents of microbial transglutaminase (also referred to herein as 'mTGase' or 'TG': Ajinomoto Activa T1) was added as a 20 µM TRIS stock solution having a pH of about 8.5 (or 80 mg/ml from white powder form of mTGase). The crude conjugation mixture was heated at 37° C. for 1 hour in a thermomixer and the thermomixer is them ramped to 4° C. and agitated with monitoring via SEC-HPLC. The crude reaction is purified via PD-10, 50 k MWCO Amicon, Protein-A or SEC-HPLC techniques. Removal of mTGase was critical to ensure removal by confirmation by analytical SEC or SDS-Gel of final recovered desired product/conjugate. FIG. 7 shows the results for analytical-SEC carried out with an ARC (prepared using transglutaminase based conjugation).

Figure 8:
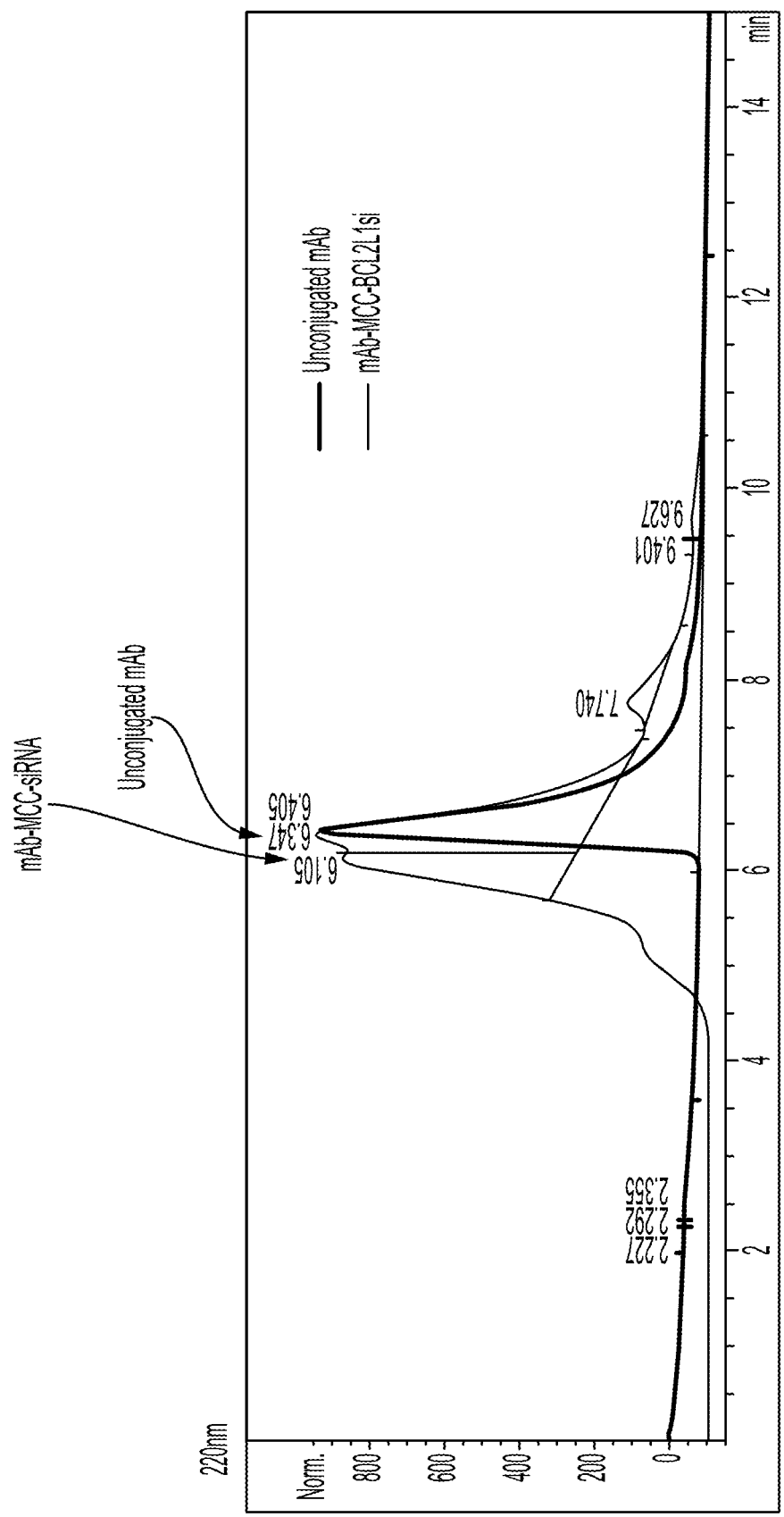
FIG. 8 shows absorbance spectrum (at 220 nm) for an exemplary antibody oligonucleotide conjugate as described herein, containing a BCL2L1 siRNA.
Figure 9:
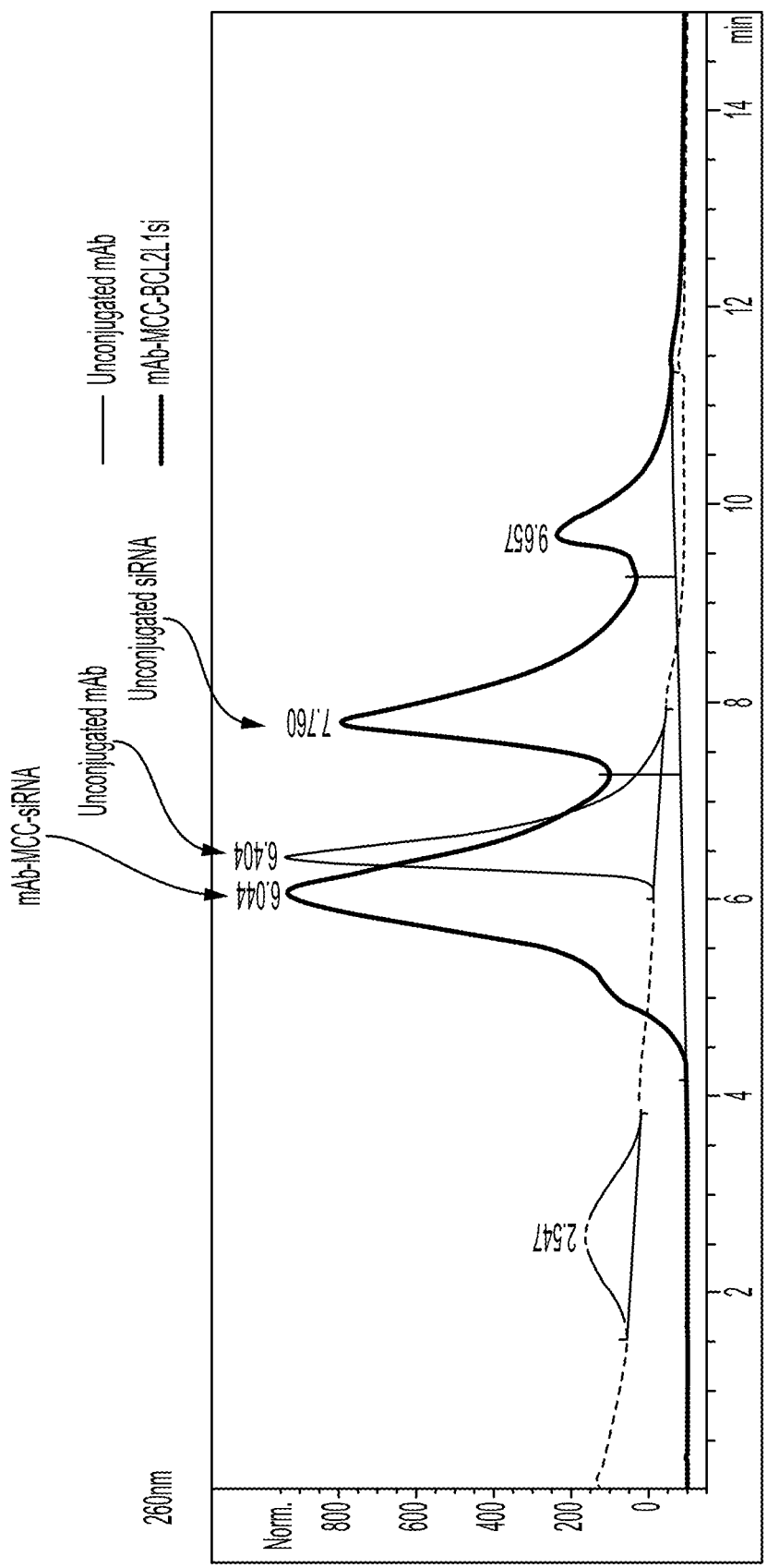
FIG. 9 show s absorbance spectrum (at 260 nm) for an exemplary antibody oligonucleotide conjugate as described herein, containing a BCL2L1 siRNA.
Figure 10:
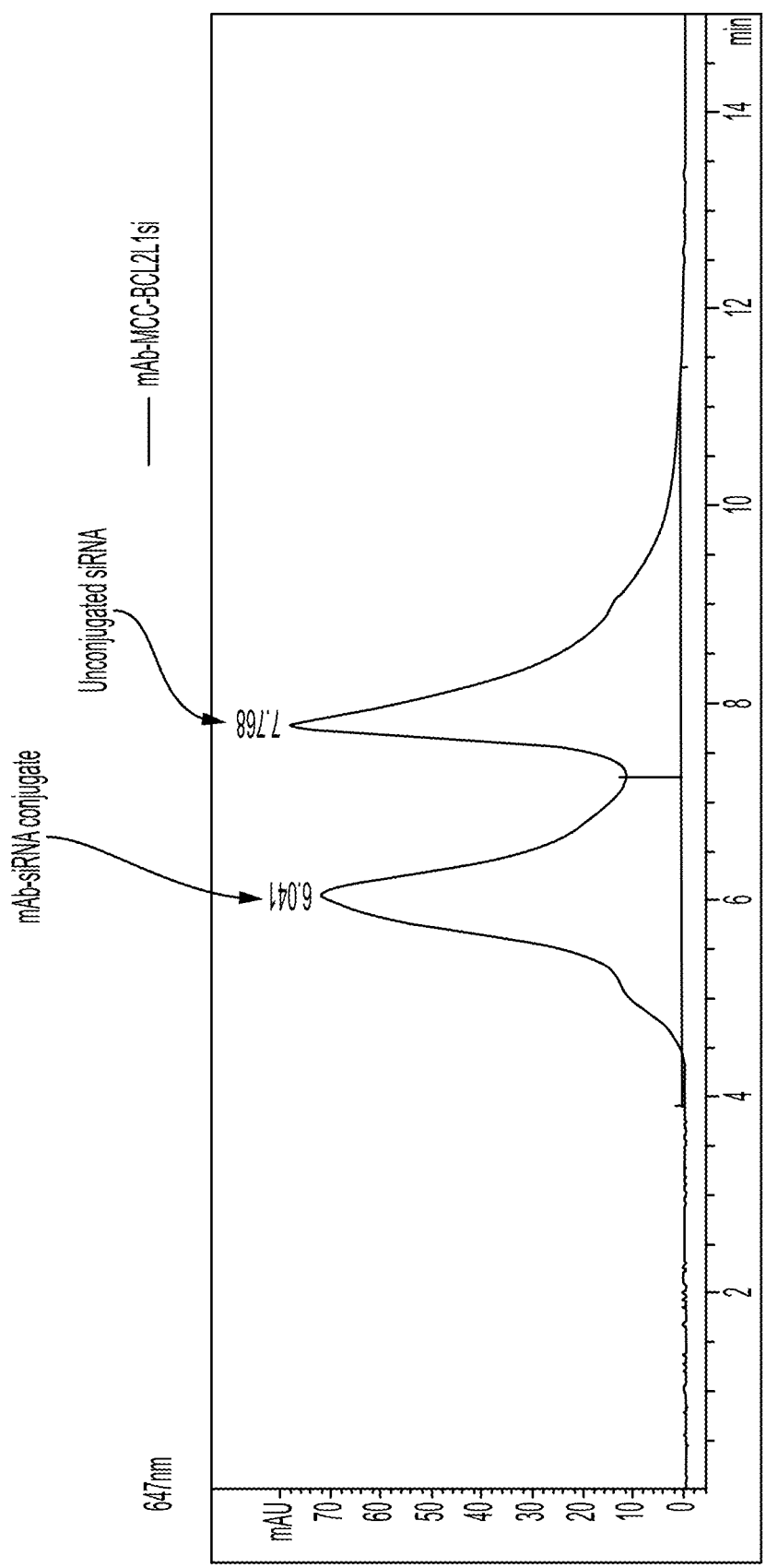
FIG. 10 shows absorbance spectrum (at 647 nm) for an exemplary antibody oligonucleotide conjugate as described herein, containing a BCL2L1 siRNA.
Figure 11:
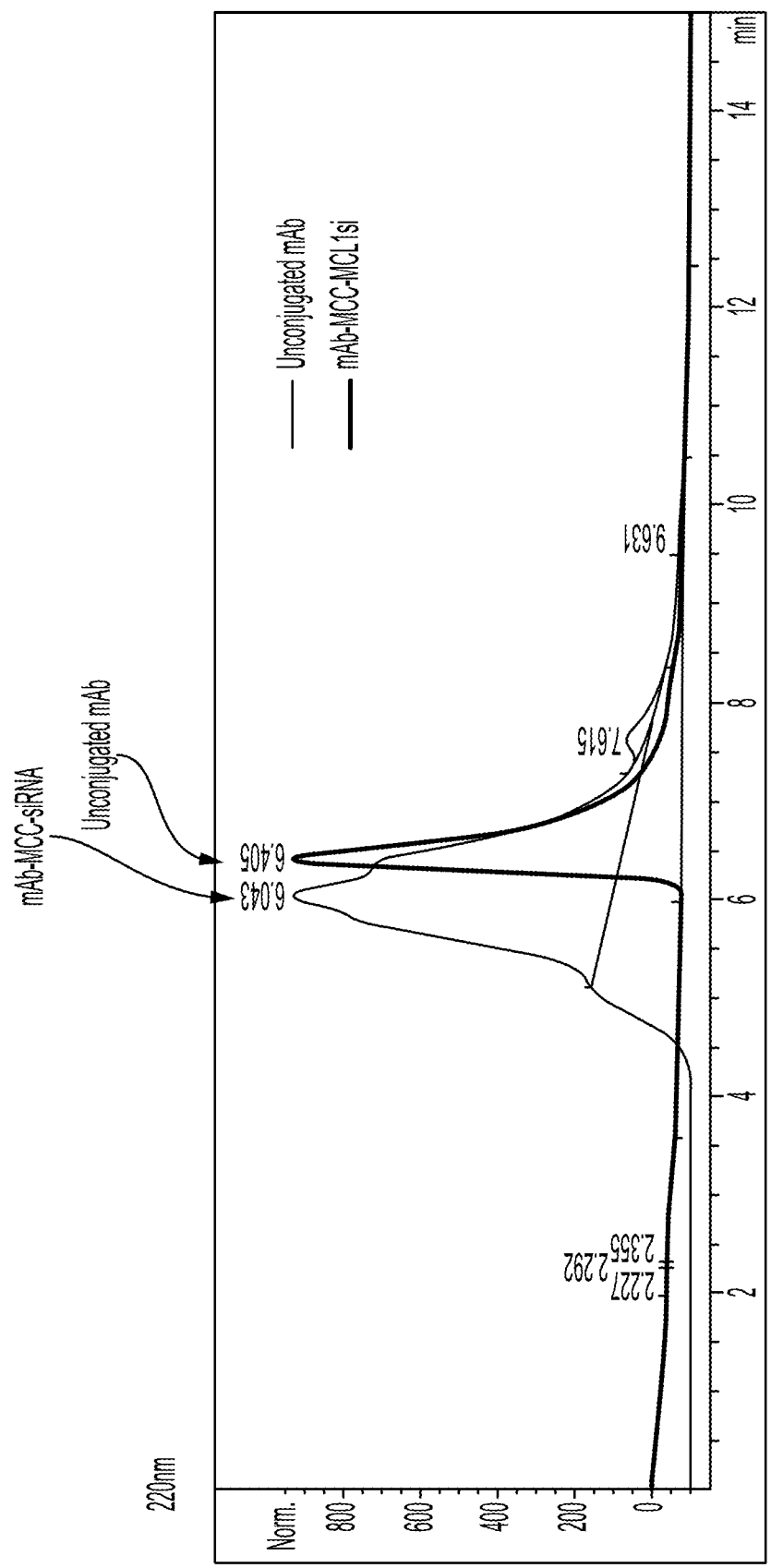
FIG. 11 shows absorbance spectrum (at 220 nm) for an exemplary antibody oligonucleotide conjugate as described herein, containing a MCL1siRNA.
Figure 12:
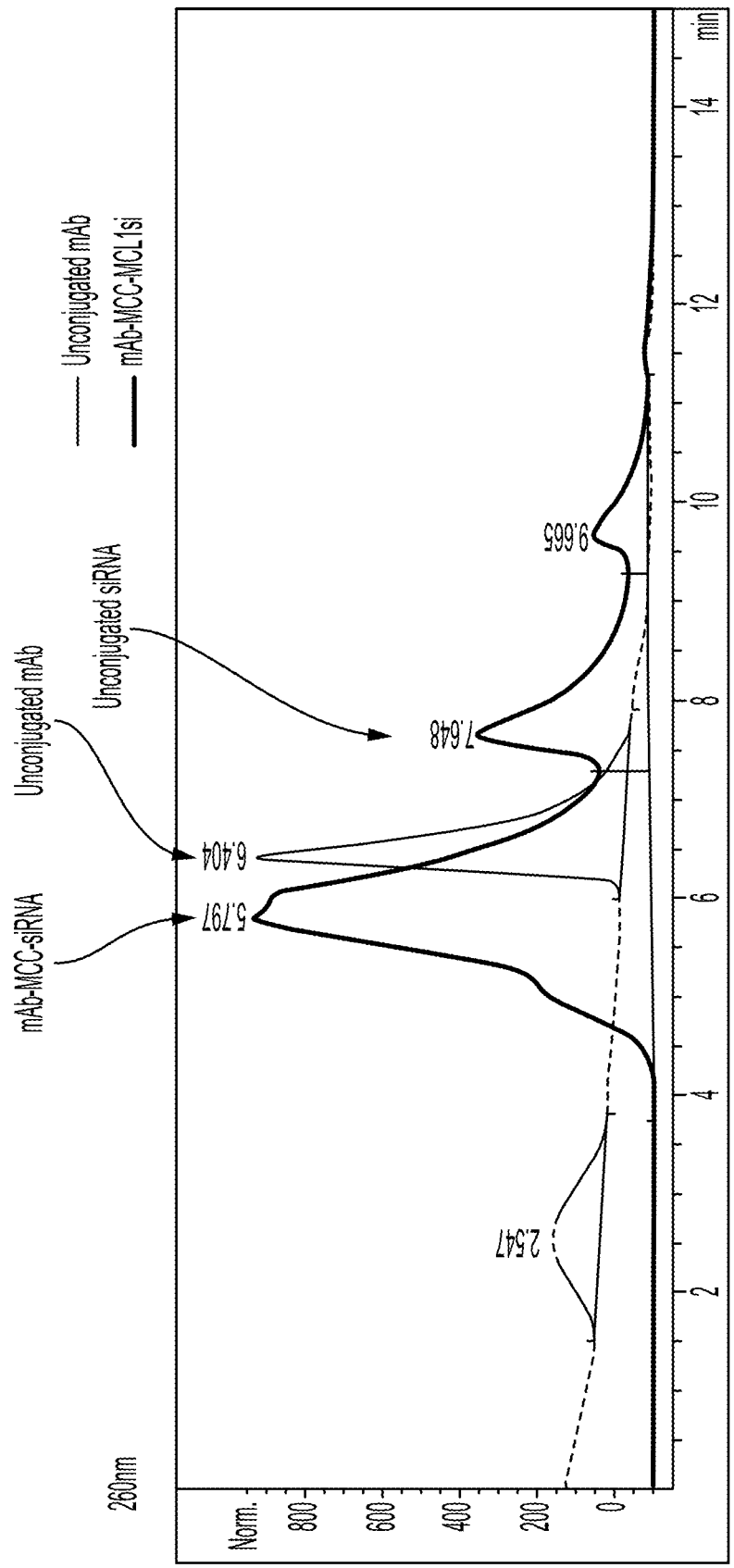
FIG. 12 shows absorbance spectrum (at 260 nm) for an exemplary antibody oligonucleotide conjugate as described herein, containing a MCL1siRNA.
Figure 13:
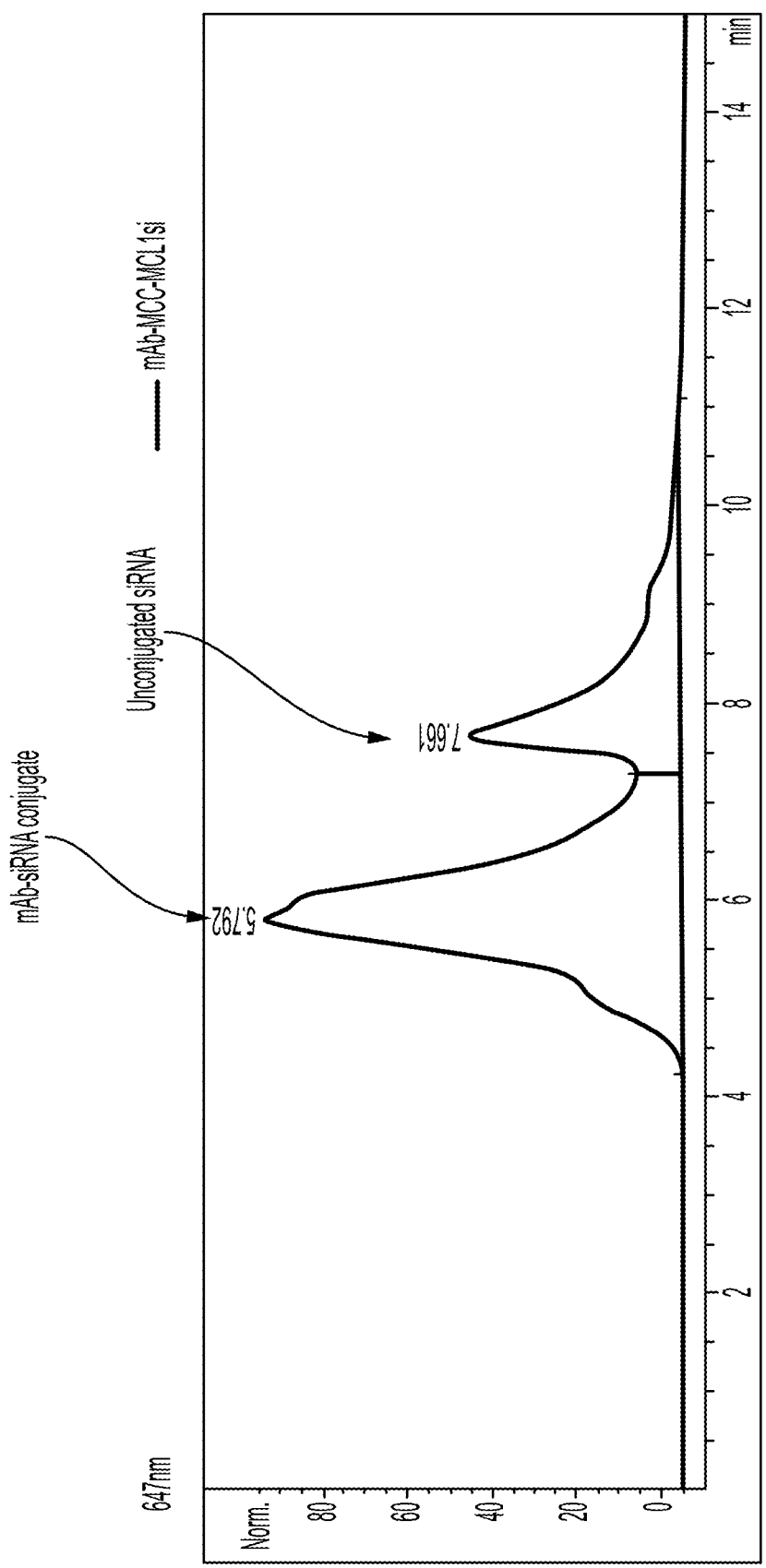
FIG. 13 shows absorbance spectrum (at 647 nm) for an exemplary antibody oligonucleotide conjugate as described herein, containing a MCL11siRNA.
Figure 14:
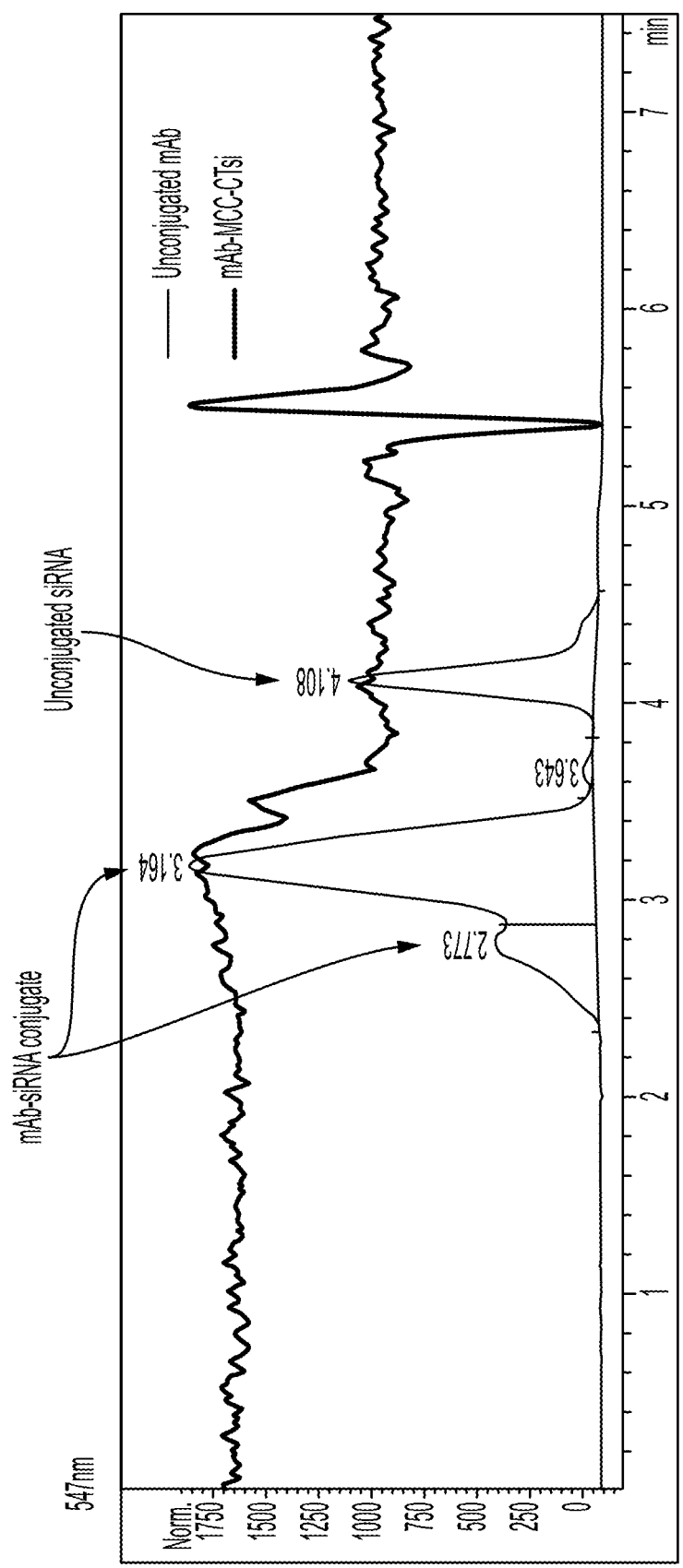
FIG. 14 shows absorbance spectrum (at 220 nm) for an exemplary antibody oligonucleotide conjugate as described herein, containing a CTsiRNA (control siRNA).
Figure 15:
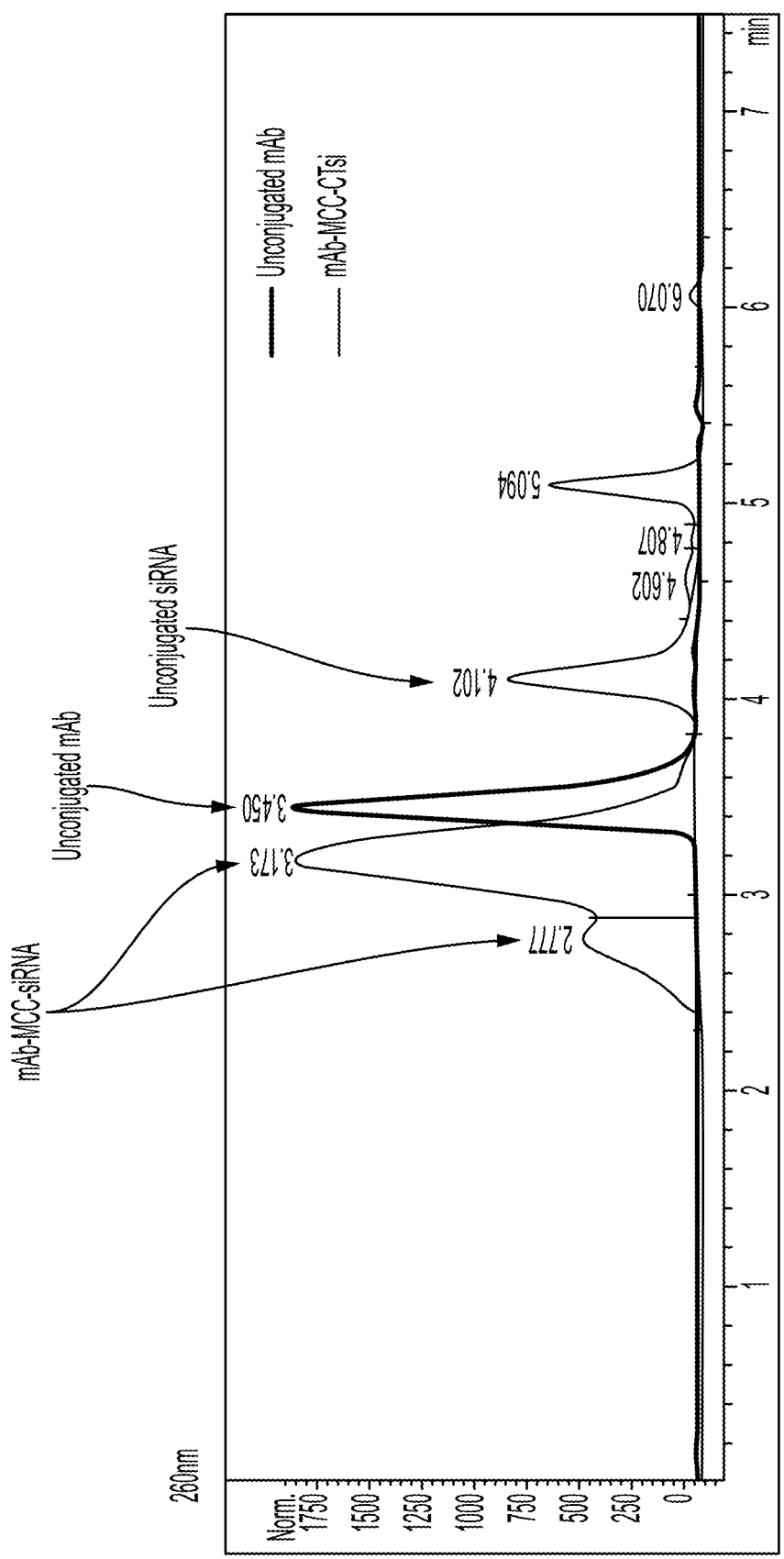
FIG. 15 shows absorbance spectrum (at 260 nm) for an exemplary antibody oligonucleotide conjugate as described herein, containing a CTsiRNA (control siRNA).
Figure 16:
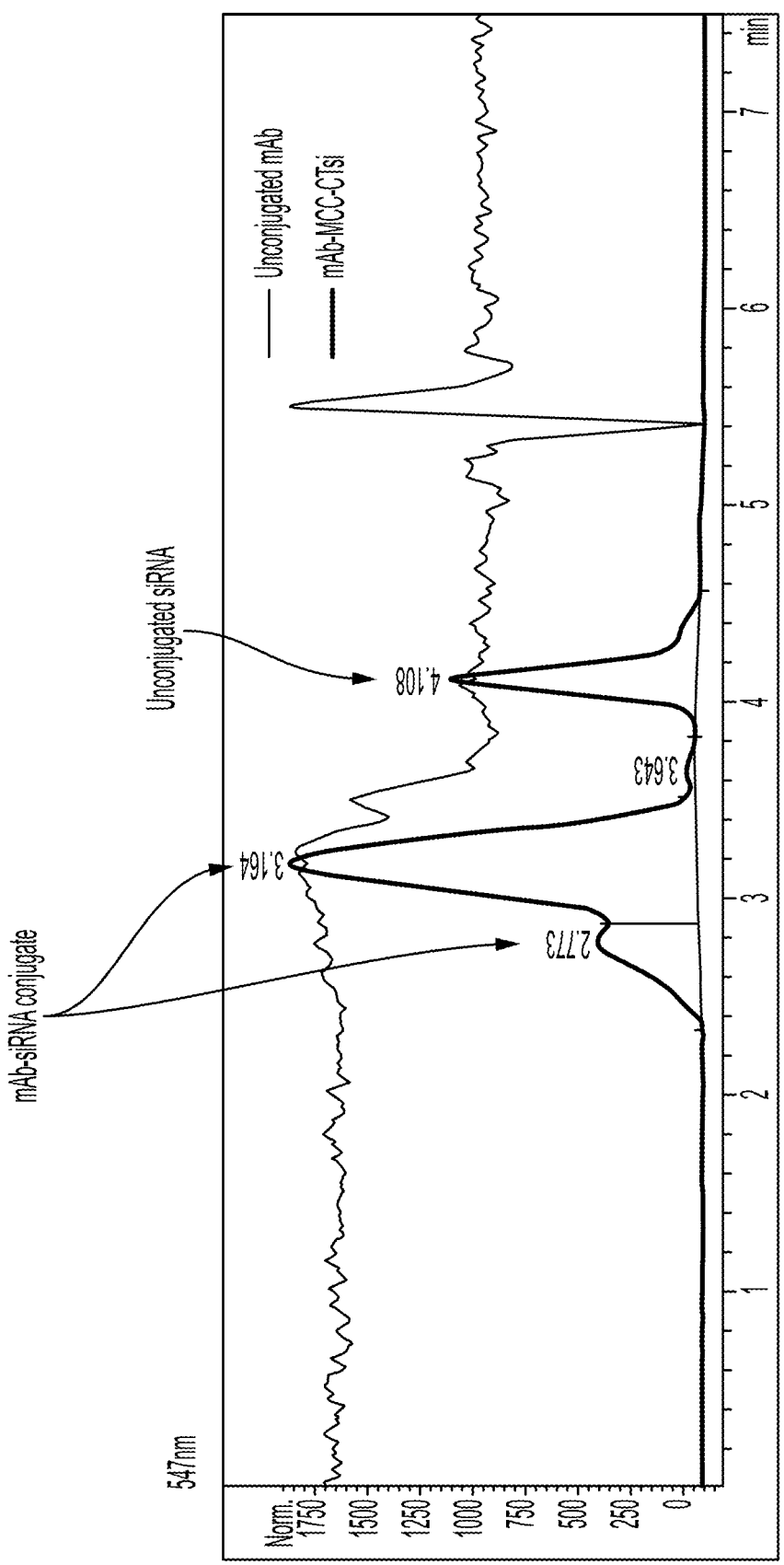
FIG. 16 shows absorbance spectrum (at 647 nm) for an exemplary antibody oligonucleotide conjugate as described herein, containing a CTsiRNA (control siRNA).
Figure 17:
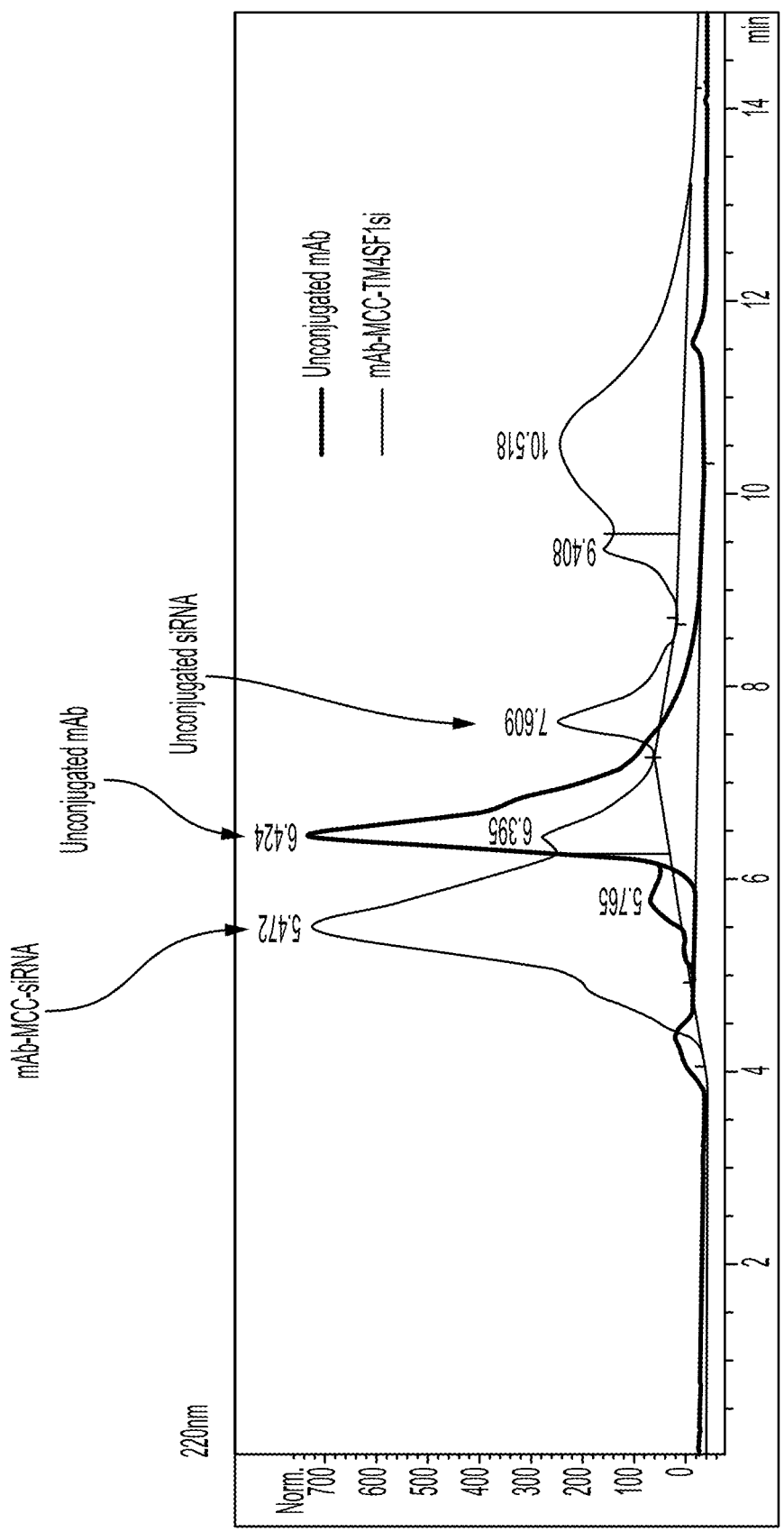
FIG. 17 shows absorbance spectrum (at 220 nm) for an exemplary antibody oligonucleotide conjugate as described herein, containing a TM4SF1 siRNA.
Figure 18:
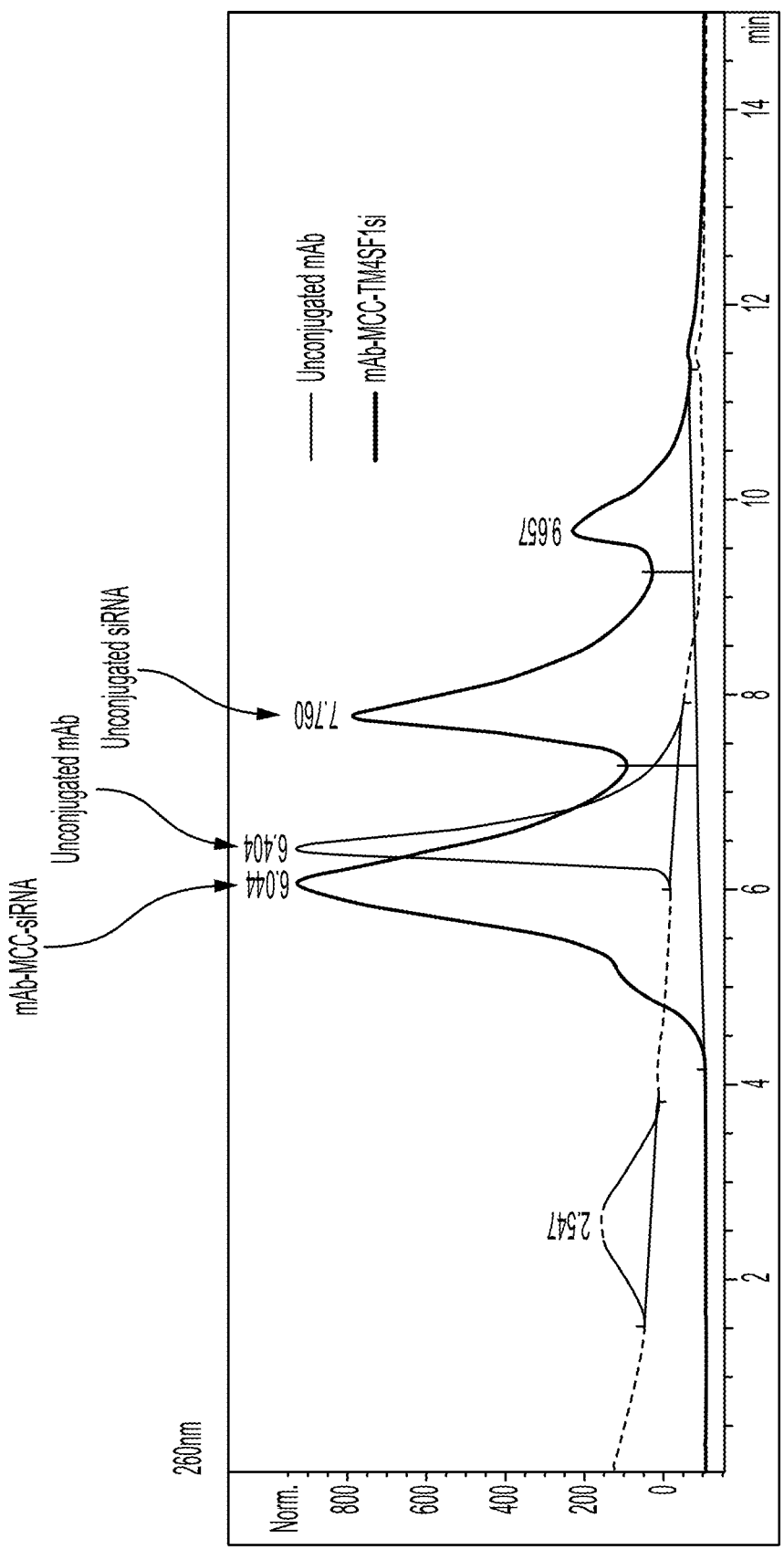
FIG. 18 show absorbance spectrum (at 260 nm) for an exemplary antibody oligonucleotide conjugate as described herein, containing a TM4SF1siRNA.
Figure 19:
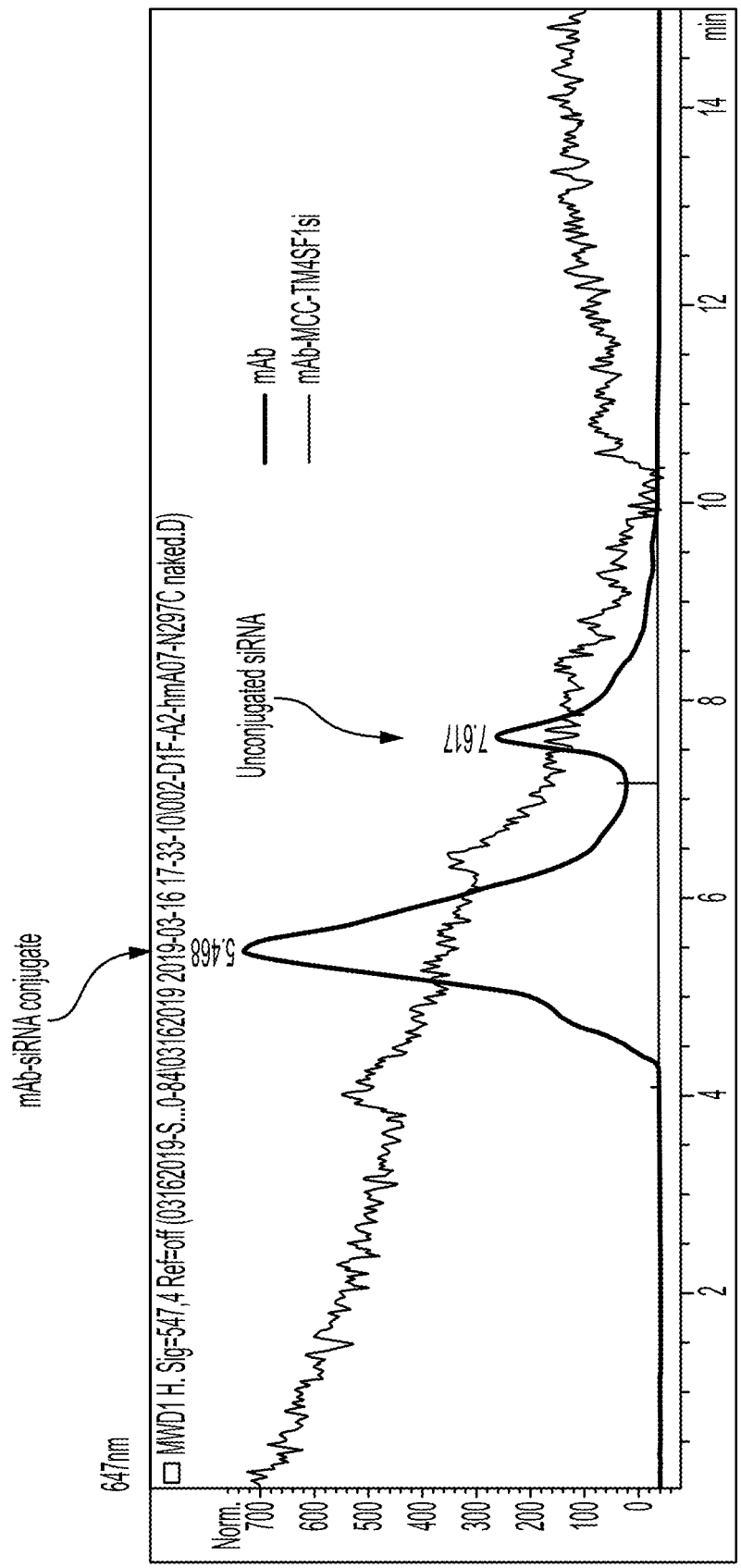
FIG. 19 shows absorbance spectrum (at 647 nm) for an exemplary antibody oligonucleotide conjugate as described herein, containing a TM4SF1siRNA.

ARCs prepared using mTGase based conjugation were characterized using analytical-SEC, results shown in FIGS. 8-10 (each figure shows comparison of unconjugated mAb and mAb conjugated to BCL2L1siRNA, via MCC linker, with absorbance measurements at 220 nm (FIG. 8), 260 nm (FIG. 9), or 647 nm (FIG. 10). Additional ARCs prepared using mTGase based conjugation were characterized using analytical-SEC, results shown in FIGS. 11-13 (each figure shows comparison of unconjugated mAb and mAb conjugated to MCLsiRNA, via MCC linker, with absorbance measurements at 220 nm (FIG. 11), 260 nm (FIG. 12), or 647 nm (FIG. 13). Further ARCs prepared using mTGase based conjugation were characterized using analytical-SEC, results shown in FIGS. 14-16 (each figure shows comparison of unconjugated mAb and mAb conjugated to CTsiRNA, via MCC linker, with absorbance measurements at 220 nm (FIG. 14), 260 nm (FIG. 15), or 647 nm (FIG. 16). Further ARCs prepared using mTGase based conjugation were characterized using analytical-SEC, results shown in FIGS. 17-19 (each figure shows comparison of unconjugated mAb and mAb conjugated to TM4SF1siRNA, via MCC linker, with absorbance measurements at 220 nm (FIG. 17), 260 nm (FIG. 18), or 647 nm (FIG. 19).

Purification of exemplary antibody oligonucleotide conjugates (in particular, antibody-RNA conjugates, also referred to herein as ARCs): Exemplary ARCs (containing a double stranded siRNA with an NH2-amine linker/spacer on the 3' end and a Dy547 dye on the 5' end; exemplary siRNA sequences are provided as SEQ ID Nos. 102-273) were purified utilizing a Bio-Inert 1260 HPLC from Agilent. Phosphate buffered saline (PBS) pH of about 7.4 sourced from Corning was triple filtered through a 0.22 micron filter prior to introduction to the system. Mobile phase was run at about 1 mL/min for about 7.5 minutes per run through an Agilent Advance Bio SEC 300 angstrom 2.7 micron pore size 7.8 mm×150 mm column. ARCs were harvested using time-based fraction collection to maximize recovery and separation from unconjugated reaction stock. Following collection, ARCs were concentrated via centrifugation in 50 kDa MWCO spin columns. To ensure sterility, ARCs were filtered through a 0.22 micron filter.

ARC concentration was measured spectrophotometrically. Absorbance was measured at 280 nm. In case of oligonucleotides, concentration was determined by measuring absorbance at 260 nm and 547 nm (if DyLight 547 dye was present on the oligonucleotide). Loading of siRNA was confirmed by larger peaks at 280 nm and then confirmed at 547 nm overlapping wavelengths.

Desired product, the ARCs, were isolated via prep-SEC-HPLC, or by passing the ARCs through 100 kDa MWCO Amicon spin-columns (7 rounds of centrifugation) followed by concentration using 50 kDa MWCO Amicon spin columns, in PBS having pH of about 7.4.

Figure 20A:
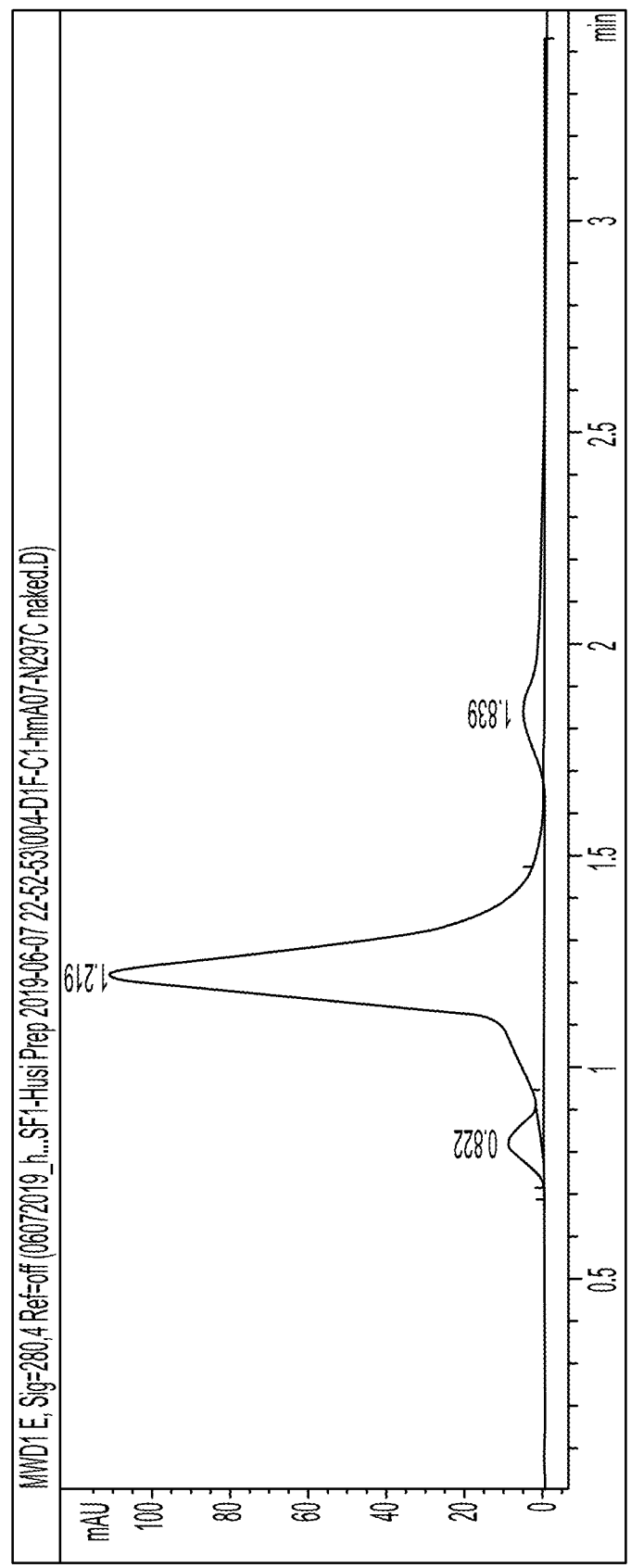
FIGS. 20A-20D provide HPLC chromatograms for various antibodies and conjugates. HPLC chromatogram for naked human AGX-A07 antibody comprising an N297C mutation in shown in FIG. 20A; that of naked SPDP-TM4SF1-Husi is shown in FIG. 20B; crude conjugate of human AGX-A07 comprising N297C-S-S-TM4SF-1-Husi is shown in FIG. 20C; and an exemplary purified ARC is shown in FIG. 20D.
Figure 20B:
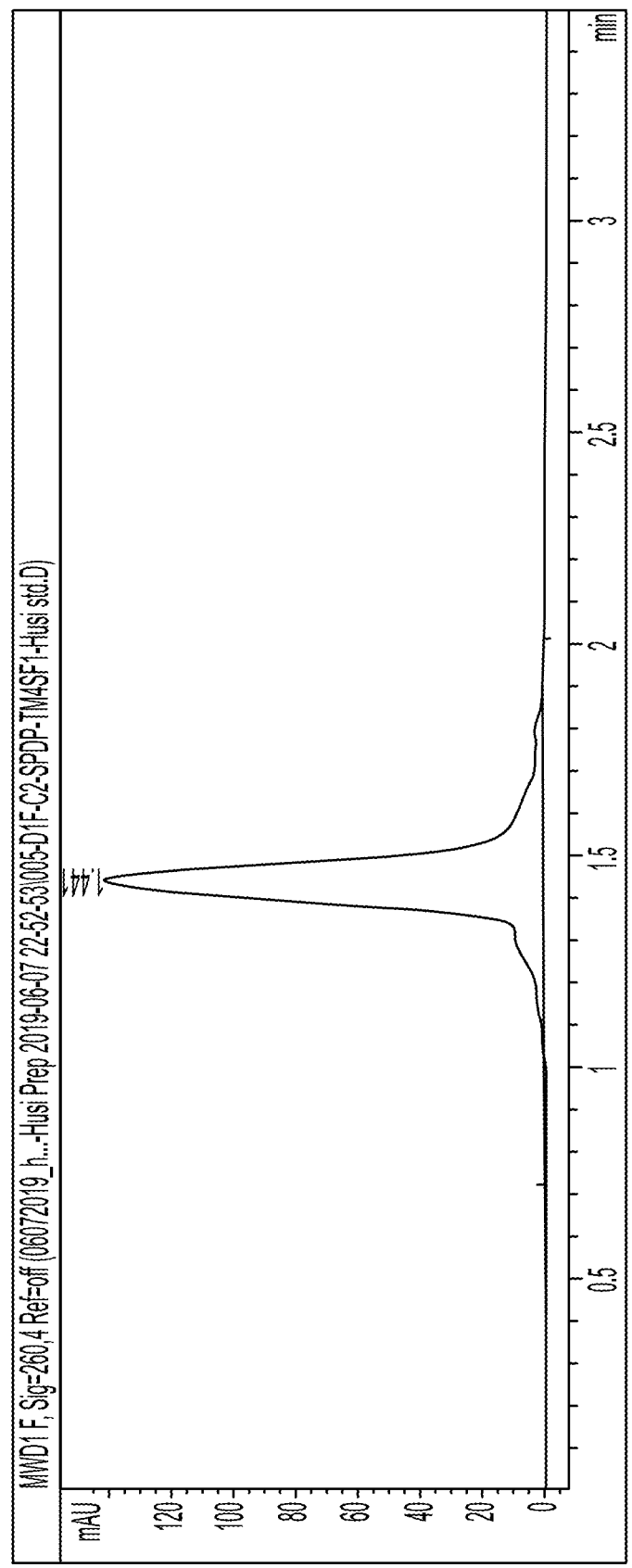
Figure 20C:
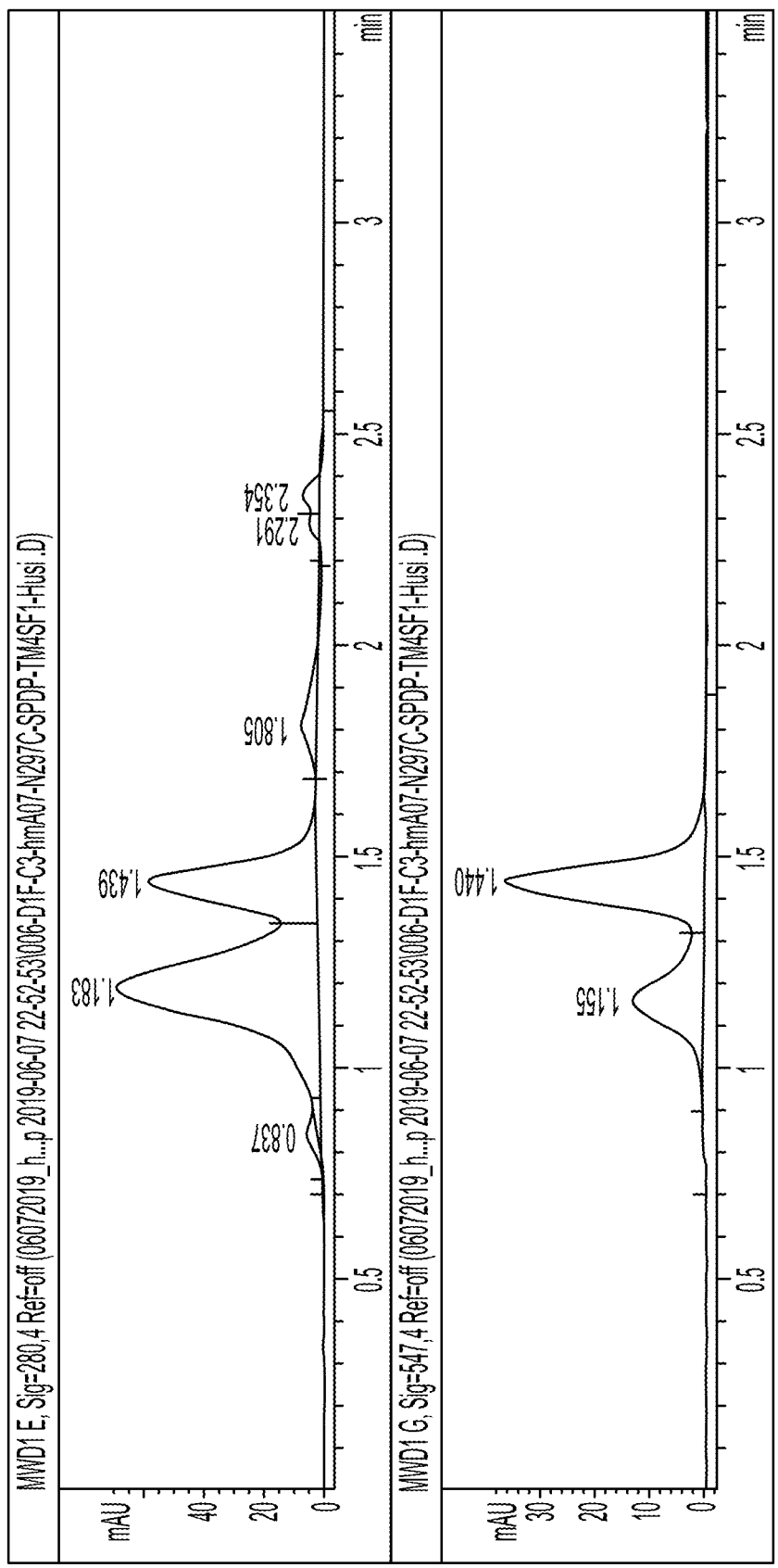
Figure 20D:
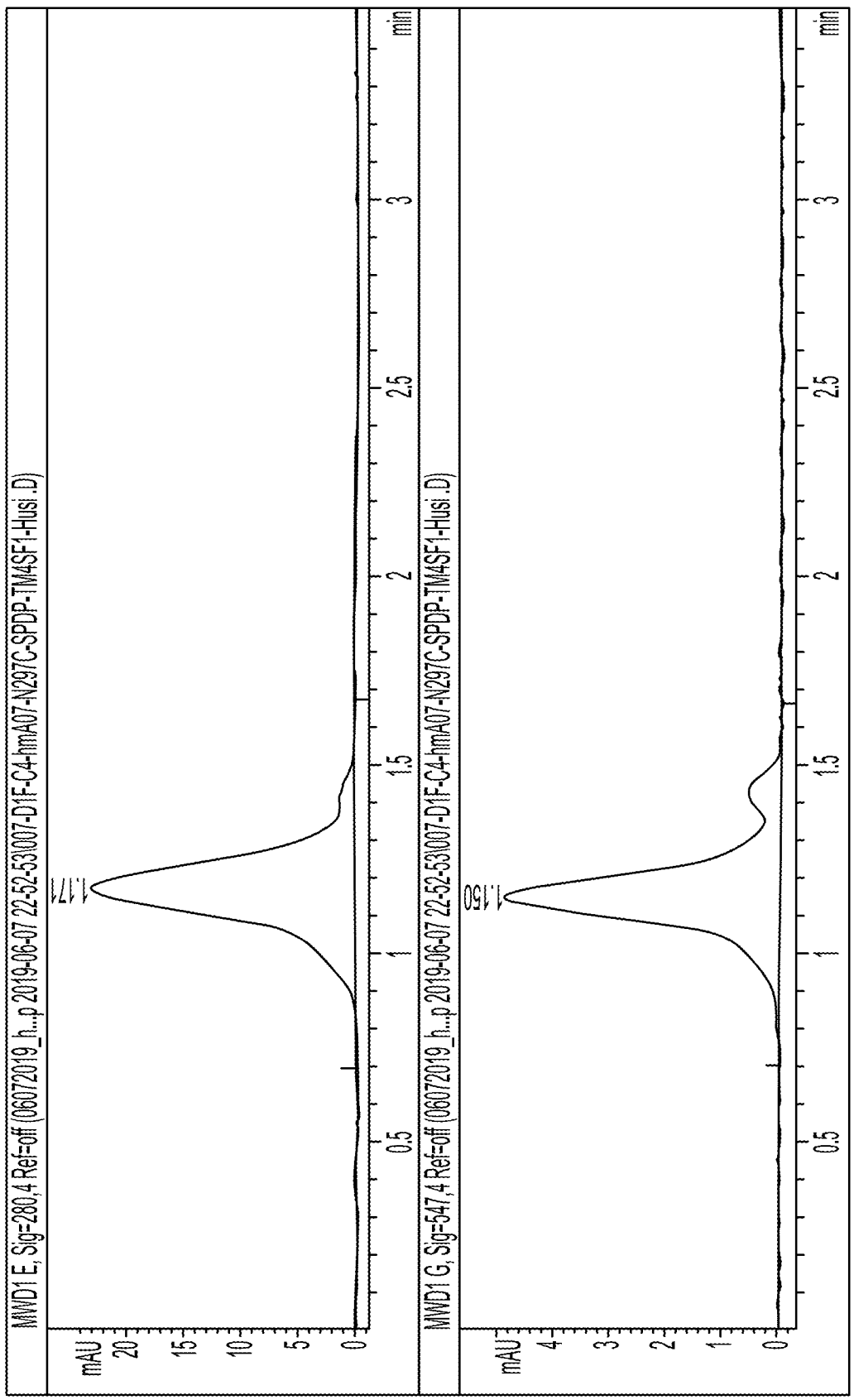
Figure 21:
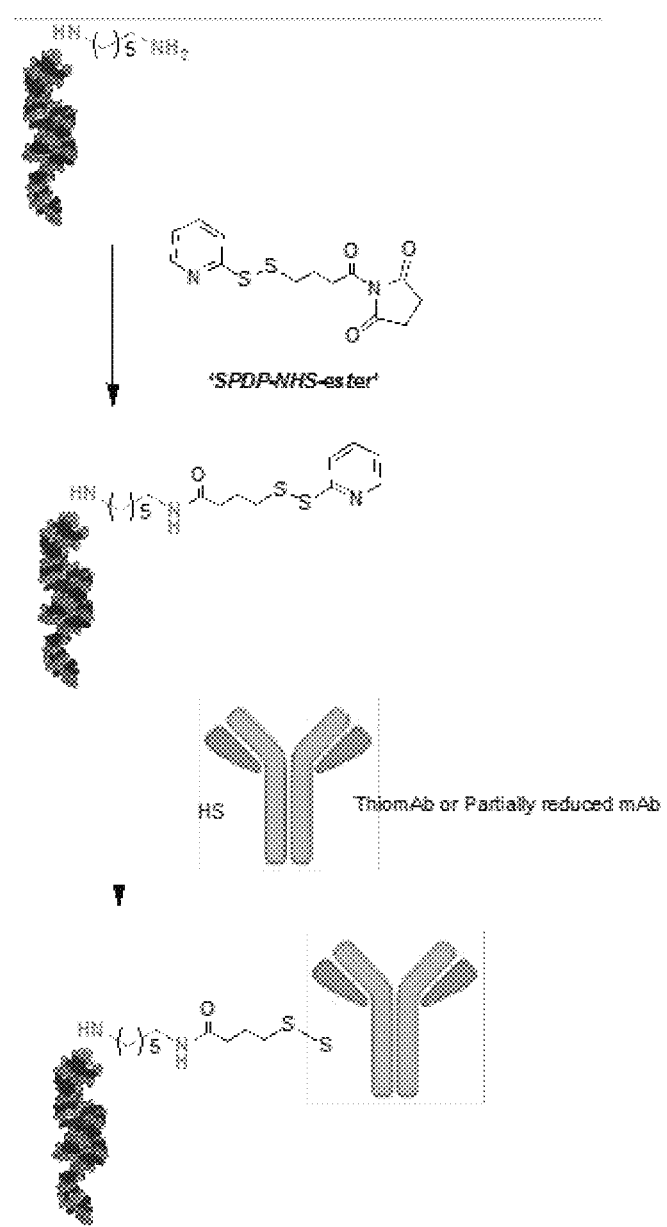
FIG. 21 show s an exemplary protocol for conjugating of an antibody to a linker oligonucleotide conjugate, utilizing the reagent SPDP.

HPLC chromatograms for various antibodies and conjugates are provided in FIGS. 20A-20D. HPLC chromatogram for naked human AGX-A07 antibody comprising an N297C mutation in shown in FIG. 20A; that of naked SPDP-TM4SF1-Husi is shown in FIG. 20B; crude conjugate of human AGX-A07 comprising N297C-S-S-TM4SF-1-Husi is shown in FIG. 20C; and an exemplary purified ARC is shown in FIG. 20D. An exemplary protocol for conjugating of an antibody to a linker oligonucleotide conjugate, utilizing the reagent SPDP is shown in FIG. 21 (ThiomAb™ in the figure refers to a cysteine engineered antibody).

Example 5: Biological Properties of Exemplary ARCs of this Disclosure

Several exemplary ARCs were studies in knockdown assays as described herein. Briefly, cells were cultured and an ARC (containing either a control siRNA sequence of a test siRNA sequence, as listed in Table 5; the siRNA containing stabilization modification were synthesized by Dharmacon®) was added after about 3 hours. The ARC added cells were cultured overnight. At this step, one group of cells was subcultured and another group was not subcultured. Cells were imaged after about 3 hours and also at about 24 hours. Samples were further processed to measure RNA or protein expression. Molar quantity/concentrations of ARCs used during incubation are indicated on the FIGS. 25, 28A, 29A, 30A, 31A, and 32A. When quantity is indicated as 10 pmol (see FIG. 25), 20 pmol siRNA (e.g., TM4SF1 siRNA in FIG. 25) was conjugated at an OAR of 2:1, yielding 10 pmol of the AGX-TM-TM4SF1si ARC. During incubation, 10 pmol of the AGX-TM4SF1si ARC was added to a well containing 1 mL culture medium (in a 12 well plate), thus the concentration of ARC was 10 nM. Similarly, in cases where quantity is indicated as 50 pmol (see FIGS. 28A, 29A, 30A, 31A, and 32A), 100 pmol siRNA (e.g., MCL1 siRNA, BCL2L1 siRNA) was conjugated to the anti-TM4SF1 antibody at an OAR ratio of 1:2, yielding 50 pmol of the ARCs, and as explained above, the concentration of the ARC during incubation was 50 nM.

Figure 22:
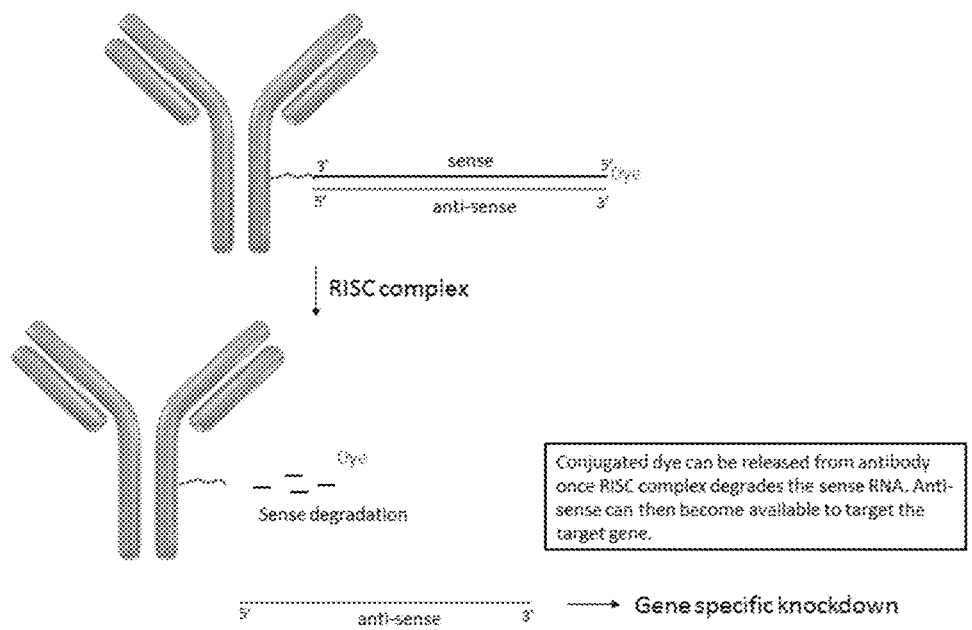
FIG. 22 shows a possible mechanism of action for an antibody-RNA conjugate (ARC) as described herein.

9 Cells were homogenized in radio-immunoprecipitation assay buffer (RIPA, Thermofisher), which was supplemented with protease/phosphatase inhibitors (Halt Protease and Phosphatase Cocktail, Thermofisher). SDS buffer was added, followed by denaturation via boiling for 5 min. Proteins were separated by SDS-polyacrylamide gel electrophoresis and transferred to a nitrocellulose membrane (Thermofisher). Membranes were blocked with 1% BSA in a Tris-buffered saline solution containing 0.1% Tween 20 followed by treatment with a primary antibody diluted in blocking solution. Anti-BCL2L1 was purchased from Cell Signaling Technologies. Immune complexes were allowed to react with the appropriate secondary antibodies conjugated to near IR dyes (Li-Cor 924-32211) and were visualized on a Li-Cor CLX. FIG. 22 shows a possible mechanism of action of an ARC.

Figures 23A, 23B, 23C, 23D, 23E:
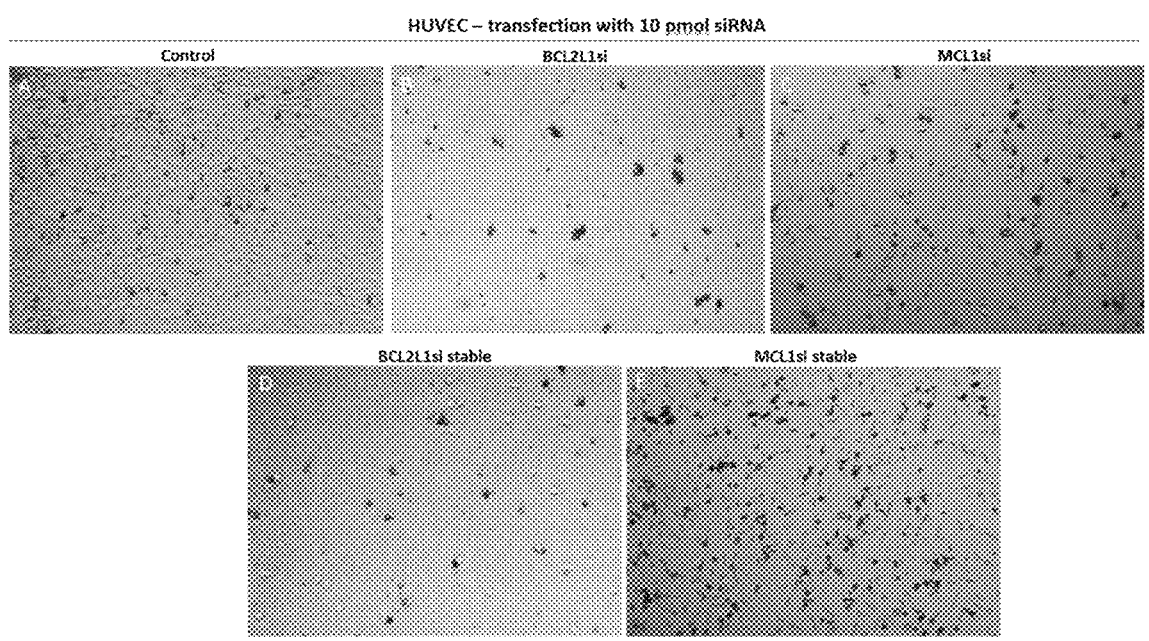
FIGS. 23A-23E show results from a knockdown assay in Human Umbilical Vein Endothelial Cells (HUVEC), using Control siRNA (FIG. 23A); BCL2L1 siRNA (FIG. 23B); MCL1 siRNA (FIG. 23C); stabilized BCL2L1 siRNA (FIG. 23D); and stabilized MCL1 siRNA (FIG. 23E).

FIGS. 23A-23E shows knockdown in HUVEC cells using BCL2L1 and MCL1 targeting siRNAs. In comparison to control (FIG. 23A): (i) greater than 95% HUVEC cells died 72 hours after the BCL2L1 knockdown (FIG. 23B); (ii) similar knockdown activity w as seen with stabilized BCL2L1 siRNA (FIG. 23C); (iii) about 90% cell death was seen with MCL1 (FIG. 23D); and (iv) MCL1 siRNA stabilization strongly affected MCL1 siRNA activity and showed only about 40% cell death (FIG. 23E).

Knockdown using MCL1, BCL2L1, and TM4SF1 siRNA was further studied in cancer cell lines, such as A549 (non-small cell lung cancer cell line); MiaPaca2 (pancreatic cancer cell line); and SKOV3 (ovarian cancer cell line). FIG. 24 provides the data from the siRNA knockdown studies in cultured human cells in vitro, as well as in endothelial cells (HUVEC). For the TM4SF1 siRNA: knockdown was over 90% in all four cell types. siRNA stabilization did not affect the knockdown activity. For BCL2L1 siRNA: knockdown was over 90% in HUVEC but weaker in tumor cell lines (average 70-80%). siRNA stabilization did not affect the knockdown activity. In case of MCL1 siRNA: knockdown was over 80% in HUVEC but weaker in tumor cell lines (average 55-66%). siRNA stabilization affected knockdown activity (average knockdown were at 34% to 48%). For each cell type. Ctl denotes control siRNA; – denotes siRNA without any modification; Dye denotes siRNA with Cy5 or Dy547 dye conjugation at 5' sense strand; Dye-stable denotes siRNA having both dye conjugation and stabilization modification, n.a. in FIG. 24=either data not available or experiment w as not conducted.

Figure 25:
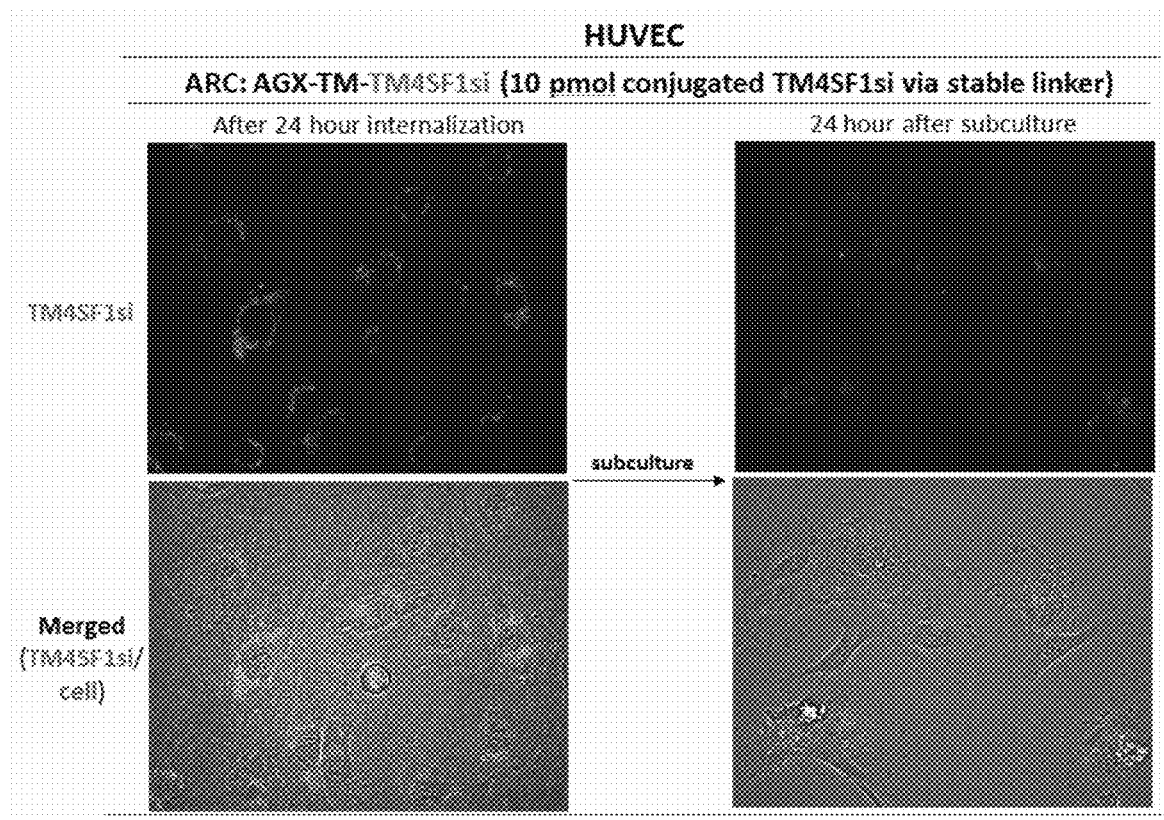
FIG. 25 shows representative images of cells exposed to exemplary ARCs as described herein.
Figure 26:
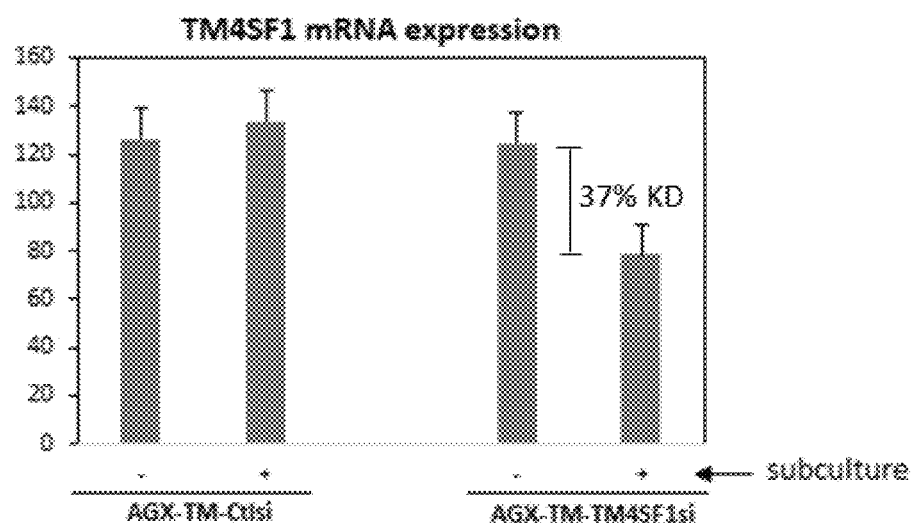
FIG. 26 shows mRNA expression levels of TM4SF1 following knockdown with an exemplary ARC as described herein.

FIG. 25 show the results of a knockdown assay, in HUVEC, using an ARC containing an anti-TM4SF1 antibody (AGX-A07) conjugated to a TM4SF1si RNA, via a stable linker. For this study, ARCs were directly added to culture medium and were removed at the time when cells were subcultured. The dye intensity declined 24 hours after the subculture indicating that the TM4SF1 siRNAs have been processed by RISC. mRNA expression (in FIG. 26) shows about 37% TM4SF1 knockdown with the exemplary TM4SF1 ARC. No knockdown was seen with control siRNA ARC. Quantitative data for the knockdown assay using ARC (AGX-TM-siRNA), containing AGX-A07 and TM4SF1 siRNA, is provided in FIG. 27.

Figure 28A:
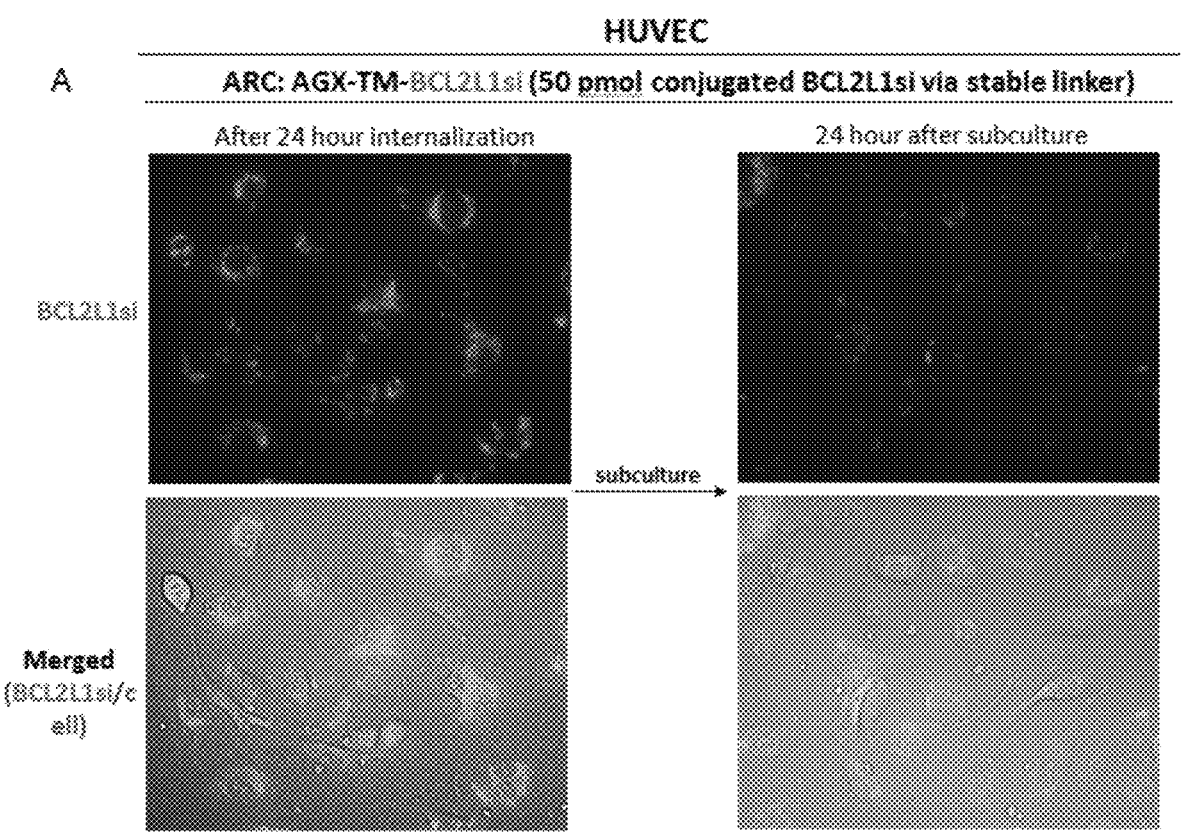
FIGS. 28A-28D show results from knockdown study in HUVECs, using an exemplary ARC as described herein. Representative images of cells exposed to the exemplary ARC is shown in FIG. 28A.
Figures 28B, 28C, 28D:
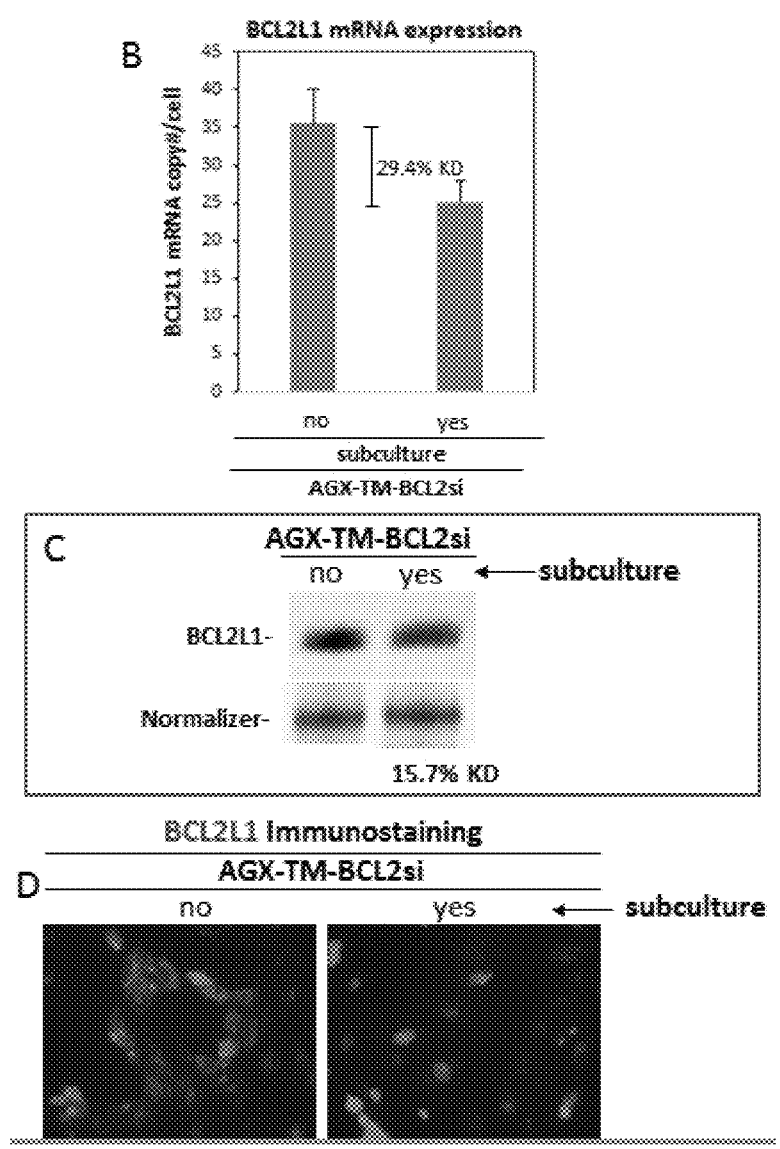
Figure 29A:
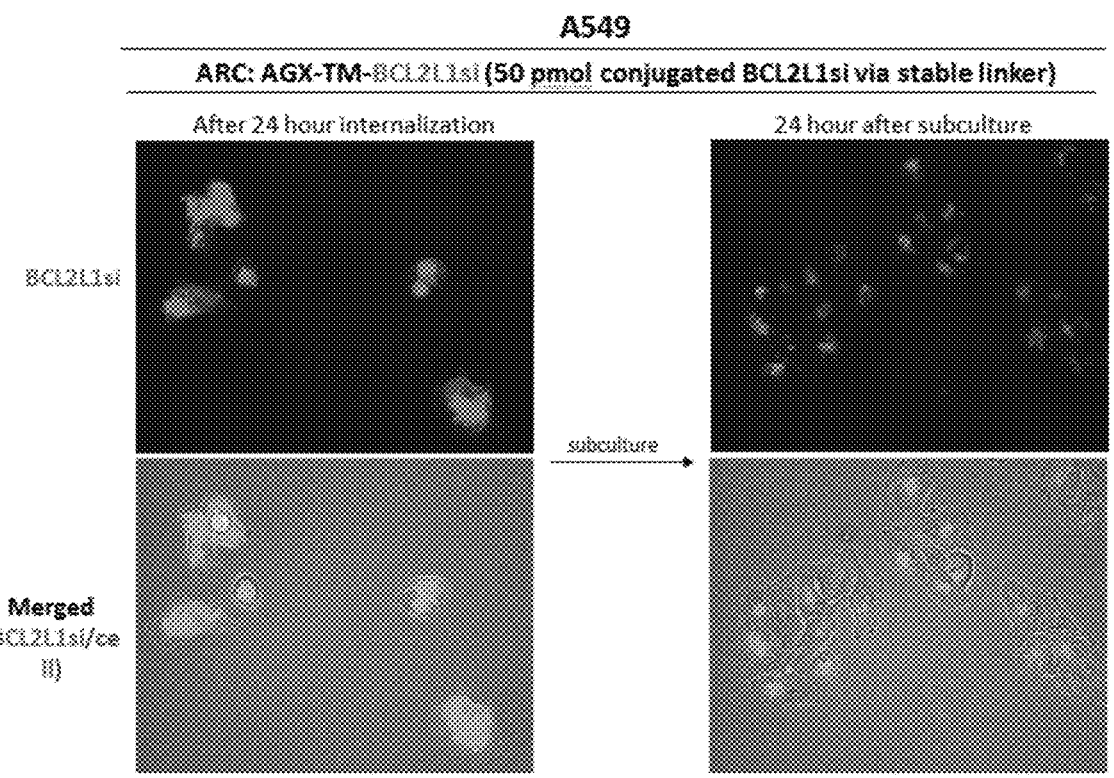
FIGS. 29A-29B show results from knockdown study in A549 cells, using an exemplary ARC as described herein. Representative images of cells exposed to the exemplary ARC is shown in FIG. 29A.
Figure 29B:
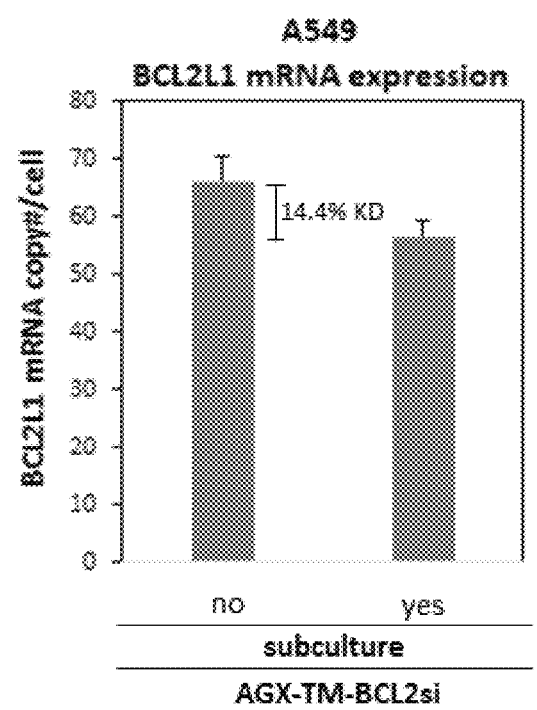
Figure 30A:
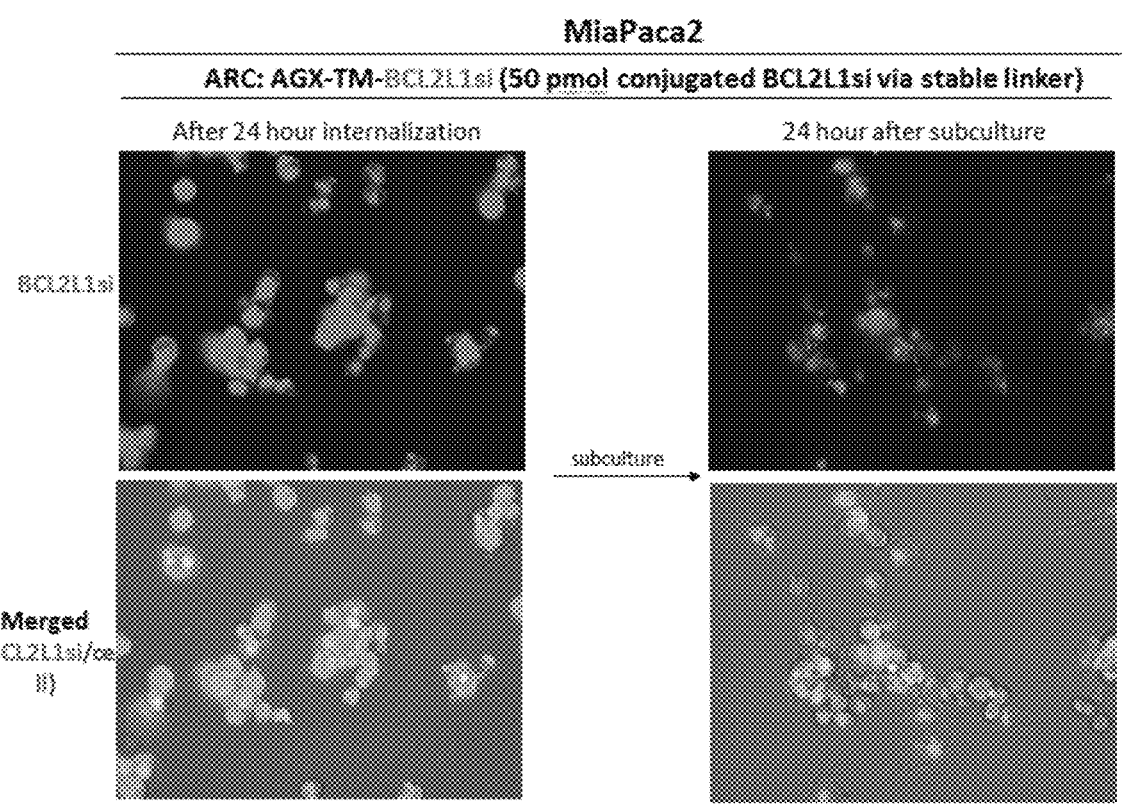
FIGS. 30A-30B show results from knockdown study in MiaPaca2 cells, using an exemplary ARC as described herein. Representative images of cells exposed to the exemplary ARC is shown in FIG. 30A.
Figure 30B:
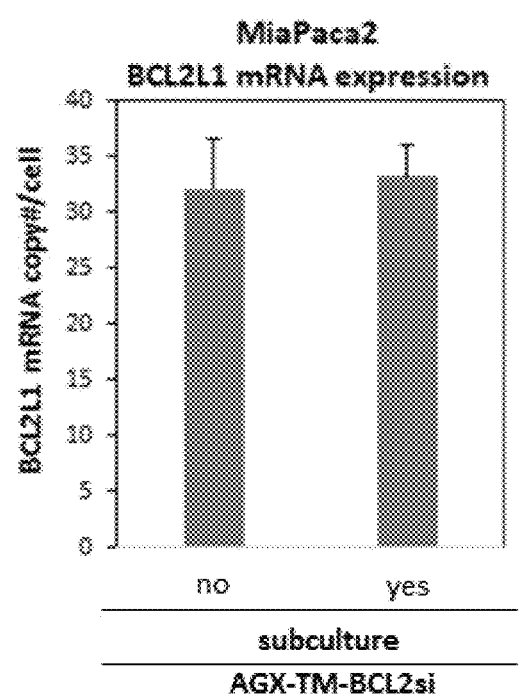
Figure 31A:
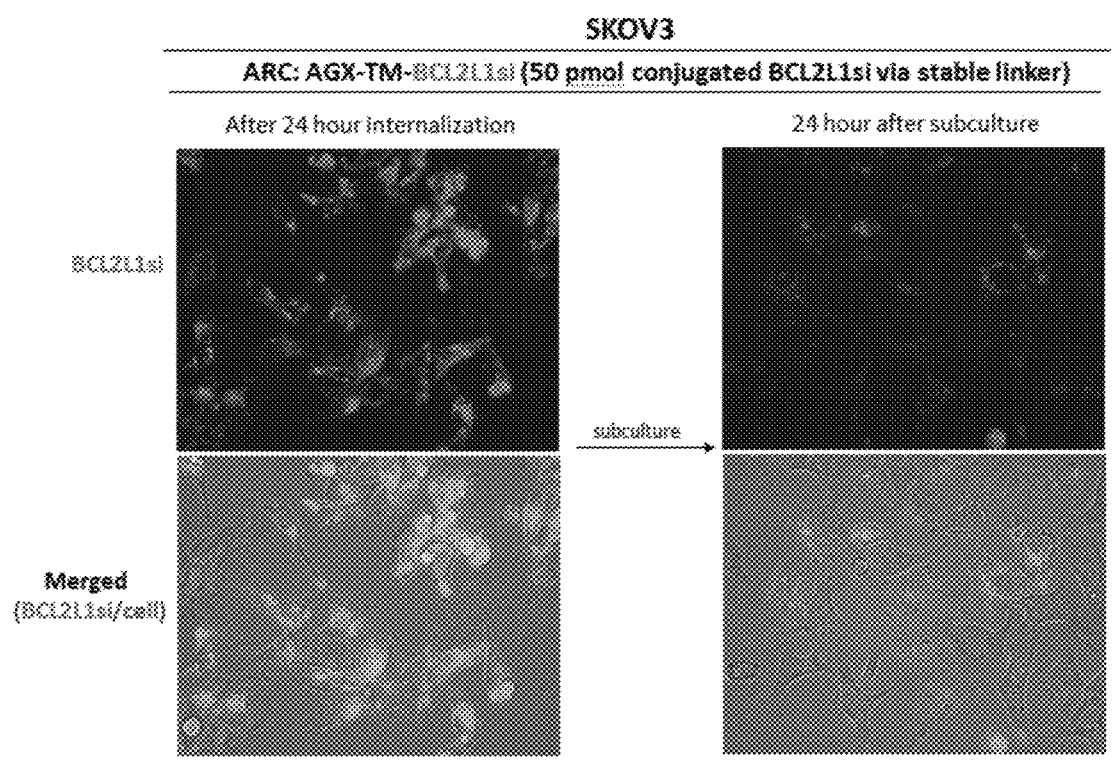
FIGS. 31A-31B show results from knockdown study in SKOV3 cells, using an exemplary ARC as described herein. Representative images of cells exposed to the exemplary ARC is shown in FIG. 31A.
Figure 31B:
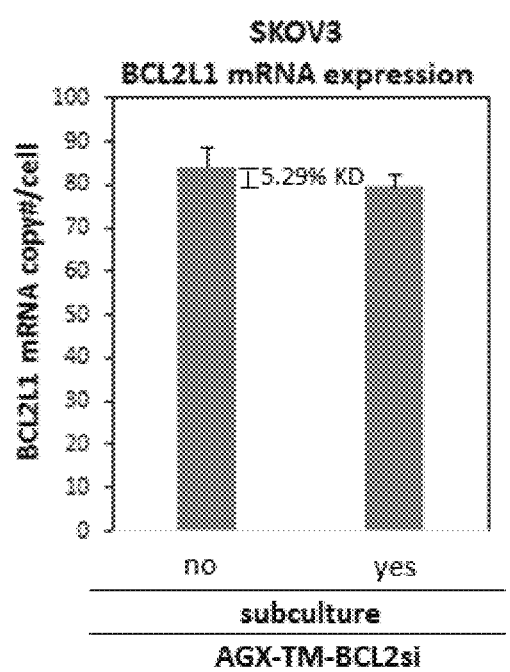

Similar knockdown study, in HUVEC, was carried out with ARC containing AGX-A07 and BCL2L1 siRNA, and the results are shown in FIG. 28A-28D. ARCs were directly added to culture medium and were removed at the time when cells were subcultured. siRNA signal declined 24 hours after the subculture indicating that the BCL2L1 siRNAs were being processed by RISC. mRNA expression showed about 29.4% BCL2L1 knockdown (FIG. 28B). Western blot showed about 15.7% knockdown of BCL2L1 (FIG. 28C). Immunostaining supports both mRNA and protein outcome showing the declined positively stained signals (FIG. 28D). ARCs containing BCL2L1 siRNA were also tested in A549 cells (results shown in FIGS. 29A-29b) (mRNA expression show-s about 14.4% BCL2L1 knockdown and siRNA signal declined 24 hours after the subculture indicates siRNAs were being processed by RISC); MiaPaca2 cells (results shown in FIGS. 30A-30B) (siRNA signal declined 24 hours after the subculture indicates siRNAs were being processed by RISC and mRNA expression showed no BCL2L1 knockdown in MiaPaca2); in SKOV3 cells (results shown in FIGS. 31A-31B) (siRNA signal declined 24 hours after the subculture indicates siRNAs were being processed by RISC and mRNA expression showed about 5.29% BCL2L1 knockdown).

Figure 32A:
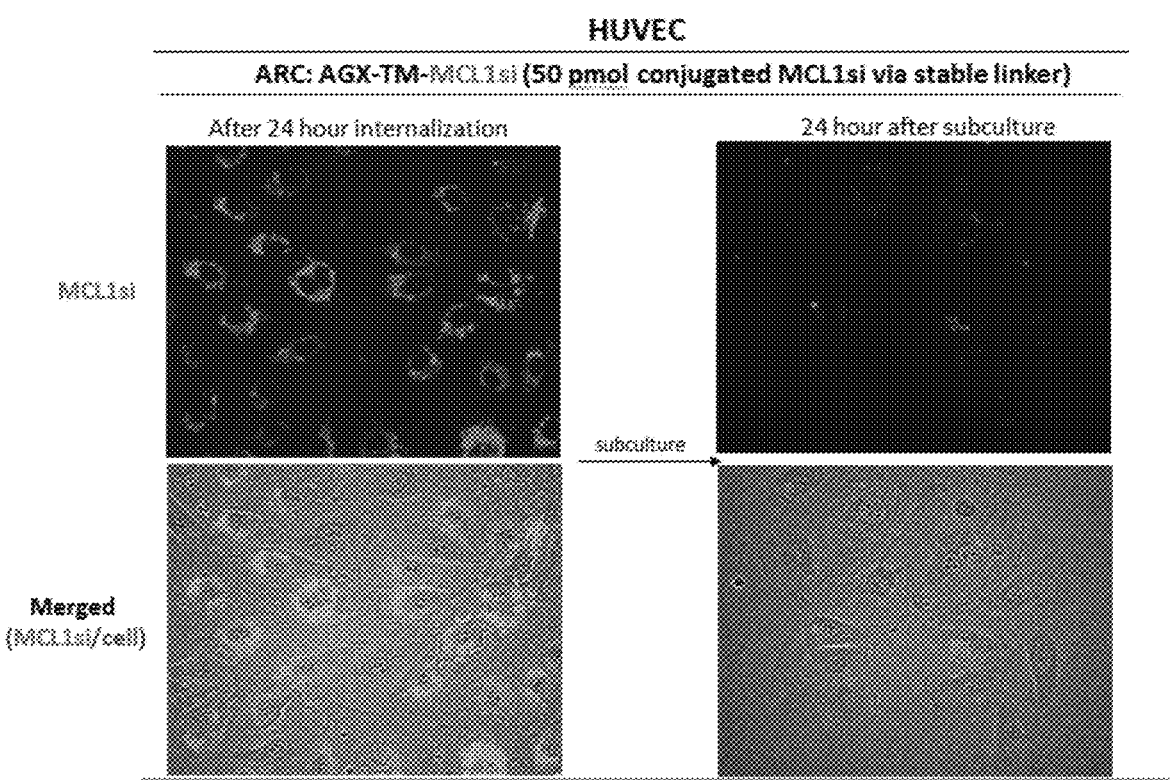
FIGS. 32A-32B show results from knockdown study in HUVECs, using an exemplary ARC as described herein. Representative images of cells exposed to the exemplary ARC is shown in FIG. 32A.
Figure 32B:
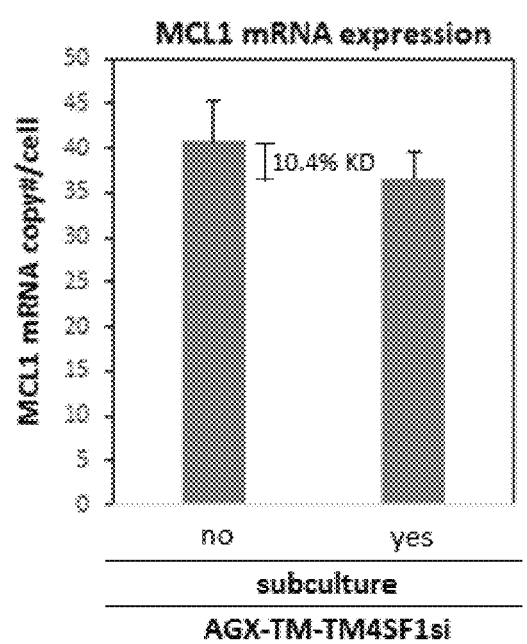

A knockdown study was carried out in HUVEC cells with ARC containing AGX-A07 and MCL1 siRNA, and the results are shown in FIGS. 32A-32B. ARCs were directly added to culture medium and were removed at the time when cells were subcultured. siRNA signal declined 24 hours after the subculture indicating that the MCL1 siRNAs were being processed by RISC. mRNA expression showed about 10.4% MCL1 knockdown. It was hypothesized that the efficiency of knockdown may have been affected by the fact that stabilized MCL1 had lost 50% of original MCL1 siRNA activity.

TABLE 3

ANTIBODY SEQUENCE DESCRIPTION

| SEQ ID NO | Description | Sequence |
|---|---|---|
| | Antibody AGX-A01 | |
| 1 | AGX-A01 Variable heavy (VH) chain- amino acid | EVILVESGGGLVKPGGSLKLSCAASGFTFSSFAMSWVRQTP EKRLEWVATISSGSIYIYYTDGVKGRFTISRDNAKNTVHLQ MSSLRSEDTAMYYCARRGIYYGYDGYAMDYWGQGTSVTVS |
| 2 | AGX-A01 Variable light (VL) chain- amino acid | AVVMTQTPLSLPVSIGDQASISCRSSQSLVHSNGNTYLHWY MQKPGQSPKVLIYKVSNRFSGVPDRFSGSGSGTDFTLKISR VEADDLGIYFCSQSTHIPLAFGAGTKLELK |
| | Antibody AGX-A03 | |
| 3 | AGX-A03 Variable heavy (VH) chain- amino acid | QIQLVQSGPELKKPGETVKISCKASGYSERDYGMNWVKQAP GRTFKWMGWINTYTGAPVYAADFKGRFAFSLDTSASAAFLQ INNLKNEDTATYFCARWVSYGNNRNWFFDFWGAGTTVTVSS |
| 4 | AGX-A03 Variable heavy (VH) chain- nucleic acid | CAGATCCAGTTGGTGCAGTCTGGACCTGAGCTGAAGAAGCC TGGAGAGACAGTCAAGATCTCCTGCAAGGCTTCTGGGTATT CCTTCAGAGACTATGGAATGAACTGGGTGAAGCAGGCTCCA GGAAGGACTTTTAAGTGGATGGGCTGGATAAACACCTACAC TGGAGCGCCAGTATATGCTGCTGACTTCAAGGGACGGTTTG CCTTCTCTTTGGACACCTCTGCCAGCGCTGCCTTTTTGCAG ATCAACAACCTCAAAAATGAAGACACGGCTACATATTTCTG TGCAAGATGGGTCTCCTACGGTAATAACCGCAACTGGTTCT TCGATTTTTGGGGCGCAGGGACCACGGTCACCGTCTCCTCA |
| 5 | AGX-A03 Variable heavy (VH) chain- codon optimized nucleic acid | CAAATTCAGTTGGTTCAATCCGGCCCTGAGCTCAAGAAGCC TGGAGAGACAGTGAAGATAAGTTGTAAGGCTAGTGGCTATT CATTTCGAGATTATGGGATGAATTGGGTCAAGCAGGCCCCA GGGCGGACCTTCAAATGGATGGGTGGATCAATACTTACAC TGGCGCACCAGTATATGCAGCTGATTTTAAGGGTCGCTTTG CATTTTCACTTGATACTTCAGCCAGTGCCGCTTTTTTGCAA |

TABLE 3-continued

ANTIBODY SEQUENCE DESCRIPTION

| SEQ ID NO | Description | Sequence |
|---|---|---|
| | | ATCAACAATCTCAAAAATGAAGACACTGCTACATATTTCTG CGCCAGGTGGGTGAGCTATGGCAATAACAGAAATTGGTTCT TTGACTTTTGGGGCGCAGGCACCACCGTCACTGTCTCATCA |
| 6 | VH-CDR1 | GYSFRDYGMN |
| 7 | VH-CDR2 | WINTYTGAPVYAADFKG |
| 8 | VH-CDR3 | WVSYGNNRNWFFDF |
| 9 | AGX-A03 Variable light (VL) chain-amino acid | DVLMTQTPLSLPVRLGDQASISCRSSQTLVASNGNTYLEWY LQKPGQSPKLLIYKVSNRLSGVPDRFSGSGSGIDFILKISR VETEDLGVYYCFQGSHGPWTFGGGTKLEIK |
| 10 | AGX-A03 Variable light (VL) chain-nucleic acid | GATGTTTTGATGACCCAAACTCCACTCTCCCTGCCTGTCCG TCTTGGAGATCAGGCCTCCATCTCTTGTAGATCTAGTCAGA CCCTTGTACATAGTAATGGAAACACCTATTTAGAATGGTAC CTGCAGAAACCAGGCCAGTCTCCAAAACTCTTGATCTACAA AGTTTCCAATCGACTTTCTGGGGTCCCAGACAGGTTCAGTG GCAGTGGATCAGGGACAGATTTCACACTCAAGATCAGCAGA GTGGAGACTGAGGATCTGGGAGTTTATTACTGCTTTCAAGG TTCACATGGTCCGTGGACGTTCGGTGGAGGCACCAAGCTGG AAATCAAA |
| 11 | AGX-A03 Variable light (VL) chain-codon optimized nucleic acid | GACGTACTTATGACACAAACTCCCTTGAGCTTGCCAGTACG GCTTGGCGATCAAGCTTCAATTTCATGTCGTTCTTCTCAAA CACTTGTCCACTCAAATGGGAATACATATTTGGAATGGTAT CTCCAAAAGCCCGGCCAATCCCCAAAATTGTTGATTTACAA GGTGTCTAATCGACTCTCAGGCGTCCCCGACCGATTCTCCG GGAGCGGGTCCGGTACAGACTTCACCTTGAAAATCTCCAGG GTAGAAACTGAAGACCTCGGAGTCTACTATTGTTTCCAGGG GTCACACGGCCCCTGGACATTGGAGGAGGAACTAAGCTCG AGATCAAA |
| 12 | VL-CDR1 | RSSQTLVHSNGNTYLE |
| 13 | VL-CDR2 | KVSNRLS |
| 14 | VL-CDR3 | FQGSHGPWT |

Antibody AGX-A04

| SEQ ID NO | Description | Sequence |
|---|---|---|
| 15 | AGX-A04 Variable heavy (VH) chain-amino acid | EVQLQQSGPELVKPGASVKISCKTSGYTFTDYTMHWVRQSH GKSLEWIGSFNPNNGGLTNYNQKFKGKATLTVDKSSSTVYM DLRSLTSEDSAVYYCTRIRATGFDSWGQGTTLTVSS |
| 16 | AGX-A04 Variable heavy (VH) chain-nucleic acid | GAGGTCCAGCTGCAACAGTCTGGACCTGAGCTGGTGAAGCC TGGGGCTTCAGTGAAGATATCCTGCAAGACTTCTGGATACA CATTCACTGATTACACCATGCACTGGGTGAGGCAGAGCCAT GGAAAGAGCCTTGAGTGGATTGGAAGTTTTAATCCTAACAA TGGTGGTCTTACTAACTACAACCAGAAGTTCAAGGGCAAGG CCACATTGACTGTGGACAAGTCTTCCAGCACAGTGTACATG GACCTCCGCAGCCTGACATCTGAGGATTCTGCAGTCTATTA CTGTACAAGAATCCGGGCTACGGGCTTTGACTCCTGGGGCC AGGGCACCACTCTCACAGTCTCCTCA |
| 17 | AGX-A04 Variable heavy (VH) chain-codon optimized nucleic acid | GAGGTACAACTGCAACAGAGTGGACCTGAACTTGTCAAACC TGGAGCAAGTGTGAAGATTAGCTGTAAAACCAGTGGCTACA CATTTACCGATTATACTATGCACTGGGTAAGACAGAGCCAC GGAAAATCACTGGAGTGGATTGGTAGTTTCAATCCTAACAA CGGAGGATTGACAAATTACAACCAGAAGTTCAAAGGGAAAG CCACCTTGACAGTTGATAAGTCCTCAAGTACCGTGTATATG GATCTGCGTTCTCTCACAAGTGAAGATAGCGCAGTTTACTA CTGTACCCGCATCCGAGCCACCGGGTTCGATTCATGGGGTC AGGGGACAACACTGACTGTTTCTTCT |
| 18 | VH-CDR1 | GYTFTDYTMH |
| 19 | VH-CDR2 | SFNPNNGGLTNYNQKFKG |
| 20 | VH-CDR3 | IRATGEDS |
| 21 | AGX-A04 Variable light (VL) chain-amino acid | DIVMSQSPSSLAVSAGEKVTMSCKSSQSLLNSRTRKNYLAW YQQKPGQSPKLLIYWASTRESGVPDRFTGSGSGTDFTLTIS NVQAEDLTVYYCKQSYNPPWTFGGGTKLEIK |

TABLE 3-continued

ANTIBODY SEQUENCE DESCRIPTION

| SEQ ID NO | Description | Sequence |
|---|---|---|
| 22 | AGX-A04 Variable light (VL) chain- nucleic acid | GACATTGTGATGTCACAGTCTCCATCCTCCCTGGCTGTGTC AGCAGGAGAGAAGGTCACTATGAGCTGCAAATCCAGTCAGA GTCTGCTCAACAGTAGAACCCGAAAGAACTACTTGGCTTGG TACCAGCAGAAACCAGGGCAGTCTCCTAAACTGCTGATCTA CTGGGCATCCACTAGGGAATCTGGGGTCCCTGATCGCTTCA CAGGCAGTGGATCTGGGACAGATTTCACTCTCACCATCAGC AATGTGCAGGCTGAAGACCTGACAGTTTATTACTGCAAGCA ATCTTATAATCCTCCGTGGACGTTCGGTGGAGGCACCAAGC TGGAAATCAAA |
| 23 | AGX-A04 Variable light (VL) chain- codon optimized nucleic acid | GACATAGTTATGTCCCAGTCTCCATCCAGCTTGGCTGTCAG CGCCGGAGAGAAAGTGACTATGAGTTGTAAATCTTCCCAGT CCCTGCTTAACTCACGTACTCGGAAGAATTATCTTGCCTGG TATCAACAAAAGCCAGGTCAAAGTCCTAAGCTCCTTATTTA CTGGGCCTCAACACGGGAGTCAGGTGTCCCCGATCGCTTCA CAGGTAGTGGGAGTGGTACTGACTTCACTCTCACCATTTCA AATGTCCAAGCAGAAGACTTGACTGTGTATTACTGTAAGCA GAGTTACAACCCTCCTTGGACCTTTGGTGGGGGGACCAAAC TGGAGATCAAG |
| 24 | VL-CDR1 | KSSQSLLNSRTRKNYLA |
| 25 | VL-CDR2 | WASTRES |
| 26 | VL-CDR3 | KQSYNPPWT |
| | Antibody AGX-A05 | |
| 27 | AGX-A05 Variable heavy (VH) chain- amino acid | EVQVQQSGPELVKPGASVKMSCKASGYTFTSYVMHWVKQKP GQGLEWIGYINPNNDNINYNEKFKGKASLTSDKSSNTVYME LSSLTSEDSAVYYCAGYGNSGANWGQGTLVTVSA |
| 28 | AGX-A05 Variable heavy (VH) chain- nucleic acid | GAGGTCCAGGTACAGCAGTCTGGACCTGAACTGGTAAAGCC TGGGGCTTCAGTGAAGATGTCCTGTAAGGCTTCTGGATACA CATTCACTAGCTATGTCATGCACTGGGTGAAGCAGAAGCCT GGGCAGGGCCTTGAGTGGATTGGATATATTAATCCTAACAA TGATAATATTAACTACAATGAGAAGTTCAAAGGCAAGGCCT CACTGACTTCAGACAAATCCTCCAACACAGTCTACATGGAG CTCAGCAGCCTGACCTCTGAGGACTCTGCGGTCTATTACTG TGCAGGCTATGGTAACTCCGGAGCTAACTGGGGCCAAGGGA CTCTGGTCACTGTCTCTGCA |
| 29 | AGX-A05 Variable heavy (VH) chain- codon optimized nucleic acid | GAAGTTCAAGTTCAGCAAAGCGGGCCTGAGCTTGTCAAGCC AGGCGCATCAGTCAAAATGAGCTGTAAGGCTTCCGGGTACA CCTTCACCAGTTATGTCATGCATTGGGTAAAACAAAAGCCA GGACAGGGACTCGAGTGGATAGGATACATTAACCCAAATAA CGACAACATTAACTACAACGAGAAATTCAAGGGCAAAGCAT CATTGACTTCCGATAAATCCTCTAACACCGTGTACATGGAG CTGAGTTCATTGACCAGCGAGGATTCTGCCGTGTACTACTG TGCAGGTTATGGCAACTCTGGTGCTAACTGGGGGCAGGGGA CTCTGGTCACAGTCAGCGCA |
| 30 | VH-CDR1 | GYTFTSYVMH |
| 31 | VH-CDR2 | YINPNNDNINYNEKEKG |
| 32 | VH-CDR3 | YGNSGAN |
| 33 | AGX-A05 Variable light (VL) chain- amino acid | DIQMTQSPASLSASVGETVTITCRISKNIFNFLAWYHQKQG RSPRLLVSHTKTLAAGVPSRFSGSGSGTQFSLKINSLQPED FGIYYCQHHYGTPWTFGGGTKLEIK |
| 34 | AGX-A05 Variable light (VL) chain- nucleic acid | GACATCCAGATGACTCAGTCTCCAGCCTCCCTATCTGCATC TGTGGGAGAAACTGTCACCATCACATGTCGAACAAGTAAAA ATATTTTCAATTTTTTAGCATGGTATCACCAGAAACAGGGA AGATCTCCTCGACTCCTGGTCTCTCATACAAAAACCTTAGC AGCAGGTGTGCCATCAAGGTTCAGTGGCAGTGGCTCAGGCA CACAGTTTTCTCTGAAGATCAACAGCCTGCAGCCTGAAGAT TTTGGGATTTATTACTGTCAACATCATTATGGTACTCCGTG GACGTTCGGTGGAGGCACCAAACTGGAAATCAAA |

TABLE 3-continued

| | ANTIBODY SEQUENCE DESCRIPTION | |
|---|---|---|
| SEQ ID NO | Description | Sequence |
| 35 | AGX-A05 Variable light (VL) chain-codon optimized nucleic acid | GACATTCAGATGACCCAGTCACCAGCATCTTTGAGCGCATC CGTTGGGGAGACTGTGACAATCACATGCCGAACCAGTAAGA ACATCTTCAACTTCCTCGCATGGTACCATCAAAAGCAGGGC AGGTCTCCCAGACTGCTTGTCTCTCACACCAAGACACTGGC AGCAGGCGTCCCCAGCCGGTTTAGTGGTAGTGGATCTGGCA CACAGTTTAGTTTGAAAATCAATTCCCTGCAACCCGAAGAC TTCGGCATATACTATTGCCAGCACCACTATGGGACACCTTG GACTTTCGGAGGTGGTACTAAACTTGAGATTAAA |
| 36 | VL-CDR1 | RISKNIFNFLA |
| 37 | VL-CDR2 | HTKTLAA |
| 38 | VL-CDR3 | QHHYGTPWT |
| | Antibody AGX-A07 | |
| 39 | AGX-A07 Variable heavy (VH) chain-amino acid | QIQLVQSGPELKKPGETVKISCKASGYTFTNYGVKWVKQAP GKDLKWMGWINTYTGNPIYAADFKGRFAFSLETSASTAFLQ INNLKNEDTATYFCVRFQYGDYRYFDVWGAGTTVTVSS |
| 40 | AGX-A07 Variable heavy (VH) chain-nucleic acid | CAGATCCAGTTGGTGCAGTCTGGACCTGAGCTGAAGAAGCC TGGAGAGACAGTCAAGATCTCCTGCAAGGCTTCTGGGTATA CCTTCACAAACTATGGAGTGAAGTGGGTGAAGCAGGCTCCA GGAAAGGATTTAAAGTGGATGGGCTGGATAAACACCTACAC TGGAAATCCAATTTATGCTGCTGACTTCAAGGGACGGTTTG CCTTCTCTTTGGAGACCTCTGCCAGCACTGCCTTTTTGCAG ATCAACAACCTCAAAAATGAGGACACGGCTACATATTTCTG TGTAAGATTCCAATATGGCGATTACCGGTACTTCGATGTCT GGGGCGCAGGGACCACGGTCACCGTCTCCTCA |
| 41 | AGX-A07 Variable heavy (VR) chain-codon optimized nucleic acid | CAAATCCAACTTGTCCAGAGCGGTCCCGAGTTGAAGAAGCC TGGCGAAACCGTGAAAATCTCATGCAAGGCCAGTGGATATA CATTTACAAACTATGGCGTCAAGTGGGTGAAACAAGCCCCA GGTAAGACTTGAAATGGATGGGATGGATCAACACATACAC AGGGAATCCTATCTATGCAGCCGACTTTAAAGGCAGATTTG CCTTCAGTTTGGAGACATCTGCCTCCACCGCTTTCCTGCAA ATAAATAACCTGAAAAATGAAGATACCGCTACATACTTCTG TGTACGGTTCCAGTACGGAGATTACCGCTATTTCGATGTGT GGGGCGCAGGTACCACAGTAACCGTCTCCTCA |
| 42 | VH-CDR1 | GYTFTNYGVK |
| 43 | VH-CDR2 | WINTYTGNPIYAADFKG |
| 44 | VH-CDR3 | FQYGDYRYFDV |
| 45 | AGX-A07 Variable light (VL) chain-amino acid | QIILSQSPAILSASPGEKVTMTCRANSGISFINWYQQKPGS SPKPWIYGTANLASGVPARFGGSGSGTSYSLTISRVEAEDA ATYYCQQWSSNPLTFGAGTKLELR |
| 46 | AGX-A07 Variable light (VL) chain-nucleic acid | CAAATTATTCTCTCCCAGTCTCCAGCAATCCTGTCTGCATC TCCAGGGGAGAAGGTCACGATGACTTGCAGGGCCAACTCAG GTATTAGTTTCATCAACTGGTACCAGCAGAAGCCAGGATCC TCCCCCAAACCCTGGATTTATGGCACAGCCAACCTGGCTTC TGGAGTCCCTGCTCGCTTCGGTGGCAGTGGGTCTGGGACTT CTTACTCTCTCACAATCAGCAGAGTGGAGGCTGAAGACGCT GCCACTTATTACTGCCAGCAGTGGAGTAGTAACCCGCTCAC GTTCGGTGCTGGGACCAAGCTGGAGTTGAGA |
| 47 | AGX-A07 Variable light (VL) chain-codon optimized nucleic acid | CAAATAATTCTGTCACAGTCCCCCGCTATACTTAGTGCTTC ACCAGGAGAAAAAGTGACCATGACTTGTAGAGCTAATTCTG GCATATCATTCATCAACTGGTATCAACAAAAGCCAGGTTCC TCCCCCAAGCCATGGATTTACGGGACCGCCAACCTTGCTTC TGGGGTACCCGCTCGTTTCGGCGGATCAGGTTCAGGAACTT CCTATAGCCTCACTATCAGTCGGGTTGAAGCTGAGGATGCC GCTACATATTACTGCCAGCAATGGTCTAGTAATCCACTTAC CTTTGGAGCTGGCACCAAATTGGAACTTCGT |
| 48 | VL-CDR1 | RANSGISFIN |
| 49 | VL-CDR2 | GTANLAS |
| 50 | VL-CDR3 | QQWSSNPLT |

TABLE 3-continued

| ANTIBODY SEQUENCE DESCRIPTION | | |
|---|---|---|
| SEQ ID NO | Description | Sequence |
| Antibody AGX-A08 | | |
| 51 | AGX-A08 Variable heavy chain (VH) - amino acid | EVQLQQSGPELVKPGASVKLSCKASGYTVTSYVMHWVKQKP GQGLEWIGYINPYSDVINCNEKFKGKATLTSDKISSTAYME LSSLTSEDSAVYYCSSYGGGFAYWGQGTLVTVSA |
| 52 | AGX-A08 Variable heavy (VH) chain- nucleic acid | GAGGTCCAGCTGCAGCAGTCTGGACCTGAGCTGGTAAAGCC TGGGGCTTCAGTGAAGCTGTCCTGCAAGGCTTCTGGATACA CAGTCACTAGCTATGTTATGCACTGGGTGAAGCAGAAGCCT GGGCAGGGCCTTGAGTGGATTGGATATATTAATCCTTACAG TGATGTTACTAACTGCAATGAGAAGTTCAAAGGCAAGGCCA CACTGACTTCAGACAAAACCTCCAGCACAGCCTACATGGAG CTCAGCAGCCTGACCTCTGAGGACTCTGCGGTCTATTACTG TTCCTCCTACGGTGGGGGGTTTGCTTACTGGGGCCAAGGGA CTCTGGTCACTGTCTCTGCA |
| 53 | AGX-A08 Variable heavy (VH) chain- codon optimized nucleic acid | GAAGTCCAGCTTCAGCAATCCGGCCCAGAACTGGTAAAACC AGGCGCAAGTGTTAAGTTGAGTTGCAAAGCCAGTGGTTATA CCGTTACTTCATACGTCATGCATTGGGTAAAACAAAAGCCC GGCCAAGGGCTTGAATGGATCGGCTACATCAACCCTTACTC TGACGTCACCAACTGCAACGAGAAATTCAAAGGGAAGCCA CATTGACCTCTGACAAGACAAGCAGTACCGCCTACATGGAG CTTTCTAGTTTGACTTCTGAAGACTCTGCTGTCTACTACTG TAGCAGCTACGGCGGCGGCTTTGCTTACTGGGGCCAGGGTA CATTGGTGACTGTGAGTGCA |
| 54 | VH-CDR1 | GYTVTSYVMH |
| 55 | VH-CDR2 | YINPYSDVTNCNEKFKG |
| 56 | VH-CDR3 | YGGGFAY |
| 57 | AGX-A08 Variable light chain (VL) - amino acid | DIQMTQSPASLSASVGEPVTITCRASKNIYTYLAWYHQKQG KSPQFLVYNARTLAGGVPSRLSGSGSVTQFSLNINTLHRED LGTYFCQHHYDTPYTFGGGTNLEIK |
| 58 | AGX-A08 Variable light (VL) chain- nucleic acid | GACATCCAGATGACTCAGTCTCCAGCCTCCCTATCTGCATC TGTGGGAGAACCTGTCACCATCACATGTCGAGCAAGTAAGA ATATTTACACATATTTAGCATGGTATCACCAGAAACAGGGA AAATCTCCTCAGTTCCTGGTCTATAATGCAAGAACCTTAGC AGGAGGTGTGCCATCAAGGCTCAGTGGCAGTGGATCAGTCA CGCAGTTTTCTCTAAACATCAACACCCTTGCATCGAGAAGAT TTAGGGACTTACTTCTGTCAACATCATTATGATACTCCGTA CACGTTCGGAGGGGGGACCAACCTGGAAATAAAA |
| 59 | AGX-A08 Variable light (VL) chain- codon optimized nucleic acid | GACATCCAGATGACACAGTCACCAGCATCCCTGTCCGCCTC AGTTGGGGAGCCTGTTACCATAACTTGTCGGGCAAGCAAAA ACATATACACCTATTTGGCTTGGTATCACCAAAAGCAAGGT AAGTCACCTCAGTTTCTTGTATATAATGCCCGCACACTTGC TGGCGGAGTACCCTCTCGATTGTCTGGATCTGGCAGCGTTA CCCAATTCAGCCTGAACATCAACACCCTTCCATCGGGAAGAT TTGGGTACCTATTTCTGTCAACATCACTACGACACCCCATA CACCTTCGGAGGCGGCACAAATTTGGAAATTAAA |
| 60 | VL-CDR1 | RASKNIYTYLA |
| 61 | VL-CDR2 | NARTLAG |
| 62 | VL-CDR3 | QHHYDTPYT |
| Antibody AGX-A09 | | |
| 63 | AGX-A09 Variable heavy (VH) chain- amino acid | EVQLQQSGPELVKPGASVKMSCKASGYTFSSYVMHWVKQKP GQGLEWIGYINPYSDVINYNEKFKGKATLTSDRSSNTAYME LSSLTSEDSAVYYCARNYFDWGRGTLVTVSA |
| 64 | AGX-A09 Variable heavy (VH) chain- nucleic acid | GAGGTCCAGCTGCAGCAGTCTGGACCTGAGCTGGTAAAGCC TGGGGCTTCAGTGAAGATGTCCTGCAAGGCTTCTGGATACA CATTCTCTAGCTATGTTATGCACTGGGTGAAGCAGAAGCCT GGGCAGGGCCTTGAGTGGATTGGATATATTAATCCTTACAG TGATGTCACTAACTACAATGAAGTTCAAAGGCAAGGCCA CACTGACTTCAGACAGATCCTCCAACACAGCCTACATGGAA CTCAGCAGCCTGACCTCTGAGGACTCTGCGGTCTATTACTG |

TABLE 3-continued

ANTIBODY SEQUENCE DESCRIPTION

| SEQ ID NO | Description | Sequence |
|---|---|---|
| | | TGCAAGAAATTACTTCGACTGGGGCCGAGGGACTCTGGTCA<br>CAGTCTCTGCA |
| 65 | AGX-A09<br>Variable heavy (VH) chain-<br>codon optimized nucleic<br>acid | GAGGTACAGCTTCAGCAGAGTGGTCCAGAACTCGTCAAGCC<br>TGGGGCAAGCGTTAAGATGAGTTGTAAAGCATCCGGTTACA<br>CATTCAGTAGCTATGTTATGCACTGGGTCAAACAGAAGCCT<br>GGGCAGGGGTTGGAGTGGATCGGATATATAAATCCCTATTC<br>AGACGTAACTAATTATAATGAAAAGTTCAAGGGGAAAGCAA<br>CCTTGACAAGTGACCGGTCATCTAATACCGCATACATGGAG<br>CTGAGCTCATTGACAAGTGAGGACTCTGCTGTGTATTACTG<br>TGCCCCGGAACTACTTCGACTGGGGTAGGGGCACACTGGTAA<br>CTGTTAGTGCA |
| 66 | VH-CDR1 | GYTFSSYVMH |
| 67 | VH-CDR2 | YINPYSDVINYNEKFKG |
| 68 | VH-CDR3 | NYFD |
| 69 | AGX-A09<br>Variable light (VL) chain-<br>amino acid | DIQMTQSPASLSASVGETVTITCRASKNVYSYLAWFQQKQG<br>KSPQLLVYNAKTLAEGVPSRFSGGGSGTQFSLKINSLQPAD<br>FGSYYCQHHYNIPFTFGSGTKLEIK |
| 70 | AGX-A09<br>Variable light (VL) chain-<br>nucleic acid | GACATCCAGATGACTCAGTCTCCAGCCTCCCTATCTGCATC<br>TGTGGGAGAAACTGTCACCATCACATGTCGAGCAAGTAAAA<br>ATGTTTACAGTTATTTAGCATGGTTTCAACAGAAACAGGGG<br>AAATCTCCTCAGCTCCTGGTCTATAATGCTAAAACCTTAGC<br>AGAAGGTGTGCCATCAAGGTTCAGTGGCGGGGGATCAGGCA<br>CACAGTTTTCTCTGAAGATCAACAGCCTGCAGCCTGCAGAT<br>TTTGGGAGTTATTACTGTCAACATCATTATAATATTCCATT<br>CACGTTCGGCTCGGGGACAAAGTTGGAAATAAAA |
| 71 | AGX-A09<br>Variable light (VL) chain-<br>codon optimized nucleic<br>acid | GACATACAAATGACACAAAGTCCCGCTAGTCTTTCAGCCAG<br>TGTTGGTGAGACTGTGACAATAACCTGTAGAGCTAGCAAAA<br>ATGTCTACTCCTATCTGGCTTGGTTCCAGCAGAAACAAGGA<br>AAGAGTCCTCAGTTGCTCGTATATAATGCTAAAACTTTGGC<br>AGAAGGCGTCCCTTCTCGTTTCAGTGGCGGAGGAAGTGGGA<br>CTCAATTCTCACTGAAGATCAATAGCCTCCAGCCCGCCGAC<br>TTTGGGAGCTACTATTGCCAACATCATTACAACATACCATT<br>CACCTTTGGCTCAGGTACTAAACTCGAAATTAAA |
| 72 | VL-CDR1 | RASKNVYSYLA |
| 73 | VL-CDR2 | NAKTLAE |
| 74 | VL-CDR3 | QHHYNIPFT |
| | Antibody AGX-A11 | |
| 75 | AGX-A11<br>Variable heavy (VH) chain-<br>amino acid | QIQLVQSGPELKKPGETVKISCKASGFTFTNYPMHWVKQAP<br>GKGLKWMGWINTYSGVPTYADDFKGRFAFSLETSASTAYLQ<br>INNLKNEDMATYFCARGGYDGSREFAYWGQGTLVTVS |
| 76 | AGX-A11<br>Variable heavy (VR) chain-<br>nucleic acid | CAGATCCAGTTGGTGCAGTCTGGACCTGAGCTGAAGAAGCC<br>TGGAGAGACAGTCAAGATCTCCTGCAAGGCTTCTGGGTTTA<br>CCTTCACAAACTATCCAATGCACTGGGTGAAGCAGGCTCCA<br>GGAAAGGGTTTAAAGTGGATGGGCTGGATAAACACCTACTC<br>TGGAGTGCCAACATATGCAGATGACTTCAAGGGACGGTTTG<br>CCTTCTCTTTGGAAACCTCTGCCAGCACTGCATATTTGCAG<br>ATCAACAACCTCAAAAATGAGGACATGGCTACATATTTCTG<br>TGCAAGAGGGGCTACGATGGTAGCAGGGAGTTTGCTTACT<br>GGGGCCAAGGGACTCTGGTCACTGTCTCT |
| 77 | AGX-A11<br>Variable heavy (VH) chain-<br>codon optimized nucleic<br>acid | CAGATACAACTCGTCCAGTCAGGTCCAGAGTTGAAGAAACC<br>CGGAGAAACTGTGAAGATATCCTGTAAAGCCAGCGGCTTTA<br>CTTTCACAAACTACCCCATGCATTGGGTGAAGCAGGCCCCC<br>GGAAAAGGACTCAAATGGATGGGATGGATCAACACATACAG<br>TGGGGTGCCTACTTACGCAGACGATTTCAAAGGAAGGTTCG<br>CATTTAGCTTGGAAACTAGCGCATCTACAGCATATCTCCAG<br>ATTAACAATCTTAAAAATGAGGACATGGCAACATACTTCTG<br>CGCTAGGGGAGGTTACGATGGGAGCAGGGAGTTCGCTTATT<br>GGGGGCAAGGGACTCTTGTGACTGTAAGT |
| 78 | VH-CDR1 | GFTFTNYPMH |

TABLE 3-continued

ANTIBODY SEQUENCE DESCRIPTION

| SEQ ID NO | Description | Sequence |
|---|---|---|
| 79 | VH-CDR2 | WINTYSGVPTYADDFKG |
| 80 | VH-CDR3 | GGYDGSREFAY |
| 81 | AGX-A11 Variable light (VL) chain- amino acid | DIVLTQSPASLAASLGQRATTSYRASKSVSTSGYSYMHWNQ QKPGQPPRLLIYLVSNLESGVPARFSGSGSGIDFILNIHPV EEEDAATYYCQHIRELTTFGGGTKLEIK |
| 82 | AGX-A11 Variable light (VL) chain- nucleic acid | GACATTGTGCTGACACAGTCTCCTGCTTCCTTAGCTGCATC TCTGGGGCAGAGGGCCACCACCTCATACAGGGCCAGCAAAA GTGTCAGTACATCTGGCTATAGTTATATGCACTGGAACCAA CAGAAACCAGGACAGCCACCCAGACTCCTCATCTATCTTGT ATCCAACCTAGAATCTGGGGTCCCTGCCAGGTTCAGTGGCA GTGGGTCTGGGACAGACTTCACCCTCAACATCCATCCTGTG GAGGAGGAGGATGCTGCAACCTATTACTGTCAGCACATTAG GGAGCTTACCACGTTCGGAGGGGGGACCAAGCTGGAAATAA AA |
| 83 | AGX-A11 Variable light (VL) chain- codon optimized nucleic acid | GACATAGTGCTCACTCAGAGCCCTGCATCCCTTGCCGCCTC CCTCGGACAACGAGCTACTACAAGCTACCGGGCATCAAAGT CCGTTAGCACATCAGGATACAGCTATATGCACTGGAATCAG CAAAAGCCAGGCCAACCACCCCGTCTTCTCATCTACCTCGT AAGTAATCTGGAATCAGGCGTGCCAGCCCGATTCAGTGGGT CAGGGTCTGGGACAGATTTCACCCTCAACATCCATCCAGTA GAGGAAGAGGACGCAGCAACATATTACTGCCAACACATTAG AGAACTTACCACTTTCGGAGGAGGAACTAAATTGGAGATCA AA |
| 84 | VL-CDR1 | RASKSVSTSGYSYMH |
| 85 | VL-CDR2 | LVSNLES |
| 86 | VL-CDR3 | QHIRELIT |

Constant Region Sequences

| 87 | IgG1 G1m17* (heavy chain constant region) * with L234A/L235A/G237A mutations SEQ ID NO: 88 is sequence without the terminal lysine | ASTKGPSVFPLAPSSKSTSGGTAALGCLVKDYFPEPVTVSW NSGALTSGVHTFPAVLQSSGLYSLSSVVTVPSSSLGTQTYI CNVNHKPSNTKVDKKVEPKSCDKTHTCPPCPAPEAAGAPSV FLFPPKPKDTLMISRTPEVTCVVVDVSHEDPEVKFNWYVDG VEVHNAKTKPREEQYNSTYRVVSVLIVLHQDWINGKEYKCK VSNKALPAPIEKTISKAKGQPREPQVYTLPPSREEMTKNQV SLTCLVKGFYPSDIAVEWESNGQPENNYKTTPPVLDSDGSF FLYSKLTVDKSRWQQGNVFSCSVMHEALHNHYTQKSLSLSP GK |
| 88 | IgG1 G1m17* (heavy chain constant region) * with L234A/L235A/G237A mutations | ASTKGPSVFPLAPSSKSTSGGTAALGCLVKDYFPEPVTVSW NSGALTSGVHTFPAVLQSSGLYSLSSVVTVPSSSLGTQTYI CNVNHKPSNTKVDKKVEPKSCDKTHTCPPCPAPEAAGAPSV FLFPPKPKDTLMISRTPEVTCVVVDVSHEDPEVKFNWYVDG VEVHNAKTKPREEQYNSTYRVVSVLIVLHQDWINGKEYKCK VSNKALPAPIEKTISKAKGQPREPQVYTLPPSREEMTKNQV SLTCLVKGFYPSDIAVEWESNGQPENNYKTTPPVLDSDGSF FLYSKLTVDKSRWQQGNVFSCSVMHEALHNHYTQKSLSLSP G |
| 89 | IgG1 Km3 (light chain constant region) | RTVAAPSVFIFPPSDEQLKSGTASVVCLLNNFYPREAKVQW KVDNALQSGNSQESVTEQDSKDSTYSLSSTLILSKADYEKH KVYACEVTHQGLSSPVTKSFNRGEC |

Antibody 8G4

| 92 | Variable heavy chain (VH) - amino acid | EVILVESGGGLVKPGGSLKLSCAASGFTFSSFAMSWVRQTP EKRLEWVATISSGSIYIYYTDGVKGRFTISRDNAKNTVHLQ MSSLRSEDTAMYYCARRGIYYGYDGYAMDYWGQGISVTVSS |
| 93 | Variable light chain (VL) - amino acid | AVVMTQTPLSLPVSLGDQASISCRSSQSLVHSNGNTYLHWY MQKPGQSPKVLIYKVSNRFSGVPDRFSG SGSGTDFILKISRVEADDIG IYFCSQSTH IPLAFGAGTKLELK |
| 94 | VH CDR1 | GFTFSSFAMS |

TABLE 3-continued

ANTIBODY SEQUENCE DESCRIPTION

| SEQ ID NO | Description | Sequence |
|---|---|---|
| 95 | VH CDR2 | TISSGSIYIYYTDGVKG |
| 96 | VH CDR3 | RG IYYGYDGYAMDY |
| 97 | VL CDR1 | RSSQSLVHSNGNTYLH |
| 98 | VL CDR2 | KVSNRFS |
| 99 | VL CDR3 | SQSTHVYT |

TM4SF1 SiRNA

| | | |
|---|---|---|
| 100 | Human TM4SF1 siRNA | AUAAUGAACUUAUUCUGUG |
| 101 | siCAG/CUG TNR siRNA | CAGCAGCAGCAGCAGCAGdAdA |

TABLE 4 siRNA SEQUENCES

| SEQ ID No. | Target position | Target sequence<br>21 nt target + 21 nt overhang | RNA oligo sequence<br>21nt guide (5' → 3'); (anti-sense strand sequence)<br>21nt passenger (5' → 3'); Sense strand sequence |
|---|---|---|---|
| 102 | 5'UTR 45-67 | CTGCCATTAGGACCAATGAAAGC | UUUCAUUGGUCCUAAUGGCAG |
| 103 | | | GCCAUUAGGACCAAUGAAAGC |
| 104 | 5'UTR 89-111 | GACTAAGAATCGCAGTATTTAAG | UAAAUACUGCGAUUCUUAGUC |
| 105 | | | CUAAGAAUCGCAGUAUUUAAG |
| 106 | 5'UTR 90-112 | ACTAAGAATCGCAGTATTTAAGA | UUAAAUACUGCGAUUCUUAGU |
| 107 | | | UAAGAAUCGCAGUAUUUAAGA |
| 108 | coding 301-323 | GCGGCTAATATTTTGCTTTACTT | GUAAAGCAAAAUAUUAGCCGC |
| 109 | | | GGCUAAUAUUUUGCUUUACUU |
| 110 | coding 302-324 | CGGCTAATATTTTGCTTTACTTT | AGUAAAGCAAAAUAUUAGCCG |
| 111 | | | GCUAAUAUUUUGCUUUACUUU |
| 112 | coding 303-325 | GGCTAATATTTTGCTTTACTTTC | AAGUAAAGCAAAAUAUUAGCC |
| 113 | | | CUAAUAUUUUGCUUUACUUUC |
| 114 | coding 476-498 | ATGAAAACTGTGGCAAACGATGT | AUCGUUUGCCACAGUUUUCAU |
| 115 | | | GAAAACUGUGGCAAACGAUGU |
| 116 | coding 706-728 | TGGAATGTATCTCTGTTTTCTAT | AGAAAACAGAGAUACAUUCCA |
| 117 | | | GAAUGUAUCUCUGUUUUCUAU |
| 118 | coding 741-763 | TGGTGGAATTGAATTCATCTTGT | AAGAUGAAUUCAAUUCCACCA |
| 119 | | | GUGGAAUUGAAUUCAUCUUGU |
| 120 | coding 743-765 | GTGGAATTGAATTCATCTTGTGT | ACAAGAUGAAUUCAAUUCCAC |
| 121 | | | GGAAUUGAAUUCAUCUUGUGU |

TABLE 4-continued siRNA SEQUENCES

| SEQ ID No. | Target | Target position | Target sequence | RNA oligo sequence |
|---|---|---|---|---|
| 122 | coding | 753-775 | ATTCATCTTGTGTCTTATTCAAG | UGAAUAAGACACAAGAUGAAU |
| 123 | | | | UCAUCUUGUGUCUUAUUCAAG |
| 124 | coding | 754-776 | TTCATCTTGTGTCTTATTCAAGT | UUGAAUAAGACACAAGAUGAA |
| 125 | | | | CAUCUUGUGUCUUAUUCAAGU |
| 126 | coding | 760-782 | TTGTGTCTTATTCAAGTAATAAA | UAUUACUUGAAUAAGACACAA |
| 127 | | | | GUGUCUUAUUCAAGUAAUAAA |
| 128 | coding | 762-784 | GTGTCTTATTCAAGTAATAAATG | UUUAUUACUUGAAUAAGACAC |
| 129 | | | | GUCUUAUUCAAGUAAUAAAUG |
| 130 | coding | 794-816 | GAGGCATATGTGGCTTTTGCTGC | AGCAAAAGCCACAUAUGCCUC |
| 131 | | | | GGCAUAUGUGGCUUUUGCUGC |
| 132 | 3'UTR | 863-885 | AGCCACAATCTTCCTCTATTTCA | AAAUAGAGGAAGAUUGUGGCU |
| 133 | | | | CCACAAUCUUCCUCUAUUUCA |
| 134 | 3'UTR | 865-887 | CCACAATCTTCCTCTATTTCATT | UGAAAUAGAGGAAGAUUGUGG |
| 135 | | | | ACAAUCUUCCUCUAUUUCAUU |
| 136 | 3'UTR | 866-888 | CACAATCTTCCTCTATTTCATTG | AUGAAAUAGAGGAAGAUUGUG |
| 137 | | | | CAAUCUUCCUCUAUUUCAUUG |
| 138 | 3'UTR | 873-895 | TTCCTCTATTTCATTGTAATTTA | AAUUACAAUGAAAUAGAGGAA |
| 139 | | | | CCUCUAUUUCAUUGUAAUUUA |
| 140 | 3'UTR | 874-896 | TCCTCTATTTCATTGTAATTTAT | AAAUUACAAUGAAAUAGAGGA |
| 141 | | | | CUCUAUUUCAUUGUAAUUUAU |
| 142 | 3'UTR | 875-897 | CCTCTATTTCATTGTAATTTATA | UAAAUUACAAUGAAAUAGAGG |
| 143 | | | | UCUAUUUCAUUGUAAUUUAUA |
| 144 | 3'UTR | 877-899 | TCTATTTCATTGTAATTTATATA | UAUAAAUUACAAUGAAAUAGA |
| 145 | | | | UAUUUCAUUGUAAUUUAUAUA |
| 146 | 3'UTR | 882-904 | TTCATTGTAATTTATATATTTCA | AAAUAUAUAAAUUACAAUGAA |
| 147 | | | | CAUUGUAAUUUAUAUAUUUCA |
| 148 | 3'UTR | 886-908 | TTGTAATTTATATATTTCACTTG | AGUGAAAUAUAUAAAUUACAA |
| 149 | | | | GUAAUUUAUAUAUUUCACUUG |
| 150 | 3'UTR | 901-923 | TTCACTTGTATTCATTTGTAAAA | UUACAAAUGAAUACAAGUGAA |
| 151 | | | | CACUUGUAUUCAUUUGUAAAA |
| 152 | 3'UTR | 903-925 | CACTTGTATTCATTTGTAAAACT | UUUUACAAAUGAAUACAAGUG |
| 153 | | | | CUUGUAUUCAUUUGUAAAACU |
| 154 | 3'UTR | 910-932 | ATTCATTTGTAAAACTTTGTATT | UACAAAGUUUUACAAAUGAAU |
| 155 | | | | UCAUUUGUAAAACUUUGUAUU |
| 156 | 3'UTR | 918-940 | GTAAAACTTTGTATTAGTGTAAC | UACACUAAUACAAAGUUUUAC |
| 157 | | | | AAAACUUUGUAUUAGUGUAAC |

TABLE 4-continued siRNA SEQUENCES

| SEQ ID No. | Target | position | Target sequence | RNA oligo sequence |
|---|---|---|---|---|
| 158 | 3'UTR | 919-941 | TAAAACTTTGTATTAGTGTAACA | UUACACUAAUACAAAGUUUUA |
| 159 | | | | AAACUUUGUAUUAGUGUAACA |
| 160 | 3'UTR | 921-943 | AAACTTTGTATTAGTGTAACATA | UGUUACACUAAUACAAAGUUU |
| 161 | | | | ACUUUGUAUUAGUGUAACAUA |
| 162 | 3'UTR | 922-944 | AACTTTGTATTAGTGTAACATAC | AUGUUACACUAAUACAAAGUU |
| 163 | | | | CUUUGUAUUAGUGUAACAUAC |
| 164 | 3'UTR | 959-981 | TTTTACAAACGCCTGTAAAGACT | UCUUUACAGGCGUUUGUAAAA |
| 165 | | | | UUACAAACGCCUGUAAAGACU |
| 166 | 3'UTR | 1005-1027 | TTTAAATTTAGTAAACTTCTTTT | AAGAAGUUUACUAAAUUUAAA |
| 167 | | | | UAAAUUUAGUAAACUUCUUUU |
| 168 | 3'UTR | 1013-1035 | TAGTAAACTTCTTTTTGTTTGT | AAACAAAAAAGAAGUUUACUA |
| 169 | | | | GUAAACUUCUUUUUGUUUGU |
| 170 | 3'UTR | 1055-1077 | TTTAAGGAATGAGGAAACAAACC | UUUGUUUCCUCAUUCCUUAAA |
| 171 | | | | UAAGGAAUGAGGAAACAAACC |
| 172 | 3'UTR | 1112-1134 | TACTCAGTATATCTGAGATAAAC | UUUAUCUCAGAUAUACUGAGUA |
| 173 | | | | CUCAGUAUAUCUGAGAUAAAC |
| 174 | 3'UTR | 1113-1135 | ACTCAGTATATCTGAGATAAACT | UUUAUCUCAGAUAUACUGAGU |
| 175 | | | | UCAGUAUAUCUGAGAUAAACU |
| 176 | 3'UTR | 1122-1144 | ATCTGAGATAAACTCTATAATGT | AUUAUAGAGUUUAUCUCAGAU |
| 177 | | | | CUGAGAUAAACUCUAUAAUGU |
| 178 | 3'UTR | 1124-1146 | CTGAGATAAACTCTATAATGTTT | ACAUUAUAGAGUUUAUCUCAG |
| 179 | | | | GAGAUAAACUCUAUAAUGUUU |
| 180 | 3'UTR | 1126-1148 | GAGATAAACTCTATAATGTTTTG | AAACAUUAUAGAGUUUAUCUC |
| 181 | | | | GAUAAACUCUAUAAUGUUUUG |
| 182 | 3'UTR | 1132-1154 | AACTCTATAATGTTTTGGATAAA | UAUCCAAAACAUUAUAGAGUU |
| 183 | | | | CUCUAUAAUGUUUUGGAUAAA |
| 184 | 3'UTR | 1133-1155 | ACTCTATAATGTTTTGGATAAAA | UUAUCCAAAACAUUAUAGAGU |
| 185 | | | | UCUAUAAUGUUUUGGAUAAAA |
| 186 | 3'UTR | 1134-1156 | CTCTATAATGTTTTGGATAAAAA | UUUAUCCAAAACAUUAUAGAG |
| 187 | | | | CUAUAAUGUUUUGGAUAAAAA |
| 188 | 3'UTR | 1135-1157 | TCTATAATGTTTTGGATAAAAAT | UUUUAUCCAAAACAUUAUAGA |

TABLE 4-continued siRNA SEQUENCES

| SEQ ID No. | Target | position | Target sequence | RNA oligo sequence |
|---|---|---|---|---|
| 189 | | | | UAUAAUGUUUUGGAUAAAAAU |
| 190 | 3'UTR | 1136-1158 | CTATAATGTTTTGGATAAAAATA | UUUUUAUCCAAAACAUUAUAG |
| 191 | | | | AUAAUGUUUUGGAUAAAAAUA |
| 192 | 3'UTR | 1138-1160 | ATAATGTTTTGGATAAAAATAAC | UAUUUUUAUCCAAAACAUUAU |
| 193 | | | | AAUGUUUUGGAUAAAAAUAAC |
| 194 | 3'UTR | 1139-1161 | TAATGTTTTGGATAAAAATAACA | UUAUUUUUAUCCAAAACAUUA |
| 195 | | | | AUGUUUUGGAUAAAAAUAACA |
| 196 | 3'UTR | 1158-1180 | AACATTCCAATCACTATTGTATA | UACAAUAGUGAUUGGAAUGUU |
| 197 | | | | CAUUCCAAUCACUAUUGUAUA |
| 198 | 3'UTR | 1162-1184 | TTCCAATCACTATTGTATATATG | UAUAUACAAUAGUGAUUGGAA |
| 199 | | | | CCAAUCACUAUUGUAUAUAUG |
| 200 | 3'UTR | 1163-1185 | TCCAATCACTATTGTATATATGT | AUAUAUACAAUAGUGAUUGGA |
| 201 | | | | CAAUCACUAUUGUAUAUAUGU |
| 202 | 3'UTR | 1184-1206 | GTGCATGTATTTTTTAAATTAAA | UAAUUUAAAAAAUACAUGCAC |
| 203 | | | | GCAUGUAUUUUUUAAAUUAAA |
| 204 | 3'UTR | 1205-1227 | AAGATGTCTAGTTGCTTTTTATA | UAAAAAGCAACUAGACAUCUU |
| 205 | | | | GAUGUCUAGUUGCUUUUUAUA |
| 206 | 3'UTR | 1208-1230 | ATGTCTAGTTGCTTTTTATAAGA | UUAUAAAAAGCAACUAGACAU |
| 207 | | | | GUCUAGUUGCUUUUUAUAAGA |
| 208 | 3'UTR | 1267-1289 | TTGTTTTCACTGCTTGTATGATG | UCAUACAAGCAGUGAAAACAA |
| 209 | | | | GUUUUCACUGCUUGUAUGAUG |
| 210 | 3'UTR | 1284-1306 | ATGATGTTTCCCATTCATACACC | UGUAUGAAUGGGAAACAUCAU |
| 211 | | | | GAUGUUUCCCAUUCAUACACC |
| 212 | 3'UTR | 1292-1314 | TCCCATTCATACACCTATAAATC | UUUAUAGGUGUAUGAAUGGGA |
| 213 | | | | CCAUUCAUACACCUAUAAAUC |
| 214 | 3'UTR | 1293-1315 | CCCATTCATACACCTATAAATCT | AUUUAUAGGUGUAUGAAUGGG |
| 215 | | | | CAUUCAUACACCUAUAAAUCU |
| 216 | 3'UTR | 1301-1323 | TACACCTATAAATCTCTAACAAG | UGUUAGAGAUUUAUAGGUGUA |
| 217 | | | | CACCUAUAAAUCUCUAACAAG |
| 218 | 3'UTR | 1302-1324 | ACACCTATAAATCTCTAACAAGA | UUGUUAGAGAUUUAUAGGUGU |

TABLE 4-continued siRNA SEQUENCES

| SEQ ID No. | Target | position | Target sequence | RNA oligo sequence |
|---|---|---|---|---|
| 219 | | | | ACCUAUAAAUCUCUAACAAGA |
| 220 | 3'UTR | 1304-1326 | ACCTATAAATCTCTAACAAGAGG | UCUUGUUAGAGAUUUAUAGGU |
| 221 | | | | CUAUAAAUCUCUAACAAGAGG |
| 222 | 3'UTR | 1353-1375 | AGAAACAAATATTTACTTAGAGT | UCUAAGUAAAUAUUUGUUUCU |
| 223 | | | | AAACAAAUAUUUACUUAGAGU |
| 224 | 3'UTR | 1387-1409 | TTGAGAATGTTCCAATCCAAATG | UUUGGAUUGGAACAUUCUCAA |
| 225 | | | | GAGAAUGUUCCAAUCCAAAUG |
| 226 | 3'UTR | 1407-1429 | ATGAATGCATCACAACTTACAAT | UGUAAGUUGUGAUGCAUUCAU |
| 227 | | | | GAAUGCAUCACAACUUACAAU |
| 228 | 3'UTR | 1421-1443 | ACTTACAATGCTGCTCATTGTTG | ACAAUGAGCAGCAUUGUAAGU |
| 229 | | | | UUACAAUGCUGCUCAUUGUUG |
| 230 | 3'UTR | 1443-1465 | GTGAGTACTATGAGATTCAAATT | UUUGAAUCUCAUAGUACUCAC |
| 231 | | | | GAGUACUAUGAGAUUCAAAUU |
| 232 | 3'UTR | 1456-1478 | GATTCAAATTTTTCTAACATATG | UAUGUUAGAAAAAUUUGAAUC |
| 233 | | | | UUCAAAUUUUUCUAACAUAUG |
| 234 | 3'UTR | 1457-1479 | ATTCAAATTTTTCTAACATATGG | AUAUGUUAGAAAAAUUUGAAU |
| 235 | | | | UCAAAUUUUUCUAACAUAUGG |
| 236 | 3'UTR | 1471-1493 | AACATATGGAAAGCCTTTTGTCC | ACAAAAGGCUUUCCAUAUGUU |
| 237 | | | | CAUAUGGAAAGCCUUUUGUCC |
| 238 | 3'UTR | 1511-1533 | GGGATCATGTGTTTAAAAAAGA | UUUUUUUAAACACAUGAUCCC |
| 239 | | | | GAUCAUGUGUUUAAAAAAGA |
| 240 | 3'UTR | 1555-1577 | GAAGAAAGATGGGAAACTGAATA | UUCAGUUUCCCAUCUUUCUUC |
| 241 | | | | AGAAAGAUGGGAAACUGAAUA |
| 242 | 3'UTR | 1556-1578 | AAGAAAGATGGGAAACTGAATAA | AUUCAGUUUCCCAUCUUUCUU |
| 243 | | | | GAAAGAUGGGAAACUGAAUAA |
| 244 | 3'UTR | 1631-1653 | ACGAGGAAATACCCTCAAAACTA | GUUUUGAGGGUAUUUCCUCGU |
| 245 | | | | GAGGAAAUACCCUCAAAACUA |
| 246 | 3'UTR | 1632-1654 | CGAGGAAATACCCTCAAAACTAA | AGUUUUGAGGGUAUUUCCUCG |
| 247 | | | | AGGAAAUACCCUCAAAACUAA |

TABLE 4-continued siRNA SEQUENCES

| SEQ ID No. | Target | position | Target sequence | RNA oligo sequence |
|---|---|---|---|---|
| 248 | 3'UTR | 1633-1655 | GAGGAAATACCCTCAAAACTAAC | UAGUUUUGAGGGUAUUUCCUC |
| 249 | | | | GGAAAUACCCUCAAAACUAAC |
| 250 | 3'UTR | 1641-1663 | ACCCTCAAAACTAACTTGTTTAC | AAACAAGUUAGUUUUGAGGGU |
| 251 | | | | CCUCAAAACUAACUUGUUUAC |
| 252 | 3'UTR | 1642-1664 | CCCCAAAACTAACTTGTTTACA | UAAACAAGUUAGUUUUGAGGG |
| 253 | | | | CUCAAAACUAACUUGUUUACA |
| 254 | 3'UTR | 1648-1670 | AAACTAACTTGTTTACAACAAAA | UUGUUGUAAACAAGUUAGUUU |
| 255 | | | | ACUAACUUGUUUACAACAAAA |
| 256 | 3'UTR | 1649-1671 | AACTAACTTGTTTACAACAAAAT | UUUGUUGUAAACAAGUUAGUU |
| 257 | | | | CUAACUUGUUUACAACAAAAU |
| 258 | 3'UTR | 1650-1672 | ACTAACTTGTTTACAACAAAATA | UUUUGUUGUAAACAAGUUAGU |
| 259 | | | | UAACUUGUUUACAACAAAAUA |
| 260 | 3'UTR | 1652-1674 | TAACTTGTTTACAACAAAATAAA | UAUUUUGUUGUAAACAAGUUA |
| 261 | | | | ACUUGUUUACAACAAAAUAAA |
| 262 | 3'UTR | 1654-1676 | ACTTGTTTACAACAAAATAAAGT | UUUAUUUUGUUGUAAACAAGU |
| 263 | | | | UUGUUUACAACAAAAUAAAGU |
| 264 | 3'UTR | 1656-1678 | TTGTTTACAACAAAATAAAGTAT | ACUUUAUUUUGUUGUAAACAA |
| 265 | | | | GUUUACAACAAAAUAAAGUAU |
| 266 | 3'UTR | 1661-1683 | TACAACAAAATAAAGTATTCACT | UGAAUACUUUAUUUUGUUGUA |
| 267 | | | | CAACAAAAUAAAGUAUUCACU |
| 268 | 3'UTR | 1664-1686 | AACAAAATAAAGTATTCACTACC | UAGUGAAUACUUUAUUUUGUU |
| 269 | | | | CAAAAUAAAGUAUUCACUACC |
| 270 | 3'UTR | 1673-1695 | AAGTATTCACTACCATGTTAAAA | UUAACAUGGUAGUGAAUACUU |
| 271 | | | | GUAUUCACUACCAUGUUAAAA |
| 272 | 3'UTR | 1674-1696 | AGTATTCACTACCATGTTAAAAA | UUUAACAUGGUAGUGAAUACU |
| 273 | | | | UAUUCACUACCAUGUUAAAAA |

TABLE 5 siRNA SEQUENCES

| Gene List | Passenger (Sense, 5' to 3') | Guide (anti-sense, 3'-5') |
|---|---|---|
| BCL2L1 | Cy5-CUUUGAACAGGUAGUGAAUUU-C6 amine | uuGAAACUUGUCCAUCACUUA |
| MCL1 | Cy5-GAACCAUUAGCAGAAAGUAUU-C6 amine | uuCUUGGUAAUCGUCUUUCAU |
| TMASF1 | Dy547-GUGUCUUAUUCAAGUAAUAUU-C6 amine | uuCACAGAAUAAGUUCAUUAU |
| BCL2L1L1 | CUUUGAACAGGUAGUGAAUUU | UUGAAACUUGUCCAUCACUUA |
| CD274 (PD-L1) | UCAAUUGUCAUAUUGCUACCA | UAAGUUAACAGUAUAACGAUG |
| CD47/IAP | UACAAAACGUGAAUUCUACAG | UAAUGUUUUGCACUUAAGAUG |
| CDK4 | UAAAAGUCAGCAUUUCCAGCA | CAAUUUUCAGUCGUAAAGGUC |
| e-selectin | UCUUUUUGCCUAUUGUUGGGU | GUAGAAAAACGGAUAACAACC |
| ICAM1 | AGUUUGAAUAGCACAUUGGUU | CGUCAAACUUAUCGUGUAACC |
| MCL1 | GAACCAUUAGCAGAAAGUAUU | UUCUUGGUAAUCGUCUUUCAU |
| p-selectin, | UGCUUUUGCAGAAUGAAGGCA | UUACGAAAACGUCUUACUUCC |
| VCAM1 | ACUAACAGGAUUCAUUGUCAG | UUUGAUUGUCCUAAGUAACAG |
| VEGFR2 | AUAAUGAUUUCCAAGUUCGUC | CUUAUUACUAAAGGUUCAAGC |
| Control | UAUUACUUGAAUAAGACAC | AUAAUGAACUUAUUCUGUG |

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A conjugate comprising an anti-TM4SF 1 antibody or an antigen binding fragment thereof conjugated to an oligonucleotide, (1) wherein the anti-TM4SF1 antibody or an antigen binding fragment thereof comprises a heavy chain CDR1, CDR2, and CDR3 sequence of SEQ ID NO.: 94, 95, and 96, respectively, and a light chain CDR1, CDR2, and CDR3 sequence of SEQ ID NO.: 97, 98, and 99, respectively, and wherein optionally the anti-TM4SF1 antibody or an antigen binding fragment thereof comprises a heavy chain sequence of SEQ ID NO.: 92 and a light chain sequence of SEQ ID NO.: 93;

(2) wherein the anti-TM4SF1 antibody or an antigen binding fragment thereof comprises a heavy chain sequence of SEQ ID NO.: 1 and a light chain sequence of SEQ ID NO.: 2;

(3) wherein the anti-TM4SF1 antibody or an antigen binding fragment thereof comprises a heavy chain CDR1, CDR2, and CDR3 sequence of SEQ ID NO.: 6, 7, and 8, respectively, and a light chain CDR1, CDR2, and CDR3 sequence of SEQ ID NO.: 12, 13, and 14, respectively, and wherein optionally the anti-TM4SF1 antibody or an antigen binding fragment thereof comprises a heavy chain sequence of SEQ ID NO.: 3 and a light chain sequence of SEQ ID NO.: 9;

(4) wherein the anti-TM4SF1 antibody or an antigen binding fragment thereof comprises a heavy chain CDR1, CDR2, and CDR3 sequence of SEQ ID NO.: 18, 19, and 20, respectively, and a light chain CDR1, CDR2, and CDR3 sequence of SEQ ID NO.: 24, 25, and 26, respectively, and wherein optionally the anti-TM4SF1 antibody or an antigen binding fragment thereof comprises a heavy chain sequence of SEQ ID NO.: 15 and a light chain sequence of SEQ ID NO.: 21;

(5) wherein the anti-TM4SF1 antibody or an antigen binding fragment thereof comprises a heavy chain CDR1, CDR2, and CDR3 sequence of SEQ ID NO.: 30, 31, and 32, respectively, and a light chain CDR1, CDR2, and CDR3 sequence of SEQ ID NO.: 36, 37, and 38, respectively, and wherein optionally the anti-TM4SF1 antibody or an antigen binding fragment thereof comprises a heavy chain sequence of SEQ ID NO.: 27 and a light chain sequence of SEQ ID NO.: 33;

(6) wherein the anti-TM4SF1 antibody or an antigen binding fragment thereof comprises a heavy chain CDR1, CDR2, and CDR3 sequence of SEQ ID NO.: 54, 55, and 56, respectively, and a light chain CDR1, CDR2, and CDR3 sequence of SEQ ID NO.: 60, 61, and 62, respectively, and wherein optionally the anti-TM4SF1 antibody or an antigen binding fragment thereof comprises a heavy chain sequence of SEQ ID NO.: 51 and a light chain sequence of SEQ ID NO.: 57;

(7) wherein the anti-TM4SF1 antibody or an antigen binding fragment thereof comprises a heavy chain CDR1, CDR2, and CDR3 sequence of SEQ ID NO.: 66, 67, and 68, respectively, and a light chain CDR1, CDR2, and CDR3 sequence of SEQ ID NO.: 72, 73, and 74, respectively, and wherein optionally the anti-TM4SF1 antibody or an antigen binding fragment thereof comprises a heavy chain sequence of SEQ ID NO.: 63 and a light chain sequence of SEQ ID NO.: 69;

(8) wherein the anti-TM4SF1 antibody or an antigen binding fragment thereof comprises a heavy chain CDR1, CDR2, and CDR3 sequence of SEQ ID NO.: 78, 79, and 80, respectively, and a light chain CDR1, CDR2, and CDR3 sequence of SEQ ID NO.: 84, 85, and 86, respectively, and wherein optionally the anti-TM4SF1 antibody or an antigen binding fragment thereof comprises a heavy chain sequence of SEQ ID NO.: 75 and a light chain sequence of SEQ ID NO.: 81; or (9) wherein the anti-TM4SF1 antibody or an antigen binding fragment thereof comprises a heavy chain CDR1, CDR2, and CDR3 sequence of SEQ ID NO.: 42, 43, and 44, respectively, and a light chain CDR1, CDR2, and CDR3 sequence of SEQ ID NO.: 48, 49, and 50, respectively, the anti-TM4SF1 antibody or an antigen binding fragment thereof comprises a heavy chain sequence of SEQ ID NO.: 39 and a light chain sequence of SEQ ID NO.: 45.

2. The conjugate of claim 1, wherein the oligonucleotide comprises a DNA molecule or an RNA molecule.

3. The conjugate of claim 2, wherein the oligonucleotide comprises the RNA molecule, and wherein the oligonucleotide comprises an antisense oligonucleotide, an siRNA, an antisense RNA, an miRNA, an antisense miRNA, an antagomir (anti-miRNA), an shRNA, or an mRNA.

4. The conjugate of claim 2, wherein the oligonucleotide comprises the DNA molecule, and wherein the oligonucleotide comprises a modified DNA, a triple helical DNA, a supercoiled DNA, a Z-DNA, or any combinations thereof.

5. The conjugate of claim 3, wherein the oligonucleotide comprises the siRNA comprising a trinucleotide repeat.

6. The conjugate of claim 5, wherein the siRNA is a CAG/CUG trinucleotide repeat based siRNA.

7. A composition comprising a conjugate according to claim 1 in combination with an antibody-drug conjugate.

8. The composition of claim 7, wherein the antibody-drug conjugate comprises a cytotoxic payload.

9. The composition of claim 8, wherein the cytotoxic payload comprises a V-ATPase inhibitor, a pro-apoptotic agent, a Bcl2 inhibitor, an MCL1 inhibitor, a HSP90 inhibitor, an 1AP inhibitor, an mTor inhibitor, a microtubule stabilizer, a microtubule destabilizer, an auri statin, a dolastatin, a maytansinoid, a MetAP (methionine aminopeptidase), an inhibitor of nuclear export of proteins CRM1, a DPPIV inhibitor, proteasome inhibitors, inhibitors of phosphoryl transfer reactions in mitochondria, a protein synthesis inhibitor, a kinase inhibitor, a CDK2 inhibitor, a CDK9 inhibitor, a kinesin inhibitor, an HD AC inhibitor, a DNA damaging agent, a DNA alkylating agent, a DNA intercalator a DNA minor groove binder, a DHFR inhibitor, a nucleic acid, or a CRISPR enzyme.

10. The composition of claim 7, wherein the antibody-drug conjugate comprises an anti-TM4SF 1 antibody or an antigen binding fragment thereof.

11. The conjugate of claim 3, wherein the oligonucleotide hybridizes with a polynucleotide encoding an inhibitor of p53.

12. The conjugate of claim 3, wherein the oligonucleotide hybridizes with a polynucleotide encoding an apoptosis inhibitor.

* * * * *

SEQUENCE LISTING

```
<160> NUMBER OF SEQ ID NOS: 390

<210> SEQ ID NO 1
<211> LENGTH: 122
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Glu Val Ile Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Ser Phe
            20                  25                  30

Ala Met Ser Trp Val Arg Gln Thr Pro Glu Lys Arg Leu Glu Trp Val
        35                  40                  45

Ala Thr Ile Ser Ser Gly Ser Ile Tyr Ile Tyr Tyr Thr Asp Gly Val
    50                  55                  60

Lys Gly Arg Phe Thr Ile Ser Arg Asp Asn Ala Lys Asn Thr Val His
65                  70                  75                  80

Leu Gln Met Ser Ser Leu Arg Ser Glu Asp Thr Ala Met Tyr Tyr Cys
                85                  90                  95
```

```
Ala Arg Arg Gly Ile Tyr Tyr Gly Tyr Asp Gly Tyr Ala Met Asp Tyr
            100                 105                 110

Trp Gly Gln Gly Thr Ser Val Thr Val Ser
        115                 120

<210> SEQ ID NO 2
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Ala Val Val Met Thr Gln Thr Pro Leu Ser Leu Pro Val Ser Leu Gly
1               5                   10                  15

Asp Gln Ala Ser Ile Ser Cys Arg Ser Ser Gln Ser Leu Val His Ser
            20                  25                  30

Asn Gly Asn Thr Tyr Leu His Trp Tyr Met Gln Lys Pro Gly Gln Ser
        35                  40                  45

Pro Lys Val Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Asp Asp Leu Gly Ile Tyr Phe Cys Ser Gln Ser
                85                  90                  95

Thr His Ile Pro Leu Ala Phe Gly Ala Gly Thr Lys Leu Glu Leu Lys
            100                 105                 110

<210> SEQ ID NO 3
<211> LENGTH: 123
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Ser Phe Arg Asp Tyr
            20                  25                  30

Gly Met Asn Trp Val Lys Gln Ala Pro Gly Arg Thr Phe Lys Trp Met
        35                  40                  45

Gly Trp Ile Asn Thr Tyr Thr Gly Ala Pro Val Tyr Ala Ala Asp Phe
    50                  55                  60

Lys Gly Arg Phe Ala Phe Ser Leu Asp Thr Ser Ala Ser Ala Ala Phe
65                  70                  75                  80

Leu Gln Ile Asn Asn Leu Lys Asn Glu Asp Thr Ala Thr Tyr Phe Cys
                85                  90                  95

Ala Arg Trp Val Ser Tyr Gly Asn Asn Arg Asn Trp Phe Phe Asp Phe
            100                 105                 110

Trp Gly Ala Gly Thr Thr Val Thr Val Ser Ser
        115                 120

<210> SEQ ID NO 4
<211> LENGTH: 369
<212> TYPE: DNA
<213> ORGANISM: Artificial Sequence
<220> FEATURE:
```

<223> OTHER INFORMATION: Description of Artificial Sequence: Synthetic
polynucleotide

<400> SEQUENCE: 4

```
cagatccagt tggtgcagtc tggacctgag ctgaagaagc ctggagagac agtcaagatc    60
tcctgcaagg cttctgggta ttccttcaga gactatggaa tgaactgggt gaagcaggct   120
ccaggaagga cttttaagtg gatgggctgg ataaacacct acactggagc gccagtatat   180
gctgctgact tcaagggacg gtttgccttc tctttggaca cctctgccag cgctgccttt   240
ttgcagatca caacctcaa aaatgaagac acggctacat atttctgtgc aagatgggtc    300
tcctacggta ataaccgcaa ctggttcttc gattttggg gcgcagggac cacggtcacc    360
gtctcctca                                                             369
```

<210> SEQ ID NO 5
<211> LENGTH: 369
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 5

```
caaattcagt tggttcaatc cggccctgag ctcaagaagc ctggagagac agtgaagata    60
agttgtaagg ctagtggcta ttcatttcga gattatggga tgaattgggt caagcaggcc   120
ccagggcgga ccttcaaatg gatggggtgg atcaatactt acactggcgc accagtatat   180
gcagctgatt ttaagggtcg cttgcattt tcacttgata cttcagccag tgccgctttt    240
ttgcaaatca caatctcaa aaatgaagac actgctacat atttctgcgc aggtgggtg    300
agctatggca ataacagaaa ttggttcttt gactttggg gcgcaggcac caccgtcact    360
gtctcatca                                                             369
```

<210> SEQ ID NO 6
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Gly Tyr Ser Phe Arg Asp Tyr Gly Met Asn
1               5                   10

<210> SEQ ID NO 7
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Trp Ile Asn Thr Tyr Thr Gly Ala Pro Val Tyr Ala Ala Asp Phe Lys
1               5                   10                  15

Gly

<210> SEQ ID NO 8
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Trp Val Ser Tyr Gly Asn Asn Arg Asn Trp Phe Phe Asp Phe
1               5                   10

<210> SEQ ID NO 9
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Asp Val Leu Met Thr Gln Thr Pro Leu Ser Leu Pro Val Arg Leu Gly
1               5                   10                  15

Asp Gln Ala Ser Ile Ser Cys Arg Ser Ser Gln Thr Leu Val His Ser
            20                  25                  30

Asn Gly Asn Thr Tyr Leu Glu Trp Tyr Leu Gln Lys Pro Gly Gln Ser
        35                  40                  45

Pro Lys Leu Leu Ile Tyr Lys Val Ser Asn Arg Leu Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Thr Glu Asp Leu Gly Val Tyr Tyr Cys Phe Gln Gly
                85                  90                  95

Ser His Gly Pro Trp Thr Phe Gly Gly Gly Thr Lys Leu Glu Ile Lys
            100                 105                 110

<210> SEQ ID NO 10
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 10
gatgttttga tgacccaaac tccactctcc ctgcctgtcc gtcttggaga tcaggcctcc      60
atctcttgta gatctagtca gacccttgta catagtaatg gaaacaccta tttagaatgg     120
tacctgcaga aaccaggcca gtctccaaaa ctcttgatct acaaagtttc caatcgactt     180
tctggggtcc cagacaggtt cagtggcagt ggatcaggga cagatttcac actcaagatc     240
agcagagtgg agactgagga tctgggagtt tattactgct ttcaaggttc acatggtccg     300
tggacgttcg gtggaggcac caagctggaa atcaaa                               336

<210> SEQ ID NO 11
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11
gacgtactta tgacacaaac tcccttgagc ttgccagtac ggcttggcga tcaagcttca      60
atttcatgtc gttcttctca aacacttgtc cactcaaatg gaatacata tttggaatgg     120

```
tatctccaaa agcccggcca atccccaaaa ttgttgattt acaaggtgtc taatcgactc    180
tcaggcgtcc ccgaccgatt ctccgggagc gggtccggta cagacttcac cttgaaaatc    240
tccagggtag aaactgaaga cctcggagtc tactattgtt tccaggggtc acacggcccc    300
tggacatttg gaggaggaac taagctcgag atcaaa                              336
```

<210> SEQ ID NO 12
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Arg Ser Ser Gln Thr Leu Val His Ser Asn Gly Asn Thr Tyr Leu Glu
1               5                   10                  15

<210> SEQ ID NO 13
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Lys Val Ser Asn Arg Leu Ser
1               5

<210> SEQ ID NO 14
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Phe Gln Gly Ser His Gly Pro Trp Thr
1               5

<210> SEQ ID NO 15
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Glu Val Gln Leu Gln Gln Ser Gly Pro Glu Leu Val Lys Pro Gly Ala
1               5                   10                  15

Ser Val Lys Ile Ser Cys Lys Thr Ser Gly Tyr Thr Phe Thr Asp Tyr
                20                  25                  30

Thr Met His Trp Val Arg Gln Ser His Gly Lys Ser Leu Glu Trp Ile
            35                  40                  45

Gly Ser Phe Asn Pro Asn Asn Gly Gly Leu Thr Asn Tyr Asn Gln Lys
        50                  55                  60

Phe Lys Gly Lys Ala Thr Leu Thr Val Asp Lys Ser Ser Ser Thr Val
65                  70                  75                  80

Tyr Met Asp Leu Arg Ser Leu Thr Ser Glu Asp Ser Ala Val Tyr Tyr
                85                  90                  95

Cys Thr Arg Ile Arg Ala Thr Gly Phe Asp Ser Trp Gly Gln Gly Thr
            100                 105                 110

Thr Leu Thr Val Ser Ser
        115

<210> SEQ ID NO 16
<211> LENGTH: 354
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 16
gaggtccagc tgcaacagtc tggacctgag ctggtgaagc ctggggcttc agtgaagata      60
tcctgcaaga cttctggata cacattcact gattacacca tgcactgggt gaggcagagc     120
catggaaaga gccttgagtg gattggaagt tttaatccta acaatggtgg tcttactaac     180
tacaaccaga agttcaaggg caaggccaca ttgactgtgg acaagtcttc agcacagtg      240 tacatggacc tccgcagcct gacatctgag gattctgcag tctattactg taagaatc      300 cgggctacgg gctttgactc ctggggccag ggcaccactc tcacagtctc ctca           354

<210> SEQ ID NO 17
<211> LENGTH: 354
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 17
gaggtacaac tgcaacagag tggacctgaa cttgtcaaac tggagcaag tgtgaagatt       60 agctgtaaaa ccagtggcta cacatttacc gattatacta tgcactgggt aagacagagc     120
cacgaaaaat cactggagtg gattggtagt ttcaatccta acaacggagg attgacaaat     180
tacaaccaga agttcaaagg gaaagccacc ttgacagttg ataagtcctc aagtaccgtg     240
tatatggatc tgcgttctct cacaagtgaa gatagcgcag tttactactg tacccgcatc     300
cgagccaccg ggttcgattc atggggtcag gggacaacac tgactgtttc ttct           354

<210> SEQ ID NO 18
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Gly Tyr Thr Phe Thr Asp Tyr Thr Met His
1               5                   10

<210> SEQ ID NO 19
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Ser Phe Asn Pro Asn Asn Gly Gly Leu Thr Asn Tyr Asn Gln Lys Phe
1               5                   10                  15

Lys Gly

<210> SEQ ID NO 20
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Ile Arg Ala Thr Gly Phe Asp Ser
1               5

<210> SEQ ID NO 21
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Asp Ile Val Met Ser Gln Ser Pro Ser Ser Leu Ala Val Ser Ala Gly
1               5                   10                  15

Glu Lys Val Thr Met Ser Cys Lys Ser Ser Gln Ser Leu Leu Asn Ser
            20                  25                  30

Arg Thr Arg Lys Asn Tyr Leu Ala Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Asn Val Gln Ala Glu Asp Leu Thr Val Tyr Tyr Cys Lys Gln
                85                  90                  95

Ser Tyr Asn Pro Pro Trp Thr Phe Gly Gly Gly Thr Lys Leu Glu Ile
            100                 105                 110

Lys

<210> SEQ ID NO 22
<211> LENGTH: 339
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 22
gacattgtga tgtcacagtc tccatcctcc ctggctgtgt cagcaggaga gaaggtcact      60
atgagctgca aatccagtca gagtctgctc aacagtagaa cccgaaagaa ctacttggct     120
tggtaccagc agaaaccagg gcagtctcct aaactgctga tctactgggc atccactagg     180
gaatctgggg tccctgatcg cttcacaggc agtggatctg ggacagattt cactctcacc     240
atcagcaatg tgcaggctga agacctgaca gtttattact gcaagcaatc ttataatcct     300
ccgtggacgt tcggtggagg caccaagctg gaaatcaaa                            339

<210> SEQ ID NO 23
<211> LENGTH: 339
<212> TYPE: DNA
<213> ORGANISM: Artificial Sequence

```
<220> FEATURE:
<223> OTHER INFORMATION: Description of Artificial Sequence: Synthetic
      polynucleotide

<400> SEQUENCE: 23
gacatagtta tgtcccagtc tccatccagc ttggctgtca gcgccggaga gaaagtgact      60
atgagttgta atcttccca gtccctgctt aactcacgta ctcggaagaa ttatcttgcc     120
tggtatcaac aaaagccagg tcaaagtcct aagctcctta tttactgggc ctcaacacgg    180
gagtcaggtg tccccgatcg cttcacaggt agtgggagtg gtactgactt cactctcacc    240
atttcaaatg tccaagcaga agacttgact gtgtattact gtaagcagag ttacaaccct    300
ccttggacct ttggtggggg gaccaaactg gagatcaag                           339

<210> SEQ ID NO 24
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Lys Ser Ser Gln Ser Leu Leu Asn Ser Arg Thr Arg Lys Asn Tyr Leu
1               5                   10                  15
Ala

<210> SEQ ID NO 25
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Trp Ala Ser Thr Arg Glu Ser
1               5

<210> SEQ ID NO 26
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Lys Gln Ser Tyr Asn Pro Pro Trp Thr
1               5

<210> SEQ ID NO 27
<211> LENGTH: 116
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Glu Val Gln Val Gln Gln Ser Gly Pro Glu Leu Val Lys Pro Gly Ala
1               5                   10                  15

Ser Val Lys Met Ser Cys Lys Ala Ser Gly Tyr Thr Phe Thr Ser Tyr
                20                  25                  30
```

Val Met His Trp Val Lys Gln Lys Pro Gly Gln Gly Leu Glu Trp Ile
    35                  40                  45

Gly Tyr Ile Asn Pro Asn Asn Asp Ile Asn Tyr Asn Glu Lys Phe
 50                  55                  60

Lys Gly Lys Ala Ser Leu Thr Ser Asp Lys Ser Ser Asn Thr Val Tyr
 65                  70                  75                  80

Met Glu Leu Ser Ser Leu Thr Ser Glu Asp Ser Ala Val Tyr Tyr Cys
                85                  90                  95

Ala Gly Tyr Gly Asn Ser Gly Ala Asn Trp Gly Gln Gly Thr Leu Val
                100                 105                 110

Thr Val Ser Ala
    115

<210> SEQ ID NO 28
<211> LENGTH: 348
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 28
gaggtccagg tacagcagtc tggacctgaa ctggtaaagc ctggggcttc agtgaagatg      60
tcctgtaagg cttctggata cacattcact agctatgtca tgcactgggt gaagcagaag     120
cctgggcagg gccttgagtg gattggatat attaatccta caatgataa tattaactac      180 aatgagaagt tcaaaggcaa ggcctcactg acttcagaca atcctccaa cacagtctac      240 atggagctca gcagcctgac ctctgaggac tctgcggtct attactgtgc aggctatggt     300
aactccggag ctaactgggg ccaagggact ctggtcactg tctctgca                  348

<210> SEQ ID NO 29
<211> LENGTH: 348
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 29
gaagttcaag ttcagcaaag cgggcctgag cttgtcaagc caggcgcatc agtcaaaatg       60
agctgtaagg cttccgggta caccttcacc agttatgtca tgcattgggt aaaacaaaag     120
ccaggacagg gactcgagtg gataggatac attaacccaa ataacgacaa cattaactac     180
aacgagaaat tcaagggcaa agcatcattg acttccgata atcctctaa caccgtgtac      240 atggagctga gttcattgac cagcgaggat tctgccgtgt actactgtgc aggttatggc      300
aactctggtg ctaactgggg gcaggggact ctggtcacag tcagcgca                  348

<210> SEQ ID NO 30
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Gly Tyr Thr Phe Thr Ser Tyr Val Met His
 1               5                  10

```
<210> SEQ ID NO 31
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 31

Tyr Ile Asn Pro Asn Asn Asp Asn Ile Asn Tyr Asn Glu Lys Phe Lys
1               5                   10                  15

Gly

<210> SEQ ID NO 32
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Tyr Gly Asn Ser Gly Ala Asn
1               5

<210> SEQ ID NO 33
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Asp Ile Gln Met Thr Gln Ser Pro Ala Ser Leu Ser Ala Ser Val Gly
1               5                   10                  15

Glu Thr Val Thr Ile Thr Cys Arg Thr Ser Lys Asn Ile Phe Asn Phe
                20                  25                  30

Leu Ala Trp Tyr His Gln Lys Gln Gly Arg Ser Pro Arg Leu Leu Val
            35                  40                  45

Ser His Thr Lys Thr Leu Ala Ala Gly Val Pro Ser Arg Phe Ser Gly
        50                  55                  60

Ser Gly Ser Gly Thr Gln Phe Ser Leu Lys Ile Asn Ser Leu Gln Pro
65                  70                  75                  80

Glu Asp Phe Gly Ile Tyr Tyr Cys Gln His His Tyr Gly Thr Pro Trp
                85                  90                  95

Thr Phe Gly Gly Gly Thr Lys Leu Glu Ile Lys
            100                 105

<210> SEQ ID NO 34
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 34
gacatccaga tgactcagtc tccagcctcc ctatctgcat ctgtgggaga aactgtcacc      60
atcacatgtc gaacaagtaa aaatattttc aatttttag catggtatca ccagaaacag     120
ggaagatctc ctcgactcct ggtctctcat acaaaaacct agcagcagg tgtgccatca     180 aggttcagtg gcagtggctc aggcacacag ttttctctga agatcaacag cctgcagcct     240
```

```
gaagattttg ggatttatta ctgtcaacat cattatggta ctccgtggac gttcggtgga    300
ggcaccaaac tggaaatcaa a                                              321
```

<210> SEQ ID NO 35
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 35

```
gacattcaga tgacccagtc accagcatct ttgagcgcat ccgttgggga gactgtgaca    60
atcacatgcc gaaccagtaa gaacatcttc aacttcctcg catggtacca tcaaaagcag    120
ggcaggtctc ccagactgct tgtctctcac accaagacac tggcagcagg cgtccccagc    180
cggtttagtg gtagtggatc tggcacacag tttagtttga aaatcaattc cctgcaaccc    240
gaagacttcg gcatatacta ttgccagcac cactatggga caccttggac tttcggaggt    300
ggtactaaac ttgagattaa a                                              321
```

<210> SEQ ID NO 36
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Arg Thr Ser Lys Asn Ile Phe Asn Phe Leu Ala
1               5                   10

<210> SEQ ID NO 37
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

His Thr Lys Thr Leu Ala Ala
1               5

<210> SEQ ID NO 38
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Gln His His Tyr Gly Thr Pro Trp Thr
1               5

<210> SEQ ID NO 39
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

```
Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Asn Tyr
            20                  25                  30

Gly Val Lys Trp Val Lys Gln Ala Pro Gly Lys Asp Leu Lys Trp Met
        35                  40                  45

Gly Trp Ile Asn Thr Tyr Thr Gly Asn Pro Ile Tyr Ala Ala Asp Phe
    50                  55                  60

Lys Gly Arg Phe Ala Phe Ser Leu Glu Thr Ser Ala Ser Thr Ala Phe
65                  70                  75                  80

Leu Gln Ile Asn Asn Leu Lys Asn Glu Asp Thr Ala Thr Tyr Phe Cys
                85                  90                  95

Val Arg Phe Gln Tyr Gly Asp Tyr Arg Tyr Phe Asp Val Trp Gly Ala
            100                 105                 110

Gly Thr Thr Val Thr Val Ser Ser
        115                 120
```

<210> SEQ ID NO 40
<211> LENGTH: 360
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 40

```
cagatccagt tggtgcagtc tggacctgag ctgaagaagc tggagagac  agtcaagatc    60
tcctgcaagg cttctgggta taccttcaca aactatggag tgaagtgggt gaagcaggct   120
ccaggaaagg atttaaagtg gatgggctgg ataaacacct acactggaaa tccaatttat   180
gctgctgact tcaagggacg gtttgccttc tctttggaga cctctgccag cactgccttt   240
ttgcagatca caacctcaa  aaatgaggac acggctacat atttctgtgt aagattccaa   300
tatggcgatt accggtactt cgatgtctgg ggcgcaggga ccacggtcac cgtctcctca   360
```

<210> SEQ ID NO 41
<211> LENGTH: 360
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 41

```
caaatccaac ttgtccagag cggtcccgag ttgaagaagc tggcgaaac  cgtgaaaatc    60
tcatgcaagg ccagtggata tacatttaca aactatggcg tcaagtgggt gaaacaagcc   120
ccaggtaaag acttgaaatg gatgggatgg atcaacacat acacagggaa tcctatctat   180
gcagccgact ttaaaggcag atttgccttc agtttggaga catctgcctc caccgctttc   240
ctgcaaataa ataacctgaa aaatgaagat accgctacat acttctgtgt acggttccag   300
tacggagatt accgctattt cgatgtgtgg ggcgcaggta ccacagtaac cgtctcctca   360
```

<210> SEQ ID NO 42
<211> LENGTH: 10
<212> TYPE: PRT
<213> ORGANISM: Artificial Sequence
<220> FEATURE:
<223> OTHER INFORMATION: Description of Artificial Sequence: Synthetic peptide

<400> SEQUENCE: 42

Gly Tyr Thr Phe Thr Asn Tyr Gly Val Lys
1               5                   10

<210> SEQ ID NO 43
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 43

Trp Ile Asn Thr Tyr Thr Gly Asn Pro Ile Tyr Ala Ala Asp Phe Lys
1               5                   10                  15

Gly

<210> SEQ ID NO 44
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 44

Phe Gln Tyr Gly Asp Tyr Arg Tyr Phe Asp Val
1               5                   10

<210> SEQ ID NO 45
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Gln Ile Ile Leu Ser Gln Ser Pro Ala Ile Leu Ser Ala Ser Pro Gly
1               5                   10                  15

Glu Lys Val Thr Met Thr Cys Arg Ala Asn Ser Gly Ile Ser Phe Ile
                20                  25                  30

Asn Trp Tyr Gln Gln Lys Pro Gly Ser Ser Pro Lys Pro Trp Ile Tyr
            35                  40                  45

Gly Thr Ala Asn Leu Ala Ser Gly Val Pro Ala Arg Phe Gly Gly Ser
        50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Ser Ser Asn Pro Leu Thr
                85                  90                  95

Phe Gly Ala Gly Thr Lys Leu Glu Leu Arg
            100                 105

<210> SEQ ID NO 46
<211> LENGTH: 318
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 46

```
caaattattc tctcccagtc tccagcaatc ctgtctgcat ctccagggga gaaggtcacg      60
atgacttgca gggccaactc aggtattagt ttcatcaact ggtaccagca gaagccagga    120
tcctccccca aaccctggat ttatggcaca gccaacctgg cttctggagt ccctgctcgc    180
ttcggtggca gtgggtctgg gacttcttac tctctcacaa tcagcagagt ggaggctgaa    240
gacgctgcca cttattactg ccagcagtgg agtagtaacc cgctcacgtt cggtgctggg    300
accaagctgg agttgaga                                                   318
```

<210> SEQ ID NO 47
<211> LENGTH: 318
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 47

```
caaataattc tgtcacagtc ccccgctata cttagtgctt caccaggaga aaaagtgacc      60
atgacttgta gagctaattc tggcatatca ttcatcaact ggtatcaaca aaagccaggt    120
tcctccccca agccatggat ttacgggacc gccaaccttg cttctggggt acccgctcgt    180
ttcggcggat caggttcagg aacttcctat agcctcacta tcagtcgggt tgaagctgag    240
gatgccgcta catattactg ccagcaatgg tctagtaatc cacttacctt tggagctggc    300
accaaattgg aacttcgt                                                   318
```

<210> SEQ ID NO 48
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 48

Arg Ala Asn Ser Gly Ile Ser Phe Ile Asn
1               5                   10

<210> SEQ ID NO 49
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

Gly Thr Ala Asn Leu Ala Ser
1               5

<210> SEQ ID NO 50
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 50

Gln Gln Trp Ser Ser Asn Pro Leu Thr
1               5

```
<210> SEQ ID NO 51
<211> LENGTH: 116
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Glu Val Gln Leu Gln Gln Ser Gly Pro Glu Leu Val Lys Pro Gly Ala
1               5                   10                  15

Ser Val Lys Leu Ser Cys Lys Ala Ser Gly Tyr Thr Val Thr Ser Tyr
                20                  25                  30

Val Met His Trp Val Lys Gln Lys Pro Gly Gln Gly Leu Glu Trp Ile
            35                  40                  45

Gly Tyr Ile Asn Pro Tyr Ser Asp Val Thr Asn Cys Asn Glu Lys Phe
        50                  55                  60

Lys Gly Lys Ala Thr Leu Thr Ser Asp Lys Thr Ser Ser Thr Ala Tyr
65                  70                  75                  80

Met Glu Leu Ser Ser Leu Thr Ser Glu Asp Ser Ala Val Tyr Tyr Cys
                85                  90                  95

Ser Ser Tyr Gly Gly Gly Phe Ala Tyr Trp Gly Gln Gly Thr Leu Val
                100                 105                 110

Thr Val Ser Ala
        115

<210> SEQ ID NO 52
<211> LENGTH: 348
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 52
gaggtccagc tgcagcagtc tggacctgag ctggtaaagc ctggggcttc agtgaagctg      60
tcctgcaagg cttctggata cacagtcact agctatgtta tgcactgggt gaagcagaag     120
cctgggcagg gccttgagtg gattggatat attaatcctt acagtgatgt tactaactgc     180
aatgagaagt tcaaaggcaa ggccacactg acttcagaca aaacctccag cacagcctac     240
atggagctca gcagcctgac ctctgaggac tctgcggtct attactgttc ctcctacggt     300
ggggggtttg cttactgggg ccaagggact ctggtcactg tctctgca                  348

<210> SEQ ID NO 53
<211> LENGTH: 348
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 53
gaagtccagc ttcagcaatc cggcccagaa ctggtaaaac caggcgcaag tgttaagttg      60
agttgcaaag ccagtggtta taccgttact tcatacgtca tgcattgggt aaaacaaaag     120
cccggccaag ggcttgaatg gatcggctac atcaacccct actctgacgt caccaactgc     180
aacgagaaat tcaaagggaa agccacattg acctctgaca agacaagcag taccgcctac     240
atggagcttt ctagtttgac ttctgaagac tctgctgtct actactgtag cagctacggc     300
ggcggctttg cttactgggg ccagggtaca ttggtgactg tgagtgca                  348
```

<210> SEQ ID NO 54
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 54

Gly Tyr Thr Val Thr Ser Tyr Val Met His
1               5                   10

<210> SEQ ID NO 55
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Tyr Ile Asn Pro Tyr Ser Asp Val Thr Asn Cys Asn Glu Lys Phe Lys
1               5                   10                  15

Gly

<210> SEQ ID NO 56
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Tyr Gly Gly Gly Phe Ala Tyr
1               5

<210> SEQ ID NO 57
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 57

Asp Ile Gln Met Thr Gln Ser Pro Ala Ser Leu Ser Ala Ser Val Gly
1               5                   10                  15

Glu Pro Val Thr Ile Thr Cys Arg Ala Ser Lys Asn Ile Tyr Thr Tyr
            20                  25                  30

Leu Ala Trp Tyr His Gln Lys Gln Gly Lys Ser Pro Gln Phe Leu Val
        35                  40                  45

Tyr Asn Ala Arg Thr Leu Ala Gly Gly Val Pro Ser Arg Leu Ser Gly
    50                  55                  60

Ser Gly Ser Val Thr Gln Phe Ser Leu Asn Ile Asn Thr Leu His Arg
65                  70                  75                  80

Glu Asp Leu Gly Thr Tyr Phe Cys Gln His His Tyr Asp Thr Pro Tyr
                85                  90                  95

Thr Phe Gly Gly Gly Thr Asn Leu Glu Ile Lys
            100                 105

<210> SEQ ID NO 58

```
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 58
gacatccaga tgactcagtc tccagcctcc ctatctgcat ctgtgggaga acctgtcacc     60
atcacatgtc gagcaagtaa gaatatttac acatatttag catggtatca ccagaaacag    120
ggaaaatctc ctcagttcct ggtctataat gcaagaacct tagcaggagg tgtgccatca    180
aggctcagtg gcagtggatc agtcacgcag ttttctctaa acatcaacac cttgcatcga    240
gaagatttag ggacttactt ctgtcaacat cattatgata ctccgtacac gttcggaggg    300
gggaccaacc tggaaataaa a                                              321

<210> SEQ ID NO 59
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 59
gacatccaga tgacacagtc accagcatcc ctgtccgcct cagttgggga gcctgttacc     60
ataacttgtc gggcaagcaa aacatatac acctatttgg cttggtatca ccaaaagcaa    120
ggtaagtcac ctcagtttct tgtatataat gcccgcacac ttgctggcgg agtaccctct    180
cgattgtctg gatctggcag cgttacccaa ttcagcctga acatcaacac cctccatcgg    240
gaagatttgg gtacctattt ctgtcaacat cactacgaca ccccatacac cttcggaggc    300
ggcacaaatt tggaaattaa a                                              321

<210> SEQ ID NO 60
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 60

Arg Ala Ser Lys Asn Ile Tyr Thr Tyr Leu Ala
1               5                   10

<210> SEQ ID NO 61
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 61

Asn Ala Arg Thr Leu Ala Gly
1               5

<210> SEQ ID NO 62
<211> LENGTH: 9
<212> TYPE: PRT
<213> ORGANISM: Artificial Sequence
<220> FEATURE:
<223> OTHER INFORMATION: Description of Artificial Sequence: Synthetic
``` peptide

<400> SEQUENCE: 62

Gln His His Tyr Asp Thr Pro Tyr Thr
1               5

<210> SEQ ID NO 63
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 63

Glu Val Gln Leu Gln Gln Ser Gly Pro Glu Leu Val Lys Pro Gly Ala
1               5                   10                  15

Ser Val Lys Met Ser Cys Lys Ala Ser Gly Tyr Thr Phe Ser Ser Tyr
            20                  25                  30

Val Met His Trp Val Lys Gln Lys Pro Gly Gln Gly Leu Glu Trp Ile
        35                  40                  45

Gly Tyr Ile Asn Pro Tyr Ser Asp Val Thr Asn Tyr Asn Glu Lys Phe
    50                  55                  60

Lys Gly Lys Ala Thr Leu Thr Ser Asp Arg Ser Ser Asn Thr Ala Tyr
65                  70                  75                  80

Met Glu Leu Ser Ser Leu Thr Ser Glu Asp Ser Ala Val Tyr Tyr Cys
                85                  90                  95

Ala Arg Asn Tyr Phe Asp Trp Gly Arg Gly Thr Leu Val Thr Val Ser
            100                 105                 110

Ala

<210> SEQ ID NO 64
<211> LENGTH: 339
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 64
gaggtccagc tgcagcagtc tggacctgag ctggtaaagc ctggggcttc agtgaagatg      60
tcctgcaagg cttctggata cacattctct agctatgtta tgcactgggt gaagcagaag     120
cctgggcagg gccttgagtg gattggatat attaatcctt acagtgatgt cactaactac     180
aatgagaagt tcaaaggcaa ggccacactg acttcagaca gatcctccaa cacagcctac     240
atggaactca gcagcctgac ctctgaggac tctgcggtct attactgtgc aagaaattac     300
ttcgactggg gccgagggac tctggtcaca gtctctgca                            339

<210> SEQ ID NO 65
<211> LENGTH: 339
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 65
gaggtacagc ttcagcagag tggtccagaa ctcgtcaagc ctggggcaag cgttaagatg      60
agttgtaaag catccggtta cacattcagt agctatgtta tgcactgggt caaacagaag     120

```
cctgggcagg ggttggagtg gatcggatat ataaatccct attcagacgt aactaattat    180
aatgaaaagt tcaaggggaa agcaaccttg acaagtgacc ggtcatctaa taccgcatac    240
atggagctga gctcattgac aagtgaggac tctgctgtgt attactgtgc ccggaactac    300
ttcgactggg gtaggggcac actggtaact gttagtgca                           339
```

```
<210> SEQ ID NO 66
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Gly Tyr Thr Phe Ser Ser Tyr Val Met His
1               5                   10

<210> SEQ ID NO 67
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 67

Tyr Ile Asn Pro Tyr Ser Asp Val Thr Asn Tyr Asn Glu Lys Phe Lys
1               5                   10                  15

Gly

<210> SEQ ID NO 68
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 68

Asn Tyr Phe Asp
1

<210> SEQ ID NO 69
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69

Asp Ile Gln Met Thr Gln Ser Pro Ala Ser Leu Ser Ala Ser Val Gly
1               5                   10                  15

Glu Thr Val Thr Ile Thr Cys Arg Ala Ser Lys Asn Val Tyr Ser Tyr
            20                  25                  30

Leu Ala Trp Phe Gln Gln Lys Gln Gly Lys Ser Pro Gln Leu Leu Val
        35                  40                  45

Tyr Asn Ala Lys Thr Leu Ala Glu Gly Val Pro Ser Arg Phe Ser Gly
    50                  55                  60

Gly Gly Ser Gly Thr Gln Phe Ser Leu Lys Ile Asn Ser Leu Gln Pro
65                  70                  75                  80

Ala Asp Phe Gly Ser Tyr Tyr Cys Gln His His Tyr Asn Ile Pro Phe
```

85                  90                  95

Thr Phe Gly Ser Gly Thr Lys Leu Glu Ile Lys
            100                 105

<210> SEQ ID NO 70
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 70
gacatccaga tgactcagtc tccagcctcc ctatctgcat ctgtgggaga aactgtcacc    60
atcacatgtc gagcaagtaa aaatgtttac agttatttag catggtttca acagaaacag   120
gggaaatctc ctcagctcct ggtctataat gctaaaacct tagcagaagg tgtgccatca   180
aggttcagtg gcgggggatc aggcacacag ttttctctga agatcaacag cctgcagcct   240
gcagattttg ggagttatta ctgtcaacat cattataata ttccattcac gttcggctcg   300
gggacaaagt tggaaataaa a                                             321

<210> SEQ ID NO 71
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 71
gacatacaaa tgacacaaag tcccgctagt ctttcagcca gtgttggtga gactgtgaca    60
ataacctgta gagctagcaa aaatgtctac tcctatctgg cttggttcca gcagaaacaa   120
ggaaagagtc ctcagttgct cgtatataat gctaaaactt tggcagaagg cgtcccttct   180
cgtttcagtg gcggaggaag tgggactcaa ttctcactga gatcaatag cctccagccc   240 gccgactttg ggagctacta ttgccaacat cattacaaca taccattcac ctttggctca   300
ggtactaaac tcgaaattaa a                                             321

<210> SEQ ID NO 72
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 72

Arg Ala Ser Lys Asn Val Tyr Ser Tyr Leu Ala
1               5                   10

<210> SEQ ID NO 73
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 73

Asn Ala Lys Thr Leu Ala Glu
1               5

<210> SEQ ID NO 74
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 74

Gln His His Tyr Asn Ile Pro Phe Thr
1               5

<210> SEQ ID NO 75
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Gln Ile Gln Leu Val Gln Ser Gly Pro Glu Leu Lys Lys Pro Gly Glu
1               5                   10                  15

Thr Val Lys Ile Ser Cys Lys Ala Ser Gly Phe Thr Phe Thr Asn Tyr
            20                  25                  30

Pro Met His Trp Val Lys Gln Ala Pro Gly Lys Gly Leu Lys Trp Met
        35                  40                  45

Gly Trp Ile Asn Thr Tyr Ser Gly Val Pro Tyr Ala Asp Asp Phe
    50                  55                  60

Lys Gly Arg Phe Ala Phe Ser Leu Glu Thr Ser Ala Ser Thr Ala Tyr
65                  70                  75                  80

Leu Gln Ile Asn Asn Leu Lys Asn Glu Asp Met Ala Thr Tyr Phe Cys
                85                  90                  95

Ala Arg Gly Gly Tyr Asp Gly Ser Arg Glu Phe Ala Tyr Trp Gly Gln
            100                 105                 110

Gly Thr Leu Val Thr Val Ser
        115

<210> SEQ ID NO 76
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 76
cagatccagt tggtgcagtc tggacctgag ctgaagaagc ctggagagac agtcaagatc      60
tcctgcaagg cttctgggtt taccttcaca aactatccaa tgcactgggt gaagcaggct     120
ccaggaaagg gtttaaagtg gatgggctgg ataaacacct actctggagt gccaacatat     180
gcagatgact caagggacg gtttgccttc tctttggaaa cctctgccag cactgcatat     240
ttgcagatca acaacctcaa aaatgaggac atggctacat atttctgtgc aagaggggc     300 tacgatggta gcagggagtt tgcttactgg ggccaaggga ctctggtcac tgtctct        357

<210> SEQ ID NO 77
<211> LENGTH: 357
<212> TYPE: DNA
<213> ORGANISM: Artificial Sequence
<220> FEATURE:
<223> OTHER INFORMATION: Description of Artificial Sequence: Synthetic -continued polynucleotide

<400> SEQUENCE: 77
cagatacaac tcgtccagtc aggtccagag ttgaagaaac ccggagaaac tgtgaagata     60
tcctgtaaag ccagcggctt tactttcaca aactacccca tgcattgggt gaagcaggcc    120
cccggaaaag gactcaaatg gatgggatgg atcaacacat acagtggggt gcctacttac    180
gcagacgatt tcaaaggaag gttcgcattt agcttggaaa ctagcgcatc tacagcatat    240
ctccagatta acaatcttaa aaatgaggat atggcaacat acttctgcgc tagggggaggt    300 tacgatggga gcagggagtt cgcttattgg gggcaaggga ctcttgtgac tgtaagt       357

<210> SEQ ID NO 78
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 78

Gly Phe Thr Phe Thr Asn Tyr Pro Met His
1               5                   10

<210> SEQ ID NO 79
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 79

Trp Ile Asn Thr Tyr Ser Gly Val Pro Thr Tyr Ala Asp Asp Phe Lys
1               5                   10                  15

Gly

<210> SEQ ID NO 80
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 80

Gly Gly Tyr Asp Gly Ser Arg Glu Phe Ala Tyr
1               5                   10

<210> SEQ ID NO 81
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Asp Ile Val Leu Thr Gln Ser Pro Ala Ser Leu Ala Ala Ser Leu Gly
1               5                   10                  15

Gln Arg Ala Thr Thr Ser Tyr Arg Ala Ser Lys Ser Val Ser Thr Ser
            20                  25                  30

Gly Tyr Ser Tyr Met His Trp Asn Gln Gln Lys Pro Gly Gln Pro Pro
        35                  40                  45

```
Arg Leu Leu Ile Tyr Leu Val Ser Asn Leu Glu Ser Gly Val Pro Ala
 50                  55                  60

Arg Phe Ser Gly Ser Gly Ser Gly Thr Asp Phe Thr Leu Asn Ile His
 65                  70                  75                  80

Pro Val Glu Glu Glu Asp Ala Ala Thr Tyr Tyr Cys Gln His Ile Arg
                 85                  90                  95

Glu Leu Thr Thr Phe Gly Gly Gly Thr Lys Leu Glu Ile Lys
            100                 105                 110

<210> SEQ ID NO 82
<211> LENGTH: 330
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 82
gacattgtgc tgacacagtc tcctgcttcc ttagctgcat ctctgggca gagggccacc      60 acctcataca gggccagcaa aagtgtcagt acatctggct atagttatat gcactggaac    120
caacagaaac caggacagcc acccagactc ctcatctatc ttgtatccaa cctagaatct    180
ggggtccctg ccaggttcag tggcagtggg tctgggacag acttcaccct caacatccat    240
cctgtggagg aggaggatgc tgcaacctat tactgtcagc acattaggga gcttaccacg    300
ttcggagggg ggaccaagct ggaaataaaa                                      330

<210> SEQ ID NO 83
<211> LENGTH: 330
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 83
gacatagtgc tcactcagag ccctgcatcc cttgccgcct ccctcggaca acgagctact      60
acaagctacc gggcatcaaa gtccgttagc acatcaggat acagctatat gcactggaat    120
cagcaaaagc caggccaacc accccgtctt ctcatctacc tcgtaagtaa tctggaatca    180
ggcgtgccag cccgattcag tgggtcaggg tctgggacag atttcaccct caacatccat    240
ccagtagagg aagaggacgc agcaacatat tactgccaac acattagaga acttaccact    300
ttcggaggag gaactaaatt ggagatcaaa                                      330

<210> SEQ ID NO 84
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 84

Arg Ala Ser Lys Ser Val Ser Thr Ser Gly Tyr Ser Tyr Met His
 1               5                  10                  15

<210> SEQ ID NO 85
<211> LENGTH: 7
<212> TYPE: PRT
<213> ORGANISM: Artificial Sequence
<220> FEATURE:
```

<223> OTHER INFORMATION: Description of Artificial Sequence: Synthetic
      peptide

<400> SEQUENCE: 85

Leu Val Ser Asn Leu Glu Ser
1               5

<210> SEQ ID NO 86
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 86

Gln His Ile Arg Glu Leu Thr Thr
1               5

<210> SEQ ID NO 87
<211> LENGTH: 330
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 87

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Ala Ala Gly Ala Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr

-continued

```
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 88
<211> LENGTH: 329
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Ala Ala Gly Ala Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270
```

```
Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly
                325

<210> SEQ ID NO 89
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 89

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 90
<211> LENGTH: 202
<212> TYPE: PRT
<213> ORGANISM: Homo sapiens

<400> SEQUENCE: 90

Met Cys Tyr Gly Lys Cys Ala Arg Cys Ile Gly His Ser Leu Val Gly
1               5                   10                  15

Leu Ala Leu Leu Cys Ile Ala Ala Asn Ile Leu Leu Tyr Phe Pro Asn
            20                  25                  30

Gly Glu Thr Lys Tyr Ala Ser Glu Asn His Leu Ser Arg Phe Val Trp
        35                  40                  45

Phe Phe Ser Gly Ile Val Gly Gly Leu Leu Met Leu Leu Pro Ala
    50                  55                  60

Phe Val Phe Ile Gly Leu Glu Gln Asp Cys Cys Gly Cys Cys Gly
65                  70                  75                  80

His Glu Asn Cys Gly Lys Arg Cys Ala Met Leu Ser Ser Val Leu Ala
                85                  90                  95

Ala Leu Ile Gly Ile Ala Gly Ser Gly Tyr Cys Val Ile Val Ala Ala
            100                 105                 110

Leu Gly Leu Ala Glu Gly Pro Leu Cys Leu Asp Ser Leu Gly Gln Trp
        115                 120                 125

Asn Tyr Thr Phe Ala Ser Thr Glu Gly Gln Tyr Leu Leu Asp Thr Ser
    130                 135                 140
```

```
Thr Trp Ser Glu Cys Thr Glu Pro Lys His Ile Val Glu Trp Asn Val
145                 150                 155                 160

Ser Leu Phe Ser Ile Leu Leu Ala Leu Gly Gly Ile Glu Phe Ile Leu
                165                 170                 175

Cys Leu Ile Gln Val Ile Asn Gly Val Leu Gly Gly Ile Cys Gly Phe
            180                 185                 190

Cys Cys Ser His Gln Gln Gln Tyr Asp Cys
            195                 200

<210> SEQ ID NO 91
<211> LENGTH: 202
<212> TYPE: PRT
<213> ORGANISM: Homo sapiens

<400> SEQUENCE: 91

Met Cys Tyr Gly Lys Cys Ala Arg Cys Ile Gly His Ser Leu Val Gly
1               5                   10                  15

Leu Ala Leu Leu Cys Ile Ala Ala Asn Ile Leu Leu Tyr Phe Pro Asn
            20                  25                  30

Gly Glu Thr Lys Tyr Ala Ser Glu Asn His Leu Ser Arg Phe Val Trp
        35                  40                  45

Phe Phe Ser Gly Ile Val Gly Gly Gly Leu Leu Met Leu Leu Pro Ala
50                  55                  60

Phe Val Phe Ile Gly Leu Glu Gln Asp Asp Cys Cys Gly Cys Cys Gly
65                  70                  75                  80

His Glu Asn Cys Gly Lys Arg Cys Ala Met Leu Ser Ser Val Leu Ala
                85                  90                  95

Ala Leu Ile Gly Ile Ala Gly Ser Gly Tyr Cys Val Ile Val Ala Ala
            100                 105                 110

Leu Gly Leu Ala Glu Gly Pro Leu Cys Leu Asp Ser Leu Gly Gln Trp
        115                 120                 125

Asn Tyr Thr Phe Ala Ser Thr Glu Gly Gln Tyr Leu Leu Asp Thr Ser
130                 135                 140

Thr Trp Ser Glu Cys Thr Glu Pro Lys His Ile Val Glu Trp Asn Val
145                 150                 155                 160

Ser Leu Phe Ser Ile Leu Leu Ala Leu Gly Gly Ile Glu Phe Ile Leu
                165                 170                 175

Cys Leu Ile Gln Val Ile Asn Gly Val Leu Gly Gly Ile Cys Gly Phe
            180                 185                 190

Cys Cys Ser His Gln Gln Gln Tyr Asp Cys
            195                 200

<210> SEQ ID NO 92
<211> LENGTH: 123
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 92

Glu Val Ile Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Ser Phe
            20                  25                  30

Ala Met Ser Trp Val Arg Gln Thr Pro Glu Lys Arg Leu Glu Trp Val
        35                  40                  45
```

```
Ala Thr Ile Ser Ser Gly Ser Ile Tyr Ile Tyr Tyr Thr Asp Gly Val
 50                  55                  60

Lys Gly Arg Phe Thr Ile Ser Arg Asp Asn Ala Lys Asn Thr Val His
 65                  70                  75                  80

Leu Gln Met Ser Ser Leu Arg Ser Glu Asp Thr Ala Met Tyr Tyr Cys
                 85                  90                  95

Ala Arg Arg Gly Ile Tyr Tyr Gly Tyr Asp Gly Tyr Ala Met Asp Tyr
                100                 105                 110

Trp Gly Gln Gly Thr Ser Val Thr Val Ser Ser
            115                 120

<210> SEQ ID NO 93
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

Ala Val Val Met Thr Gln Thr Pro Leu Ser Leu Pro Val Ser Leu Gly
 1               5                  10                  15

Asp Gln Ala Ser Ile Ser Cys Arg Ser Ser Gln Ser Leu Val His Ser
                 20                  25                  30

Asn Gly Asn Thr Tyr Leu His Trp Tyr Met Gln Lys Pro Gly Gln Ser
             35                  40                  45

Pro Lys Val Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Asp Asp Leu Gly Ile Tyr Phe Cys Ser Gln Ser
                 85                  90                  95

Thr His Ile Pro Leu Ala Phe Gly Ala Gly Thr Lys Leu Glu Leu Lys
                100                 105                 110

<210> SEQ ID NO 94
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 94

Gly Phe Thr Phe Ser Ser Phe Ala Met Ser
 1               5                  10

<210> SEQ ID NO 95
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 95

Thr Ile Ser Ser Gly Ser Ile Tyr Ile Tyr Tyr Thr Asp Gly Val Lys
 1               5                  10                  15

Gly

<210> SEQ ID NO 96
```

```
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 96

Arg Gly Ile Tyr Tyr Gly Tyr Asp Gly Tyr Ala Met Asp Tyr
1               5                   10

<210> SEQ ID NO 97
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 97

Arg Ser Ser Gln Ser Leu Val His Ser Asn Gly Asn Thr Tyr Leu His
1               5                   10                  15

<210> SEQ ID NO 98
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 98

Lys Val Ser Asn Arg Phe Ser
1               5

<210> SEQ ID NO 99
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 99

Ser Gln Ser Thr His Val Tyr Thr
1               5

<210> SEQ ID NO 100
<211> LENGTH: 19
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 100
auaaugaacu uauucgug                                                  19

<210> SEQ ID NO 101
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: Description of Combined DNA/RNA Molecule:
      Synthetic oligonucleotide
```

<400> SEQUENCE: 101
cagcagcagc agcagcagca a                                              21

<210> SEQ ID NO 102
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 102
uuucauuggu ccuaauggca g                                              21

<210> SEQ ID NO 103
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 103
gccauuagga ccaaugaaag c                                              21

<210> SEQ ID NO 104
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 104
uaaauacugc gauucuuagu c                                              21

<210> SEQ ID NO 105
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 105
cuaagaaucg caguauuuaa g                                              21

<210> SEQ ID NO 106
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 106
uuaaauacug cgauucuuag u                                              21

<210> SEQ ID NO 107
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 107
uaagaaucgc aguauuuaag a                                              21

<210> SEQ ID NO 108
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 108
guaaagcaaa auauuagccg c                                              21

<210> SEQ ID NO 109
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 109
ggcuaauauu uugcuuuacu u                                              21

<210> SEQ ID NO 110
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 110
aguaaagcaa aauauuagcc g                                              21

<210> SEQ ID NO 111
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 111
gcuaauauuu ugcuuuacuu u                                              21

<210> SEQ ID NO 112
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 112
aaguaaagca aaauauuagc c                                              21

<210> SEQ ID NO 113
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 113
cuaauauuuu gcuuuacuuu c                                          21

<210> SEQ ID NO 114
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 114
aucguuugcc acaguuuuca u                                          21

<210> SEQ ID NO 115
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 115
gaaaacugug gcaaacgaug u                                          21

<210> SEQ ID NO 116
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 116
agaaaacaga gauacauucc a                                          21

<210> SEQ ID NO 117
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 117
gaauguaucu cuguuuucua u                                          21

<210> SEQ ID NO 118
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 118
aagaugaauu caauuccacc a                                          21

<210> SEQ ID NO 119
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 119
guggaauuga auucaucuug u                                          21

```
<210> SEQ ID NO 120
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 120
acaagaugaa uucaauucca c                                              21

<210> SEQ ID NO 121
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 121
ggaauugaau ucaucuugug u                                              21

<210> SEQ ID NO 122
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 122
ugaauaagac acaagaugaa u                                              21

<210> SEQ ID NO 123
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 123
ucaucuugug ucuuauucaa g                                              21

<210> SEQ ID NO 124
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 124
uugaauaaga cacaagauga a                                              21

<210> SEQ ID NO 125
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 125
caucuugugu cuuauucaag u                                              21
```

<210> SEQ ID NO 126
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 126
uauuacuuga auaagacaca a                                              21

<210> SEQ ID NO 127
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 127
gugucuuauu caaguaauaa a                                              21

<210> SEQ ID NO 128
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 128
uuuauuacuu gaauaagaca c                                              21

<210> SEQ ID NO 129
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 129
gucuuauuca aguaauaaau g                                              21

<210> SEQ ID NO 130
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 130
agcaaaagcc acauaugccu c                                              21

<210> SEQ ID NO 131
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 131
ggcauaugug gcuuuugcug c                                              21

```
<210> SEQ ID NO 132
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 132
aaauagagga agauuguggc u                                             21

<210> SEQ ID NO 133
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 133
ccacaaucuu ccucuauuuc a                                             21

<210> SEQ ID NO 134
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 134
ugaaauagag gaagauugug g                                             21

<210> SEQ ID NO 135
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 135
acaaucuucc ucuauuucau u                                             21

<210> SEQ ID NO 136
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 136
augaaauaga ggaagauugu g                                             21

<210> SEQ ID NO 137
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 137
caaucuuccu cuauuucauu g                                             21

<210> SEQ ID NO 138
```

```
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 138
aauuacaaug aaauagagga a                                          21

<210> SEQ ID NO 139
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 139
ccucuauuuc auuguaauuu a                                          21

<210> SEQ ID NO 140
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 140
aaauuacaau gaaauagagg a                                          21

<210> SEQ ID NO 141
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 141
cucuauuuca uuguaauuua u                                          21

<210> SEQ ID NO 142
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 142
uaaauuacaa ugaaauagag g                                          21

<210> SEQ ID NO 143
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 143
ucuauuucau uguaauuuau a                                          21

<210> SEQ ID NO 144
<211> LENGTH: 21
```

<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 144
uauaaauuac aaugaaauag a                                              21

<210> SEQ ID NO 145
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 145
uauuucauug uaauuuauau a                                              21

<210> SEQ ID NO 146
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 146
aaauauauaa auuacaauga a                                              21

<210> SEQ ID NO 147
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 147
cauuguaauu uauauauuuc a                                              21

<210> SEQ ID NO 148
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 148
agugaaauau auaaauuaca a                                              21

<210> SEQ ID NO 149
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 149
guaauuuaua uauuucacuu g                                              21

<210> SEQ ID NO 150
<211> LENGTH: 21
<212> TYPE: RNA

```
<213> ORGANISM: Artificial Sequence
<220> FEATURE:
<223> OTHER INFORMATION: Description of Artificial Sequence: Synthetic
      oligonucleotide

<400> SEQUENCE: 150
uuacaaauga auacaaguga a                                              21

<210> SEQ ID NO 151
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 151
cacuuguauu cauuuguaaa a                                              21

<210> SEQ ID NO 152
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 152
uuuuacaaau gaauacaagu g                                              21

<210> SEQ ID NO 153
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 153
cuuguauuca uuuguaaaac u                                              21

<210> SEQ ID NO 154
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 154
uacaaaguuu uacaaaugaa u                                              21

<210> SEQ ID NO 155
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 155
ucauuuguaa aacuuuguau u                                              21

<210> SEQ ID NO 156
<211> LENGTH: 21
<212> TYPE: RNA
<213> ORGANISM: Artificial Sequence
```

```
<220> FEATURE:
<223> OTHER INFORMATION: Description of Artificial Sequence: Synthetic
      oligonucleotide

<400> SEQUENCE: 156
uacacuaaua caaaguuuua c                                              21

<210> SEQ ID NO 157
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 157
aaaacuuugu auuaguguaa c                                              21

<210> SEQ ID NO 158
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 158
uuacacuaau acaaaguuuu a                                              21

<210> SEQ ID NO 159
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 159
aaacuuugua uuaguguaac a                                              21

<210> SEQ ID NO 160
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 160
uguuacacua auacaaaguu u                                              21

<210> SEQ ID NO 161
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 161
acuuuguauu aguguaacau a                                              21

<210> SEQ ID NO 162
<211> LENGTH: 21
<212> TYPE: RNA
<213> ORGANISM: Artificial Sequence
<220> FEATURE:
```

```
<223> OTHER INFORMATION: Description of Artificial Sequence: Synthetic
      oligonucleotide

<400> SEQUENCE: 162
auguuacacu aauacaaagu u                                              21

<210> SEQ ID NO 163
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 163
cuuuguauua guguaacaua c                                              21

<210> SEQ ID NO 164
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 164
ucuuuacagg cguuuguaaa a                                              21

<210> SEQ ID NO 165
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 165
uuacaaacgc cuguaaagac u                                              21

<210> SEQ ID NO 166
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 166
aagaaguuua cuaaauuuaa a                                              21

<210> SEQ ID NO 167
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 167
uaaauuuagu aaacuucuuu u                                              21

<210> SEQ ID NO 168
<211> LENGTH: 21
<212> TYPE: RNA
<213> ORGANISM: Artificial Sequence
<220> FEATURE:
<223> OTHER INFORMATION: Description of Artificial Sequence: Synthetic
``` oligonucleotide

<400> SEQUENCE: 168
aaacaaaaaa gaaguuuacu a                                              21

<210> SEQ ID NO 169
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 169
guaaacuucu uuuuguuug u                                               21

<210> SEQ ID NO 170
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 170
uuuguuuccu cauuccuuaa a                                              21

<210> SEQ ID NO 171
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 171
uaaggaauga ggaaacaaac c                                              21

<210> SEQ ID NO 172
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 172
uuaucucaga uauacgagu a                                               21

<210> SEQ ID NO 173
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 173
cucaguauau cugagauaaa c                                              21

<210> SEQ ID NO 174
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

```
<400> SEQUENCE: 174
uuuaucucag auauacugag u                                      21

<210> SEQ ID NO 175
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 175
ucaguauauc ugagauaaac u                                      21

<210> SEQ ID NO 176
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 176
auuauagagu uuaucucaga u                                      21

<210> SEQ ID NO 177
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 177
cugagauaaa cucuauaaug u                                      21

<210> SEQ ID NO 178
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 178
acauuauaga guuuaucuca g                                      21

<210> SEQ ID NO 179
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 179
gagauaaacu cuauaauguu u                                      21

<210> SEQ ID NO 180
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide
```

```
<400> SEQUENCE: 180
aaacauuaua gaguuuaucu c                                              21

<210> SEQ ID NO 181
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 181
gauaaacucu auaauguuuu g                                              21

<210> SEQ ID NO 182
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 182
uauccaaaac auuauagagu u                                              21

<210> SEQ ID NO 183
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 183
cucuauaaug uuuuggauaa a                                              21

<210> SEQ ID NO 184
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 184
uuauccaaaa cauuauagag u                                              21

<210> SEQ ID NO 185
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 185
ucuauaaugu uuuggauaaa a                                              21

<210> SEQ ID NO 186
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 186
```
uuuauccaaa acauuauaga g                    21

<210> SEQ ID NO 187
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 187
cuauaauguu uuggauaaaa a                    21

<210> SEQ ID NO 188
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 188
uuuuauccaa aacauuauag a                    21

<210> SEQ ID NO 189
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 189
uauaauguuu uggauaaaaa u                    21

<210> SEQ ID NO 190
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 190
uuuuuaucca aaacauuaua g                    21

<210> SEQ ID NO 191
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 191
auaauguuuu ggauaaaaau a                    21

<210> SEQ ID NO 192
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 192
uauuuuuauc caaaacauua u                        21

<210> SEQ ID NO 193
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 193
aauguuuugg auaaaaauaa c                        21

<210> SEQ ID NO 194
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 194
uuauuuuuau ccaaaacauu a                        21

<210> SEQ ID NO 195
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 195
auguuuugga uaaaaauaac a                        21

<210> SEQ ID NO 196
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 196
uacaauagug auuggaaugu u                        21

<210> SEQ ID NO 197
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 197
cauuccaauc acuauuguau a                        21

<210> SEQ ID NO 198
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 198
uauauacaau agugauugga a                        21

<210> SEQ ID NO 199
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 199
ccaaucacua uuguauauau g                                           21

<210> SEQ ID NO 200
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 200
auauauacaa uagugauugg a                                           21

<210> SEQ ID NO 201
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 201
caaucacuau uguauauaug u                                           21

<210> SEQ ID NO 202
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 202
uaauuuaaaa aauacaugca c                                           21

<210> SEQ ID NO 203
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 203
gcauguauuu uuuaaauuaa a                                           21

<210> SEQ ID NO 204
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 204
uaaaaagcaa cuagacaucu u                                           21

<210> SEQ ID NO 205
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 205
gaugucuagu ugcuuuuuau a                                              21

<210> SEQ ID NO 206
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 206
uuauaaaaag caacuagaca u                                              21

<210> SEQ ID NO 207
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 207
gucuaguugc uuuuuauaag a                                              21

<210> SEQ ID NO 208
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 208
ucauacaagc agugaaaaca a                                              21

<210> SEQ ID NO 209
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 209 guuucacug cuuguaugau g                                               21

<210> SEQ ID NO 210
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 210
uguaugaaug ggaaacauca u                                              21

```
<210> SEQ ID NO 211
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 211 gauguuccc auucauacac c                                              21

<210> SEQ ID NO 212
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 212
uuuauaggug uaugaauggg a                                             21

<210> SEQ ID NO 213
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 213
ccauucauac accuauaaau c                                             21

<210> SEQ ID NO 214
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 214
auuuauaggu guaugaaugg g                                             21

<210> SEQ ID NO 215
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 215
cauucauaca ccuauaaauc u                                             21

<210> SEQ ID NO 216
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 216
uguuagagau uuauaggugu a                                             21

<210> SEQ ID NO 217
```

```
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 217
caccuauaaa ucucuaacaa g                                               21

<210> SEQ ID NO 218
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 218
uuguuagaga uuuauaggug u                                               21

<210> SEQ ID NO 219
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 219
accuauaaau cucuaacaag a                                               21

<210> SEQ ID NO 220
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 220
ucuuguuaga gauuuauagg u                                               21

<210> SEQ ID NO 221
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 221
cuauaaaucu cuaacaagag g                                               21

<210> SEQ ID NO 222
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 222
ucuaaguaaa uauuuguuuc u                                               21

<210> SEQ ID NO 223
<211> LENGTH: 21
```

```
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 223
aaacaaauau uuacuuagag u                                              21

<210> SEQ ID NO 224
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 224
uuuggauugg aacauucuca a                                              21

<210> SEQ ID NO 225
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 225
gagaauguuc caauccaaau g                                              21

<210> SEQ ID NO 226
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 226
uguaaguugu gaugcauuca u                                              21

<210> SEQ ID NO 227
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 227
gaaugcauca caacuuacaa u                                              21

<210> SEQ ID NO 228
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 228
acaaugagca gcauuguaag u                                              21

<210> SEQ ID NO 229
<211> LENGTH: 21
<212> TYPE: RNA
```

```
<213> ORGANISM: Artificial Sequence
<220> FEATURE:
<223> OTHER INFORMATION: Description of Artificial Sequence: Synthetic
      oligonucleotide

<400> SEQUENCE: 229
uuacaaugcu gcucauuguu g                                              21

<210> SEQ ID NO 230
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 230
uuugaaucuc auaguacuca c                                              21

<210> SEQ ID NO 231
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 231
gaguacuaug agauucaaau u                                              21

<210> SEQ ID NO 232
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 232
uauguuagaa aaauuugaau c                                              21

<210> SEQ ID NO 233
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 233
uucaaauuuu ucuaacauau g                                              21

<210> SEQ ID NO 234
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 234
auauguuaga aaauuugaa u                                               21

<210> SEQ ID NO 235
<211> LENGTH: 21
<212> TYPE: RNA
<213> ORGANISM: Artificial Sequence
```

```
<220> FEATURE:
<223> OTHER INFORMATION: Description of Artificial Sequence: Synthetic
      oligonucleotide

<400> SEQUENCE: 235
ucaaauuuuu cuaacauaug g                                              21

<210> SEQ ID NO 236
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 236
acaaaaggcu uuccauaugu u                                              21

<210> SEQ ID NO 237
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 237
cauauggaaa gccuuuuguc c                                              21

<210> SEQ ID NO 238
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 238
uuuuuuuaaa cacaugaucc c                                              21

<210> SEQ ID NO 239
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 239
gaucaugugu uuaaaaaaag a                                              21

<210> SEQ ID NO 240
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 240
uucaguuucc caucuuucuu c                                              21

<210> SEQ ID NO 241
<211> LENGTH: 21
<212> TYPE: RNA
<213> ORGANISM: Artificial Sequence
<220> FEATURE:
```

```
<223> OTHER INFORMATION: Description of Artificial Sequence: Synthetic
      oligonucleotide

<400> SEQUENCE: 241
agaaagaugg gaaacugaau a                                              21

<210> SEQ ID NO 242
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 242
auucaguuuc ccaucuuucu u                                              21

<210> SEQ ID NO 243
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 243
gaaagauggg aaacugaaua a                                              21

<210> SEQ ID NO 244
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 244
guuuugaggg uauuuccucg u                                              21

<210> SEQ ID NO 245
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 245
gaggaaauac ccucaaaacu a                                              21

<210> SEQ ID NO 246
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 246
aguuuugagg guauuuccuc g                                              21

<210> SEQ ID NO 247
<211> LENGTH: 21
<212> TYPE: RNA
<213> ORGANISM: Artificial Sequence
<220> FEATURE:
<223> OTHER INFORMATION: Description of Artificial Sequence: Synthetic
``` oligonucleotide

<400> SEQUENCE: 247
aggaaauacc cucaaaacua a                                              21

<210> SEQ ID NO 248
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 248
uaguuuugag gguauuuccu c                                              21

<210> SEQ ID NO 249
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 249
ggaaauaccc ucaaaacuaa c                                              21

<210> SEQ ID NO 250
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 250
aaacaaguua guuuugaggg u                                              21

<210> SEQ ID NO 251
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 251
ccucaaaacu aacuuguuua c                                              21

<210> SEQ ID NO 252
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 252
uaaacaaguu aguuuugagg g                                              21

<210> SEQ ID NO 253
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 253
cucaaaacua acuuguuuac a                                              21

<210> SEQ ID NO 254
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 254
uuguuguaaa caaguuaguu u                                              21

<210> SEQ ID NO 255
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 255
acuaacuugu uuacaacaaa a                                              21

<210> SEQ ID NO 256
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 256
uuuguuguaa acaaguuagu u                                              21

<210> SEQ ID NO 257
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 257
cuaacuuguu uacaacaaaa u                                              21

<210> SEQ ID NO 258
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 258
uuuuguugua aacaaguuag u                                              21

<210> SEQ ID NO 259
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

```
<400> SEQUENCE: 259
uaacuuguuu acaacaaaau a                                        21

<210> SEQ ID NO 260
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 260
uauuuuguug uaaacaaguu a                                        21

<210> SEQ ID NO 261
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 261
acuuguuuac aacaaaauaa a                                        21

<210> SEQ ID NO 262
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 262
uuuauuuugu uguaaacaag u                                        21

<210> SEQ ID NO 263
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 263
uuguuuacaa caaauaaag u                                         21

<210> SEQ ID NO 264
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 264
acuuuauuuu guuguaaaca a                                        21

<210> SEQ ID NO 265
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 265
```
guuuacaaca aaauaaagua u                          21

<210> SEQ ID NO 266
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 266
ugaauacuuu auuuuguugu a                          21

<210> SEQ ID NO 267
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 267
caacaaaaua aaguauucac u                          21

<210> SEQ ID NO 268
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 268
uagugaauac uuuauuuugu u                          21

<210> SEQ ID NO 269
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 269
caaaauaaag uauucacuac c                          21

<210> SEQ ID NO 270
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 270
uuaacauggu agugaauacu u                          21

<210> SEQ ID NO 271
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 271
guauucacua ccauguuaaa a					21

<210> SEQ ID NO 272
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 272
uuuaacaugg uagugaauac u					21

<210> SEQ ID NO 273
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 273
uauucacuac cauguuaaaa a					21

<210> SEQ ID NO 274
<211> LENGTH: 48
<212> TYPE: PRT
<213> ORGANISM: Homo sapiens

<400> SEQUENCE: 274

Glu Gly Pro Leu Cys Leu Asp Ser Leu Gly Gln Trp Asn Tyr Thr Phe
1               5                   10                  15

Ala Ser Thr Glu Gly Gln Tyr Leu Leu Asp Thr Ser Thr Trp Ser Glu
            20                  25                  30

Cys Thr Glu Pro Lys His Ile Val Glu Trp Asn Val Ser Leu Phe Ser
        35                  40                  45

<210> SEQ ID NO 275
<211> LENGTH: 23
<212> TYPE: DNA
<213> ORGANISM: Homo sapiens

<400> SEQUENCE: 275
ctgccattag gaccaatgaa agc				23

<210> SEQ ID NO 276
<211> LENGTH: 23
<212> TYPE: DNA
<213> ORGANISM: Homo sapiens

<400> SEQUENCE: 276
gactaagaat cgcagtattt aag				23

<210> SEQ ID NO 277
<211> LENGTH: 23
<212> TYPE: DNA
<213> ORGANISM: Homo sapiens

<400> SEQUENCE: 277
actaagaatc gcagtattta aga				23

<210> SEQ ID NO 278
<211> LENGTH: 23
<212> TYPE: DNA

```
<213> ORGANISM: Homo sapiens

<400> SEQUENCE: 278
gcggctaata ttttgcttta ctt                                              23

<210> SEQ ID NO 279
<211> LENGTH: 23
<212> TYPE: DNA
<213> ORGANISM: Homo sapiens

<400> SEQUENCE: 279
cggctaatat tttgctttac ttt                                              23

<210> SEQ ID NO 280
<211> LENGTH: 23
<212> TYPE: DNA
<213> ORGANISM: Homo sapiens

<400> SEQUENCE: 280
ggctaatatt ttgctttact ttc                                              23

<210> SEQ ID NO 281
<211> LENGTH: 23
<212> TYPE: DNA
<213> ORGANISM: Homo sapiens

<400> SEQUENCE: 281
atgaaaactg tggcaaacga tgt                                              23

<210> SEQ ID NO 282
<211> LENGTH: 23
<212> TYPE: DNA
<213> ORGANISM: Homo sapiens

<400> SEQUENCE: 282
tggaatgtat ctctgttttc tat                                              23

<210> SEQ ID NO 283
<211> LENGTH: 23
<212> TYPE: DNA
<213> ORGANISM: Homo sapiens

<400> SEQUENCE: 283
tggtggaatt gaattcatct tgt                                              23

<210> SEQ ID NO 284
<211> LENGTH: 23
<212> TYPE: DNA
<213> ORGANISM: Homo sapiens

<400> SEQUENCE: 284
gtggaattga attcatcttg tgt                                              23

<210> SEQ ID NO 285
<211> LENGTH: 23
<212> TYPE: DNA
<213> ORGANISM: Homo sapiens

<400> SEQUENCE: 285
attcatcttg tgtcttattc aag                                              23

<210> SEQ ID NO 286
<211> LENGTH: 23
```

```
<212> TYPE: DNA
<213> ORGANISM: Homo sapiens

<400> SEQUENCE: 286
ttcatcttgt gtcttattca agt                                            23

<210> SEQ ID NO 287
<211> LENGTH: 23
<212> TYPE: DNA
<213> ORGANISM: Homo sapiens

<400> SEQUENCE: 287
ttgtgtctta ttcaagtaat aaa                                            23

<210> SEQ ID NO 288
<211> LENGTH: 23
<212> TYPE: DNA
<213> ORGANISM: Homo sapiens

<400> SEQUENCE: 288
gtgtcttatt caagtaataa atg                                            23

<210> SEQ ID NO 289
<211> LENGTH: 23
<212> TYPE: DNA
<213> ORGANISM: Homo sapiens

<400> SEQUENCE: 289
gaggcatatg tggcttttgc tgc                                            23

<210> SEQ ID NO 290
<211> LENGTH: 23
<212> TYPE: DNA
<213> ORGANISM: Homo sapiens

<400> SEQUENCE: 290
agccacaatc ttcctctatt tca                                            23

<210> SEQ ID NO 291
<211> LENGTH: 23
<212> TYPE: DNA
<213> ORGANISM: Homo sapiens

<400> SEQUENCE: 291
ccacaatctt cctctatttc att                                            23

<210> SEQ ID NO 292
<211> LENGTH: 23
<212> TYPE: DNA
<213> ORGANISM: Homo sapiens

<400> SEQUENCE: 292
cacaatcttc ctctatttca ttg                                            23

<210> SEQ ID NO 293
<211> LENGTH: 23
<212> TYPE: DNA
<213> ORGANISM: Homo sapiens

<400> SEQUENCE: 293
ttcctctatt tcattgtaat tta                                            23

<210> SEQ ID NO 294
```

```
<211> LENGTH: 23
<212> TYPE: DNA
<213> ORGANISM: Homo sapiens

<400> SEQUENCE: 294
tcctctattt cattgtaatt tat                                              23

<210> SEQ ID NO 295
<211> LENGTH: 23
<212> TYPE: DNA
<213> ORGANISM: Homo sapiens

<400> SEQUENCE: 295
cctctatttc attgtaatttt ata                                             23

<210> SEQ ID NO 296
<211> LENGTH: 23
<212> TYPE: DNA
<213> ORGANISM: Homo sapiens

<400> SEQUENCE: 296
tctatttcat tgtaatttat ata                                              23

<210> SEQ ID NO 297
<211> LENGTH: 23
<212> TYPE: DNA
<213> ORGANISM: Homo sapiens

<400> SEQUENCE: 297
ttcattgtaa tttatatatt tca                                              23

<210> SEQ ID NO 298
<211> LENGTH: 23
<212> TYPE: DNA
<213> ORGANISM: Homo sapiens

<400> SEQUENCE: 298
ttgtaattta tatatttcac ttg                                              23

<210> SEQ ID NO 299
<211> LENGTH: 23
<212> TYPE: DNA
<213> ORGANISM: Homo sapiens

<400> SEQUENCE: 299
ttcacttgta ttcatttgta aaa                                              23

<210> SEQ ID NO 300
<211> LENGTH: 23
<212> TYPE: DNA
<213> ORGANISM: Homo sapiens

<400> SEQUENCE: 300
cacttgtatt catttgtaaa act                                              23

<210> SEQ ID NO 301
<211> LENGTH: 23
<212> TYPE: DNA
<213> ORGANISM: Homo sapiens

<400> SEQUENCE: 301
attcatttgt aaaactttgt att                                              23
```

```
<210> SEQ ID NO 302
<211> LENGTH: 23
<212> TYPE: DNA
<213> ORGANISM: Homo sapiens

<400> SEQUENCE: 302
gtaaaacttt gtattagtgt aac                                            23

<210> SEQ ID NO 303
<211> LENGTH: 23
<212> TYPE: DNA
<213> ORGANISM: Homo sapiens

<400> SEQUENCE: 303
taaaactttg tattagtgta aca                                            23

<210> SEQ ID NO 304
<211> LENGTH: 23
<212> TYPE: DNA
<213> ORGANISM: Homo sapiens

<400> SEQUENCE: 304
aaactttgta ttagtgtaac ata                                            23

<210> SEQ ID NO 305
<211> LENGTH: 23
<212> TYPE: DNA
<213> ORGANISM: Homo sapiens

<400> SEQUENCE: 305
aactttgtat tagtgtaaca tac                                            23

<210> SEQ ID NO 306
<211> LENGTH: 23
<212> TYPE: DNA
<213> ORGANISM: Homo sapiens

<400> SEQUENCE: 306
ttttacaaac gcctgtaaag act                                            23

<210> SEQ ID NO 307
<211> LENGTH: 23
<212> TYPE: DNA
<213> ORGANISM: Homo sapiens

<400> SEQUENCE: 307
tttaaattta gtaaacttct ttt                                            23

<210> SEQ ID NO 308
<211> LENGTH: 23
<212> TYPE: DNA
<213> ORGANISM: Homo sapiens

<400> SEQUENCE: 308
tagtaaactt cttttttgtt tgt                                            23

<210> SEQ ID NO 309
<211> LENGTH: 23
<212> TYPE: DNA
<213> ORGANISM: Homo sapiens

<400> SEQUENCE: 309
tttaaggaat gaggaaacaa acc                                            23
```

<210> SEQ ID NO 310
<211> LENGTH: 23
<212> TYPE: DNA
<213> ORGANISM: Homo sapiens

<400> SEQUENCE: 310
tactcagtat atctgagata aac                                              23

<210> SEQ ID NO 311
<211> LENGTH: 23
<212> TYPE: DNA
<213> ORGANISM: Homo sapiens

<400> SEQUENCE: 311
actcagtata tctgagataa act                                              23

<210> SEQ ID NO 312
<211> LENGTH: 23
<212> TYPE: DNA
<213> ORGANISM: Homo sapiens

<400> SEQUENCE: 312
atctgagata aactctataa tgt                                              23

<210> SEQ ID NO 313
<211> LENGTH: 23
<212> TYPE: DNA
<213> ORGANISM: Homo sapiens

<400> SEQUENCE: 313
ctgagataaa ctctataatg ttt                                              23

<210> SEQ ID NO 314
<211> LENGTH: 23
<212> TYPE: DNA
<213> ORGANISM: Homo sapiens

<400> SEQUENCE: 314
gagataaact ctataatgtt ttg                                              23

<210> SEQ ID NO 315
<211> LENGTH: 23
<212> TYPE: DNA
<213> ORGANISM: Homo sapiens

<400> SEQUENCE: 315
aactctataa tgttttggat aaa                                              23

<210> SEQ ID NO 316
<211> LENGTH: 23
<212> TYPE: DNA
<213> ORGANISM: Homo sapiens

<400> SEQUENCE: 316
actctataat gttttggata aaa                                              23

<210> SEQ ID NO 317
<211> LENGTH: 23
<212> TYPE: DNA
<213> ORGANISM: Homo sapiens

<400> SEQUENCE: 317
ctctataatg ttttggataa aaa                                              23

```
<210> SEQ ID NO 318
<211> LENGTH: 23
<212> TYPE: DNA
<213> ORGANISM: Homo sapiens

<400> SEQUENCE: 318
tctataatgt tttggataaa aat                                              23

<210> SEQ ID NO 319
<211> LENGTH: 23
<212> TYPE: DNA
<213> ORGANISM: Homo sapiens

<400> SEQUENCE: 319
ctataatgtt ttggataaaa ata                                              23

<210> SEQ ID NO 320
<211> LENGTH: 23
<212> TYPE: DNA
<213> ORGANISM: Homo sapiens

<400> SEQUENCE: 320
ataatgtttt ggataaaaat aac                                              23

<210> SEQ ID NO 321
<211> LENGTH: 23
<212> TYPE: DNA
<213> ORGANISM: Homo sapiens

<400> SEQUENCE: 321
taatgttttg gataaaaata aca                                              23

<210> SEQ ID NO 322
<211> LENGTH: 23
<212> TYPE: DNA
<213> ORGANISM: Homo sapiens

<400> SEQUENCE: 322
aacattccaa tcactattgt ata                                              23

<210> SEQ ID NO 323
<211> LENGTH: 23
<212> TYPE: DNA
<213> ORGANISM: Homo sapiens

<400> SEQUENCE: 323
ttccaatcac tattgtatat atg                                              23

<210> SEQ ID NO 324
<211> LENGTH: 23
<212> TYPE: DNA
<213> ORGANISM: Homo sapiens

<400> SEQUENCE: 324
tccaatcact attgtatata tgt                                              23

<210> SEQ ID NO 325
<211> LENGTH: 23
<212> TYPE: DNA
<213> ORGANISM: Homo sapiens

<400> SEQUENCE: 325
```

```
gtgcatgtat tttttaaatt aaa                                            23

<210> SEQ ID NO 326
<211> LENGTH: 23
<212> TYPE: DNA
<213> ORGANISM: Homo sapiens

<400> SEQUENCE: 326
aagatgtcta gttgcttttt ata                                            23

<210> SEQ ID NO 327
<211> LENGTH: 23
<212> TYPE: DNA
<213> ORGANISM: Homo sapiens

<400> SEQUENCE: 327
atgtctagtt gctttttata aga                                            23

<210> SEQ ID NO 328
<211> LENGTH: 23
<212> TYPE: DNA
<213> ORGANISM: Homo sapiens

<400> SEQUENCE: 328
ttgttttcac tgcttgtatg atg                                            23

<210> SEQ ID NO 329
<211> LENGTH: 23
<212> TYPE: DNA
<213> ORGANISM: Homo sapiens

<400> SEQUENCE: 329
atgatgtttc ccattcatac acc                                            23

<210> SEQ ID NO 330
<211> LENGTH: 23
<212> TYPE: DNA
<213> ORGANISM: Homo sapiens

<400> SEQUENCE: 330
tcccattcat acacctataa atc                                            23

<210> SEQ ID NO 331
<211> LENGTH: 23
<212> TYPE: DNA
<213> ORGANISM: Homo sapiens

<400> SEQUENCE: 331
cccattcata cacctataaa tct                                            23

<210> SEQ ID NO 332
<211> LENGTH: 23
<212> TYPE: DNA
<213> ORGANISM: Homo sapiens

<400> SEQUENCE: 332
tacacctata aatctctaac aag                                            23

<210> SEQ ID NO 333
<211> LENGTH: 23
<212> TYPE: DNA
<213> ORGANISM: Homo sapiens

<400> SEQUENCE: 333
```

```
acacctataa atctctaaca aga                                             23

<210> SEQ ID NO 334
<211> LENGTH: 23
<212> TYPE: DNA
<213> ORGANISM: Homo sapiens

<400> SEQUENCE: 334
acctataaat ctctaacaag agg                                             23

<210> SEQ ID NO 335
<211> LENGTH: 23
<212> TYPE: DNA
<213> ORGANISM: Homo sapiens

<400> SEQUENCE: 335
agaaacaaat atttacttag agt                                             23

<210> SEQ ID NO 336
<211> LENGTH: 23
<212> TYPE: DNA
<213> ORGANISM: Homo sapiens

<400> SEQUENCE: 336
ttgagaatgt tccaatccaa atg                                             23

<210> SEQ ID NO 337
<211> LENGTH: 23
<212> TYPE: DNA
<213> ORGANISM: Homo sapiens

<400> SEQUENCE: 337
atgaatgcat cacaacttac aat                                             23

<210> SEQ ID NO 338
<211> LENGTH: 23
<212> TYPE: DNA
<213> ORGANISM: Homo sapiens

<400> SEQUENCE: 338
acttacaatg ctgctcattg ttg                                             23

<210> SEQ ID NO 339
<211> LENGTH: 23
<212> TYPE: DNA
<213> ORGANISM: Homo sapiens

<400> SEQUENCE: 339
gtgagtacta tgagattcaa att                                             23

<210> SEQ ID NO 340
<211> LENGTH: 23
<212> TYPE: DNA
<213> ORGANISM: Homo sapiens

<400> SEQUENCE: 340
gattcaaatt tttctaacat atg                                             23

<210> SEQ ID NO 341
<211> LENGTH: 23
<212> TYPE: DNA
<213> ORGANISM: Homo sapiens
```

-continued

<400> SEQUENCE: 341
attcaaattt ttctaacata tgg                                           23

<210> SEQ ID NO 342
<211> LENGTH: 23
<212> TYPE: DNA
<213> ORGANISM: Homo sapiens

<400> SEQUENCE: 342
aacatatgga aagccttttg tcc                                           23

<210> SEQ ID NO 343
<211> LENGTH: 23
<212> TYPE: DNA
<213> ORGANISM: Homo sapiens

<400> SEQUENCE: 343
gggatcatgt gtttaaaaaa aga                                           23

<210> SEQ ID NO 344
<211> LENGTH: 23
<212> TYPE: DNA
<213> ORGANISM: Homo sapiens

<400> SEQUENCE: 344
gaagaaagat gggaaactga ata                                           23

<210> SEQ ID NO 345
<211> LENGTH: 23
<212> TYPE: DNA
<213> ORGANISM: Homo sapiens

<400> SEQUENCE: 345
aagaaagatg ggaaactgaa taa                                           23

<210> SEQ ID NO 346
<211> LENGTH: 23
<212> TYPE: DNA
<213> ORGANISM: Homo sapiens

<400> SEQUENCE: 346
acgaggaaat accctcaaaa cta                                           23

<210> SEQ ID NO 347
<211> LENGTH: 23
<212> TYPE: DNA
<213> ORGANISM: Homo sapiens

<400> SEQUENCE: 347
cgaggaaata ccctcaaaac taa                                           23

<210> SEQ ID NO 348
<211> LENGTH: 23
<212> TYPE: DNA
<213> ORGANISM: Homo sapiens

<400> SEQUENCE: 348
gaggaaatac cctcaaaact aac                                           23

<210> SEQ ID NO 349
<211> LENGTH: 23
<212> TYPE: DNA
<213> ORGANISM: Homo sapiens

```
<400> SEQUENCE: 349
accctcaaaa ctaacttgtt tac                                              23

<210> SEQ ID NO 350
<211> LENGTH: 23
<212> TYPE: DNA
<213> ORGANISM: Homo sapiens

<400> SEQUENCE: 350
ccctcaaaac taacttgttt aca                                              23

<210> SEQ ID NO 351
<211> LENGTH: 23
<212> TYPE: DNA
<213> ORGANISM: Homo sapiens

<400> SEQUENCE: 351
aaactaactt gtttacaaca aaa                                              23

<210> SEQ ID NO 352
<211> LENGTH: 23
<212> TYPE: DNA
<213> ORGANISM: Homo sapiens

<400> SEQUENCE: 352
aactaacttg tttacaacaa aat                                              23

<210> SEQ ID NO 353
<211> LENGTH: 23
<212> TYPE: DNA
<213> ORGANISM: Homo sapiens

<400> SEQUENCE: 353
actaacttgt ttacaacaaa ata                                              23

<210> SEQ ID NO 354
<211> LENGTH: 23
<212> TYPE: DNA
<213> ORGANISM: Homo sapiens

<400> SEQUENCE: 354
taacttgttt acaacaaaat aaa                                              23

<210> SEQ ID NO 355
<211> LENGTH: 23
<212> TYPE: DNA
<213> ORGANISM: Homo sapiens

<400> SEQUENCE: 355
acttgtttac aacaaaataa agt                                              23

<210> SEQ ID NO 356
<211> LENGTH: 23
<212> TYPE: DNA
<213> ORGANISM: Homo sapiens

<400> SEQUENCE: 356
ttgtttacaa caaaataaag tat                                              23

<210> SEQ ID NO 357
<211> LENGTH: 23
<212> TYPE: DNA
```

```
<213> ORGANISM: Homo sapiens

<400> SEQUENCE: 357
tacaacaaaa taaagtattc act                                              23

<210> SEQ ID NO 358
<211> LENGTH: 23
<212> TYPE: DNA
<213> ORGANISM: Homo sapiens

<400> SEQUENCE: 358
aacaaaataa agtattcact acc                                              23

<210> SEQ ID NO 359
<211> LENGTH: 23
<212> TYPE: DNA
<213> ORGANISM: Homo sapiens

<400> SEQUENCE: 359
aagtattcac taccatgtta aaa                                              23

<210> SEQ ID NO 360
<211> LENGTH: 23
<212> TYPE: DNA
<213> ORGANISM: Homo sapiens

<400> SEQUENCE: 360
agtattcact accatgttaa aaa                                              23

<210> SEQ ID NO 361
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 361
cuuugaacag guagugaauu u                                                21

<210> SEQ ID NO 362
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 362
gaaccauuag cagaaaguau u                                                21

<210> SEQ ID NO 363
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 363
gugucuuauu caaguaauau u                                                21

<210> SEQ ID NO 364
<211> LENGTH: 21
<212> TYPE: RNA
```

<213> ORGANISM: Artificial Sequence
<220> FEATURE:
<223> OTHER INFORMATION: Description of Artificial Sequence: Synthetic
      oligonucleotide

<400> SEQUENCE: 364
cuuugaacag guagugaauu u                                             21

<210> SEQ ID NO 365
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 365
ucaauuguca uauugcuacc a                                             21

<210> SEQ ID NO 366
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 366
uacaaaacgu gaauucuaca g                                             21

<210> SEQ ID NO 367
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 367
uaaaagucag cauuccagc a                                              21

<210> SEQ ID NO 368
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 368 ucuuuugcc uauuguuggg u                                              21

<210> SEQ ID NO 369
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 369
aguuugaaua gcacauuggu u                                             21

<210> SEQ ID NO 370
<211> LENGTH: 21
<212> TYPE: RNA
<213> ORGANISM: Artificial Sequence

```
<220> FEATURE:
<223> OTHER INFORMATION: Description of Artificial Sequence: Synthetic
      oligonucleotide

<400> SEQUENCE: 370
gaaccauuag cagaaaguau u                                                  21

<210> SEQ ID NO 371
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 371
ugcuuuugca gaaugaaggc a                                                  21

<210> SEQ ID NO 372
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 372
acuaacagga uucauuguca g                                                  21

<210> SEQ ID NO 373
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 373
auaaugauuu ccaaguucgu c                                                  21

<210> SEQ ID NO 374
<211> LENGTH: 19
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 374
uauuacuuga auaagacac                                                     19

<210> SEQ ID NO 375
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 375
auucacuacc uguucaaagu u                                                  21

<210> SEQ ID NO 376
<211> LENGTH: 21
<212> TYPE: RNA
<213> ORGANISM: Artificial Sequence
<220> FEATURE:
```

<223> OTHER INFORMATION: Description of Artificial Sequence: Synthetic
      oligonucleotide

<400> SEQUENCE: 376
uacuuucugc uaaugguucu u                                                     21

<210> SEQ ID NO 377
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 377
uauuacuuga auaagacacu u                                                     21

<210> SEQ ID NO 378
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 378
auucacuacc uguucaaagu u                                                     21

<210> SEQ ID NO 379
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 379
guagcaauau gacaauugaa u                                                     21

<210> SEQ ID NO 380
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 380
guagaauuca cguuuuguaa u                                                     21

<210> SEQ ID NO 381
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 381
cuggaaaugc ugacuuuuaa c                                                     21

<210> SEQ ID NO 382
<211> LENGTH: 21
<212> TYPE: RNA
<213> ORGANISM: Artificial Sequence
<220> FEATURE:
<223> OTHER INFORMATION: Description of Artificial Sequence: Synthetic oligonucleotide

<400> SEQUENCE: 382
ccaacaauag gcaaaaagau g                                              21

<210> SEQ ID NO 383
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 383
ccaaugugcu auucaaacug c                                              21

<210> SEQ ID NO 384
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 384
uacuuucugc uaaugguucu u                                              21

<210> SEQ ID NO 385
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 385
ccuucauucu gcaaaagcau u                                              21

<210> SEQ ID NO 386
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 386
gacaaugaau ccuguuaguu u                                              21

<210> SEQ ID NO 387
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 387
cgaacuugga aaucauuauu c                                              21

<210> SEQ ID NO 388
<211> LENGTH: 19
<212> TYPE: RNA
<213> ORGANISM: Artificial Sequence
<220> FEATURE:
<223> OTHER INFORMATION: Description of Artificial Sequence: Synthetic
      oligonucleotide

```
<400> SEQUENCE: 388
gugucuuauu caaguaaua                                              19

<210> SEQ ID NO 389
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 389

Gly Gly Gly Gly Gly Gly
1               5

<210> SEQ ID NO 390
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 390

Gly Gly Gly Gly Gly Gly Gly
1               5
```